US012562812B2

(12) United States Patent
Chaffee et al.

(10) Patent No.: US 12,562,812 B2
(45) Date of Patent: Feb. 24, 2026

(54) RADIO FREQUENCY SIGNAL TRANSMISSION USING FREE SPACE OPTICAL COMMUNICATIONS

(71) Applicant: Attochron, LLC, Lexington, VA (US)

(72) Inventors: Thomas M. Chaffee, Lexington, VA (US); Wayne H. Knox, Rochester, NY (US)

(73) Assignee: Attochron, LLC, Lexington, VA (US)

( * ) Notice: Subject to any disclaimer, the term of this patent is extended or adjusted under 35 U.S.C. 154(b) by 0 days.

(21) Appl. No.: 19/064,272

(22) Filed: Feb. 26, 2025

(65) Prior Publication Data

US 2025/0337489 A1     Oct. 30, 2025

Related U.S. Application Data

(63) Continuation of application No. 18/811,592, filed on Aug. 21, 2024, now Pat. No. 12,244,341, which is a
(Continued)

(51) Int. Cl.
| | |
|---|---|
| *H04B 10/11* | (2013.01) |
| *H01S 3/067* | (2006.01) |
(Continued)

(52) U.S. Cl.
CPC ......... *H04B 10/11* (2013.01); *H04B 10/5161* (2013.01); *H04B 10/615* (2013.01); *H01S 3/06716* (2013.01)

(58) Field of Classification Search
CPC .. H04B 10/11; H04B 10/5161; H04B 10/615; H04B 10/548; H04B 10/505;
(Continued)

(56) References Cited

U.S. PATENT DOCUMENTS

| | | | | |
|---|---|---|---|---|
| 6,466,886 | B1 | 10/2002 | Marmur | |
| 11,575,433 | B1 * | 2/2023 | Chaffee | .............. H04B 10/1121 |
(Continued)

OTHER PUBLICATIONS

International Search Report and Written Opinion from corresponding PCT application No. PCT/US25/35907 dated Aug. 26, 2025.

*Primary Examiner* — Hibret A Woldekidan
(74) *Attorney, Agent, or Firm* — Scale LLP

(57) ABSTRACT

The present disclosure provides a free space optical system for optically transmitting processed radio frequency signals through a variably refractive medium. The system may include a transmitting element configured to receive a first signal and process it to generate a time-division combined signal. The transmitting element includes an optical source to generate a beam of light, a modulator to modulate the beam of light based on the time-division combined signal, and an amplifier to amplify the modulated beam of light, which is transmitted through the variably refractive medium. A receiving element includes a photoreceiver to receive the amplified beam of light and extract a second time-division combined signal, a correction unit to correct distortion in the second time-division combined signal, a mixer to multiply the corrected signal with a predetermined frequency signal, an amplifier to amplify the multiplied signal, and an antenna to emit a radio signal generated from the amplified multiplied signal.

19 Claims, 87 Drawing Sheets

Related U.S. Application Data continuation-in-part of application No. 18/644,752, filed on Apr. 24, 2024, now Pat. No. 12,119,875.

(51) Int. Cl.
$\quad$ *H04B 10/516* $\qquad$ (2013.01)
$\quad$ *H04B 10/61* $\qquad$ (2013.01)

(58) Field of Classification Search
$\quad$ CPC .... H04B 10/40; H04B 10/614; H04B 10/118;
$\qquad\qquad$ H04B 10/524; H01S 3/06716
$\quad$ See application file for complete search history.

(56) References Cited

U.S. PATENT DOCUMENTS

| | | | |
|---|---|---|---|
| 2003/0039026 A1* | 2/2003 | Nishihara | H04B 10/2941 |
| | | | 359/337.4 |
| 2005/0196170 A1 | 9/2005 | Winsor | |
| 2010/0061738 A1* | 3/2010 | Giorgi | H04B 10/5055 |
| | | | 375/302 |
| 2014/0255032 A1 | 9/2014 | Gottwald et al. | |
| 2018/0097567 A1* | 4/2018 | LeGrange | H04B 10/293 |
| 2019/0190639 A1* | 6/2019 | Chaffee | H04B 10/506 |
| 2019/0199559 A1* | 6/2019 | Wang | H03M 3/45 |
| 2021/0242944 A1* | 8/2021 | Chaffee | H01S 3/0675 |

\* cited by examiner (b) PZ Response (a) Fiber PZ Actuator

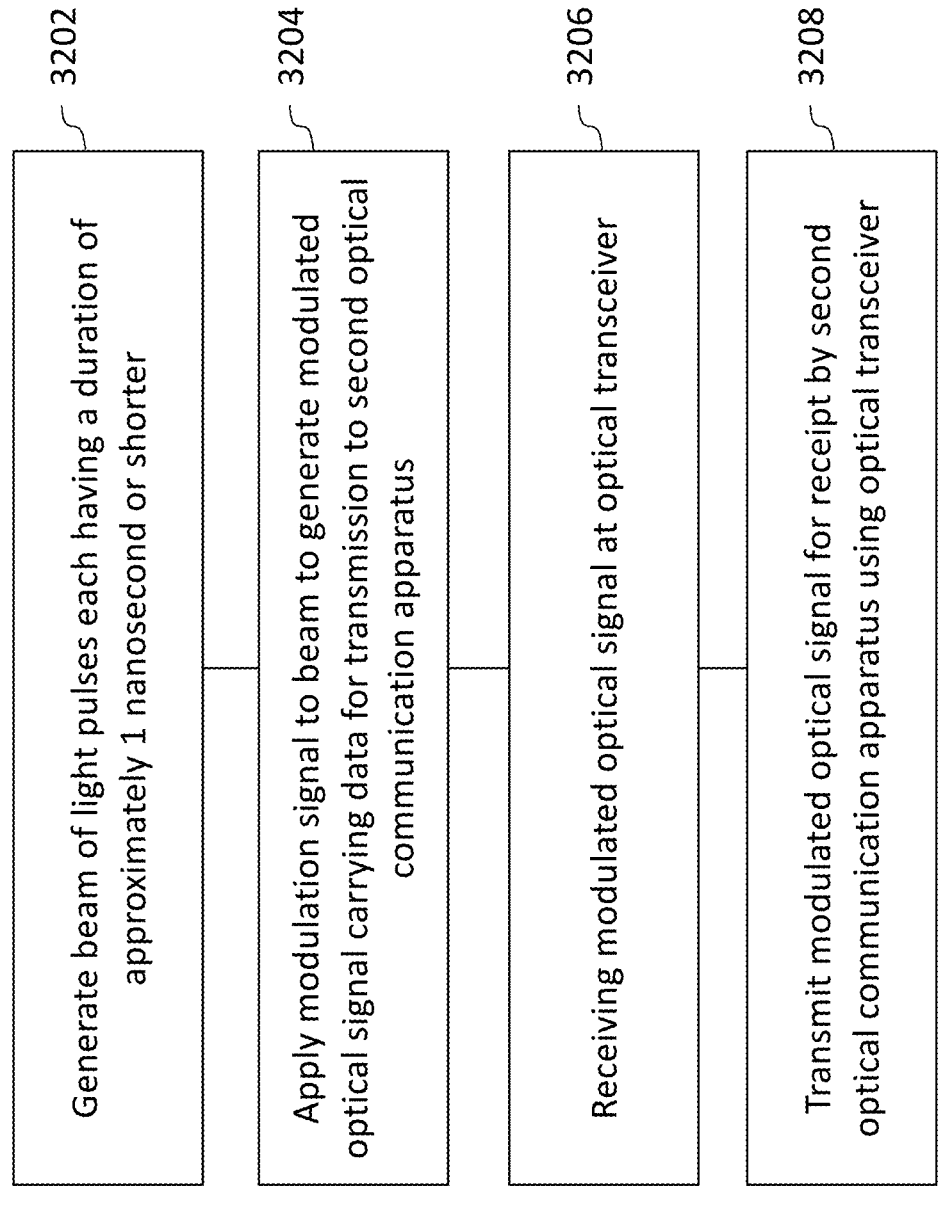

3202

Generate beam of light pulses each having a duration of approximately 1 nanosecond or shorter

3204

Apply modulation signal to beam to generate modulated optical signal carrying data for transmission to second optical communication apparatus

3206

Receiving modulated optical signal at optical transceiver

3208

Transmit modulated optical signal for receipt by second optical communication apparatus using optical transceiver

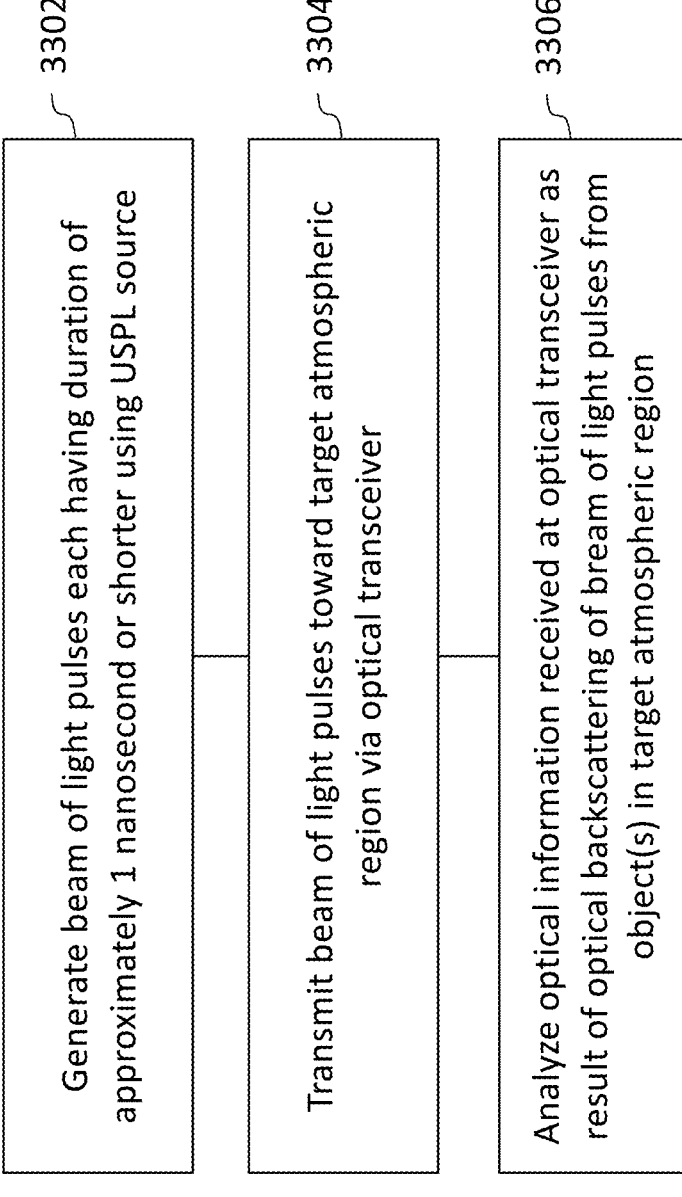

Generate beam of light pulses each having duration of approximately 1 nanosecond or shorter using USPL source — 3302

Transmit beam of light pulses toward target atmospheric region via optical transceiver — 3304

Analyze optical information received at optical transceiver as result of optical backscattering of bream of light pulses from object(s) in target atmospheric region — 3306

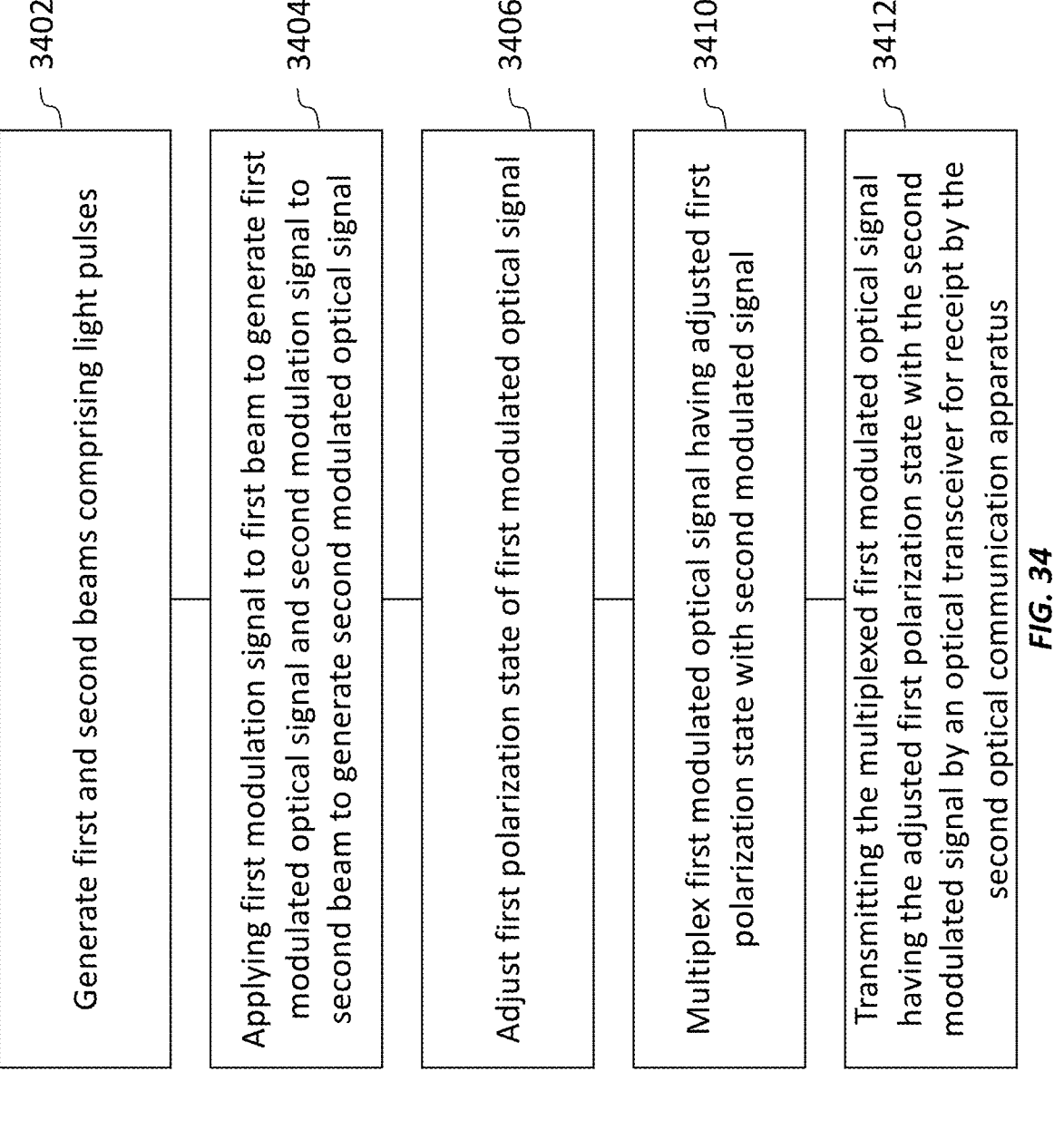

3402

Generate first and second beams comprising light pulses

3404

Applying first modulation signal to first beam to generate first modulated optical signal and second modulation signal to second beam to generate second modulated optical signal

3406

Adjust first polarization state of first modulated optical signal

3410

Multiplex first modulated optical signal having adjusted first polarization state with second modulated signal

3412

Transmitting the multiplexed first modulated optical signal having the adjusted first polarization state with the second modulated signal by an optical transceiver for receipt by the second optical communication apparatus

90 fs pulse launched

4020

4010

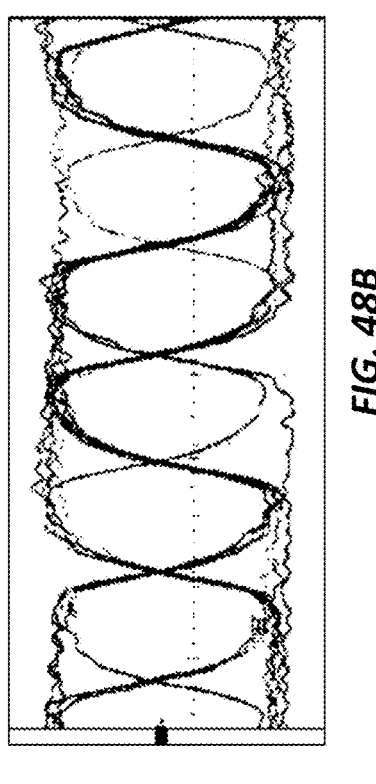
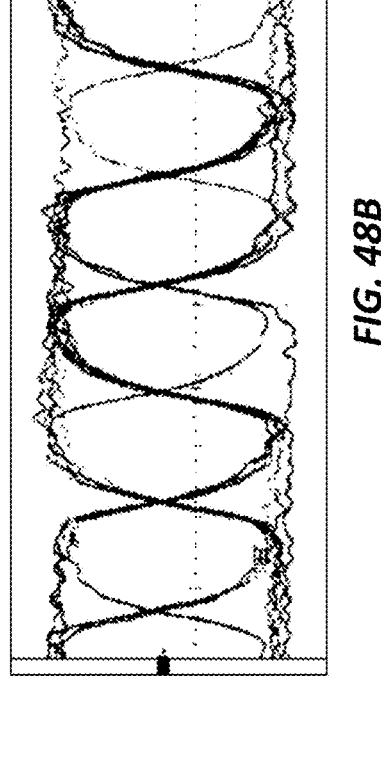
FIG. 48B
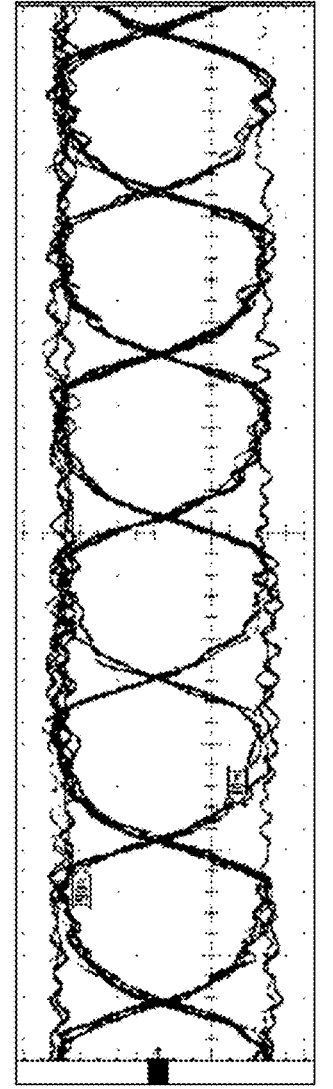
FIG. 48C
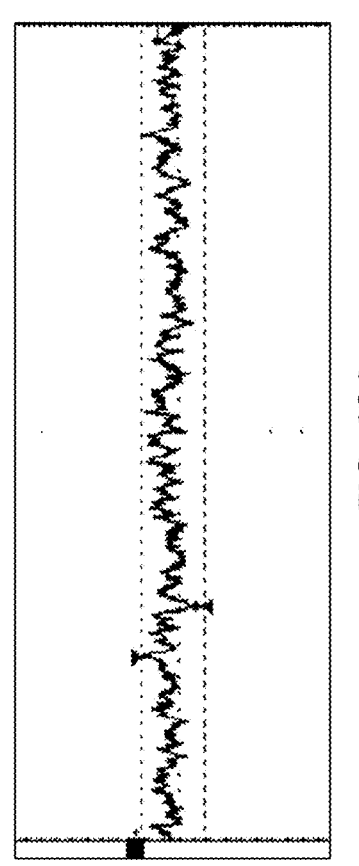
FIG. 48A

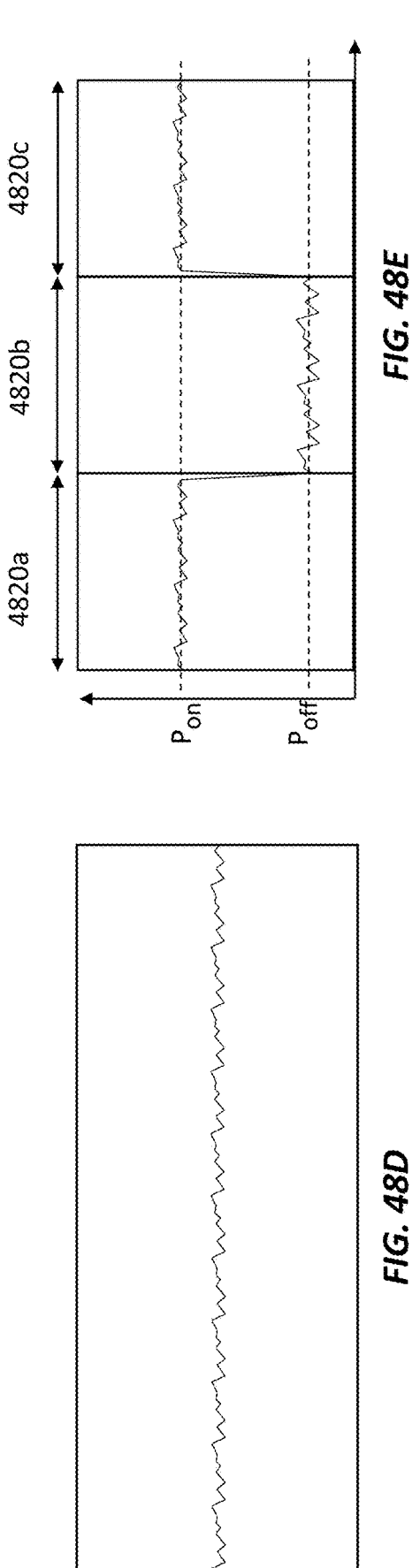
*FIG. 48E*
*FIG. 48D*
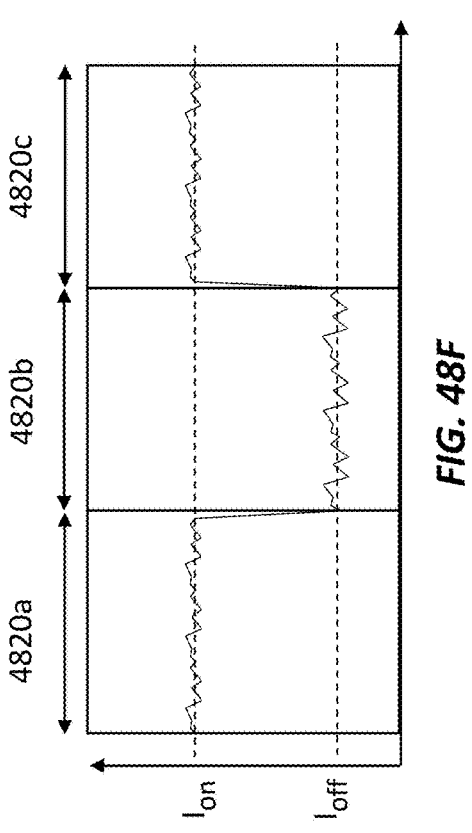
*FIG. 48F*

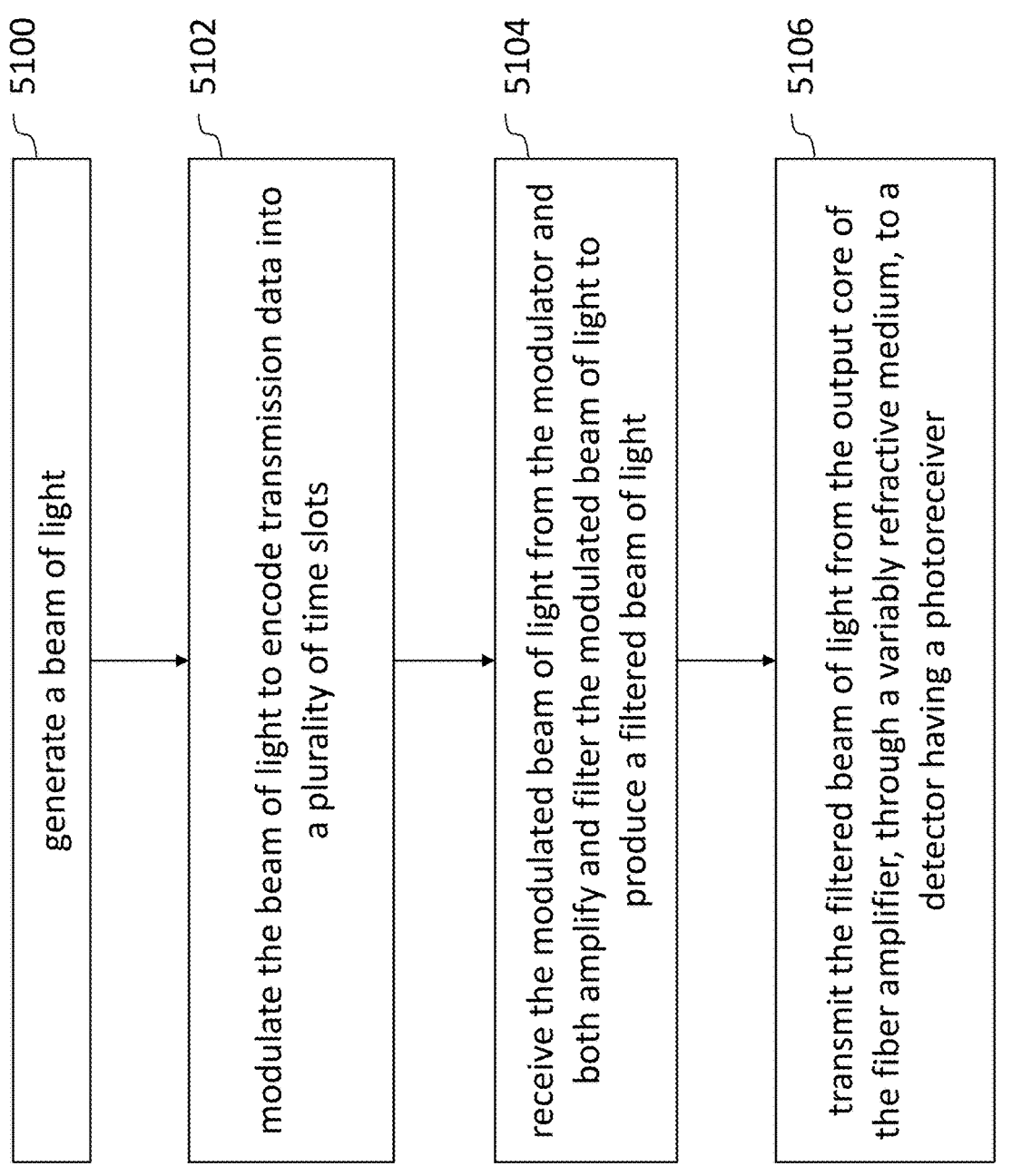

5100   generate a beam of light 5102   modulate the beam of light to encode transmission data into a plurality of time slots 5104   receive the modulated beam of light from the modulator and both amplify and filter the modulated beam of light to produce a filtered beam of light 5106   transmit the filtered beam of light from the output core of the fiber amplifier, through a variably refractive medium, to a detector having a photoreceiver

*FIG. 51*

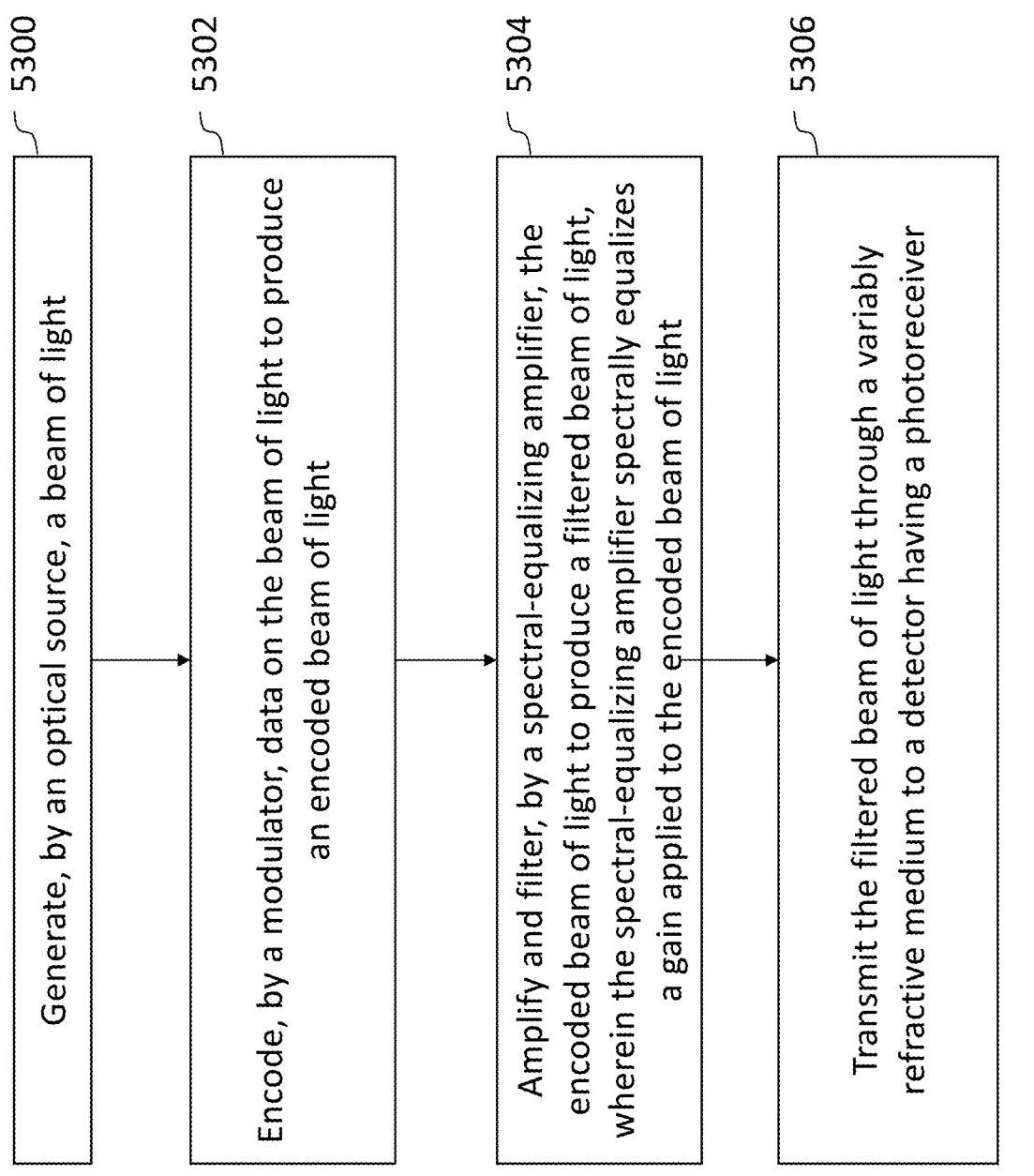

5300

Generate, by an optical source, a beam of light

5302

Encode, by a modulator, data on the beam of light to produce an encoded beam of light

5304

Amplify and filter, by a spectral-equalizing amplifier, the encoded beam of light to produce a filtered beam of light, wherein the spectral-equalizing amplifier spectrally equalizes a gain applied to the encoded beam of light

5306

Transmit the filtered beam of light through a variably refractive medium to a detector having a photoreceiver

*FIG. 53*

(a)
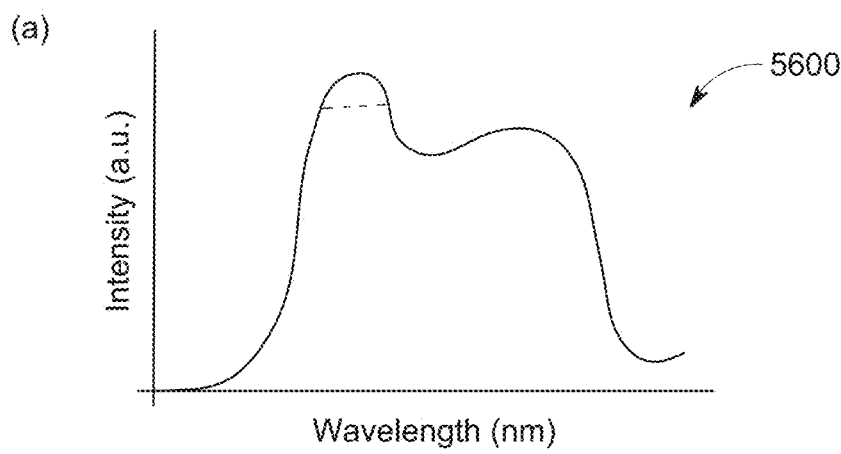
(b)
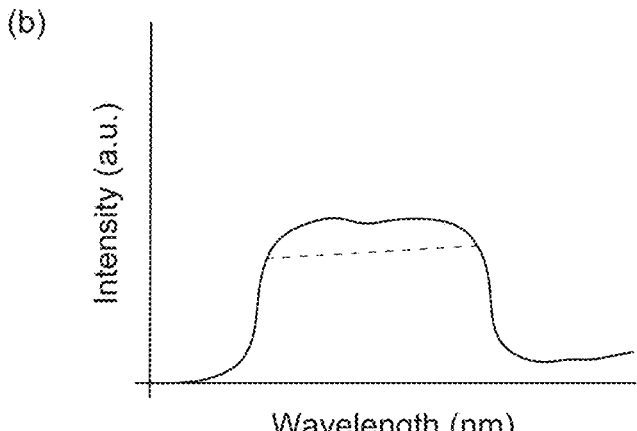
(c)
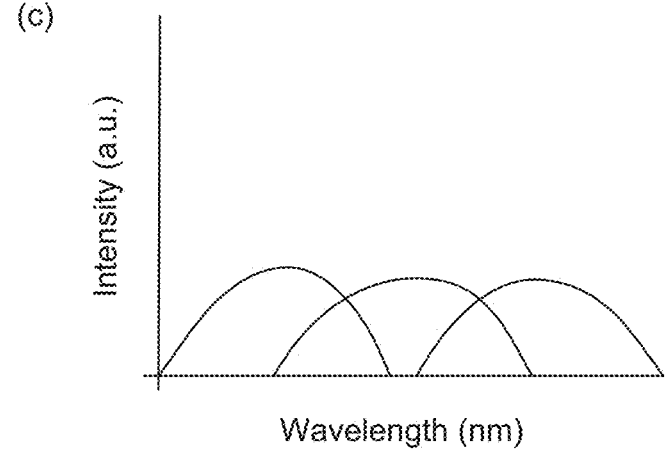
FIG. 56A

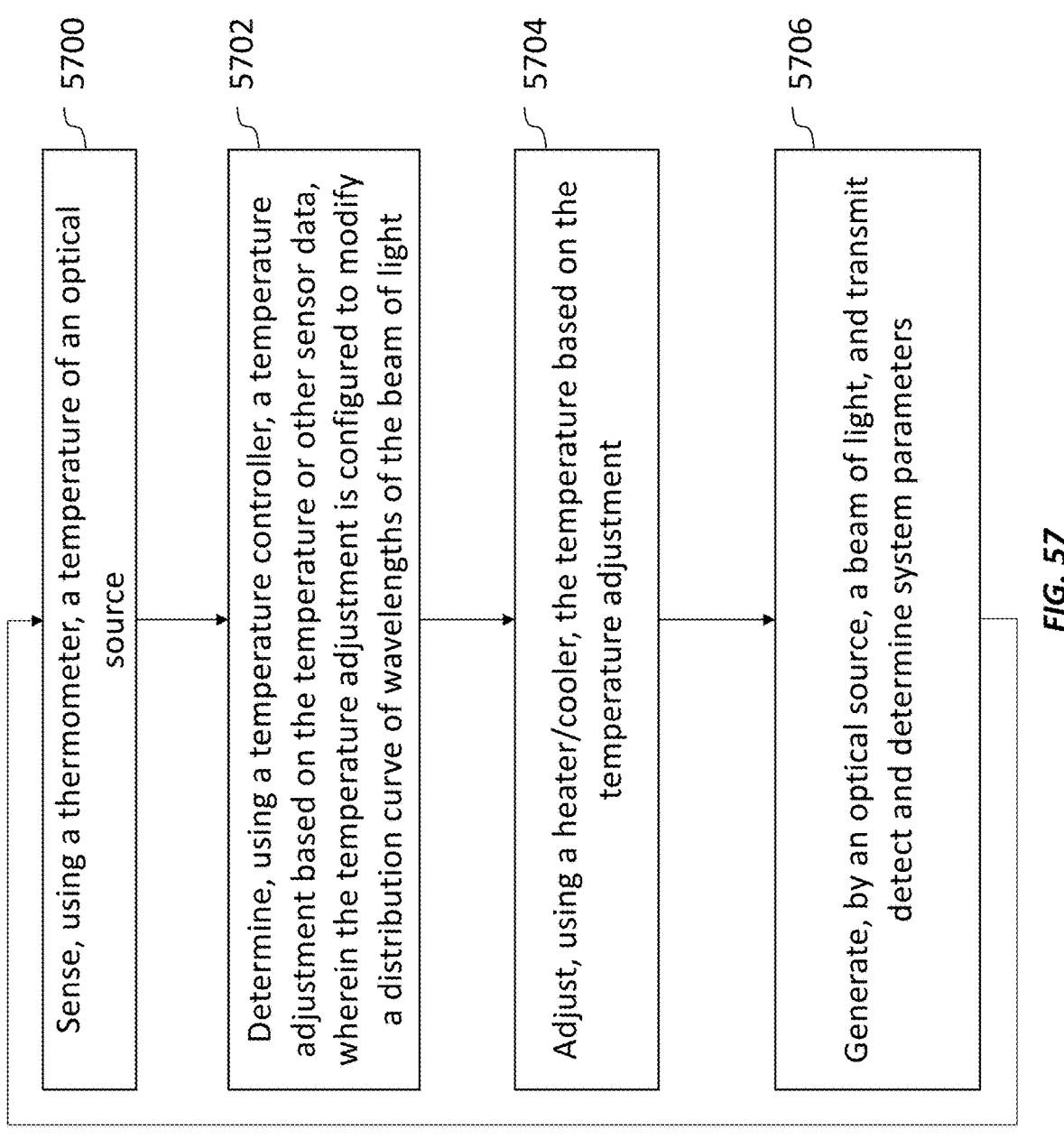

5700

Sense, using a thermometer, a temperature of an optical source

5702

Determine, using a temperature controller, a temperature adjustment based on the temperature or other sensor data, wherein the temperature adjustment is configured to modify a distribution curve of wavelengths of the beam of light

5704

Adjust, using a heater/cooler, the temperature based on the temperature adjustment

5706

Generate, by an optical source, a beam of light, and transmit detect and determine system parameters

*FIG. 57*

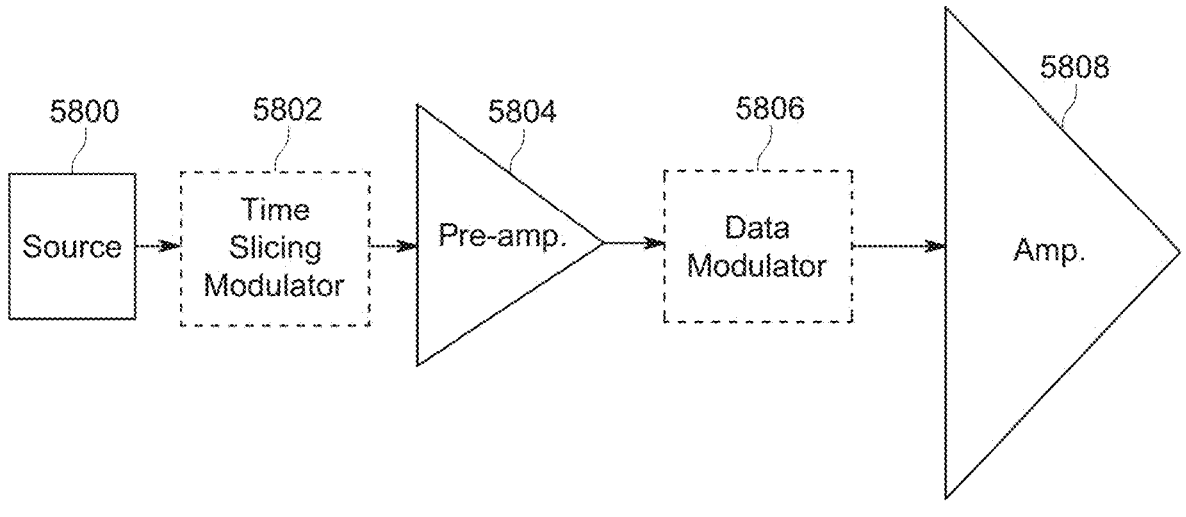
FIG. 58A
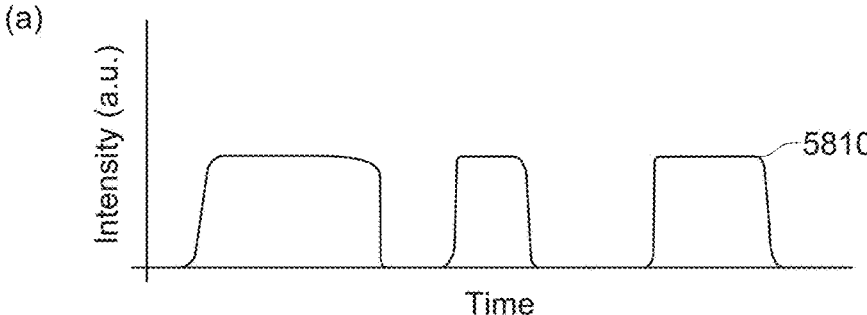
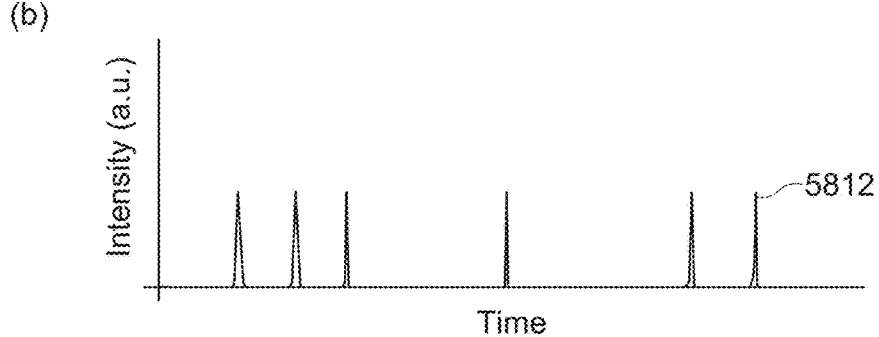
FIG. 58B

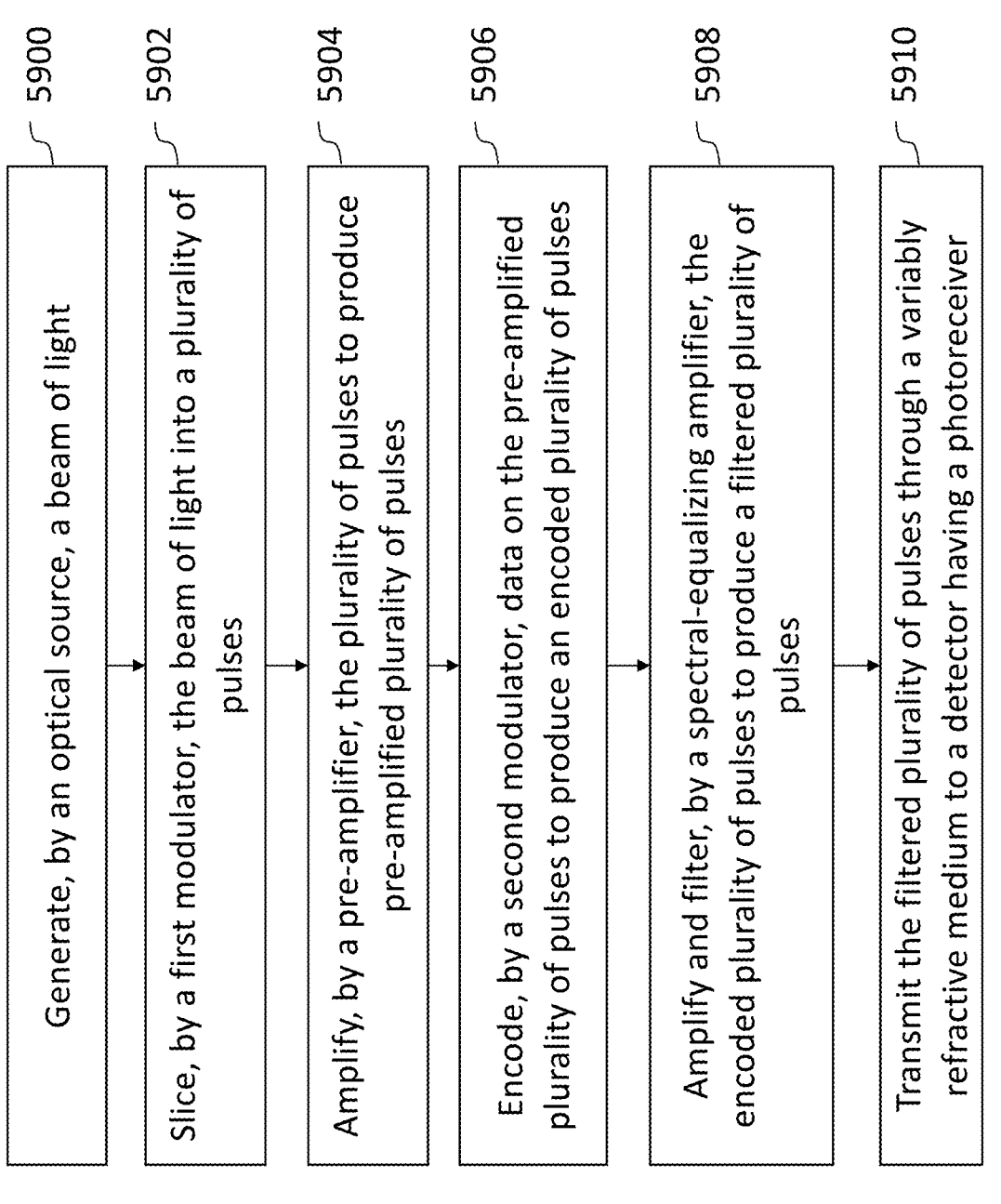

5900

Generate, by an optical source, a beam of light

5902

Slice, by a first modulator, the beam of light into a plurality of pulses

5904

Amplify, by a pre-amplifier, the plurality of pulses to produce pre-amplified plurality of pulses

5906

Encode, by a second modulator, data on the pre-amplified plurality of pulses to produce an encoded plurality of pulses

5908

Amplify and filter, by a spectral-equalizing amplifier, the encoded plurality of pulses to produce a filtered plurality of pulses

5910

Transmit the filtered plurality of pulses through a variably refractive medium to a detector having a photoreceiver

*FIG. 59*

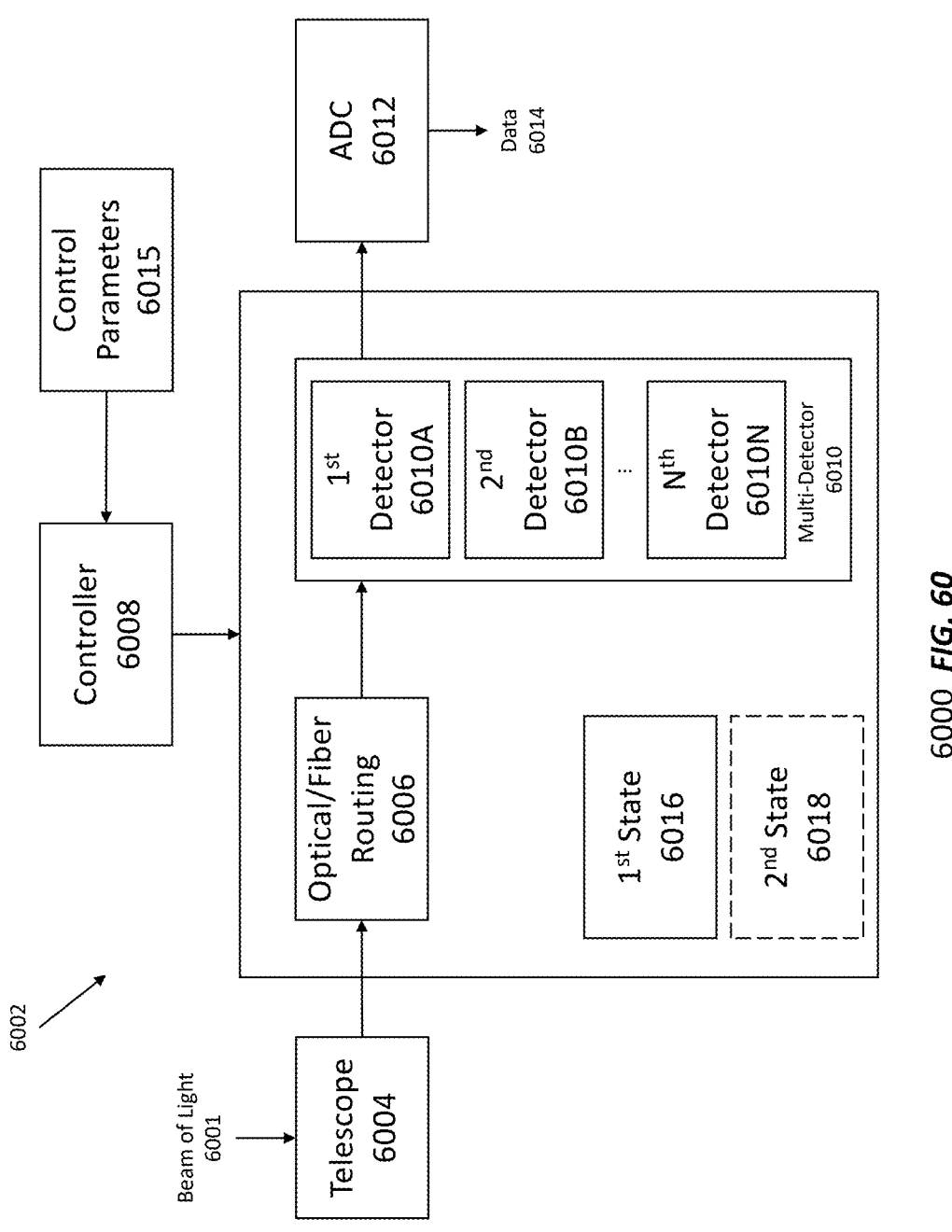
6000 *FIG. 60*

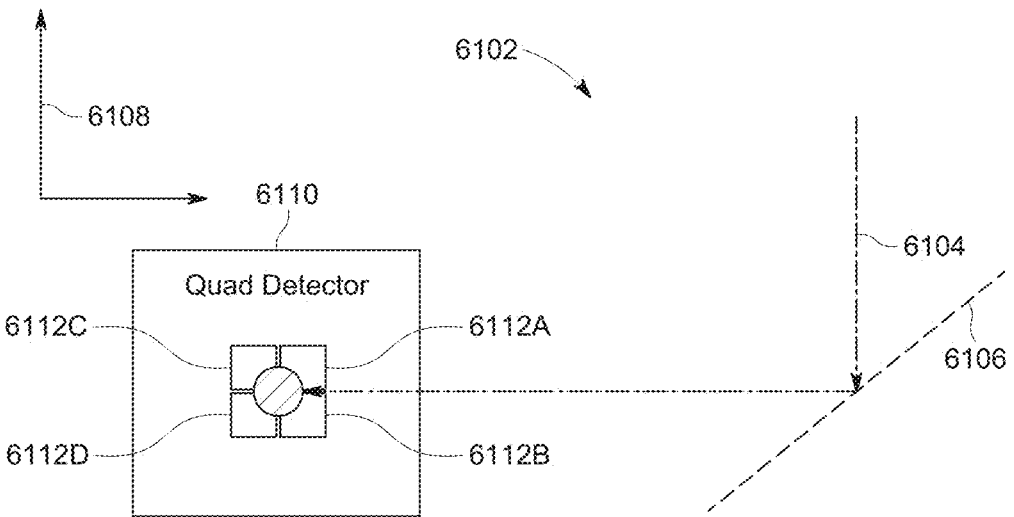
6100  FIG. 61

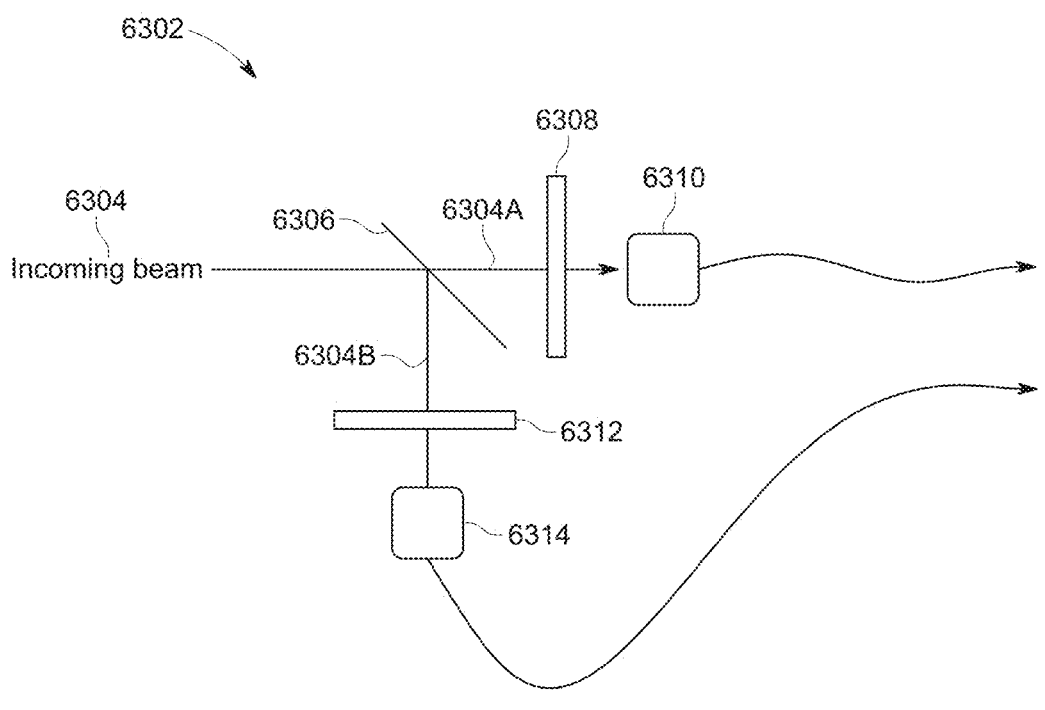
6300 FIG. 63
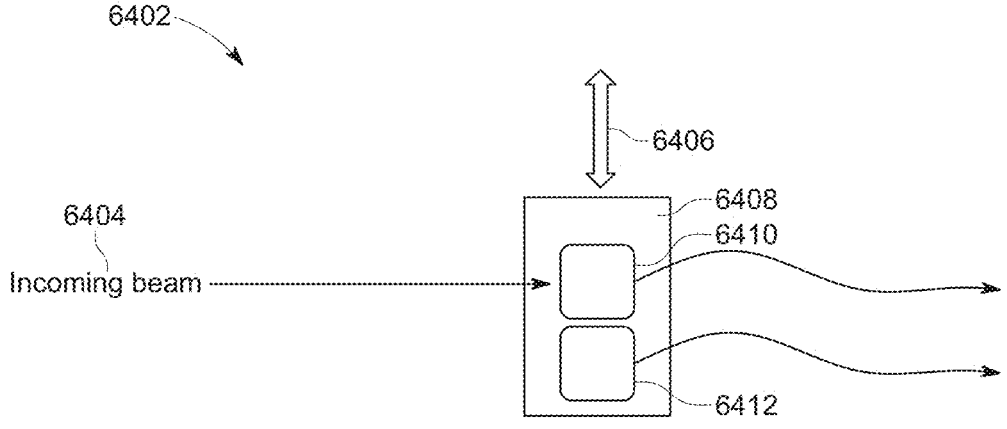
6400 FIG. 64

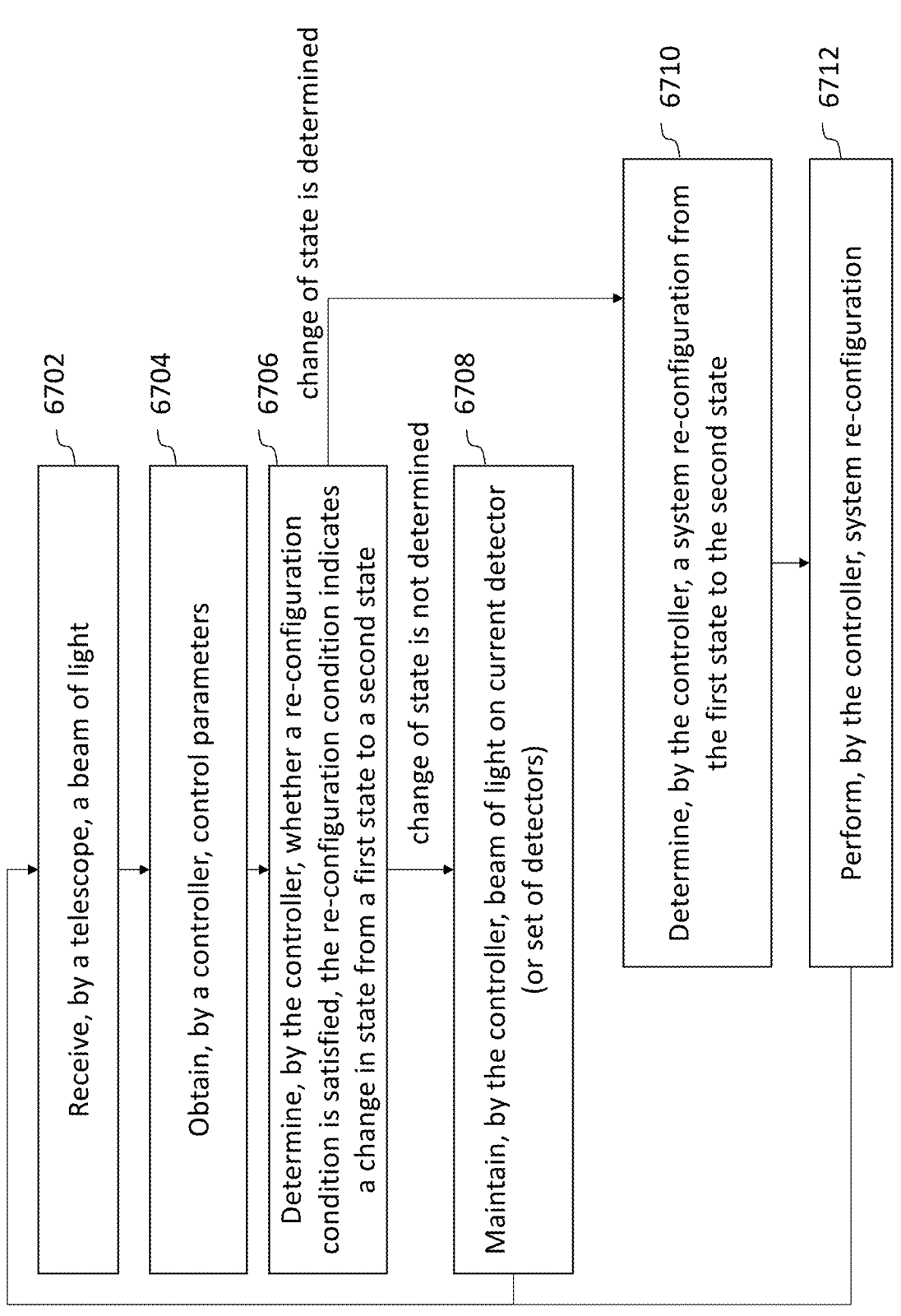

6702   Receive, by a telescope, a beam of light

6704   Obtain, by a controller, control parameters

6706   Determine, by the controller, whether a re-configuration condition is satisfied, the re-configuration condition indicates a change in state from a first state to a second state change of state is determined change of state is not determined 6708   Maintain, by the controller, beam of light on current detector (or set of detectors)

6710   Determine, by the controller, a system re-configuration from the first state to the second state 6712   Perform, by the controller, system re-configuration

6700   *FIG. 67*

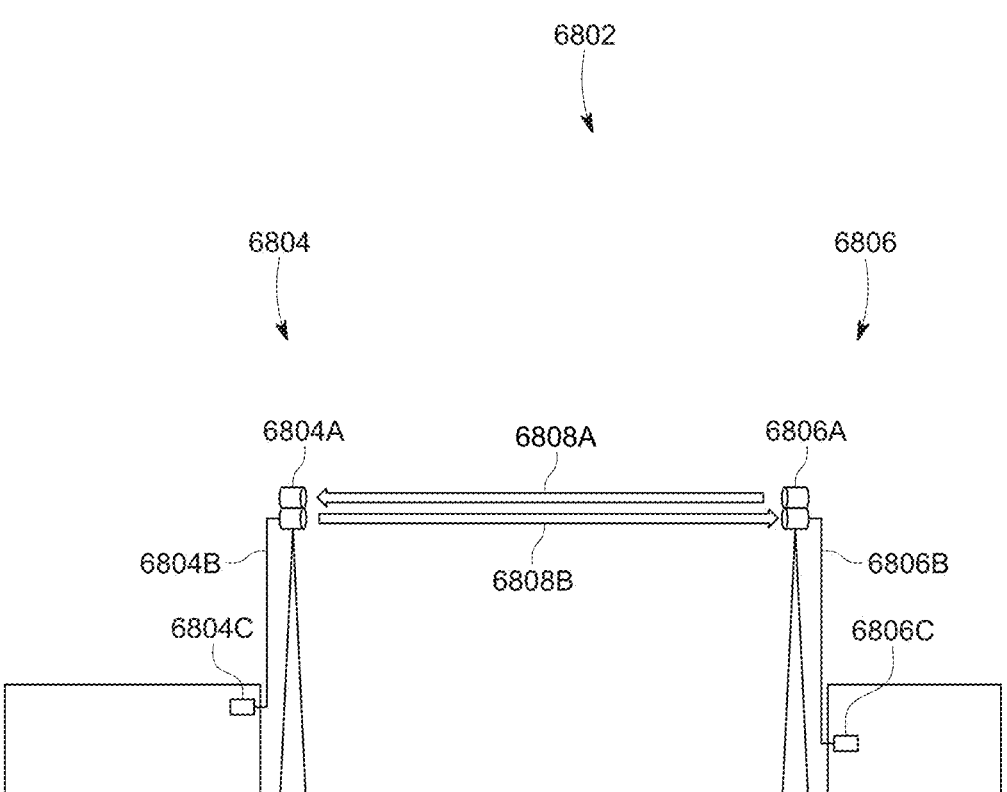
6800 FIG. 68

7000 FIG. 70

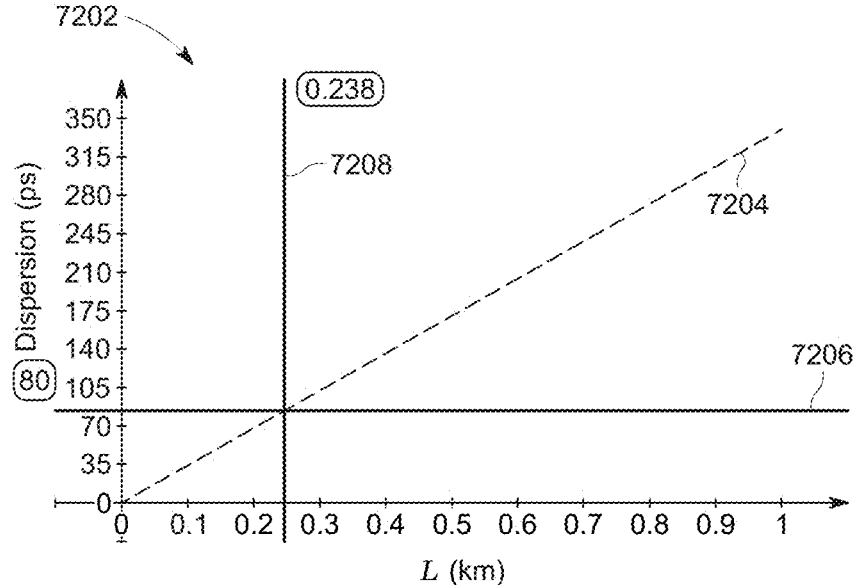
7200 FIG. 72

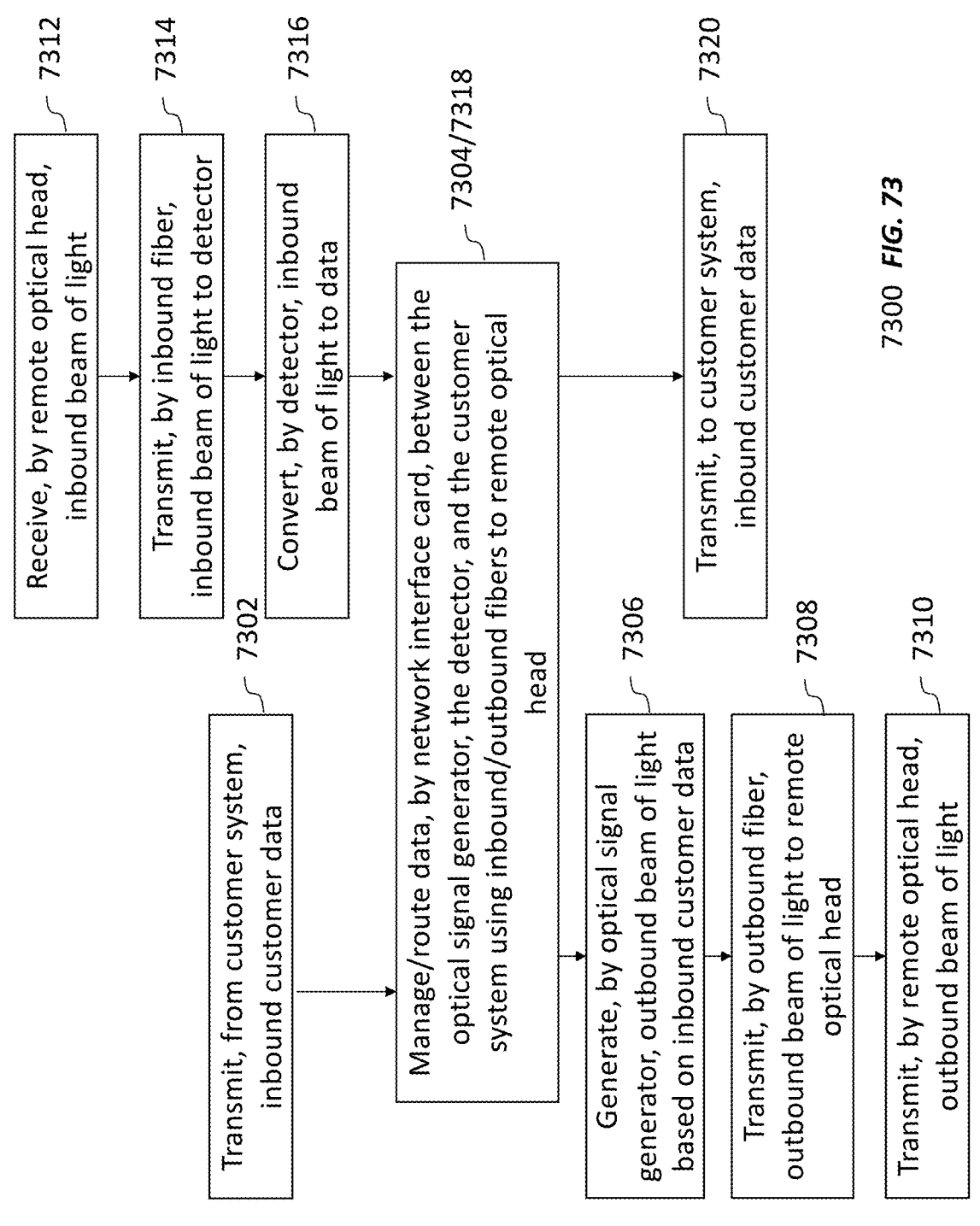

Receive, by remote optical head, inbound beam of light — 7312

Transmit, by inbound fiber, inbound beam of light to detector — 7314

Convert, by detector, inbound beam of light to data — 7316

Manage/route data, by network interface card, between the optical signal generator, the detector, and the customer system using inbound/outbound fibers to remote optical head — 7304/7318

Transmit, to customer system, inbound customer data — 7320

Transmit, from customer system, inbound customer data — 7302

Generate, by optical signal generator, outbound beam of light based on inbound customer data — 7306

Transmit, by outbound fiber, outbound beam of light to remote optical head — 7308

Transmit, by remote optical head, outbound beam of light — 7310

7300 *FIG. 73*

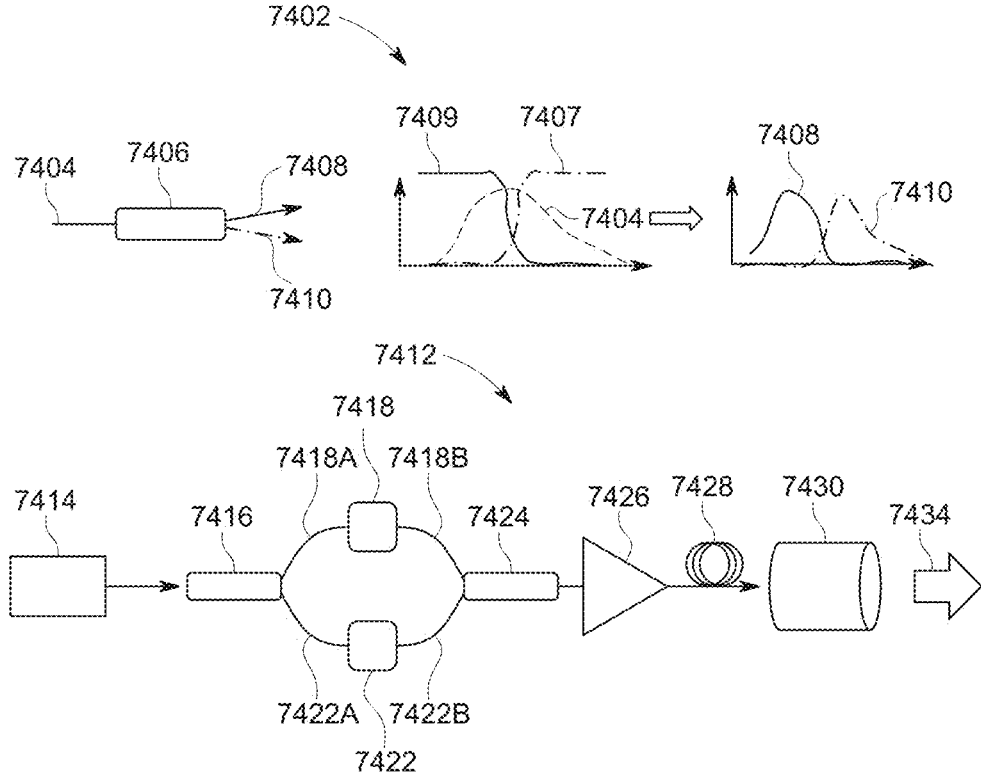
7400 FIG. 74

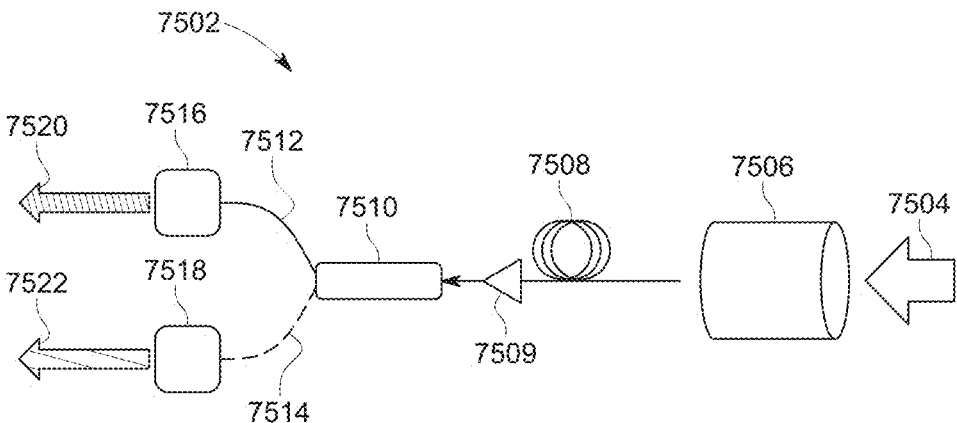
7500 FIG. 75

7600 *FIG. 76*

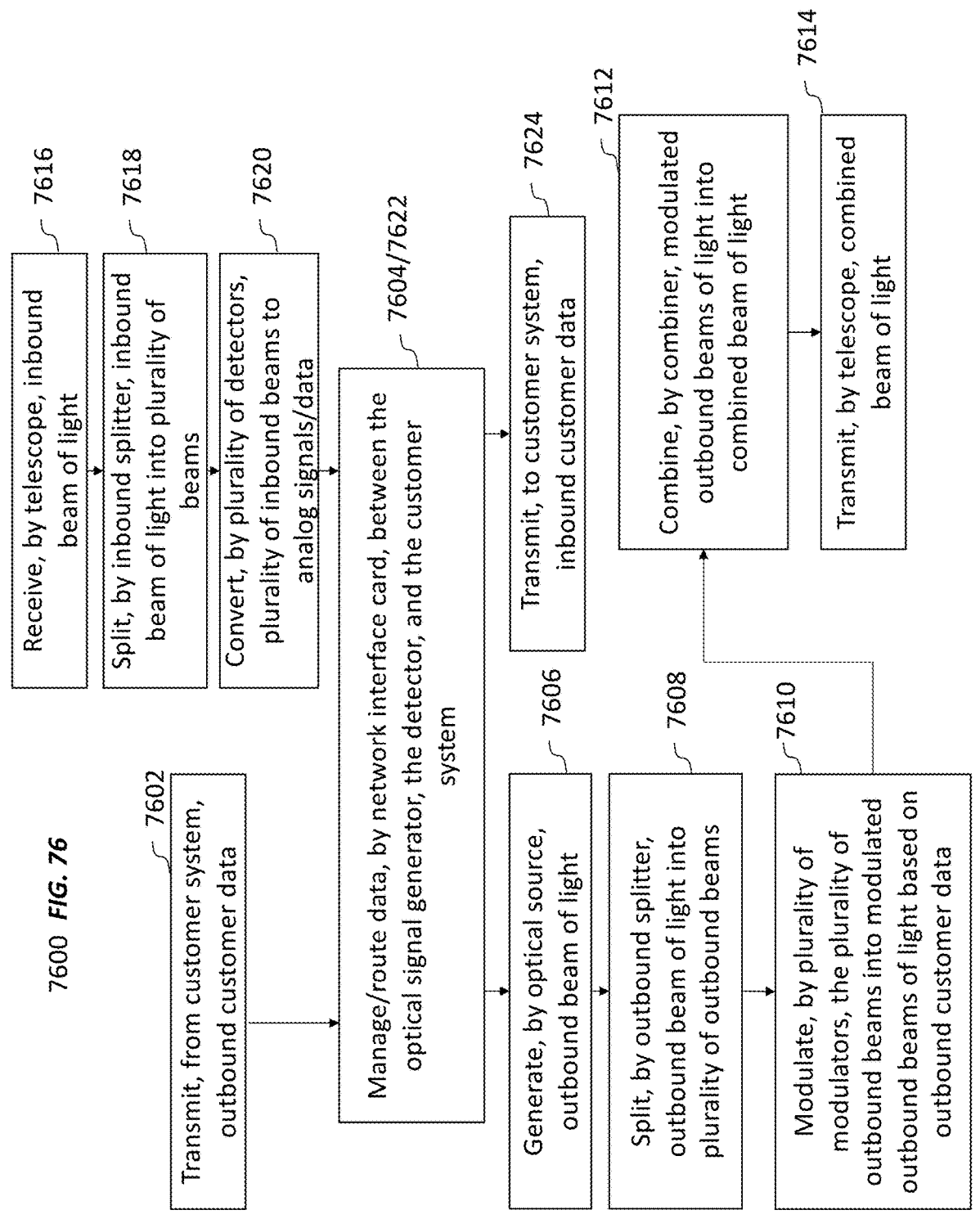

Receive, by telescope, inbound beam of light — 7616

Split, by inbound splitter, inbound beam of light into plurality of beams — 7618

Convert, by plurality of detectors, plurality of inbound beams to analog signals/data — 7620

Transmit, from customer system, outbound customer data — 7602

Manage/route data, by network interface card, between the optical signal generator, the detector, and the customer system — 7604/7622

Transmit, to customer system, inbound customer data — 7624

Generate, by optical source, outbound beam of light — 7606

Split, by outbound splitter, outbound beam of light into plurality of outbound beams — 7608

Modulate, by plurality of modulators, the plurality of outbound beams into modulated outbound beams of light based on outbound customer data — 7610

Combine, by combiner, modulated outbound beams of light into combined beam of light — 7612

Transmit, by telescope, combined beam of light — 7614

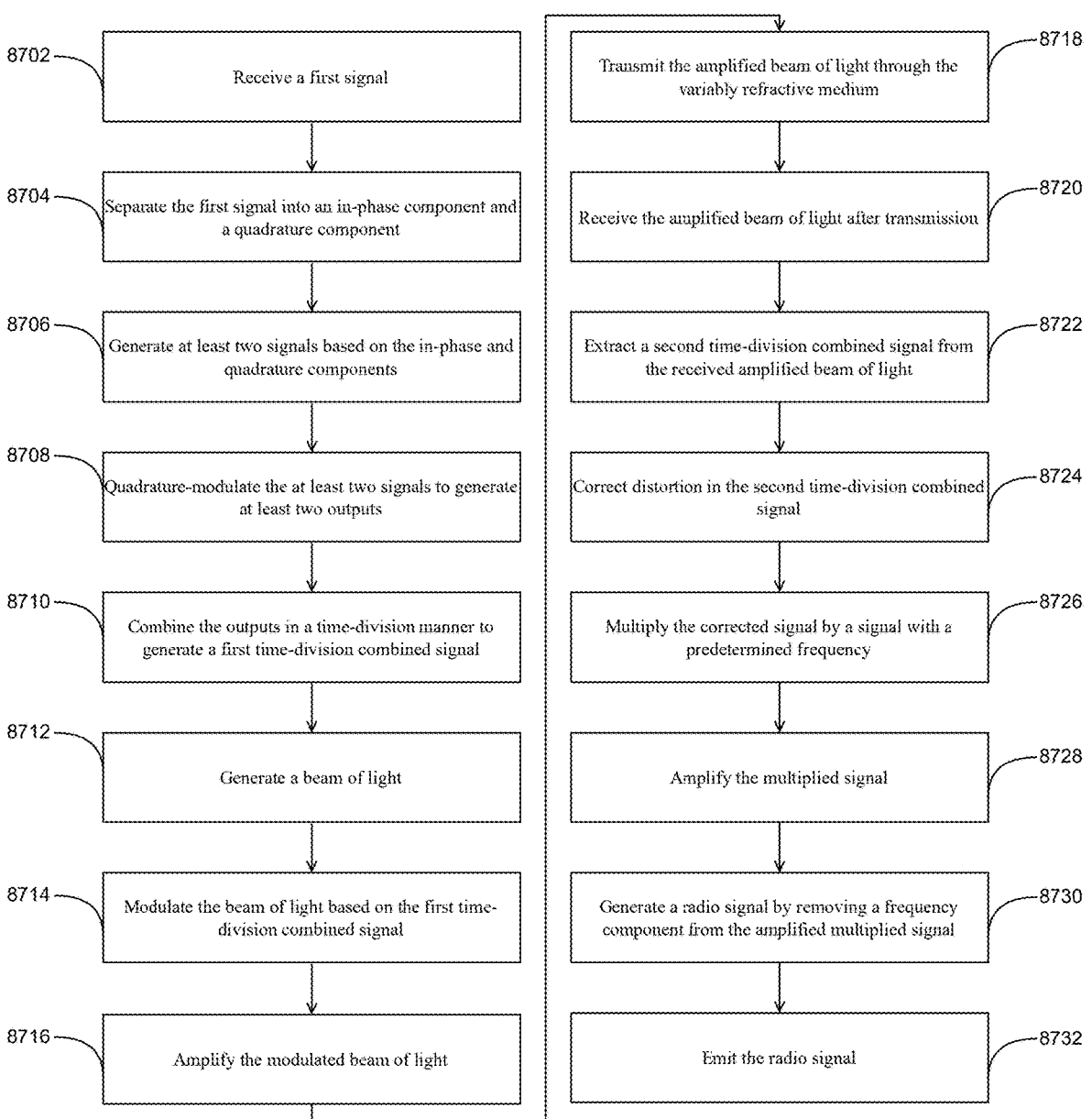

8702 — Receive a first signal

8704 — Separate the first signal into an in-phase component and a quadrature component 8706 — Generate at least two signals based on the in-phase and quadrature components 8708 — Quadrature-modulate the at least two signals to generate at least two outputs 8710 — Combine the outputs in a time-division manner to generate a first time-division combined signal 8712 — Generate a beam of light 8714 — Modulate the beam of light based on the first time-division combined signal 8716 — Amplify the modulated beam of light 8718 — Transmit the amplified beam of light through the variably refractive medium 8720 — Receive the amplified beam of light after transmission 8722 — Extract a second time-division combined signal from the received amplified beam of light 8724 — Correct distortion in the second time-division combined signal 8726 — Multiply the corrected signal by a signal with a predetermined frequency 8728 — Amplify the multiplied signal 8730 — Generate a radio signal by removing a frequency component from the amplified multiplied signal 8732 — Emit the radio signal

FIG. 87 8700

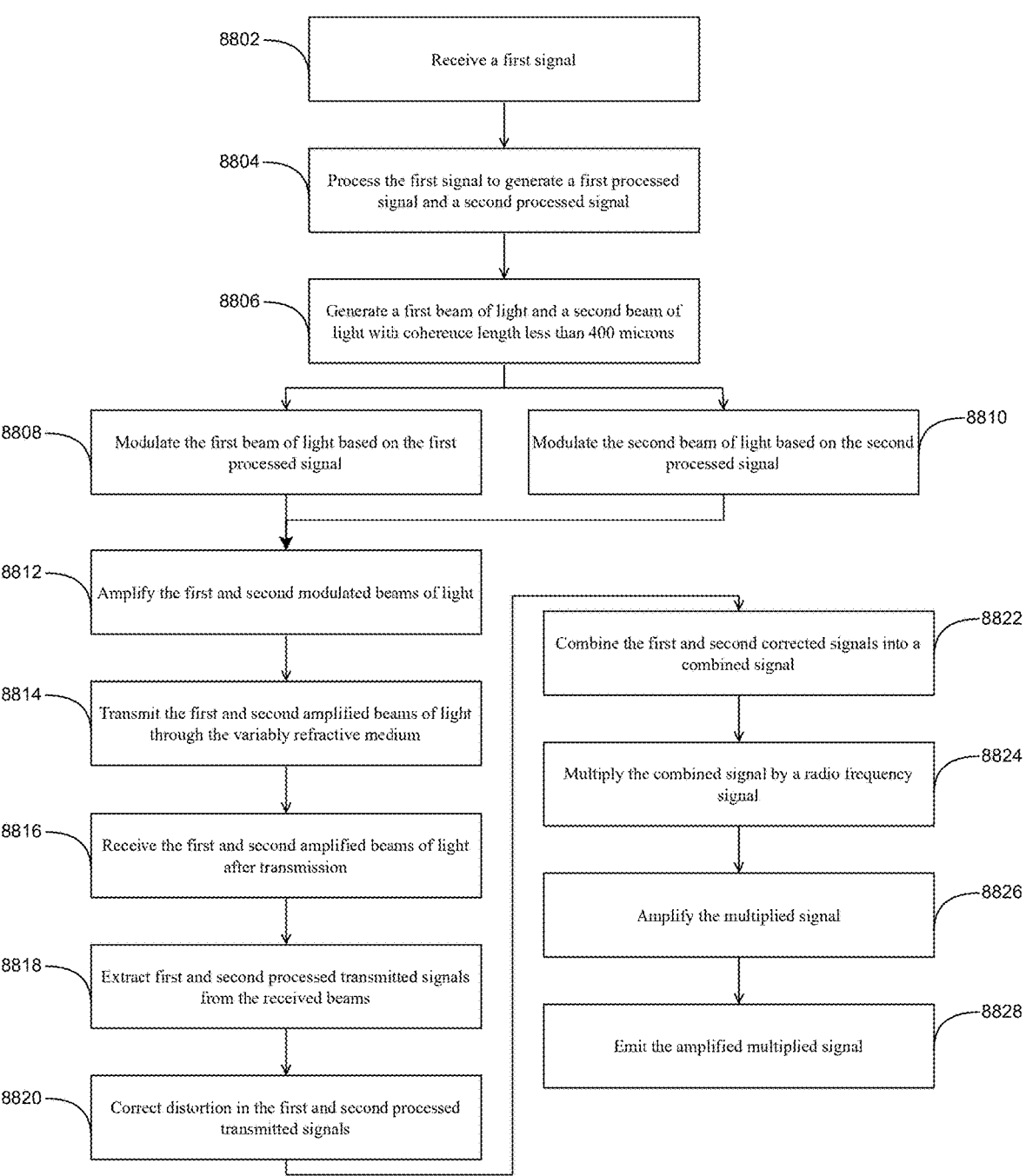
FIG. 88     8800

1

RADIO FREQUENCY SIGNAL TRANSMISSION USING FREE SPACE OPTICAL COMMUNICATIONS

CROSS-REFERENCE TO RELATED APPLICATION(S)

This application is a continuation of U.S. application Ser. No. 18/811,592, filed Aug. 21, 2024.

U.S. application Ser. No. 18/811,592, filed Aug. 21, 2024, is a continuation-in-part of U.S. application Ser. No. 18/644, 752, filed Apr. 24, 2024, now issued as U.S. Pat. No. 12,119,875 on Oct. 15, 2024.

The entire contents of each of the foregoing are incorporated herein by reference.

FIELD OF THE DISCLOSURE

The subject matter described herein relates to free-space optical (FSO) wireless transmission including optical communications, remote-sensing, laser ranging, power beaming, etc., and more particularly, to enhanced optical transport efficiencies that can be realized for wavelength propagation using short coherence length sources for beam propagation through a variably refractive medium such as the Earth's atmosphere.

BACKGROUND

FSO communications have potential to greatly increase data throughput, decrease cost, and increase access for high-speed internet and other communications technologies. To date, however, FSO communication systems have had limited operational success due to atmospheric interference, which reduces the distance over which data can be optically transmitted and introduces bit errors. Meanwhile, alternative communications technologies, such as radiofrequency and microwave communications, face significant spectrum limitations and cannot be used to deliver sufficient data to meet demand. Currently available optical systems are not able to produce sufficiently accurate, reliable, and available data transmission results that can reliably offload communications demand from these radiofrequency and microwave systems and improve data transmission and access, nor can currently available optical systems transmit data over long distances.

Superluminescent diodes (SLEDs) produce substantial noise in the form of random power fluctuations and have historically been unsuitable for use in carrier-grade FSO communications.

Accordingly, there is a need for optical communication systems that can provide highly reliable, highly available data transmission over long distances. Further, there is a need for optical communication that can reliably transmit data over long distances, such as half a mile or more.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some cases, a free space optical communication system for optically transmitting data through a variably refractive medium may include: a transmitting element configured to receive a first signal, wherein the transmitting element includes: a processor configured to: separate the first signal into an in-phase component and a quadrature component; based on the in-phase component and the quadrature component, generate at least two signals; quadrature-modulate the at least two signals to generate at least two outputs; and combine the at least two outputs in a time-division manner to generate a first time-division combined signal; an optical source configured to generate a beam of light; a modulator configured to receive the first time-division combined signal and the beam of light, and modulate the beam of light based on the time-division combined signal to form a modulated beam of light; a first amplifier configured to receive the modulated beam of light from the modulator and amplify the modulated beam of light to produce an amplified beam of light; and a telescope configured to transmit the amplified beam of light through the variably refractive medium; a receiving element comprising: a photoreceiver configured to receive the amplified beam of light and extract a second time-division combined signal from the amplified beam of light after the amplified beam of light was transmitted through the variably refractive medium; a correction unit configured to correct distortion in the second time-division combined signal created during transmission of the amplified beam of light through the variably refractive medium, thereby producing a corrected signal; a mixer configured to receive the corrected signal, and multiply the corrected signal by a signal having a predetermined frequency to produce a multiplied signal; a second amplifier configured to amplify the multiplied signal to produce an amplified multiplied signal; a band-pass filter configured to generate a radio signal by removing a frequency component contained in a predetermined frequency band from the amplified multiplied signal; and an antenna configured to emit the radio signal.

In some cases, a free space optical communication system for optically transmitting data through a variably refractive medium may include: a transmitting element configured to receive a first signal, wherein the transmitting element includes: a processor configured to: process the first signal and generate a first processed signal and a second processed signal; an optical source configured to generate a first beam of light and a second beam of light, wherein the first beam of light and the second beam of light emitted by the optical source each have a coherence length less than 400 microns; a first modulator, wherein the first modulator is configured to: receive a first one of the first processed signal and the second processed signal and a first one of the first beam of light and the second beam of light, and modulate the first one of the first beam of light and the second beam of light based on the first one of the first processed signal and the second processed signal to form a first modulated beam of light; a second modulator, wherein the second modulator is configured to: receive a second one of the first processed signal and the second processed signal and a second one of the first beam of light and the second beam of light, and modulate the second one of the first beam of light and the second beam of light based on the second one of the first processed signal and the second processed signal to form a second modulated beam of light; a first amplifier configured to receive the first modulated beam of light and the second modulated beam of light from the first modulator and the second modulator and amplify the first modulated beam of light and the second modulated beam of light to produce a first amplified beam of light and a second amplified beam of light; and a telescope configured to transmit the first amplified beam of light and the second amplified beam of light through the variably refractive medium; a receiving element comprising: a photoreceiver configured to receive the first amplified beam of light and the second amplified beam of light and configured to: extract a first processed transmitted signal from the first amplified beam of light after the first amplified beam of light was transmitted through the variably refractive medium; and extract a second processed transmitted signal from the second amplified beam of light after the second amplified beam of light was transmitted through the variably refractive medium; a correction unit configured to: correct distortion in the first processed transmitted signal created during transmission of the first amplified beam of light through the variably refractive medium, thereby producing a first corrected signal; and correct distortion in the second processed transmitted signal created during transmission of the second amplified beam of light through the variably refractive medium, thereby producing a second corrected signal; a combiner configured to combine the first corrected signal and the second corrected signal into a combined signal; a radio frequency local oscillator configured to generate a radio frequency signal; a mixer configured to receive the combined signal and the radio frequency signal, and multiply the combined signal by the radio frequency signal to produce a multiplied signal; a second amplifier configured to amplify the multiplied signal to produce an amplified multiplied signal; and an antenna configured to emit the amplified multiplied signal.

In some cases, a free space optical communication system for optically transmitting data through a variably refractive medium may include: a transmitting element configured to receive a first signal, wherein the transmitting element includes: a processor configured to: process the first signal and generate at least one processed signal; an optical source configured to generate at least one beam of light, the at least one beam of light emitted by the optical source having a coherence length less than 400 microns; at least one modulator configured to receive the at least one processed signal and the at least one beam of light, and modulate the at least one beam of light based on the at least one processed signal to form at least one modulated beam of light; a first amplifier configured to receive the at least one modulated beam of light from the at least one modulator and amplify the at least one modulated beam of light to produce at least one amplified beam of light; and a telescope configured to transmit the at least one amplified beam of light through the variably refractive medium; a receiving element comprising: a photoreceiver configured to receive the at least one amplified beam of light and extract at least one processed transmitted signal from the amplified beam of light after the amplified beam of light was transmitted through the variably refractive medium; a correction unit configured to correct distortion in the at least one processed transmitted signal created during transmission of the amplified beam of light through the variably refractive medium, thereby producing at least one corrected signal; a mixer configured to receive the at least one corrected signal, and multiply the at least one corrected signal by a signal having a predetermined frequency to produce a multiplied signal; a second amplifier configured to amplify the multiplied signal to produce an amplified multiplied signal; and an antenna configured to emit the amplified multiplied signal.

Further variations encompassed within the systems and methods are described in the detailed description of the invention below.

BRIEF DESCRIPTION OF THE DRAWINGS

The accompanying drawings, which are incorporated in and constitute a part of this specification, show certain aspects of the subject matter disclosed herein and, together with the descriptions, help explain some of the principles associated with the disclosed implementations.

FIG. 32 is a process flow chart illustrating features of a method consistent with implementations of the current subject matter.

FIG. 33 is another process flow chart illustrating features of a method consistent with implementations of the current subject matter.

FIG. 34 is another process flow chart illustrating features of a method consistent with implementations of the current subject matter.

FIGS. 48A-C show measurements of an exemplary continuous wave output.

FIGS. 48D-F show illustrative representations of the measurements shown in FIGS. 48A-C.

FIG. 51 shows an exemplary flow chart of the optical communication system configured to transmit data through a medium.

FIG. 53 shows an exemplary method of spectrally equalizing a gain of a beam of light using a spectrally-equalizing amplifier.

FIG. 56A shows exemplary diagrams demonstrating how to align the wavelengths of the output of the source and the output of the amplifier to achieve a maximally broad output bandwidth.

FIG. 57 shows an exemplary method for tuning a temperature of an optical source to optically transmit data through a refractive medium.

FIG. 58A shows an exemplary system for optically transmitting data through a variably refractive medium using pulses short enough where data can be extracted from a pulse at a rate less than a detection response time.

FIG. 58B shows exemplary diagrams of power distributions of the beam generated by the optical source and of the chopped pulses.

FIG. 59 shows an exemplary method of for optically transmitting data through a variably refractive medium using pulses short enough where data can be extracted from a pulse at a rate less than a detection response time.

FIG. 60 is a block diagram of a multi-detector system of a free-space optical system for free-space communications.

FIG. 61 depicts a schematic of a multi-detector system for free-space communications.

FIG. 63 depicts a schematic of a multi-detector system for free-space communications.

FIG. 64 depicts a schematic of a multi-detector system for free-space communications.

FIG. 67 depicts a flowchart of a multi-detector system for free-space communications.

FIG. 68 depicts a schematic for a remote optical head configuration of a free-space communications system.

FIG. 72 depicts a graph of a relationship between the length of a fiber in kilometers and the dispersion in picoseconds.

FIG. 73 depicts a flowchart for a remote optical head configuration of a free space optical transceiver system for free-space communications.

FIG. 74 depicts a schematic of channel formation and a WDM transmitter for a free space optical transceiver system for a free-space communications system.

FIG. 75 depicts a schematic of a WDM receiver for a free space optical transceiver system for a free-space communications system.

FIG. 76 depicts a flowchart of a free space optical transceiver system for free-space communications using WDM.

FIG. 87 depicts a flowchart for time-multiplexing in a free-space optical communication system for analog or radio frequency signal transmission.

FIG. 88 depicts a flowchart for multi-channel free-space optical communication system for analog or radio frequency signal transmission.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

1. FREE SPACE OPTICAL SYSTEMS

Figure 1:
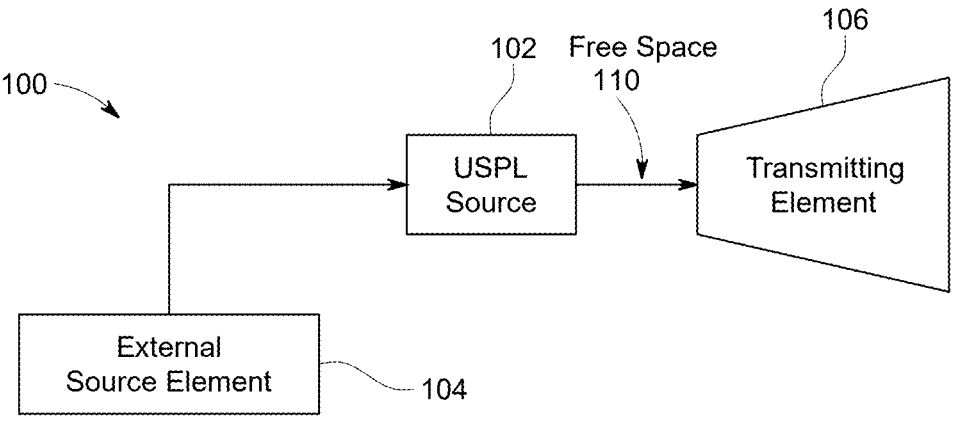
FIG. 1 depicts an example of an optical communications platform including free-space coupling of a USPL source as an optical source for transport to a remote optical receive terminal.

FIG. 1 illustrates an example of an optical communications platform 100 configured to use an USPL source as an optical source for transport. As shown in FIG. 1, a USPL source 102 may be directly modulated by an external source element 104. Optical power from the USPL source 102 can be coupled across free space 110 to a transmitting element 106, optionally by an optical telescope. The transmitting element 106 can optionally include optical components formed by hyperbolic mirror fabrication techniques, conventional Newtonian designs, or the like. A reciprocal receiving telescope at a receiver system can provide for optical reception. Consistent with implementations of the current subject matter, each optical transport platform can be designed to operate as a bi-directional unit. In other words, the transmitting element 106 of the optical communications platform 100 can also function as a receiving element. In general, unless otherwise explicitly stated, a transmitting element 106 as described can be considered to also be functional as a receiving element and vice versa. An optical element that performs both transmission and receiving functions can be referred to herein as an optical transceiver.

Figure 2:
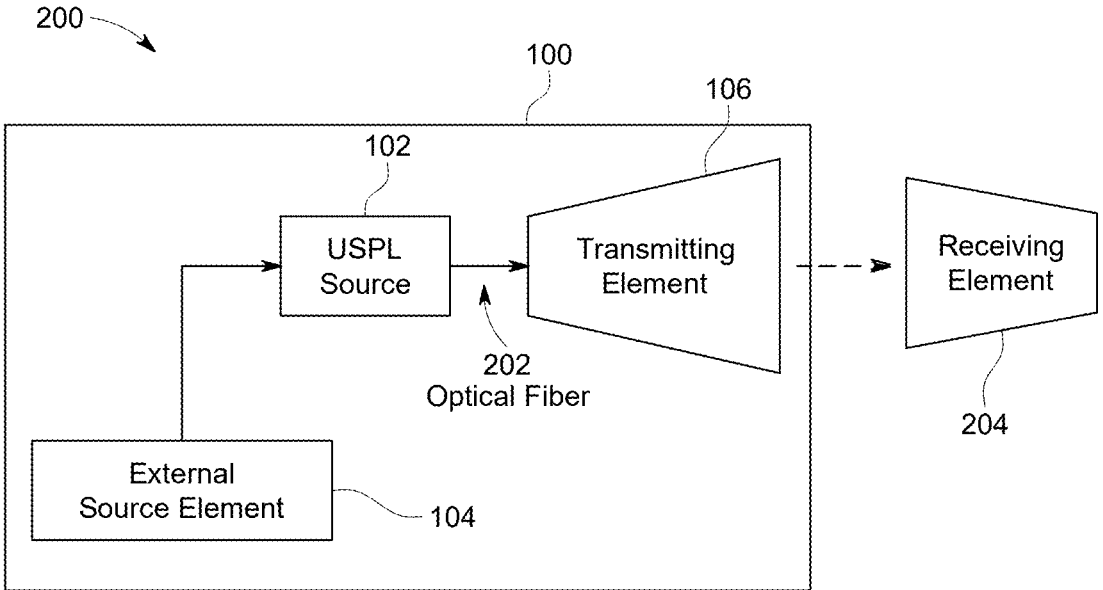
FIG. 2 depicts an example of an optical communications platform including fiber coupling of a USPL source as an optical source for transport to a remote optical receive terminal.

FIG. 2 illustrates an example of an optical communications system 200 that includes the optical communications platform 100 of FIG. 1. Also shown in FIG. 2 is a second complementary receiving element 204, which can be a receiving telescope located at a remote distance from the transmitting element 106. As noted above, both the transmitting element 106 and the receiving element 204 can be bi-directional, and each can function as both a transmitting element 106 and a receiving element 204 depending on the instantaneous direction of data transmission in the optical communications system 200. This feature applies throughout this disclosure for transmitting and receiving elements unless otherwise explicitly stated. Either or both of the transmitting element 106 and the receiving element 204 can be optical telescopes or other devices for transmitting and receiving optical information.

Figure 3:
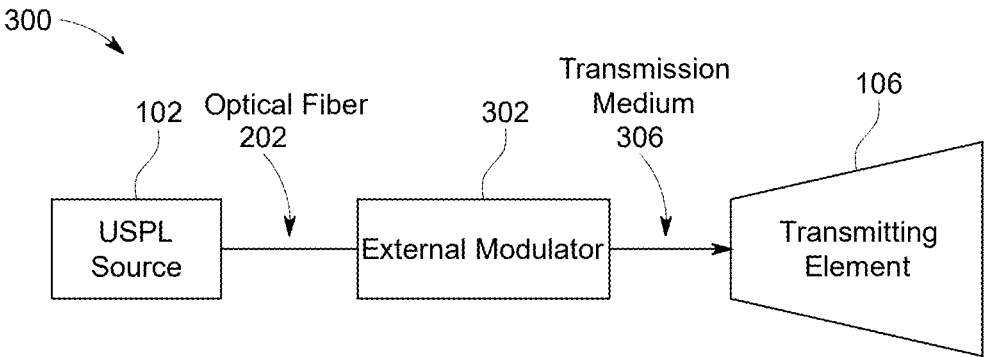
FIG. 3 depicts an example of an optical communications platform including fiber coupling of a USPL source to an external modulator for transport to a remote optical receive terminal.

FIG. 3 illustrates an example of an optical communications platform 300 for using an USPL source 102 fiber coupled to an external modulator 302 through a fiber medium 304 and connected to a transmitting element 106 through an additional transmission medium 306, which can optionally be a fiber medium, a free space connection, etc. The USPL source 102 can be externally modulated by the external modulator 302 such that optical power from the USPL source 102 is fiber coupled to the transmitting element 106 or handled via an equivalent optical telescope.

Figure 4:
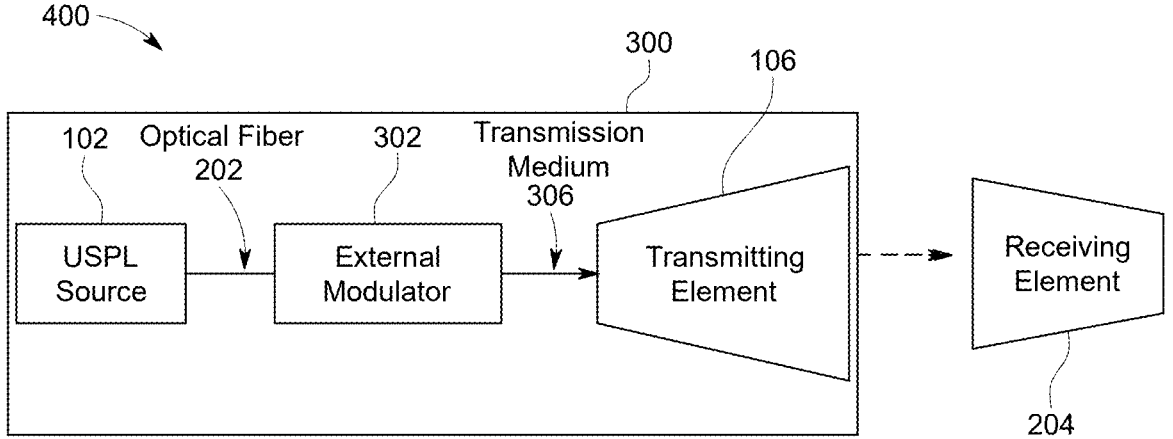
FIG. 4 depicts an example of an optical communications platform including fiber coupling of a USPL source to an external modulator through a fiber medium for transport to a remote optical receive terminal.

FIG. 4 illustrates an example of an optical communications system 400 that includes the optical communications platform 300 of FIG. 3. Also shown in FIG. 4 is a second complementary receiving telescope 204, which, as noted above in relation to FIG. 2, can be a receiving telescope located at a remote distance from the transmitting element 106.

Figure 5:
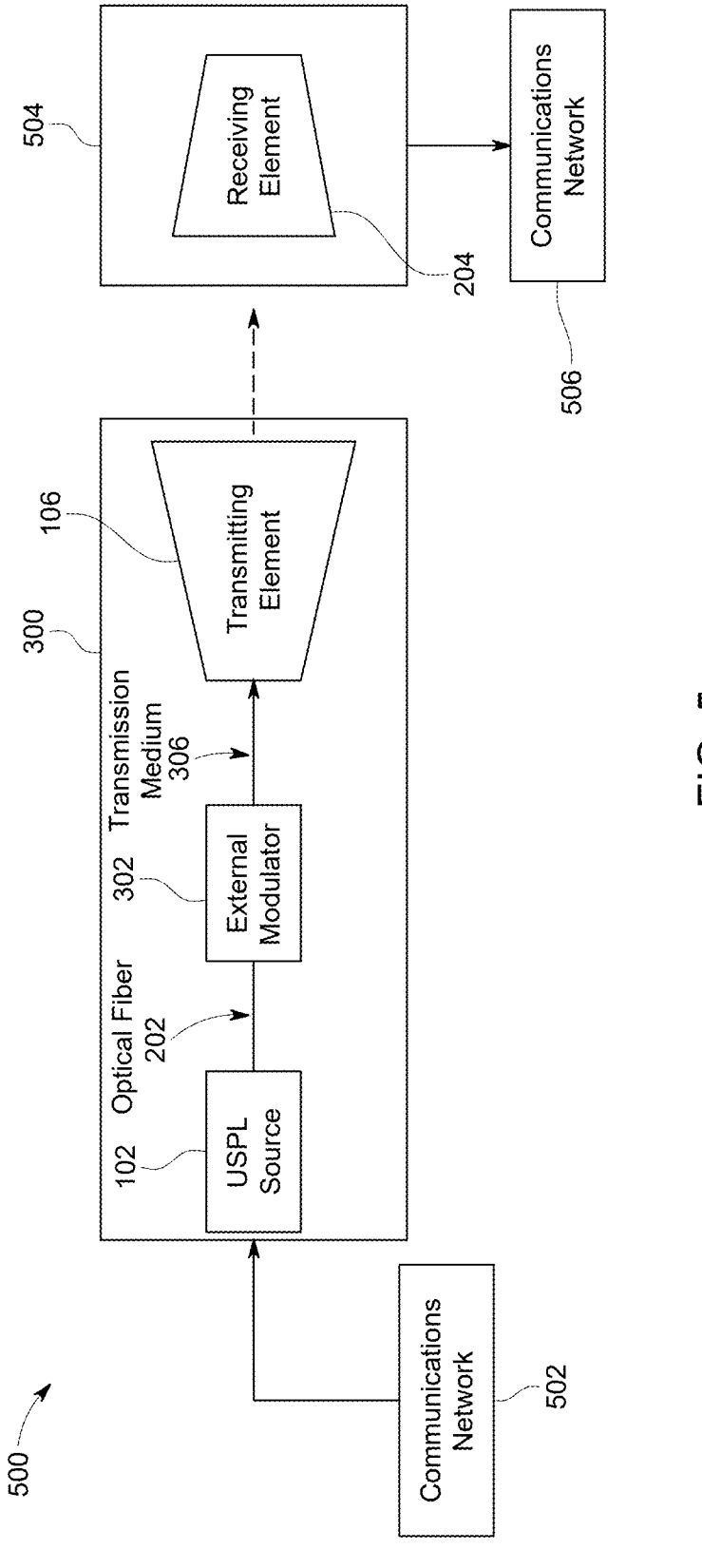
FIG. 5 depicts an example of a transmitting and or receiving elements, which can be of a type from either the Hyperbolic Mirror Fabrication Techniques or conventional Newtonian designs.

FIG. 5 illustrates an example of an optical communications architecture 500. The architecture 500 of FIG. 5 may include the elements of FIG. 4 and may further include a first communication network 502 connected to a first optical communications platform 300. The receiving element 204 is part of a second optical communications platform 504, which can optionally include components analogous to those of the first optical communications platform 300. A second communications network 506 can be connected to the second optical communications platform 504 such that the data transmitted optically between the transmitting element 106 and the receiving element 204 or are passed between the first and second communications networks 502, 506, which can each include one or more of optical and electrical networking features.

Figure 6:
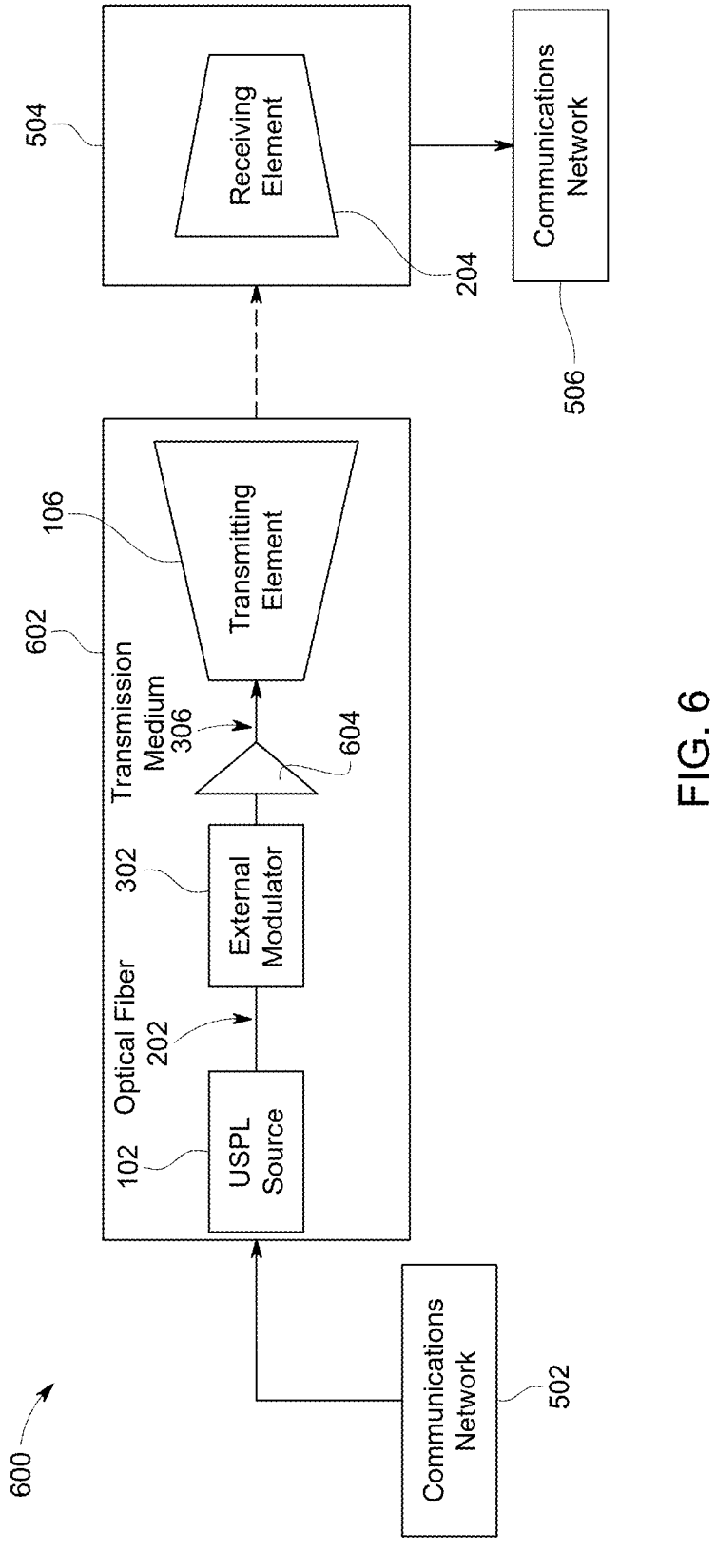
FIG. 6 depicts an example of an optical fiber amplifier element identified and used to increase enhancing optical transmit launch power for transport to a remote optical receive terminal.

FIG. 6 illustrates an example of an optical communications system 600. As part of an optical communications platform 602, an USPL source 102 is fiber coupled to an external modulator 302, for example through an optical fiber 202 or other transmission medium. The light from the USPL source 102 is propagated via a transmitting element 106 in a similar manner as discussed above. An optical amplifier element 604, which can optionally be an optical fiber amplifier element, can be used to increase optical transmit launch power, and can optionally be disposed between the external modulator 302 and the transmitting element 106 and connected to one or both via an additional transmission medium 306, which can optionally be a fiber medium, a free space connection, etc. Also shown in FIG. 6 is a second complementary receiving element 204 located at a remote distance from the optical communications platform 602. It will be readily understood that a second optical communications platform 504 that includes the receiving element 204 can also include an optical amplifier element 604. First and second communications networks 502, 506 can be connected respectively to the two optical communications platforms 602, 504.

Figure 7:
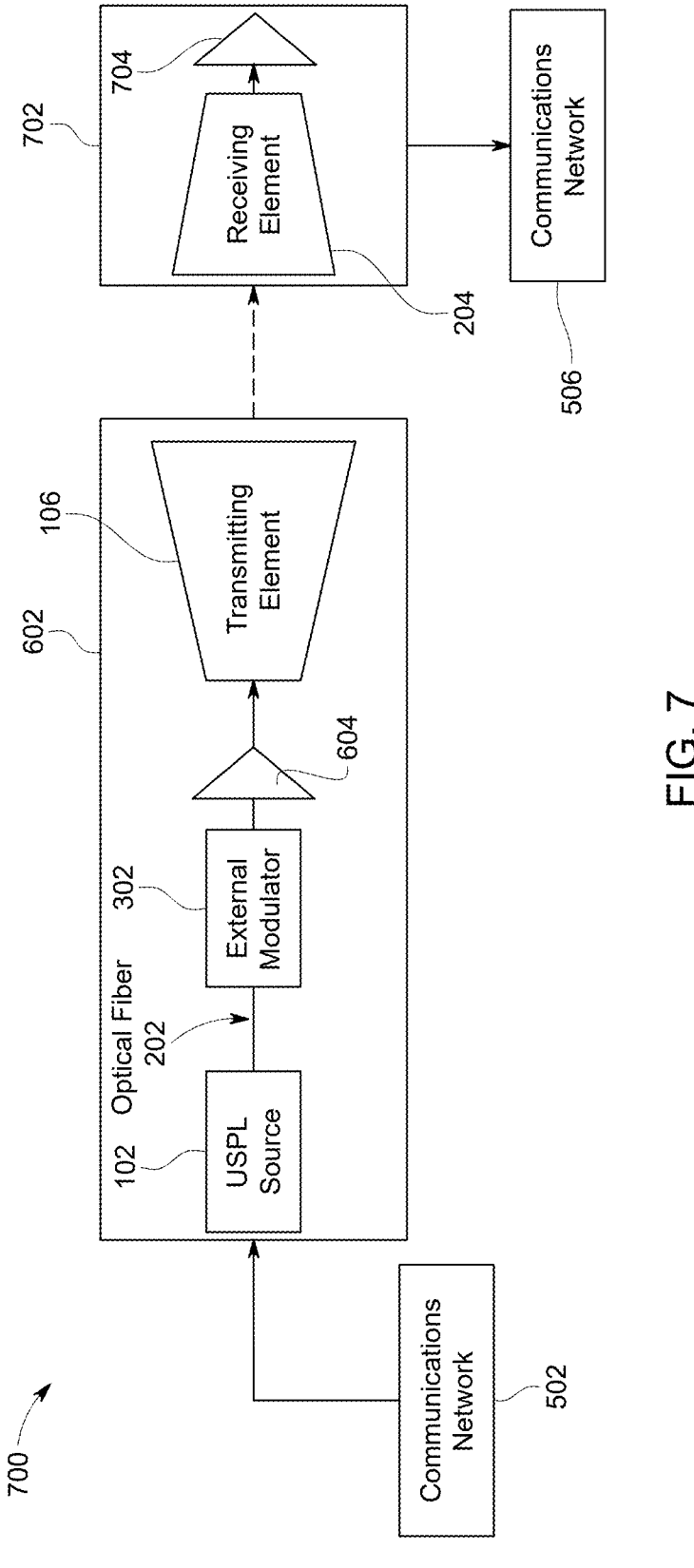
FIG. 7 depicts an example of a USPL laser device that is fiber coupled to an external modulator for transport, in a point-to-point configuration for transport to a remote optical receive terminal.

FIG. 7 illustrates an example of an optical communications system 700. The optical communications platform 602 shown in FIG. 6 can be in communication with a second optical communications platform 702, which can in this implementation include a receiving element 204 and an optical preamplifier 704. Other components similar to those shown in the optical communications platform 602 can also be included in the second optical communications platform 702, although they are not shown in FIG. 7. It will be understood that a bi-directional optical communications platform can include both of an optical preamplifier 704 for amplifying a received optical signal and an optical amplifier element 604 for boosting a transmitted optical signal.

Consistent with the implementation depicted in FIG. 7 and other implementations of the current subject matter, optical amplification (e.g. for either or both of an optical amplifier element 604 or an optical preamplifier 704) be included for enhancing the optical budget for the data-link between the transmitting element 106 and the receiving element 204 (and vice versa), for example using one or more of an erbium-doped fiber amplifier (EDFA), a high power erbium-ytterbium doped fiber amplifier (Er/Yb-DFA), or equivalents, which can include but are not limited to semiconductor-optical-amplifiers (SOA).

Figure 8:
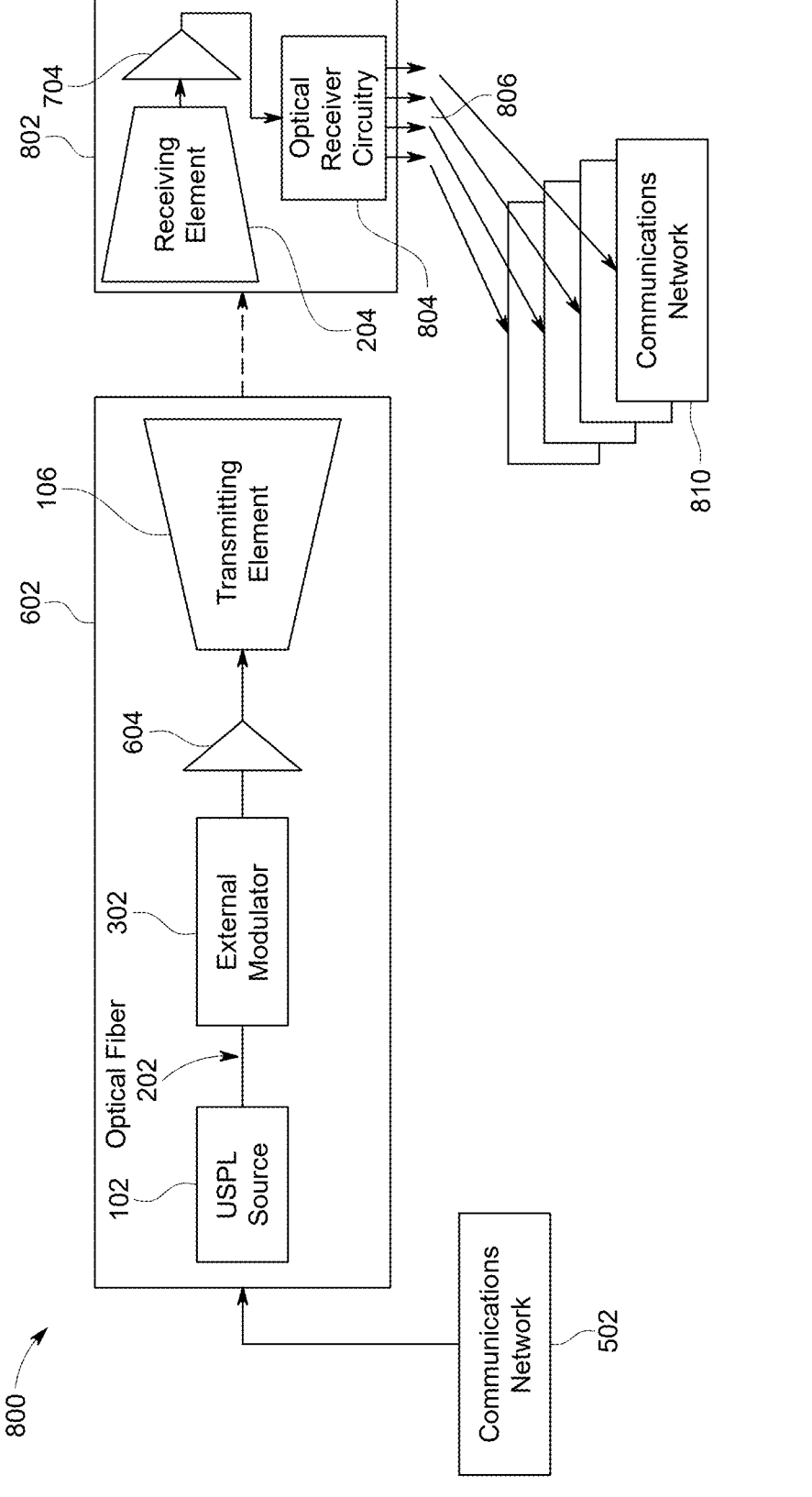
FIG. 8 depicts an example of a USPL laser device that is fiber coupled to an external modulator for transport, in a point-to-multi-point configuration.

FIG. 8 illustrates an example of an optical communications system 800. The optical communications platform 602 shown in FIG. 6 can be in communication with a second optical communications platform 802, which can in this implementation include a receiving element 204 and an optical preamplifier 704 similar to those shown in FIG. 7. As shown in FIG. 8, the second optical communications platform 802 can further include optical receiver circuitry 804, which can receive amplified and electrically recovered data received at the receiving element 204 and amplified by the optical preamplifier. A plurality of clock sources 806 can interface to multiple remote multi-point network connections with a plurality of communications networks 810 as required. In a similar manner, a complementary set of clock sources and multiple communication networks can be operated in conjunction with the optical communications platform 602 (e.g. in place of the single depicted communication network 502 in FIG. 8).

Figure 9:
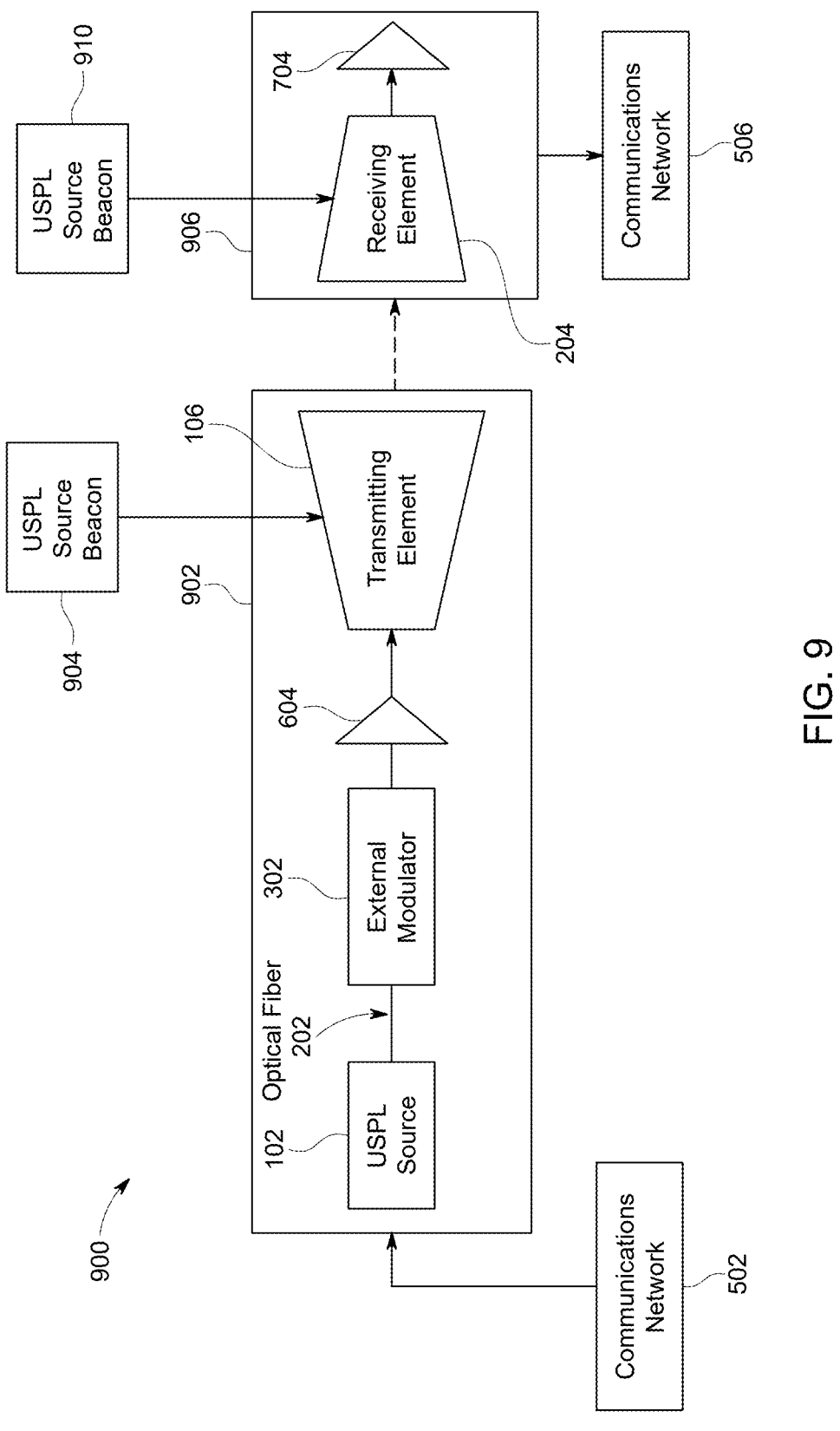
FIG. 9 depicts an example of use of USPL sources acting as tracking and alignment (pointing) beacon sources.

FIG. 9 illustrates an example of an optical communications system 900. An optical communications platform 902, which can feature similar elements to those in the optical communications platform 602 first discussed herein in reference to FIG. 6, can also include an additional USPL source 904 acting as a tracking and alignment (pointing) beacon source. A second optical communications platform 906 can also include an additional USPL source 910 acting as a tracking and alignment (pointing) beacon source. The tracking and alignment (pointing) beacon sources 904, 910 can optionally originate from available communications sources used in data transport transmission, or can be provided by separate, dedicated USPL sources. In addition, each USPL beacon source 904, 910 can include an in-band or out-of-band source, thereby allowing the advantage of available optical amplification sources, or from dedicated optical amplification resources.

Figure 10:
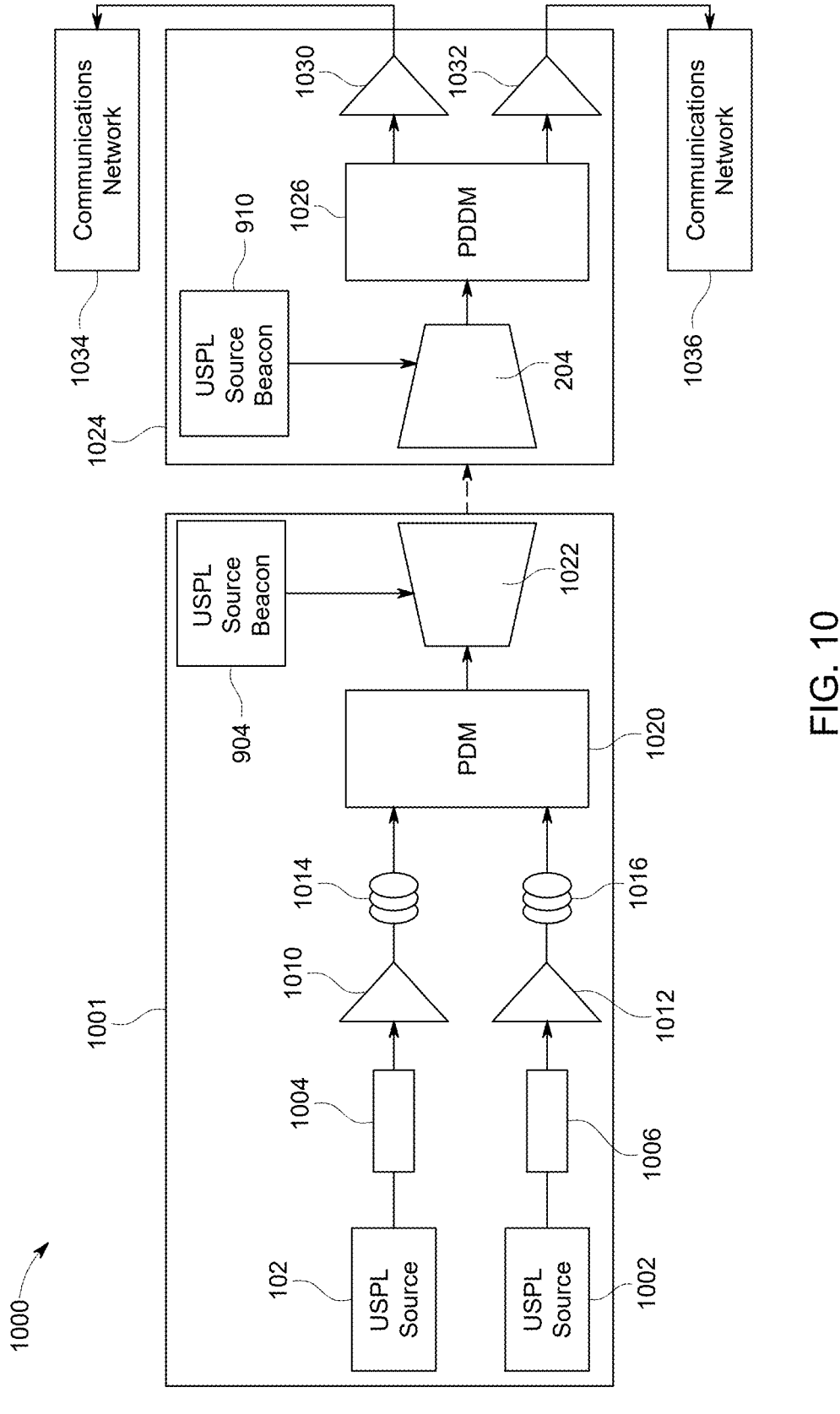
FIG. 10 depicts an example of a USPL laser sources polarization multiplexed onto a transmitted optical signal, to provide Polarization Multiplex USP-FSO (PM-USP-FSO) functionality.

FIG. 10 illustrates an example of a FSO communication system 1000 that includes a dual polarization USPL-FSO optical data-link platform 1001 in which USPL sources are polarization multiplexed onto a transmitted optical signal to thereby provide polarization multiplexed USP-FSO (PM-USP-FSO) functionality. Two USPL sources 102 and 1002 are fiber coupled to either directly modulated or externally modulated modulation components 1004, 1006 respectively. Each respective modulated signal is optically amplified by an optical amplifier component 1010, 1012 followed by adjustment of optical polarization states using polarization components 1014, 1016. The polarization state signals are fiber coupled to a polarization dependent multiplexer (PDM) component 1020 for interfacing to an optical launch platform component 1022, which can be similar to the transmit element 106 discussed above. The PDM 1020 multiplexes the light of differing polarization states into a single pulse train for transmission via the optical launch platform component 1022. An USPL optical beacon 904 can be included to provide capabilities similar to those discussed above in reference to FIG. 9, for example to operate along or in conjunction with a second USPL optical beacon 906 at a receiving platform 1024, which can include a receiving element 204 similar to those described above. As previously noted, the receiving element 204 as well as other features and components of the receiving platform 1024 can generally be capable of supporting transmission functions such that a bi-directional link is established. A received signal recovered by the receiving element 204 can provide an optical signal that is interfaced to an appropriate polarization dependent de-multiplexer 1026 capable of providing two signals for further optical amplification using amplification elements 1030, 1032. Each optical amplified signal as provided by the amplification elements 1030, 1032 can be interfaced to an appropriate optical network 1034, 1036 for network usage.

Figures 11A, 11B:
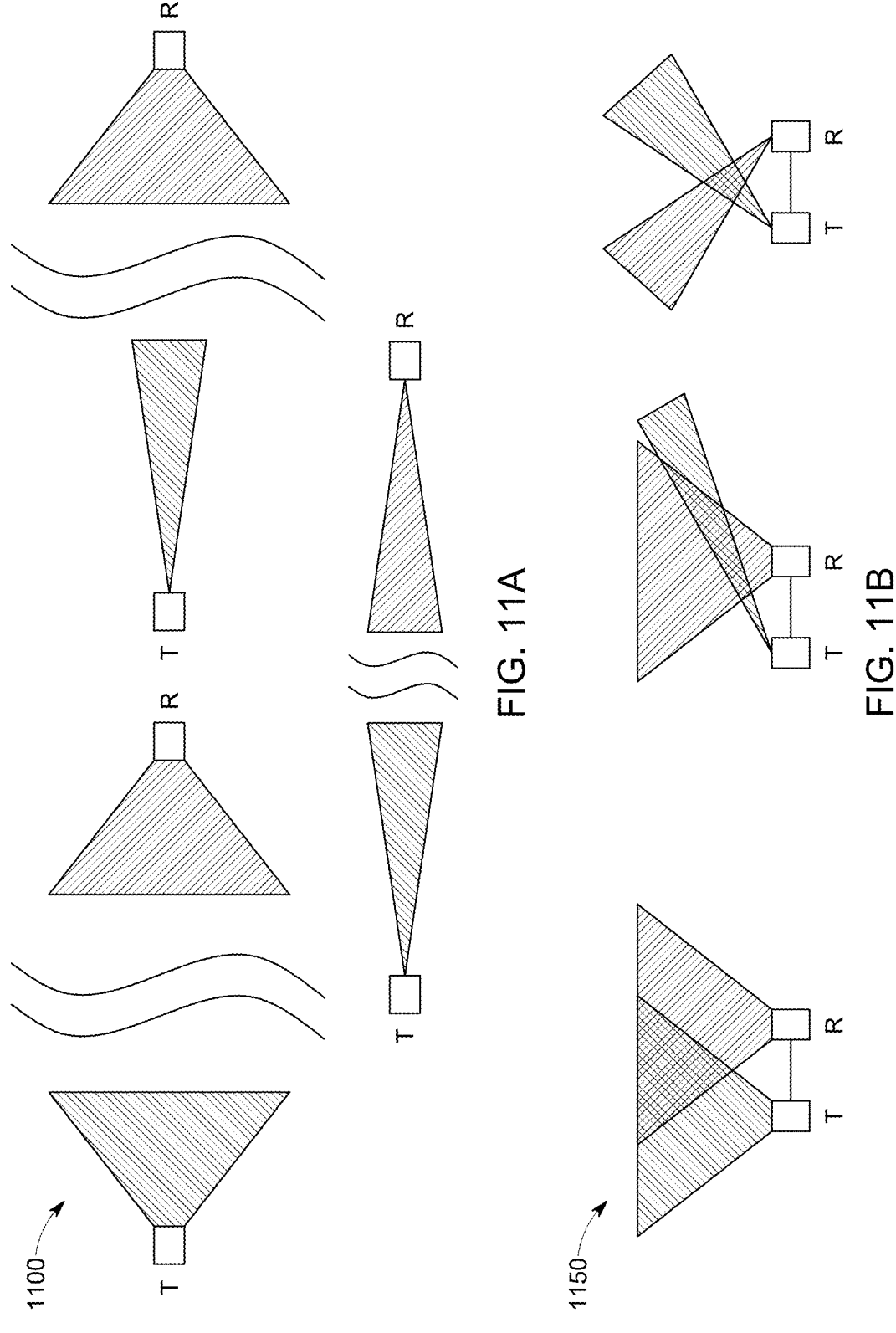
FIG. 11A and FIG. 11B respectively depict examples of USPL-FSO transceivers utilized for use in line-of-sight and non-line-of-sight lasercom applications.

FIG. 11A shows an example of a system 1100 in which USPL-FSO transceivers can be utilized for use in line-of-sight optical communication (e.g. "lasercom") applications, and FIG. 11B shows an example of a system 1150 in which USPL-FSO transceivers can be utilized for use in non-line-of-sight laser communications applications. An advantage to some implementations of the current subject matter can be realized due to scattering of the optical signal sent from a transmit element as the transmitted light passes through the atmosphere. This scattering can permit the use of non-line-of-sight communication. In addition, radios used in such communication systems can operate in the solar-blind portion of the UV-C band, where light emits at a wavelength of 200 to 280 nm. In this band, when solar radiation propagates through the environment, it is strongly attenuated by the Earth's atmosphere. This means that, as it gets closer to the ground, the amount of background noise radiation drops dramatically, and low-power communications link operation is possible. On the other hand, environmental elements such as oxygen, ozone and water can weaken or interrupt the communications broadcast, limiting usage to short-range applications.

When UV waves spread throughout the atmosphere, they are typically strongly scattered into a variety of signal paths. Signal scattering is essential to UV systems operating in non-line-of-sight conditions, and the communications performance can highly dependent on the transmission beam pointing and the receiver's field of view. A line-of-sight arrangement 1100 as shown in FIG. 11A can differ in bandwidth size from a non-line-of-sight arrangement 1150 as shown in FIG. 11B. Ultraviolet communication can more strongly rely on a transmitter's beam position and a receiver's field of view. As a result, refining of the pointing apex angle, for example by experimenting with supplementary equipment to enhance the UV-C signal, can be advantageous.

Figure 12:
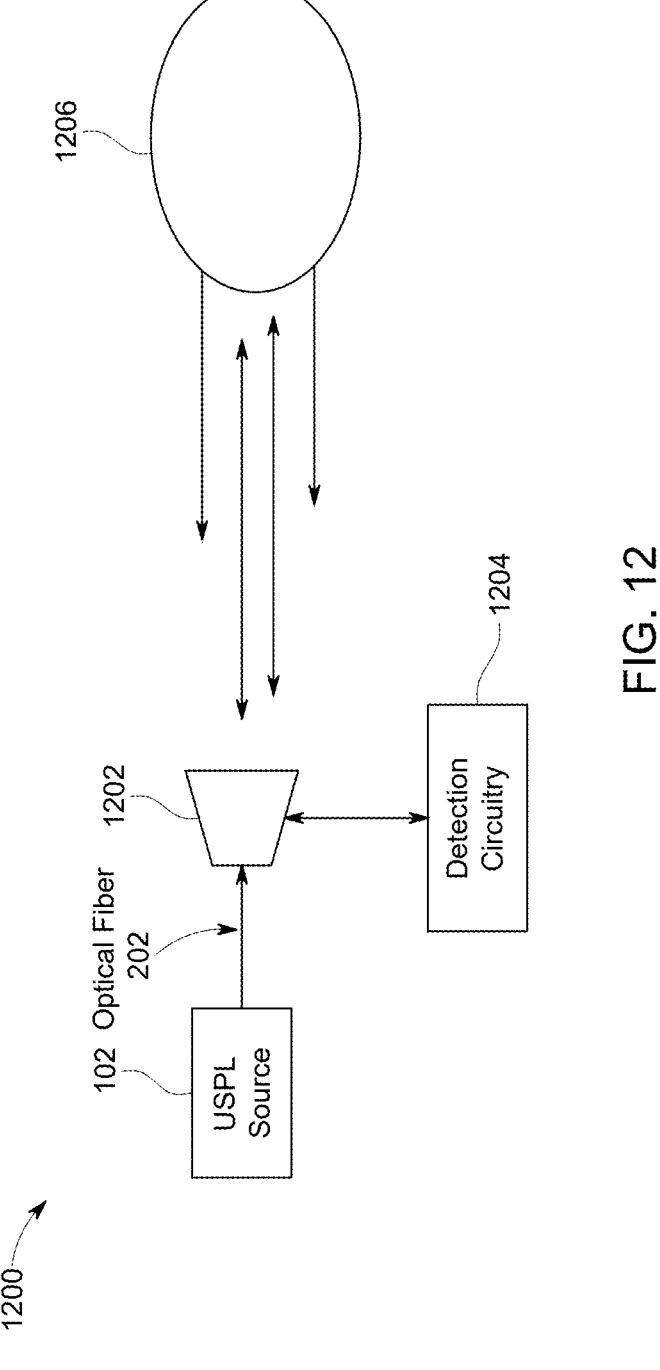
FIG. 12 depicts an example of light including light from the data signal propagated forward being backscattered by interaction with air-borne particulates that are the subject of investigation.

FIG. 12 illustrates an example of a remote sensing system 1200 in which an USPL source 102 is fiber coupled by an optical fiber component 202 to an optical launch element 1202 capable of transmitting and receiving optical signals. Some of the light propagated forward including the light from data signal through the optical launch element 1202 is backscattered by interaction with air-borne particulates that are the subject of investigation. The optical backscattered signal is detected through the optical launch element 1202 or a similar receive aperture and passed along for detection and spectrographic analysis through detection circuitry 1204 or the like in FIG. 12. The signature of particulates within a target atmospheric region 1206 within which an investigation is made can be calibrated through known approaches, for example using predetermined spectrographic calibration measurements based on one or more of ultraviolet spectroscopy, infrared spectroscopy, Raman spectroscopy, etc. Consistent with this implementation, an optical system can be operated as a LIDAR instrument providing enhanced resolution and detection sensitivity performance, using USPL laser sources operating over a spectral range of interest. Adjustability of spectral range can aid in evaluating and analyzing chemical constituents in the atmosphere.

USPL-FSO transceivers can be utilized for remote sensing and detection for signatures of airborne elements using ionization or non-ionization detection techniques, utilizing optical transport terminals manufactured through either the Hyperbolic Mirror Fabrication Techniques or conventional Newtonian designs that focus a received signal at one ideal point. Also certain adaptations can be related to ionization probing of remote regions include controllable ionization, which has been shown to occur at these frequencies and an ionization process, which can be focused at distance to adjust depth of atmospheric penetration especially in weather and clouds.

Figure 13:
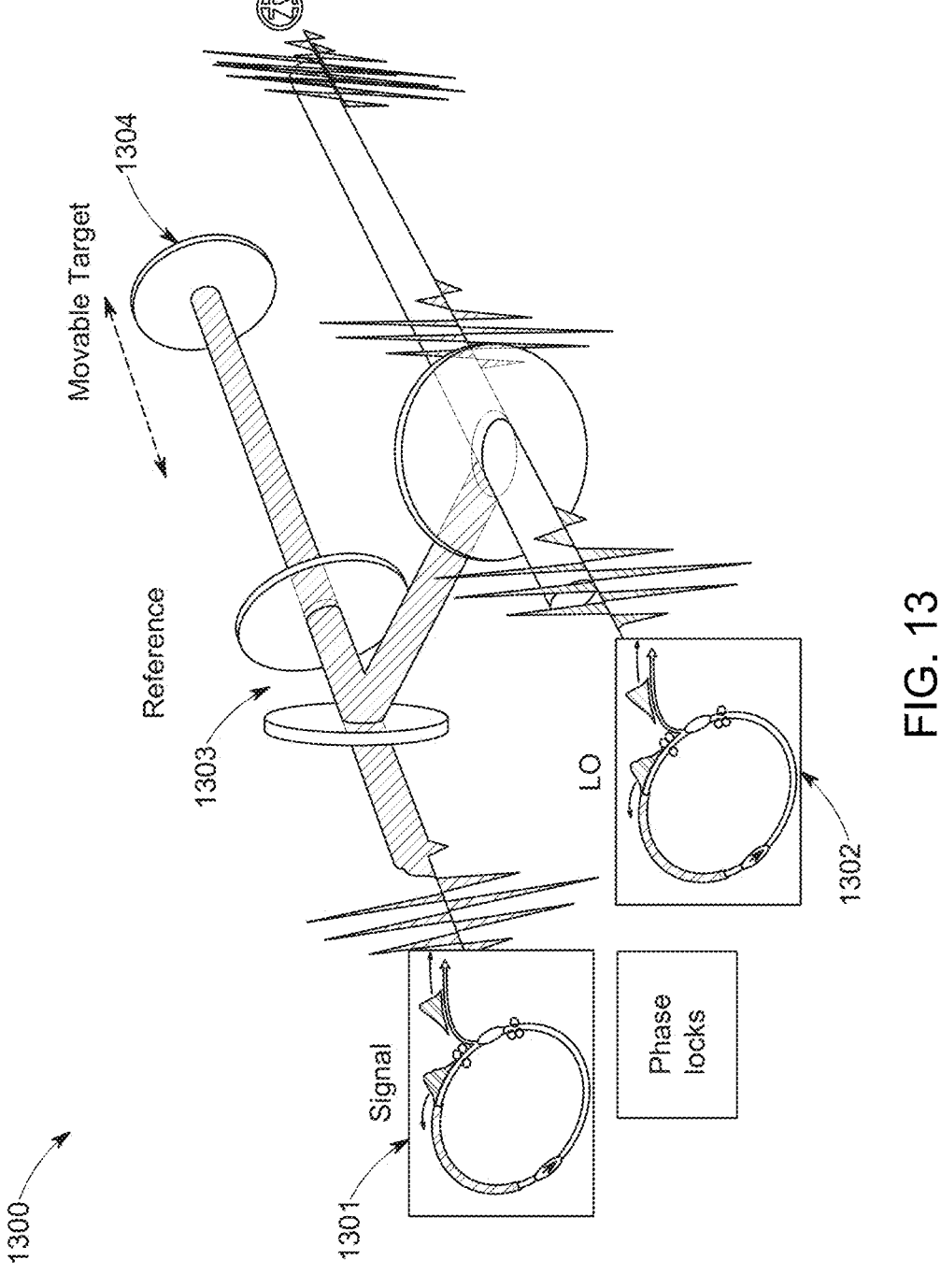
FIG. 13 depicts an example of USPL laser sources as optics reception techniques to improve detection sensitivity.

FIG. 13 illustrates an example of use of USPL sources as well as optical reception techniques to improve detection sensitivity. Researchers at the National Institute of Standards and Technology (NIST), US, have built a laser ranging system that can pinpoint multiple objects with nanometer precision over distances up to 100 km. The LIDAR (light detection and ranging) system could have applications from precision manufacturing on Earth to maintaining networks of satellites in perfect formation (Nature Photonics DOI: 10.1038/NPHOTON.2009.94). The NIST device uses two coherent broadband fiber-laser frequency combs. Frequency combs output a series of stable short pulses that also contain a highly coherent carrier that extends across the pulse train. This means a frequency comb can be employed to simultaneously make an interferometric measurement as well as a time-of-flight measurement, thereby enhancing analytical capabilities for application specific situations.

In the arrangement shown in FIG. 13, two phase-locked frequency combs 1301 and 1302 are used in a coherent linear optical sampling configuration, also known as a multi-heterodyne, meaning that one frequency comb measures both distance paths, while the other frequency comb provides distance information encoded in the light of the first comb. Pulses from one frequency comb 1301 can be launched out of the fiber and directed towards two glass plates, a reference 1303 and a target 1304. The plates 1303 and 1304 can reflect a certain fraction (e.g. approximately 4%) of the pulse back down the fiber, effectively creating two new pulses. The time separation between the two pulses 1301 can give the distance between the moveable target plate and reference plates. A second frequency comb 1302 is tightly phase-locked with the first, but has a slightly different repetition rate. Due to the different delay between consecutive pulses when the sources interfere, the second frequency comb can sample a slightly different part of the light from the electric field of the first comb.

Using the technique described is reference to FIG. 13, it is possible to replace the two coherent broadband fiber-laser sources with two appropriate USPL sources used within the scope of the configuration outlined having each USPL source fiber coupled to dedicated free-space optical telescope designs. By doing so, the overall efficiency, optical ranging and accuracy can be improved substantially.

In some embodiments, a native pulse repetition rate of a USPL laser source and may be 50 MHz or less, which may be undesirably low for optical data transmission, limiting the system to low data rate applications of 50 Mbps or less. Accordingly, systems to increase USPL operational rates are needed for providing solutions for data transport in excess of 50 Mbps.

Figure 14:
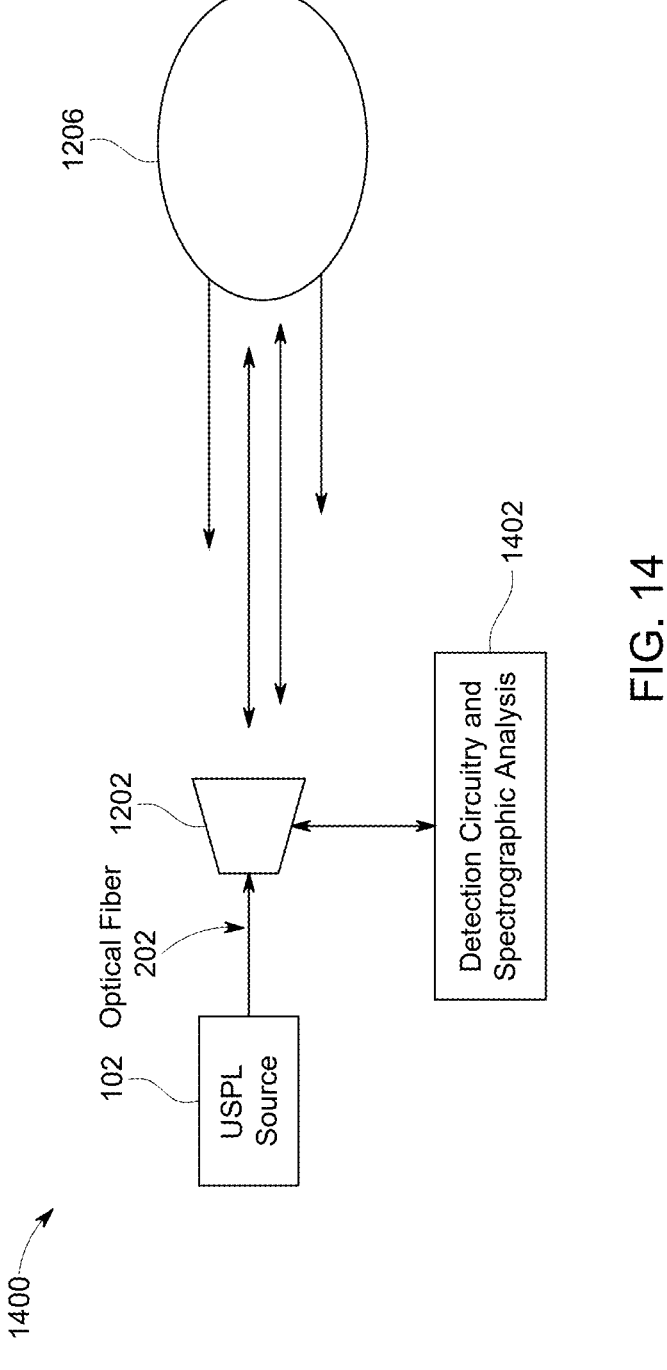
FIG. 14 depicts an example of a USPL-FSO transceiver utilized and operated across the infrared wavelength range optionally including light from the data signal as a rangefinder and spotting apparatus for the purposes of target identification.

FIG. 14 illustrates an example of a remote sensing system 1400 in which an USPL source 102 is fiber coupled by an optical fiber component 202 to an optical launch element 1202 capable of transmitting and receiving optical signals. Light propagated forward by the optical launch element 1202 including light from the data signal is backscattered by interaction with targets known and unknown that are the subject of investigation within an atmospheric region 1206. The optical backscattered signal including light from the data signal is detected through the optical launch element 1202 or a similar receive aperture and passed along for detection analysis through a detection circuitry and spectrographic analysis component 1402 in FIG. 14. The signature of particulates within the region 1206 under investigation can be calibrated, for example where range-finding analysis can be performed. A system 1400 as in FIG. 14 can include a USPL-FSO transceiver utilized and operated across the infrared wavelength range as a range-finder and spotting apparatus for the purposes of target identification and interrogation applications. As used herein, the term "optical" includes at least visible, infrared, and near-infrared wavelengths.

Figure 15:
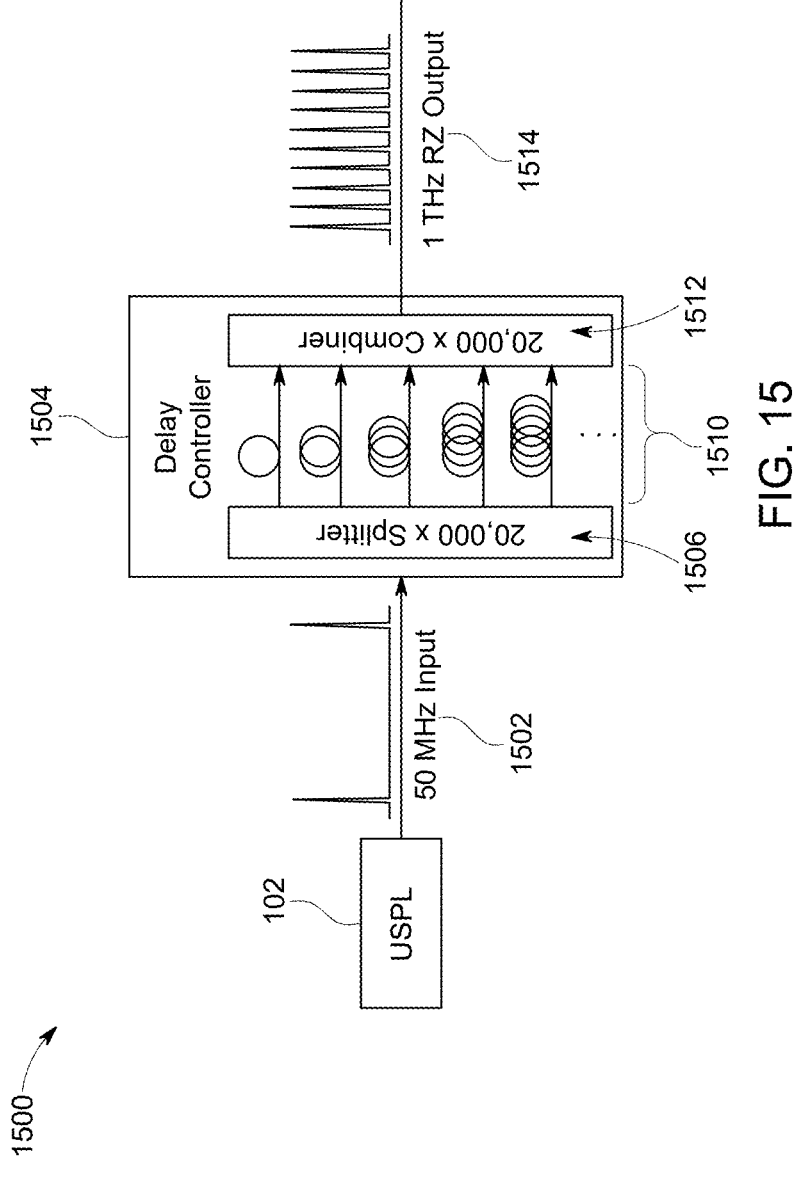
FIG. 15 depicts an example of a USPL pulse multiplier device consistent with implementations of the current subject matter.
Figure 28:
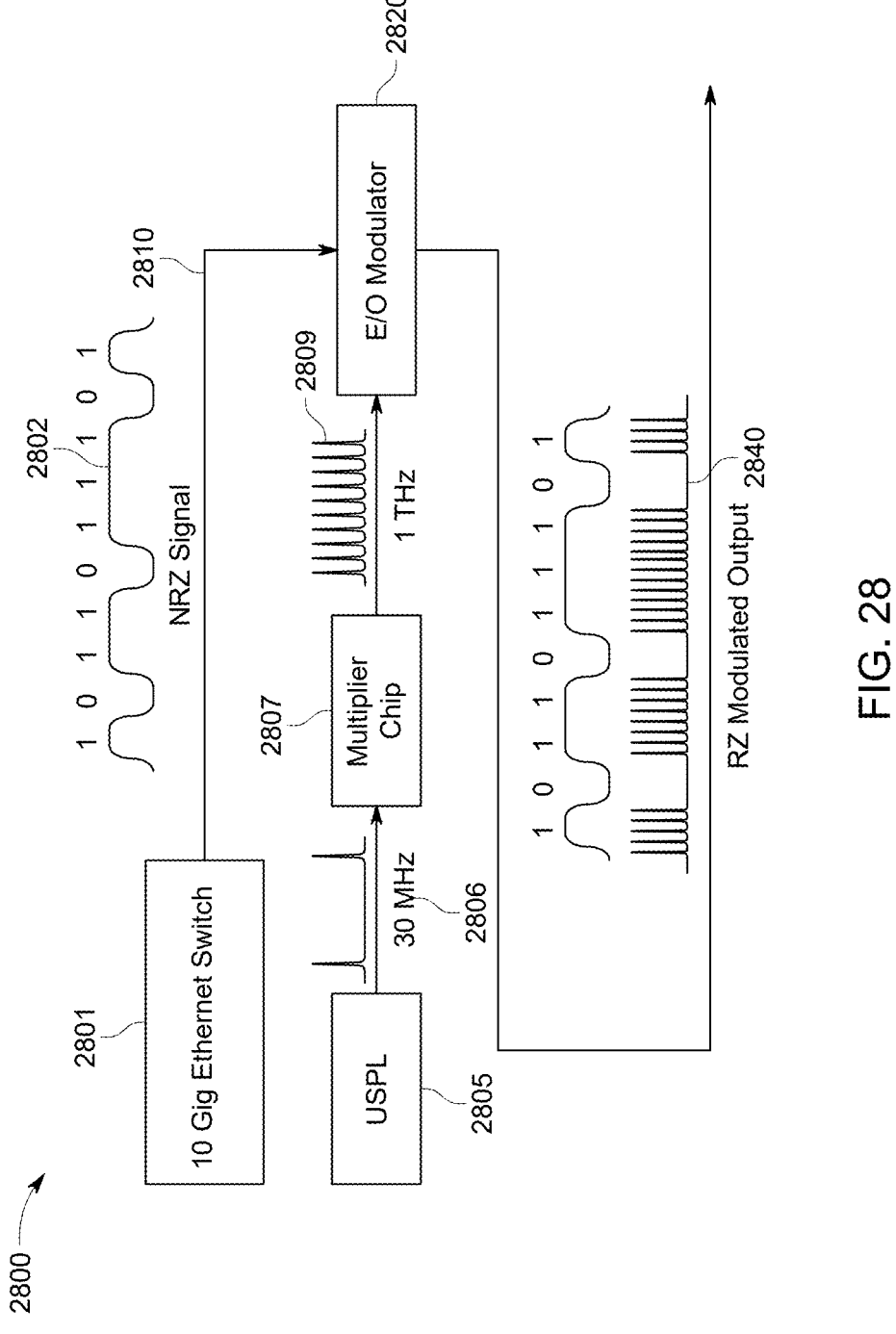
FIG. 28 depicts an example of timing of the TDM chip from the USPL modulation source to provide a Terabit/second (or faster) with a Multiplier Photonic chip.

FIG. 15 illustrates an optical pulse multiplier module 1500 that can increase the repetition rate of the output from a USPL source 102. An exemplary USPL may have a pulse width of 10-100 femto-seconds and a repetition rate of, for example, 50 MHz. The output from the USPL 102 can be fed as an input 1502 into a USPL photonic chip pulse multiplier module 1504. In this example, the photonic chip can contain a 20,000:1 splitter element 1506 that splits the input into discrete light elements. Each light element on the opposite side of the splitter element 1506 contains the 50 MHz pulse train. Each light element then passes through a delay controller (either a fiber loop or lens array) 1510, which delays the pulse train for that element in time, for example by a number of picoseconds. Successive light elements are thereby delayed by incremental picoseconds. All of these pulse trains with their unique time delays are combined into a single pulse train in a fashion similar to time division multiplexing utilizing a 20,000:1 optical combiner element 1512. The required ratios of splitters and combiners can be controlled to provide necessary optical designs for the application required. The final output 1514 is a pulse train of 10-100 femto-second pulses with a repletion rate of 1 THz. This THz pulse train can then be modulated by a 10 or 100 GigE signal, such as shown in FIG. 28, resulting in 100 femto-second pulses per bit for the 10 GigE system, and 10 femto-second pulses per bit for 100 GigE systems. The application cited is not limited to specific data rates of 10 and 100 Gbps, but can operate as required by the application under considerations. These numbers are just for illustration purposes. Implementations of the current subject matter can use any multiplier factor to increase the repetition rate of the USPL via the photonic chip pulse multiplier module 1504 to any arbitrary repetition rate. Other examples used in generation of enhanced USPL repetition rates are illustrated within this submission.

Figure 16:
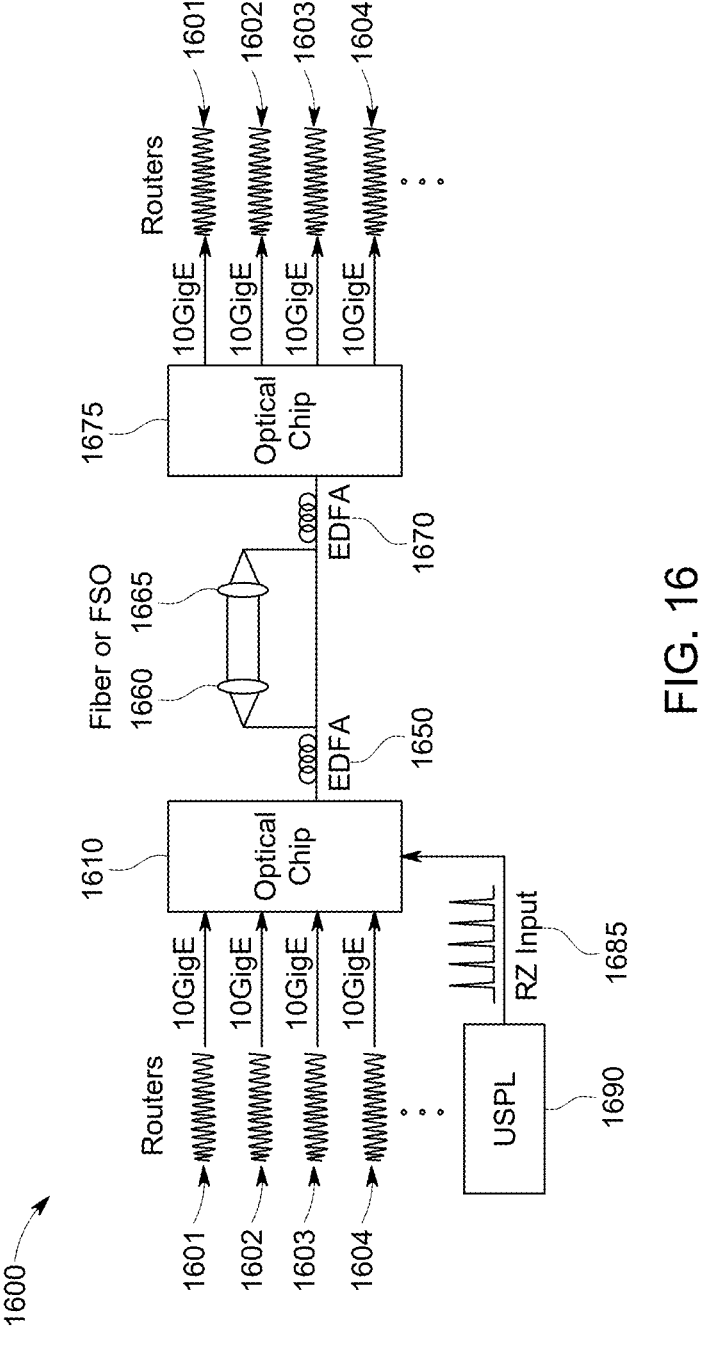
FIG. 16 depicts another example of a device for generation of high pulse rate USPL optical streams consistent with implementations of the current subject matter.

FIG. 16 depicts a system 1600 for generation, transmission, and receiving of high pulse rate USPL optical streams. An optical chip multiplexing module 1610, which can for example be similar to that discussed in reference to FIG. 15, can be used in this application. In this approach to achieve USPL pulse multiplication, a series of 10 GigE router connections (10 GigE is not intended to be a limiting feature) described by signals 1601, 1602, 1603, 1604 (four signals are shown in FIG. 16, but it will be understood that any number is within the scope of the current subject matter) are interfaced to the optical chip multiplexing module 1610. In operation, the optical chip multiplexing module 1610 can support full duplex (Tx and Rx) to connect with the 10 GigE routers 1601, 1602, 1603, 1604. The optical chip multiplexing module 1610 can provide efficient modulation by a USPL signal 1685 output from a USPL source 1690 for ingress optical signals 1601, 1602, 1603, 1604. The optical chip multiplexing module 1610 can provide capabilities to modulate and multiplex these ingress optical signals.

At a remote receive site where a receiving device is positioned, all signals sent via a transmitting element 1660 at the transmitting device can be recovered using an appropriate receiver element 1665. A complementary set of optical chip multiplexing module 1675 can provide necessary capabilities for demultiplexing the received data stream as shown by elements for delivery to a series of routers 1601', 1602', 1603', 1604' (again, the depiction of four such routers is not intended to be limiting). End-to-end network connectivity can be demonstrated through network end-point elements.

Figure 17:
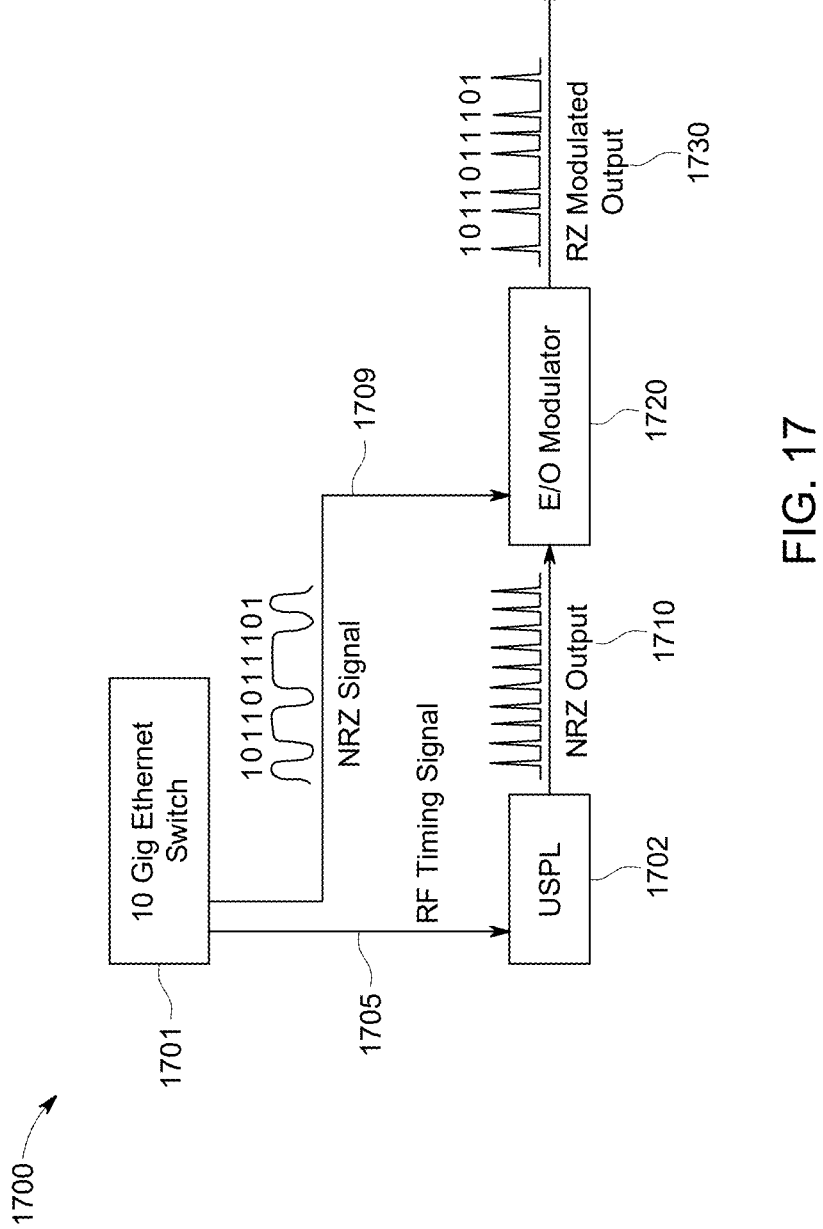
FIG. 17 depicts another example of an optical device to a generate a USPL RZ data stream from a conventional transmission networking element.

FIG. 17 depicts an example system 1700 in which an optical chip is interconnected to a wavelength division multiplexing (WDM) system. WDM systems have the advantage of not requiring timing or synchronization as needed with a 10 GigE (or other speed) router 1701, since each 10 GigE signal runs independent of other such signals on its own wavelength. Timing or synchronization of the TDM optical chip with 10 GigE routers can be important in a TDM optical chip. A GbE switch 1701 can provide the necessary electrical RF signal 1705, from the switch 1701 to modulate a USPL source 1702, either directly or by use of USPL a pulse multiplier module previously detailed within this document. A typical RZ output 1710 can be coupled into an external modulator 1720, which can be modulated using a NRZ clock source for the switch 1701, thereby resulting in a RZ modulated spectrum 1730. The conversion process using readily available equipment can provide capabilities for introducing USPL sources and their benefits into the terrestrial backhaul network spectrum.

For the optical chip system to successfully bridge between two remote 10 GigE switches, the chip may act like a simple piece of fiber. The timing of the TDM chip can therefore be driven by the 10 GigE switch 1701. Both actively mode-locked USPLs (i.e. 40 GHz, 1 picosecond pulse width) and passively mode-locked USPLs (i.e. 50 MHz, 100 femtosecond pulse width) can be driven by a RF timing signal.

Figure 18:
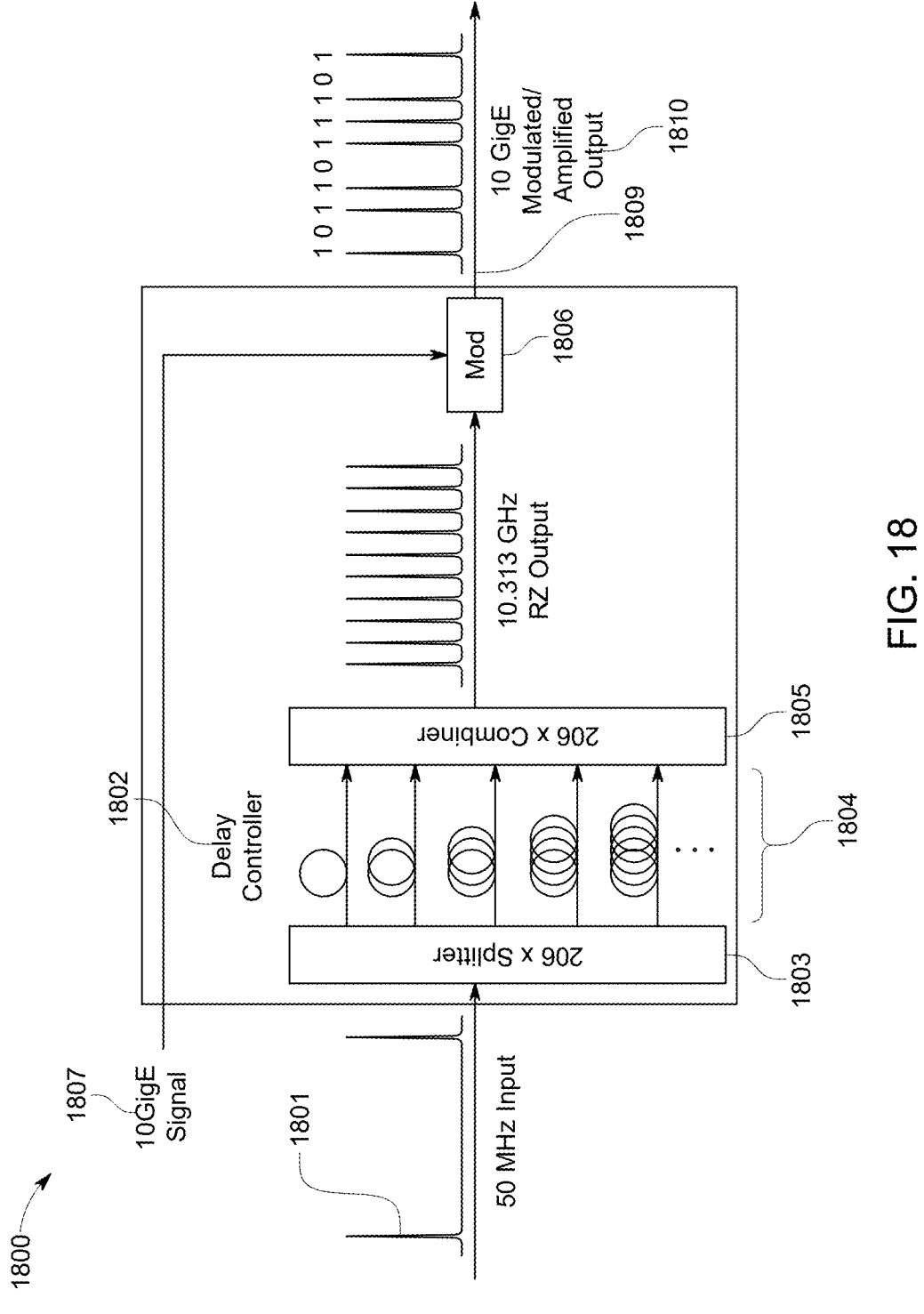
FIG. 18 depicts an example of implementing a USPL pulse multiplier device for generation of 10×TDM type signals system to give a 100 Gbps output.

FIG. 18 illustrates a device 1800 that can support another approach to progression to a high pulse repetition data rate operation, such as for extremely high data rate operation in which optical chip design can be performed using either fiber or free-space optics. A 50 MHz USPL source 1801 may be interfaced to a series of optical delay controller elements 1802, which can be designed using either fiber loops or offset lenses, to result in producing exactly a 10.313 Gbps RZ output stream, which is the 10 GigE line rate (greater than 10 Gbps because of 64B/66B encoding). A splitter element 1803 provides splitting functionality of the incoming optical signal train 1801 into (in this example) 206 paths, along with variable optical delay lines 1804. After sufficient delay is introduced through design all signals are multiplexed together through a combiner element 1805. In so doing a series of optical signals each identical, and equally spaced between adjacent pulses form a continuum of pulses for modulation. Prior to entering an E-O modulator element 1806, all optical ingress signals can be conditioned by pre-emphasis techniques, for example using typical optical amplification techniques, to result in a uniform power spectrum for each egress signal from the combiner element 1805. The conditioned egress signals may then be coupled into the E-O modulator element 1806 and modulated with an available NRZ signal from the 10 GigE signal source element 1807. The 10 GigE modulated output 1809 can interface to an EDFA and then into the TX of a FSO system (or a fiber optic system). The Rx side (after the detector) can be fed directly into a 10 GigE switch as a modulated and amplified output 1810.

Figure 19:
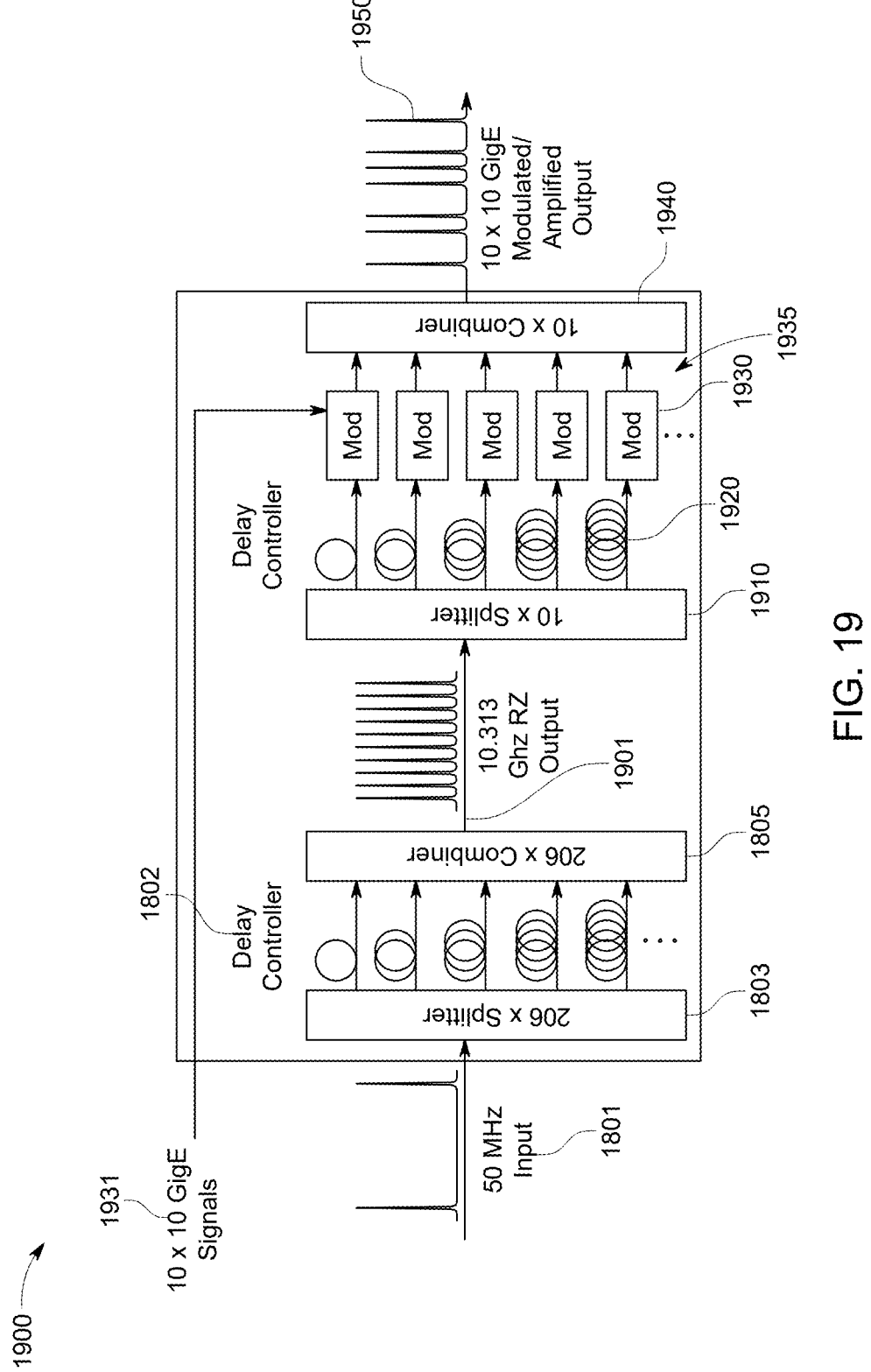
FIG. 19 depicts an example of a implementing another type of USPL pulse multiplier device for extending the pulse repetition rate for use in high capacity networks.

FIG. 19 illustrates another example of a device 1900 that can be used for USPL pulse multiplication consistent with implementations of the current subject matter. Consistent with this approach, a 10×TDM system is configured to give a 100 Gbps output. A TDM demux chip can be on the receive side of a communication link to break up the individual 10 GigE signals, and can include a reciprocal approach to the design shown in FIG. 19.

As in FIG. 18, a 50 MHz USPL source 1801 may be interfaced to a series of optical delay controller elements 1802, which can be designed using either fiber loops or offset lenses, to result in producing exactly a 10.313 Gbps RZ output stream, which is the 10 GigE line rate (greater than 10 Gbps because of 64B/66B encoding). A splitter element 1803 provides splitting functionality of the incoming optical signal train 1801 into (in this example) 206 paths, along with variable optical delay lines 1804. After sufficient delay is introduced through design all signals are multiplexed together through a combiner element 1805. Instead of a single modulator element 1806 as shown in FIG. 18, however, the 10.313 GHz RZ output 1901 from the combiner element 1805 may be fed into a second splitter element 1910, which in this case can be a 10× splitter, which splits the optical signal into ten parallel paths. Other implementations of this design can support various split ratios as required by design. Optical paths out from second splitter element 1910 are individually connected to specified optical delay lines 1920. Each individual delayed path is connected to a dedicated optical modulator of a set of optical modulators 1930 modulated with an available NRZ signal from the 10×10 GigE signal source element 1931, resulting in a series of modulated optical signals 1935. An optical combiner identified 1940 provides a single optical pulse train 1950. The series of optical pulses in the single optical pulse train 1950 can be interfaced to an appropriate optical amplifier for desired optical conditioning for network use.

Figure 20:
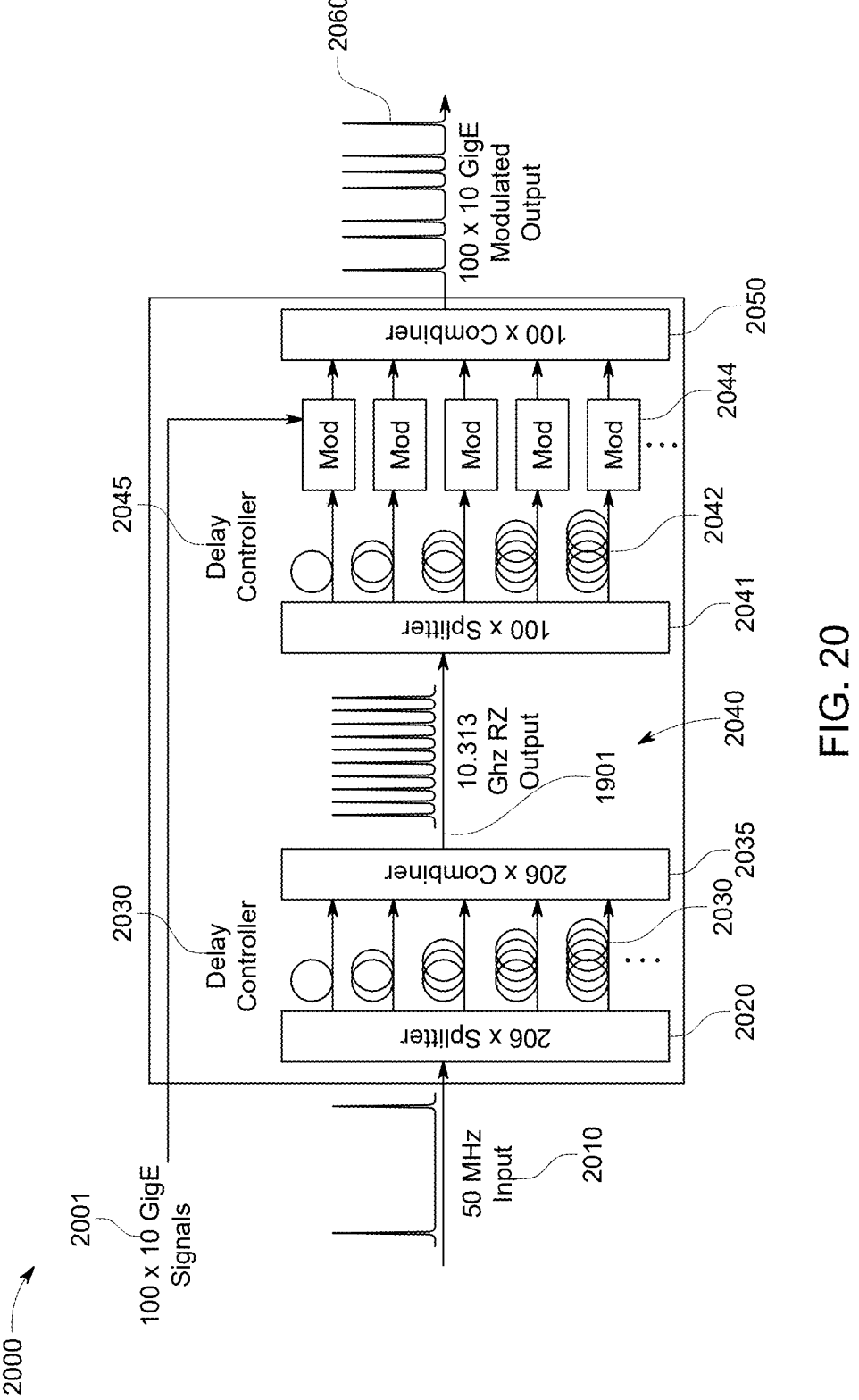
FIG. 20 depicts an example of a implementing another type of USPL pulse multiplier device for extending the pulse repetition rate for use in high capacity networks.

FIG. 20 illustrates another example of a device 2000 that can be used for USPL pulse multiplication consistent with implementations of the current subject matter. A device 2000 as depicted can provide the ability to achieve high USPL pulse repetition data rates for network applications by modulation of the low repetition rate intra-channel pulses. By applying direct modulation of each channel on the delay controller, creation of a modulation scheme, which is not constrained by the current speed limitations from the electronics technology, can be beneficially accomplished. Implementations of the current subject matter can provide a mechanism to enhance the data transmission capacity of a system, by separately modulating individual channels at the current standard electronic modulation speed (in the example of FIG. 20 at the rate of 100×10 GigE signal input 2001) and time-multiplexing the channels into a single frequency high rep rate pulse stream. In this approach, the current standard, which is limited by the speed of electro-optic modulators (40 Gbps), can be enhanced by approximately N orders of magnitude, where N is the number of channels of the time-multiplexer. For example, a 100 channel TDM with each channel amplitude modulated at the current standard data rate can be able to offer data rates at speeds of up to 4 Tbs. N can be limited by the width of the optical pulse itself. In the limit that information is carried 1 bit/pulse, the time slot occupied by 1 bit is the width of the pulse itself (in that sense, RZ system would converge to a NRZ). For example, in the scheme, a 40 fs pulse width laser with a 40 GHz rep rate is able to carry information at a maximum rate of 25 Tbps. This approach can be used in a 40 Gbps-channel modulation scheme (i.e., 1 bit every 25 ps) and can correspond to a capacity of N~625 channels in a single transmission, which can be the number of 40 fs time intervals fitting in a 25 ps time interval. A significant advantage of this approach is the ability to "optically enhance" an otherwise limited data capacity modulation scheme, while still interfacing with the existing data rate limited modulators. For example, an amplitude modulator based on a Mach-Zehnder interferometer can be easily integrated in a TDM IC package, in that required is the ability to branch out the channel into two separate paths, add a tiny phase modulator (nonlinear crystal) in one of the paths, and combine the paths for interference.

FIG. 20 includes a USPL source 2010 coupled to a multi-port optical splitter element 2020. The number of optical ports identified need not be limited to those described or shown herein. A series of optical delay lines 2030 provide required optical delays between each parallel path from the multi-port optical splitter element 2020, and can be tailored for specific applications. The optical delay paths from the optical delay lines 2030 are summed together using an optical combiner element 2035. The resulting combined optical data stream appearing through element 2040 represents a multiplicative enhancement in the pulse repetition rate of the original USPL source identified by element 2010. Further enhancement in pulse repetition rate is accomplished though the usage of element 2041, described by an optical splitter where the incoming signal 2040 is split into a series of paths not limited to those identified by element 2041. By way of a second delay controller 2045, optical delays may be introduced to each path within the device as identified by the second set of optical delay paths 2042. Each parallel path 2042 in turn is modulated by a modulating element 2044 with an available RF signal source element identified by the signal input 2001. An optical combiner element 2050 integrates all incoming signals onto a single data stream 2060.

Optical pre-emphasis and de-emphasis techniques can be introduced within each segment of elements described to custom tailor the optical spectrum for a uniform or asymmetric optical power distribution. Pre- & de-emphasis can be accomplished using commonly used optical amplifiers such as Er-Doped Optical amplifiers (EDFA).

Figure 21:
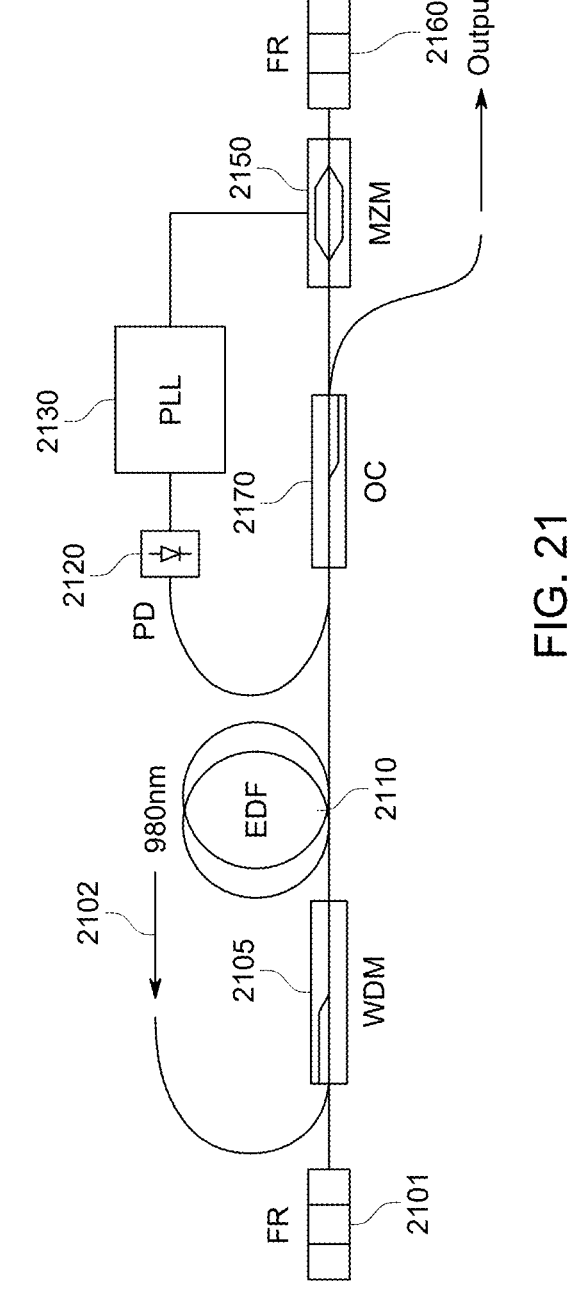
FIG. 21 depicts examples of active mode-locked linear fiber lasers with feedback regenerative systems: fiber reflector (FR), wavelength-division multiplexer (WDM), Erbium-doped fiber (EDF), optical coupler (OC), photo-detector (PD), phase-locked loop (PLL), and Mach-Zehnder Modulator (MZM).

FIG. 21 depicts an example of a system 2100 that includes a mode-locked USPL source 2101, which can be used to generate appropriately required clock and data streams for the application. Mode-locked lasers can represent a choice of high performance, high finesse source for clocks in digital communication systems. In this respect, mode-locked fiber lasers—in either linear or ring configuration—can make an attractive candidate of choice, as they can achieve pulse widths on the USPL source region and repetition rate as high as GHz. In addition to that, fibers offer compactness, low cost, low sensitivity to thermal noise, low jitter, no problems associated with diffraction or air dust pollution, just to name a few. In a communications scenario, the pulse width can determine the available bandwidth of the system, and the repetition rate limits the data rate. The pulse width can be determined by the intrinsic characteristics of the laser cavity—i.e. balancing of the overall group-velocity dispersion (GVD), and the choice of the saturable absorber (in the case of a passive system)—or the bandwidth of an active element (in the case of an active mode-locked system). The repetition rate of the pulse train is constrained by the length of the fiber. For example, in a linear laser, the fundamental mode frequency of the laser can be expressed as:

$$v_{osc} = \frac{c}{2n_gL}$$

where c is the speed of light in vacuum, $n_g$ is the average group index, and L is the length of the cavity. Therefore, a 10 cm long fiber laser cavity element 2110 with an average group index of 1.47 would have a repetition rate of 1 GHz. In strictly passive systems, mode-locking can be achieved through the use of a saturable absorber. In an active laser, an amplitude modulator element 2150 can be inserted in the cavity to increase the repetition rate of the laser (harmonic mode locking). In order to achieve high repetition rate clocks using mode-locked USPL source, it is possible to use one or more of (i) an intra-cavity amplitude Mach-Zehnder modulator (MZM) 2150 as shown in FIG. 21 and (ii) a low threshold saturable absorber. These techniques, known as "harmonic mode-locking", can be utilized within a fiber based plant distribution system or within a FSO system, for terrestrial, submarine or FSO system either in air, space, or submarine applications.

Detailed within FIG. 21 is 980 nm pump element 2102 coupled to an optical WDM device 2105. An erbium doped optical amplifier 2110 or equivalent can be used to create a non-linear environment to obtain a mode-locked pulse train emission within a closed cavity established between two Faraday reflectors 2101 and 2160 on either end of the optical USPL cavity. Operation of the device is capable of establishing a self-contained series of optical pulse in excess of 100 Gbps, and highly synchronized in nature at the output port 2170 of the module. In order to achieve a high gain non-linear medium the EDFA 2110 can be specially designed. A phase lock loop 2130 can provide advantageous stability in operation by maintaining a synchronized clock source through modulation of the signal through components 2120, 2130, 2150 of the self-contained high-repetition rate pulse generator. To achieve high rep rates in a laser that is limited by its dimensions (length in the case of a linear laser and perimeter in the case of a ring laser), it can be necessary to stimulate intra-cavity generation of the multiples of the fundamental mode. In the active case, an amplitude modulator inserted in the cavity modulates the loss of the system operating as a "threshold gating" device. For this approach to be successful, it can be necessary that the controlling signal to the modulator be referenced to the oscillation of the laser itself to avoid the driving signal "forcing" an external frequency of oscillation on the laser. This can be realized by the introduction of a phase-lock-loop element 2130, or a synchronous oscillator circuit to track-and-lock onto the repetition rate of the laser, and regenerate the signal. In the case of a PLL, the RF output can be set to a multiple of the input signal (much as this device is used in cell phone technology), and the rep rate of the laser increased. The signal can then be used for triggering of a pulse generator, or in conjunction with a low-pass filter. A MZ amplitude modulator 2150 outside the laser cavity can be used to create On-Off Keying (OOK) modulation on the pulse train coming out of the mode-locked laser.

Figure 22:
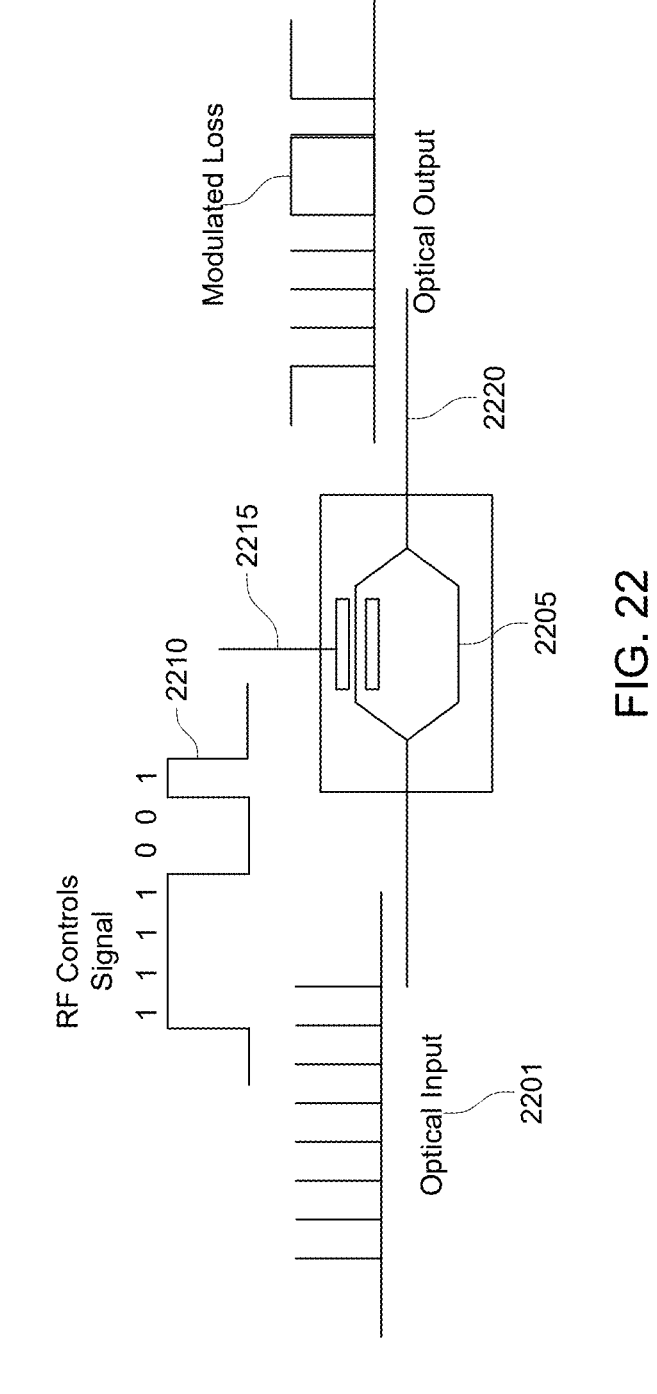
FIG. 22 and FIG. 23 depict examples of passive mode-locked linear fiber lasers using a carbon nano-tubes saturable absorber: fiber reflector (FR), wavelength-division multiplexer (WDM), Erbium-doped fiber (EDF), optical coupler (OC), and saturable absorber (SA).

FIG. 22 shows a graphical depiction 2200 illustrating effects of a loss modulation introduced to the input pulse train 2201 due to the presence of the amplitude modulator 2205 with a controlling signal NRZ signal 2210 made of a bit sequence as illustrated. The resulting signal at the output of the device 2220 represents an NRZ to RZ converter device for use in telecommunications and scientific applications where the application may benefit from RZ data streams. A clock signal 2201 (optical input) at a given pulse repetition rate will pass through the modulator 2205. At the same time, a controlling signal consisting of a sequence of 1's and 0's can be applied to the RF port of the modulator element 2215. When the modulator element 2215 is biased at minimum transmission, in the absence of a controlling signal the loss experienced by the optical signal can be at its maximum. In the presence of the RF signal (1's), the loss will drop to a minimum (OPEN GATE), thus working as an On-Off Keying modulation device. The pulse width of the output optical signal is typically much less than the time slot occupied by a single bit of information (even less than a half clock period of a NRZ scheme) making this system genuinely RZ as identified by element 2220.

Figure 23:
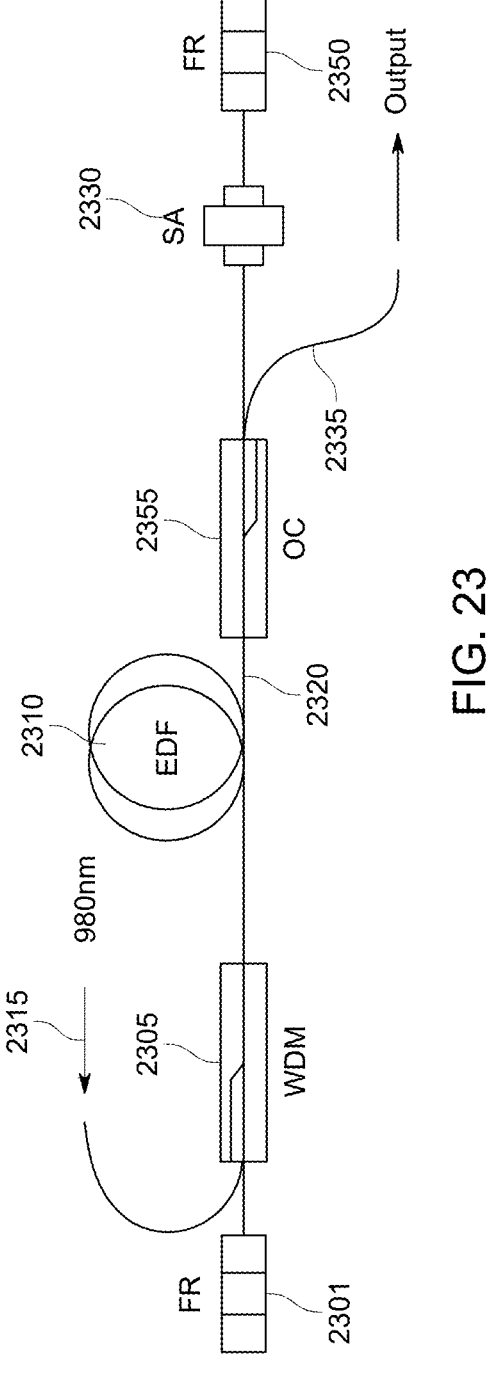

FIG. 23 illustrates an example system 2300 for generation of high optical harmonic USPL pulse streams having high pulse repetition rate using a saturable absorber (SA) device 2330. The SA device 2330 can in some examples include carbon nanotubes. Passive mode-locked fiber lasers using carbon nanotubes SA (CNT-SA) make another attractive option for high rep rate sources due to their ability to generate high harmonics of the fundamental rep rate. In the approach described, a closed, self-contained optical cavity is established, in which two Faraday reflectors 2301 and 2350 form the optical cavity. Although a high-power erbium doped fiber amplifier (EDFA) 2310 is shown in FIG. 23, any inverting medium producing a non-linear optical cavity can be used. A seed laser 2315, such as for example a 980 nm pump laser as shown in FIG. 23 can be used in generating a high-repetition rate optical train. In particular, any suitable pump laser may be considered in terms of optical wavelength and pulse repetition rate required. The SA element 2330 can be placed within the cavity to establish required optical pulse characteristics 2350 as required through design requirements.

FIG. 23 shows the schematics of an example of a laser that can be used in one or more implementations of the current subject matter. Unlike the active laser shown in FIG. 22, here the MZ modulator can be replaced by the SA element 2330. A technique similar to those described herein can be utilized within a fiber based plant distribution system or within a FSO system, for terrestrial, submarine or FSO system either in air, space or submarine applications.

Figure 24:
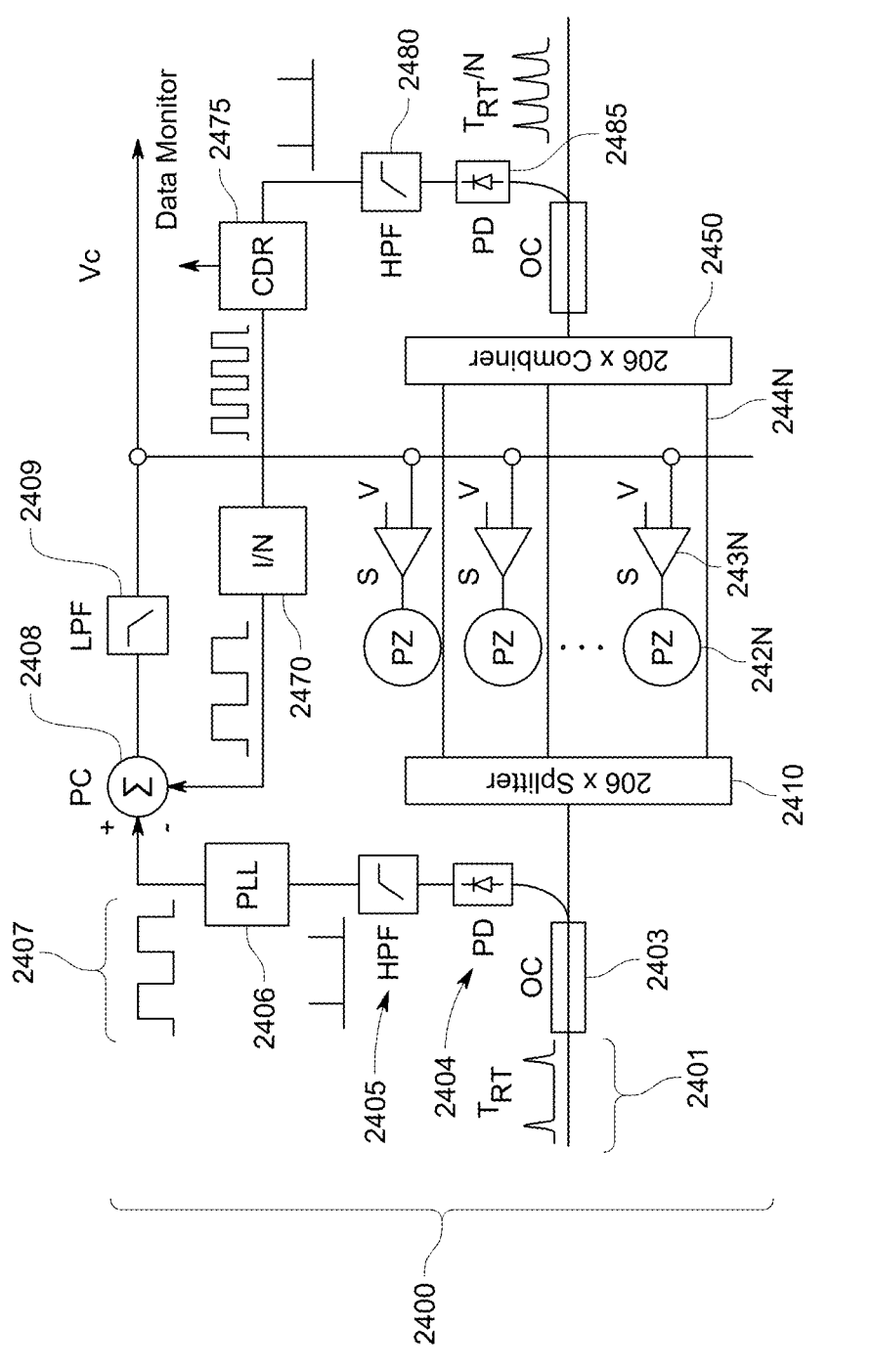
FIG. 24 depicts an example of a time-delay stabilization mechanism: optical coupler (OCin, OCout), photo-detector (PDin, PDout), high-pass filter (HPF), low-pass filter (LPF), phase-locked loop (PLL), phase-comparator (PC), frequency-divider (1/N), clock-data recovery system (CDR), piezoelectric actuator (PZ1 . . . PZN), summing op amp, for use in stabilizing the optical pulse to pulse relationship produced from the USPL source.

FIG. 24 illustrates an approach to providing time-domain multiplexing (TDM) where the TDM multiplexes a pulse train using parallel time delay channels. In some instances, it can become important to manipulate the delay channels such that they are "consistent" relative to each another. The frequency of the output multiplexed pulse train can ideally as much as possible be insensitive to environmental changes. For that, a proposed feedback loop control system is design to correct the delay units for any fluctuations which compromises the stability of the output rep rate.

FIG. 24 shows a diagram of an example of a delay control system 2400. The control loop can be implemented in one of several ways consistent with the current subject matter. FIG. 24 describes one possibility for illustration purposes. The input pulse train enters the TDM and multiplexes into N paths, each with its own delay line. If the paths are made of low "bending-loss" fiber waveguides, then each path can be coiled around a cylindrical piezoelectric actuator (PZ) of radius R. The actuators generally expand in a radial direction as a result of a controlling voltage (Vc). This expansion $\Delta R$, which is linearly proportional to Vc, causes a change in length of the fiber $\Delta L=2\pi N\Delta R$, where N is the number of fiber turns around the PZ. For Terahertz multiplexing, the delay between the pulses (and thus of PZ1) must be 1 picosecond. This can require a change in length equals to 200 microns, which, for a one turn PZ actuator corresponds to a $\Delta R=32.5$ microns. Most commercially available piezo-electric actuators are highly linear and operate well within this range. The control mechanism can, therefore, be based on several PZ actuators, each with a number of turns corresponding to multiples of the first delay, i.e. (32, 64, 96 microns, etc.), and controlled by a single voltage Vc. The controlling voltage is determined by the feedback system, which compares the frequency of the output signal using a 1/N divider, with the frequency of the input signal, using a phase comparator (PC). The frequency of the "slow" input optical signal (represented by the waveform with rRT in FIG. 24 is converted to an RF signal using photo-detector PDin. In order to reduce the effects of electronic jitter, a "differentiator" (or high pass filter) can be applied to the RF signal as to steepen the leading edges of the pulses. A phase-locked loop is used to track-and-lock the signal, and to regenerate it into a 50% duty-cycle waveform. Likewise, in the output side, the optical signal is picked-up by photo-detector PDout, high-pass filtered, and regenerated using the clock output port of a clock-and-data recovery system. The clock of the output signal, which has a frequency N times the frequency of the input signal, is send to an N times frequency divider before going to the phase comparator. From the phase comparator, a DC voltage level representing the mismatch between the input and output signals (much as what is used in the architecture of PLL circuits) indicates the direction of correction for the actuators. A low-pass filter adds a time constant to the system to enhance its insensitivity to spurious noise.

A CDR can advantageously be used in the output, as opposed to a PLL such that the output signal may, or may not, be modulated. This system can be designed to work in both un-modulated, and "intra-TDM modulated" (i.e. one modulator at each delay path) schemes. However, this is a completely deterministic approach to compensating for variations on the length of the delay lines. Ideally, and within a practical standpoint, the delay paths should all be referenced to the same "thermal level" i.e. be sensitive to the same thermal changes simultaneously. In the event that each line senses different variation, this system would not be able to correct for that in real time.

In the alternative, a completely statistical approach can include summing of op amp circuits (S1 . . . SN) to deliver the controlling voltage to the actuators. Using such an approach, input voltages (V1 to VN) can be used to compensate for discrepancies in length between the lines, in a completely static sense, otherwise they can be used for initial fine adjustments to the system. The approach typically must also compensate or at least take into account any bending loss requirements of the fibers used. Some new fibers just coming out in the market may have a critical radius of only a few millimeters.

In the event that each path delay line senses different variation in temperature or experiences uncorrelated length changes due to spurious localized noise, the previously described approach, as is, may suffer from difficulties in performing a real time correction. A more robust approach operating in a completely statistical sense can be used consistent with some implementations of the current subject matter. In such an approach, summing op amp circuits (S1 . . . SN) can be used to deliver the controlling voltages to the actuators. In this case, the input voltages (V1 to VN) can be used to compensate for discrepancies in length between the delay lines in a completely statistical sense, otherwise they can only be useful for initial fine adjustments to the system (calibration).

Referring again to FIG. 24, an incoming USPL source identified as element 2401 is coupled to an optical coupler element 2403, such that one leg of the coupler connects to an optical photodiode selected for operation at the operational data rate of 2401. Using standard electronic filtering techniques described by elements 2404, 2405, and 2406 an electrical square wave representation of the incoming USPL signal is extracted and identified by element 2407. The second optical leg of coupler 2403 is interfaced into an appropriate optical splitter element identified by 2410, where the incoming signal into 2410 is split into 206 parallel optical paths. Also illustrated are variable rate optical delay lines established in parallel for each of the parallel branches of the splitter element 2410. The parallel piezoelectric elements are identified by elements 242N and are controlled electronically through feedback circuitry within the diagram. A control voltage identified by Vc is generated through a photodiode 2485 along with electronic circuitry elements 2480 and 2475. The clock-and-data Recovery (CDR) element 2475 produces a clock source that is used in controlling each of the PZ elements. Optical paths identified as 244N are combined after a proper delay is introduced into each leg of element 2410. The pulse multiplied USPL signal 2490 is thereby generated.

Figures 25A, 25B:
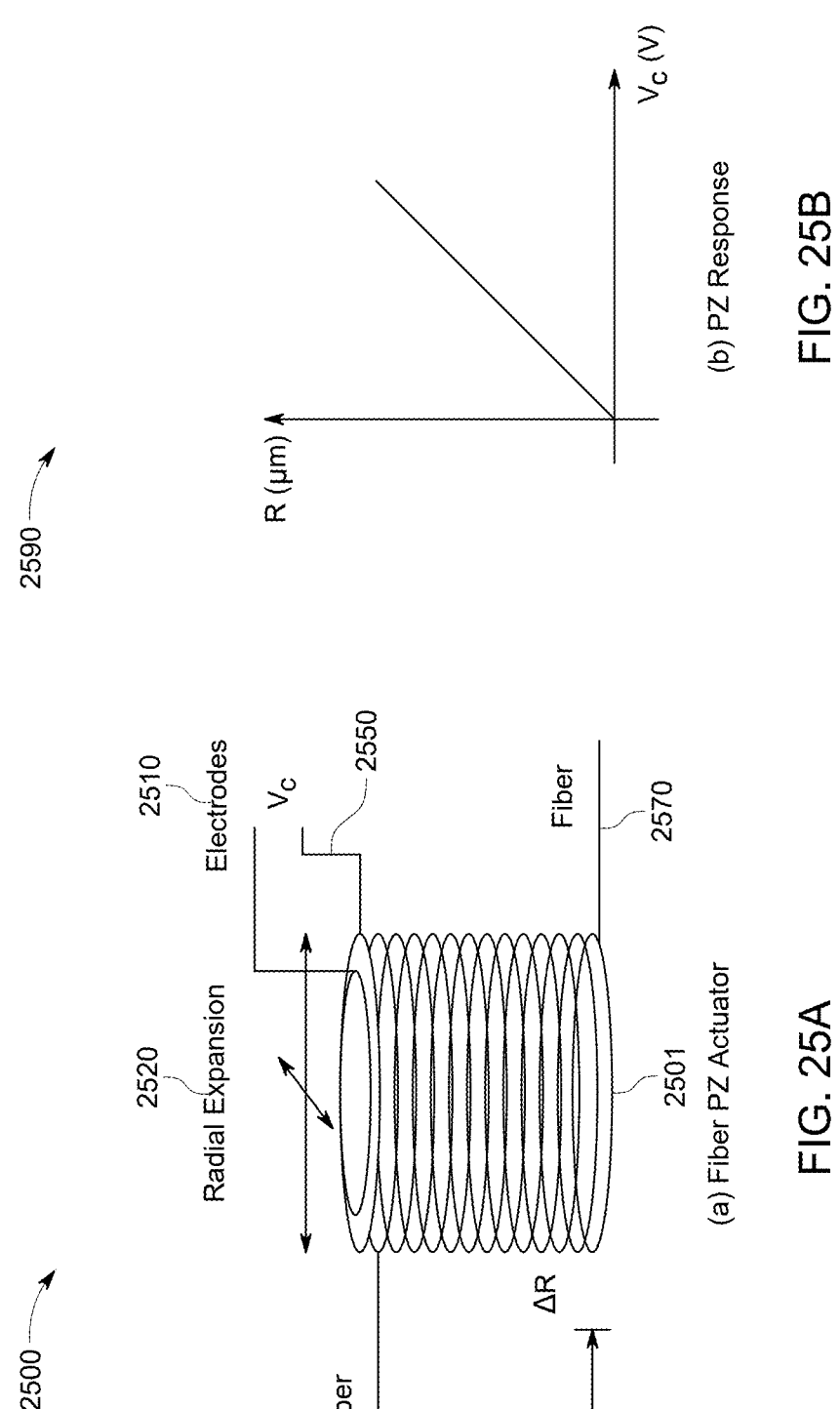
FIG. 25A and FIG. 25B respectively include a schematic diagram and a graph relating to an example of a controlling mechanism to stabilize the output frequency of TDM sources utilizing an idealized PZ actuator.

FIG. 25A shows a schematic of a fiber PZ actuator 2500, and FIG. 25B shows a graph 2590 of radius vs. voltage for such an actuator. Together, these drawings illustrate operation of a PZ actuator for increasing the pulse repetition rate of an incoming USPL pulse train through induced optical delay. Although shown for use as an element for enhancing pulse repetition rate generation for USPL signals, the same technique can be used for other optical devices requiring or benefiting from optical delay. The basic structure for the device is a fiber based PZ actuator 2501. When a voltage 2550 is applied to electrodes 2520 a voltage induced stress results within the fiber, causing a time delay of the optical signal traveling through the fiber. By varying applied voltage a performance curve of optical delay vs. applied voltage is obtained as shown in the graph 2590 of FIG. 25B.

Figure 26:
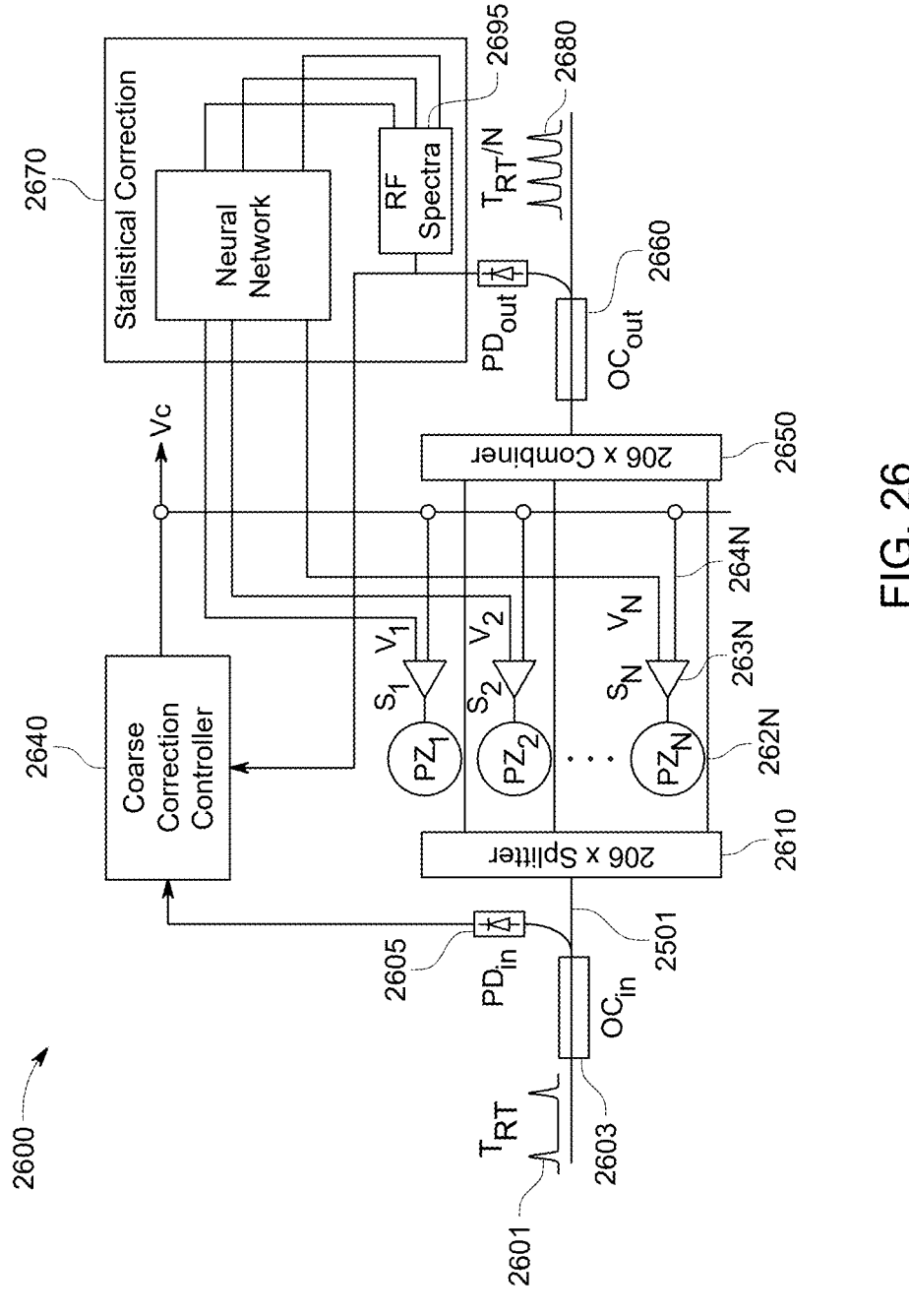
FIG. 26 depicts an example of a Time-Domain Multiplexing (TDM) where the TDM multiplexes a pulse train using parallel time delay channels, having the delay channels to be "consistent" relative to each another (Because the frequency of an output multiplexed pulse train is ideally as insensitive as possible to environmental changes, a feedback loop control system can correct the delay units for any fluctuations which compromise the stability of the output rep rate, and feedback can be provides through interconnection to a Neural Network).

FIG. 26 shows a diagram illustrating features of an example statistical corrector 2600. The coarse correction controller 2640 shown in FIG. 26 corresponds to the system described in the previous section, which can correct for length variations simultaneously picked up by all delay lines. As mentioned, these variations are expected to occur in a time scale much slower than the "intra delay line" spurious variations. This latter effect can manifest itself as a period-to-period jitter introduced on the system. This type of jitter can be monitored using an RF Spectrum Analyzer (RFA), causing the rep rate line of the system to display "side lines" (or side bands), which are the result of the analyzer beating together noisy frequencies resulting from uneven time intervals between consecutive pulses. One such pattern can be processed using an analog-to-digital converter (ADC) and saved as an array of values, which can then be fed to a neural network (NN) machine. Neural network machines are known to possess excellent adaptability characteristics that allow them to essentially learn patterns from outside events by adapting to new set of input and outputs. A set of inputs in this case can be generated from a set of "imperfect observations", i.e. "noisy" outputs of the TDM system as detected by the RFA and converted to digital arrays by the ADC ($\{f1, f2, \ldots, fN\}$, where $f_i$ is a frequency component picked up by the RFA). A set of outputs can be generated from the corrections ($\{V1, V2, \ldots, VN\}$, where Vt is a compensating input voltage to the summing op amp) required to rid the output frequency set from the undesired excess frequency noise, which is due to the outside perturbations to the system. With a sufficiently large number of $\{f,V\}$pairs, where f, V are frequency, voltage arrays, one can build an statistical set to train the NN machine to learn the underlying pattern associated with the presence of the intra-channel noise. These machines can be found commercially in an IC format from several manufacturers, or implemented as software and used in conjunction with a computer feedback control mechanism. A single layer Perceptron type neural network, or ADALINE (Adaptive Linear Neuron or later Adaptive Linear Element), should be sufficient to accomplish the task.

Similar to the description provided above in relation to FIG. 24, a statistical corrector element 2670 can include electronic circuitry that is similar to or that provides similar functionality as the electrical circuitry elements 2480 and 2475 and the photodiode 2485 of FIG. 24. For the approach illustrated in FIG. 26, a RF spectra analyzer 2695 along with a Neural Network 2670 and a Coarse Correction Controller element 2640 are used to perform the requirement of optical delay introduced into a parallel series of PZ elements 262N.

Figure 27:
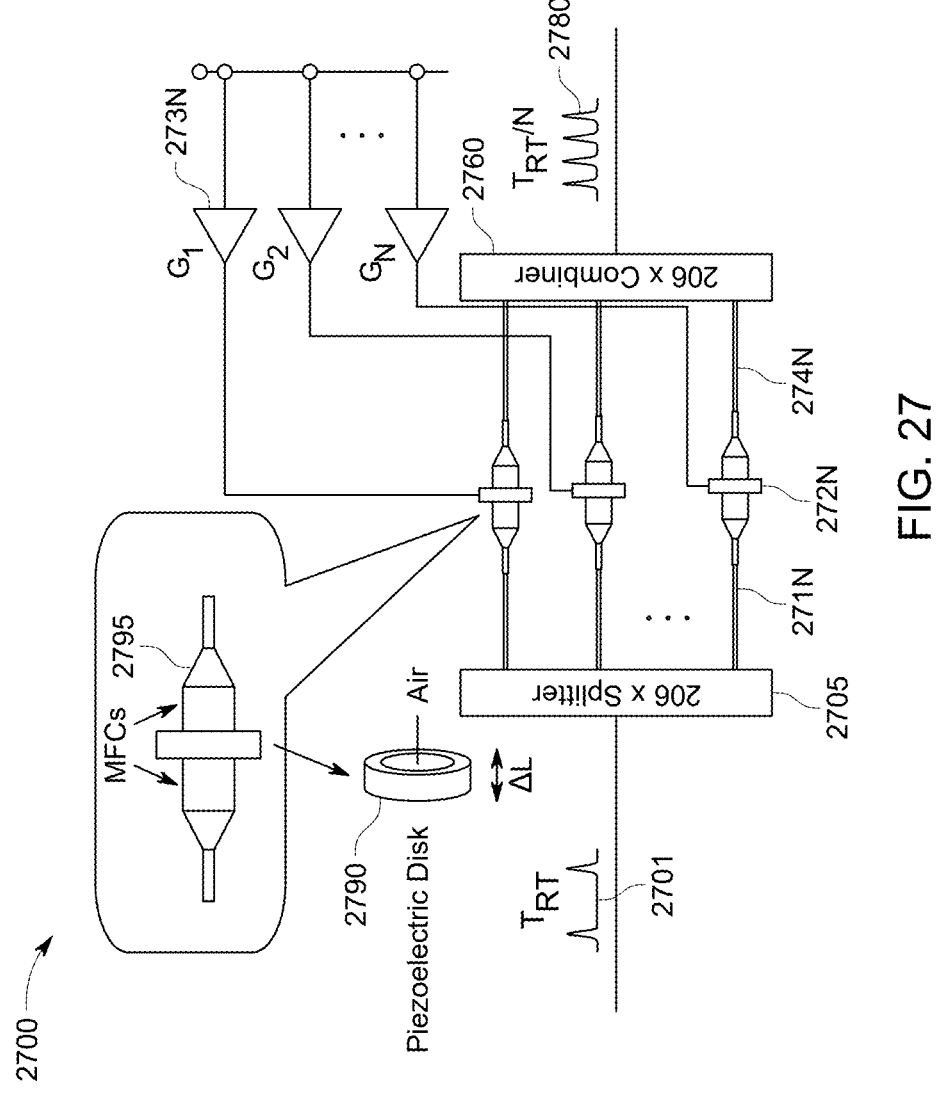
FIG. 27 depicts an example of use of fiber based collimators along with Piezoelectric transducers for controlling individual MFC circuits.

FIG. 27 illustrates concepts and capabilities of approaches consistent with implementations of the current subject matter in which performance, accuracy, and resolution can be improved through replacement of piezoelectric disk (PZ) modules identified by elements 2795 and 272N, where compact micro fiber based collimators (MFC) 2795 encircled by ceramic disks are used to obtain optical delay lines. Although illustrating a technique for increasing the native pulse repetition rate for a USPL pulse train, the design illustrated is not limited to such applications but can be applied or extended to other needs within the optical sector wherever optical delay is required. In so doing, a more controlled amount of temporal delay can be introduced within each MFC element of the circuit. The improvement through the use of utilizing MFC elements can improve response, resolution, and the achievement of reproducing in a rapid fashion required voltage responses in a mass production means. The concept identified within FIG. 27 can be incorporated into precisely produced elements that can serve as complementary paired units for use in reducing USPL pulse-to-pulse jitter as well as for the purposes of data encryption needs.

With further reference to FIG. 27, a USPL source 2701 having a certain pulse repetition rate is split into a preselected number of optical paths 271N (which can number other than 206) as identified by splitter element 2705. An appropriately controlled delay 273N is introduced into each parallel leg of the split optical paths 271N using elements described by 2795 and 272N. The resulting delayed paths 274N are added together through an optical combiner element 2760. The pulse multiplied USPL signal 2780 results.

One potential disadvantage of some previously available TDM designs, in which fibers are "wrapped-around" the piezo actuators, is that the mechanism must comply with the bending loss requirements of the fibers used. Some new fibers just coming out in the market have critical radius of only a few millimeters. To correct for this issue, implementations of the current subject matter can use of micromachined air-gap U-brackets in lieu of the fiber-wrapped cylindrical piezo elements. FIG. 27 illustrates this principle. In this approach, the piezoelectric actuators (PZ1, . . . PZN) can be replaced by air gap U-bracket structures constructed using micro-fiber collimators (MFCs), and micro-rings made of a piezoelectric material. In this case, however, the piezoelectric actuator expands longitudinally, increasing (or decreasing) the air gap distance between the collimators, in response to the controlling voltages (V1, V2, . . . VN). As in the case of the cylindrical piezoelectric, a single voltage Vc can be use to drive all the piezoelectric devices, provided that the gains of each channel (G1, G2, . . . GN) are adjusted accordingly to provide the correct expansion for each line. Ideally, except for inherent biases to the system (i.e. intrinsic differences between op amps), the gain adjustments should be as G1, 2G1, 3G1, and so forth, in order to provide expansions, which are multiples of the τRT/N. Another way of implementing such an approach can be the use of multiple piezoelectric rings at the channels. In that manner, one can have channels with 1, 2, 3, N piezoelectric rings driven by the same voltage with all amplifiers at the same gain.

FIG. 28 provides a conceptual presentation of an optical chip system 2800 to successfully bridge between two remote 10 GigE switches. Ideally, such a connection can perform similarly to a simple piece of fiber. The timing of the TDM chip can be driven by the 10 GigE switch.

In reference to FIG. 28, a USPL source 2805 having a predetermined native pulse repetition rate identified by 2806 connects to an optical Pulse multiplier chip 2807. Element 2807 is designed to convert the incoming pulse repetition rate signal 2806 into an appropriate level for operation with high-speed network Ethernet switches as identified by 2801. Switch 2801 provides a reference signal 2802 used to modulate signal 2809 by way of a standard electro-optic modulator 2820 at the data rate of interest. A resulting RZ optical signal is generated as shown in element 2840.

An alternative to having the timing run from the 10 GigE switch is to buildup the USPL to a Terabit/second (or faster) with a multiplier photonic chip, and then modulate this Terabit/second signal directly from the 10 GigE switch. Each bit will have 100 or so pulses. An advantage of this approach can be the elimination of a need for separate timing signals to be run from the switch to the USPL. The USPL via multiplier chip just has to pump out the Terabit/second pulses. Another advantage is that the output of the Multiplier Chip does not have to be exactly 10.313 or 103.12 Gbps. It just has to at a rate at about 1 Terabit/second. Where each 10 GigE bit has 100 or 101 or 99 pulses, this limitation is a non-issue. Another advantage is each bit will have many 10 USPL, so the 10 GigE signal will have the atmospheric propagation (fog and scintillation) advantage. Another advantage can be realized at the receiver end. It should be easier for a detector to detect a bit if that bit has 100 or so USPL pulses within that single bit. This could result in improved receiver sensitivity, and thus allow improved range for the FSO system. An additional advantage can be realized in that upgrading to 100 GigE can be as simple as replacing the 10 GigE switch with a 100 GigE switch. Each bit will have around 10 pulses in this case.

From a purely signal processing perspective this approach demonstrates an efficient way to send data and clock combined in a single transmission stream. Much like a "sampling" of the bits using an optical pulse stream, this approach has the advantage that the bit "size" is determined by the maximum number of pulses the it carries, therefore establishing a basis for counting bits as they arrive at the receiving end. In other words, if the bit unit has a time slot which can fit N pulses, the clock of the system can be established as "one new bit of information" after every 5th.

A technique similar to those described herein can be utilized within a fiber based plant distribution system or within a FSO system, for terrestrial, submarine or FSO system either in air, space or submarine applications, and illustrates for the first time how the interconnection from USPL sources to optical network elements is achieved for networking applications.

Figure 29:
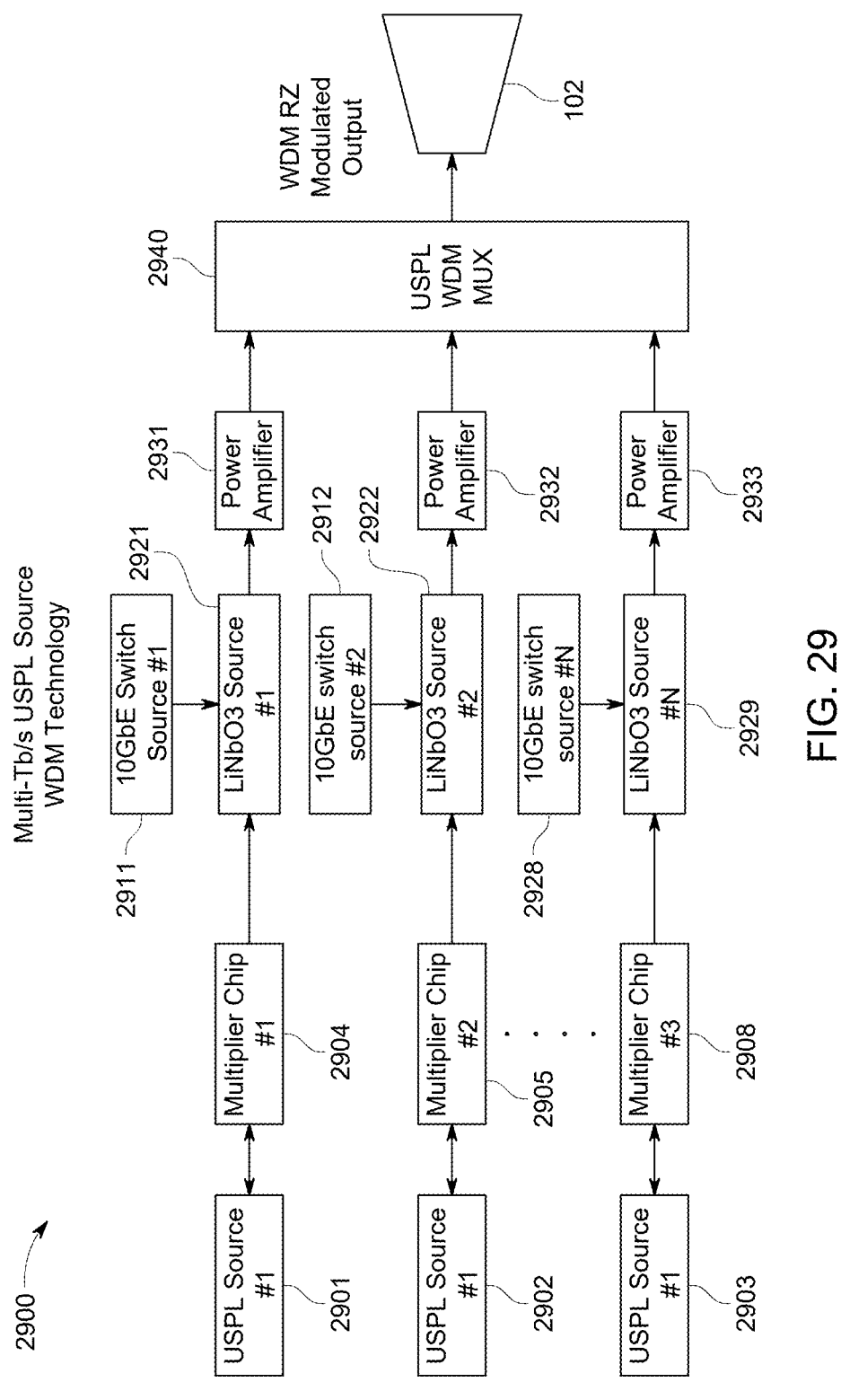
FIG. 29 depicts an example of timing of the TDM chip from the USPL modulation source to provide a Terabit/second (or faster) with a Multiplier Photonic chip operating in a WDM configuration.

FIG. 29 shows a system 2900 that illustrates a conceptual network extension for the design concept reflected within FIG. 28. As multiple USPL sources 2901, 2902, 2903 (it should be noted that while three are shown, any number is within the scope of the current subject matter), each modulated through dedicated optical switches and USPL laser Multiplier Chips circuits are configured in a WDM arrangement. As described in reference to FIG. 28, electrical signals from each Ethernet switch can be used to modulate dedicated optical modulators 2911, 2922, 2928 for each optical path. Optical power for each segment of the system can be provided by optical amplification elements 2931, 2932, 2933 for amplification purposes. Each amplified USPL path can then be interfaced to an appropriate optical combiner 2940 for transport to a network 2950, and can be either free space or fiber based as required. The output from the WDM module can then be configured to a transmitting element 102 for FSO transport or into fiber plant equipment.

The technique described herein can be utilized within a fiber based plant distribution system or within a FSO system, for terrestrial, submarine or FSO system either in; air, space, or submarine applications, and illustrates for the first time how the interconnection from USPL sources to optical network elements is achieved for networking applications.

Figure 30:
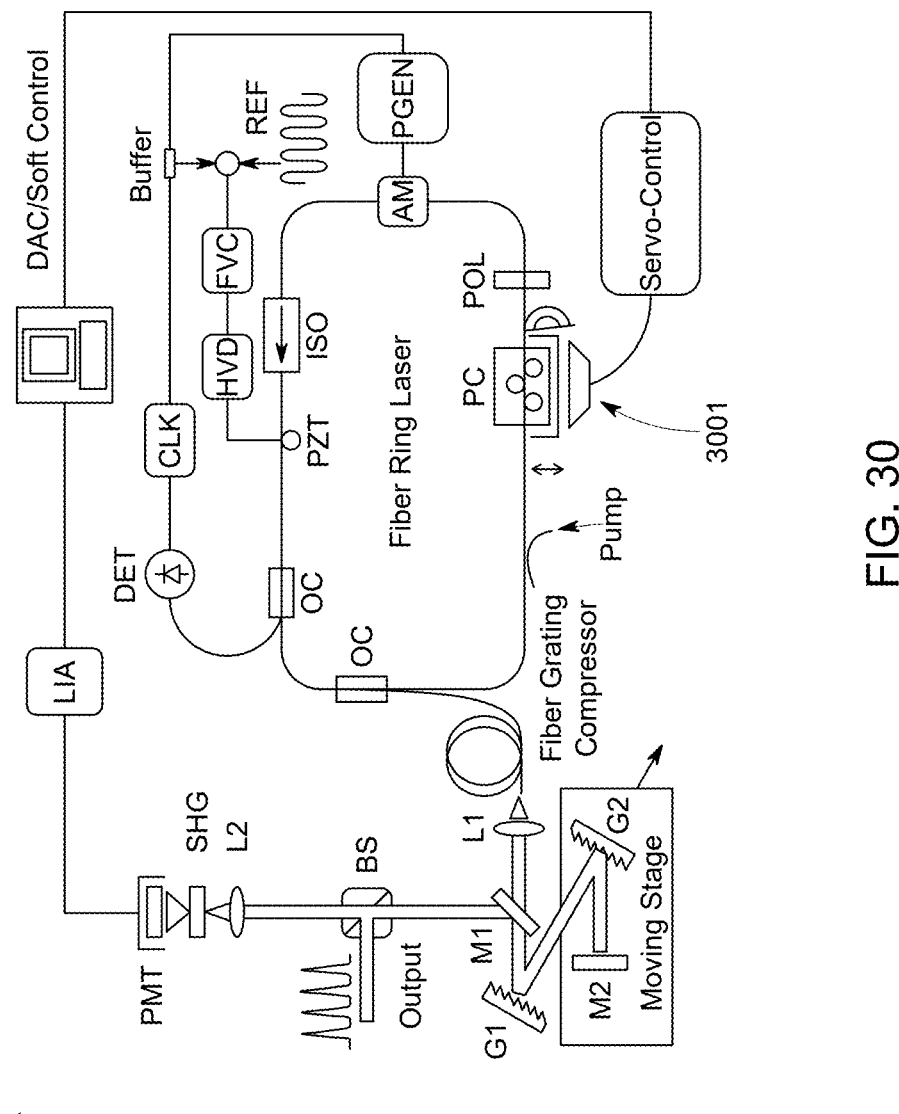
FIG. 30 depicts an example of construction of a computer assisted system, which can control the pulse width of an all-fiber mode-locked laser using recursive linear polarization adjustments with simultaneous stabilization of the cavity's repetition rate using a synchronous self-regenerative mechanism and can also offer tunability of the repetition rate, and pulse width.

FIG. 30 shows the schematics of an experimental setup for implementations of the current subject matter to include construction of a computer assisted system to control the pulse width of an all-fiber mode-locked laser using recursive linear polarization adjustments with simultaneous stabilization of the cavity's repetition rate using a synchronous self-regenerative mechanism. The design can also offer tune-ability of the repetition rate, and pulse width.

The fiber ring laser is represented by the inner blue loop, where all intra-cavity fiber branches are coded in blue, except for the positive high dispersion fiber outside the loop, which is part of the fiber grating compressor (coded in dark brown). The outside loops represent the feedback active systems.

FIG. 30 shows a diagram of a system 3000 illustrating features of an USPL module providing control of pulse width and pulse repetition rate control through mirrors (M1, M2), gratings (G1,G2), lengths (L1,L2), second-harmonic generator (SHG), photomultiplier tube (PMT), lock-in amplifier (LIA), data acquisition system (DAC), detector (DET), clock-extraction mechanism (CLK), frequency-to-voltage controller (FVC), high-voltage driver (HVD), reference signal (REF), pulse-generator (PGEN), amplitude modulator (AM), isolator (ISO), piezoelectric actuator (PZT), optical coupler (OC), polarizer (POL), and polarization controller (PC) all serve to provide control of pulse repetition rate and pulse width control.

The passive mode-locking mechanism can be based on nonlinear polarization rotation (NPR), which can be used in mode-locked fiber lasers. In this mechanism, weakly birefringent single mode fibers (SMF) can be used to create elliptically polarized light in a propagating pulse. As the pulse travels along the fiber, it experiences a nonlinear effect, where an intensity dependent polarization rotation occurs. By the time the pulse reaches the polarization controller (PC) 3001 the polarization state of the high intensity portion of the pulse experiences more rotation than the lower intensity one. The controller can perform the function of rotating the high intensity polarization component of the pulse, bringing its orientation as nearly aligned to the axis of the polarizer (POL) as possible. Consequently, as the pulse passes through the polarizer, its lower intensity components experience more attenuation than the high intensity components. The pulse coming out of the polarizer is, therefore, narrowed, and the entire process works as a Fast-Saturable Absorber (FSA). This nonlinear effect works in conjunction with the Group-Velocity Dispersion (GVD) of the loop, and, after a number of round trips, a situation of stability occurs, and passive mode-locking is achieved. The overall GVD of the optical loop can be tailored to produce, within a margin of error, an specific desired pulse width, by using different types of fibers (such as single mode, dispersion shifted, polarization maintaining, etc. . . . ), and adding up their contributions to the average GVD of the laser.

An active control of the linear polarization rotation from the PC can greatly improve the performance of the laser. This can be achieved using a feedback system that tracks down the evolution of the pulse width. This system, represented by the outer loop in FIG. 1, can be used to maximize compression, and consequently, the average power of the pulse. A pulse coming out of the fiber ring laser through an OC is expected to have a width on the order of a few picoseconds. An external pulse compression scheme, which uses a fiber grating compressor, is used to narrow the pulse to a sub 100 fsec range. This technique has been extensively used in many reported experiments, leading to high energy, high power, USPL pulses. Here, the narrowed pulse is focused on a Second-Harmonic Generator (SHG) crystal and detected using a Photo-Multiplying Tube (PMT). The lock-in-amplifier (LIA) provides an output DC signal to a Data Acquisition Card (DAC). This signal follows variations of the pulse width by tracking increases, or decreases, in the pulses' peak power. A similar technique has been successfully used in the past, except that, in that case, a Spatial Light Modulator (SLM) was used instead. Here, a programmable servo-mechanism directly controls the linear polarization rotation using actuators on the PC. With the DC signal data provided by the DAC, a decision-making software (such as, but not limited to, LABVIEW or MATLAB SIMULINK) can be developed to control the servo-mechanism, which in turn adjusts the angle of rotation of the input pulse relative to the polarizer's axis. These adjustments, performed by the actuators, are achieved using stress induced birefringence. For instance, if the pulse width decreases, the mechanism will prompt the actuator to follow a certain direction of the linear angular rotation to compensate for that, and if the pulse width increases, it will act in the opposite direction, both aimed at maximizing the average output power.

A self-regenerative feedback system synchronized to the repetition rate of the optical oscillation, and used as a driving signal to an amplitude modulator (AM), can regulate the round trip time of the laser. In the active system, the amplitude modulator acts as a threshold gating device by modulating the loss, synchronously with the round trip time. This technique has can successfully stabilize mode-locked lasers in recent reports. A signal picked up from an optical coupler (OC) by a photo-detector (DET) can be electronically locked and regenerated by a clock extraction mechanism (CLK) such as a Phase-Locked Loop or a Synchronous Oscillator. The regenerated signal triggers a Pulse Generator (PGen), which is then used to drive the modulator. In a perfectly synchronized scenario, the AM will "open" every time the pulse passes through it, at each round trip time (TRT). Because the CLK follows variations on TRT, the driving signal of the AM will vary accordingly.

An outside reference signal (REF) can be used to tune the repetition rate of the cavity. It can be compared to the recovered signal from the CLK using a mixer, and the output used to drive a Piezoelectric (PZT) system, which can regulate the length of the cavity. Such use of a PZT system to regulate the cavity's length is a well-known concept, and similar designs have already been successfully demonstrated experimentally. Here a linear Frequency-to-Voltage Converter (FVC) may be calibrated to provide an input signal to the PZT's High Voltage Driver (HVD). The PZT will adjust the length of the cavity to match the repetition rate of the REF signal. If, for instance the REF signal increases its frequency, the output of the FVC will decrease, and so will the HV drive level to the piezoelectric-cylinder, forcing it to contract and, consequently increasing the repetition rate of the laser. The opposite occurs when the rep. rate of the reference decreases.

It is possible to have the width of the pulse tuned to a "transformed-limited" value using a pair of negative dispersion gratings. This chirped pulse compression technique is well established, and there has been reports of pulse compressions as narrow as 6 fs. The idea is to have the grating pair pulse compressor mounted on a moving stage that translates along a line which sets the separation between the gratings. As the distance changes, so does the compression factor.

In an example of a data modulation scheme consistent with implementations of the current subject matter, a passively mode locked laser can be used as the source of ultrafast pulses, which limits our flexibility to change the data modulation rate. In order to scale up the data rate of our system, we need to increase the base repetition rate of our pulse source. Traditionally, the repetition rate of a passively mode locked laser has been increased by either shortening the laser cavity length or by harmonic mode-locking of the laser. Both techniques cause the intra-cavity pulse peak power to decrease, resulting in longer pulse-widths and more unstable mode-locking.

Figure 31:
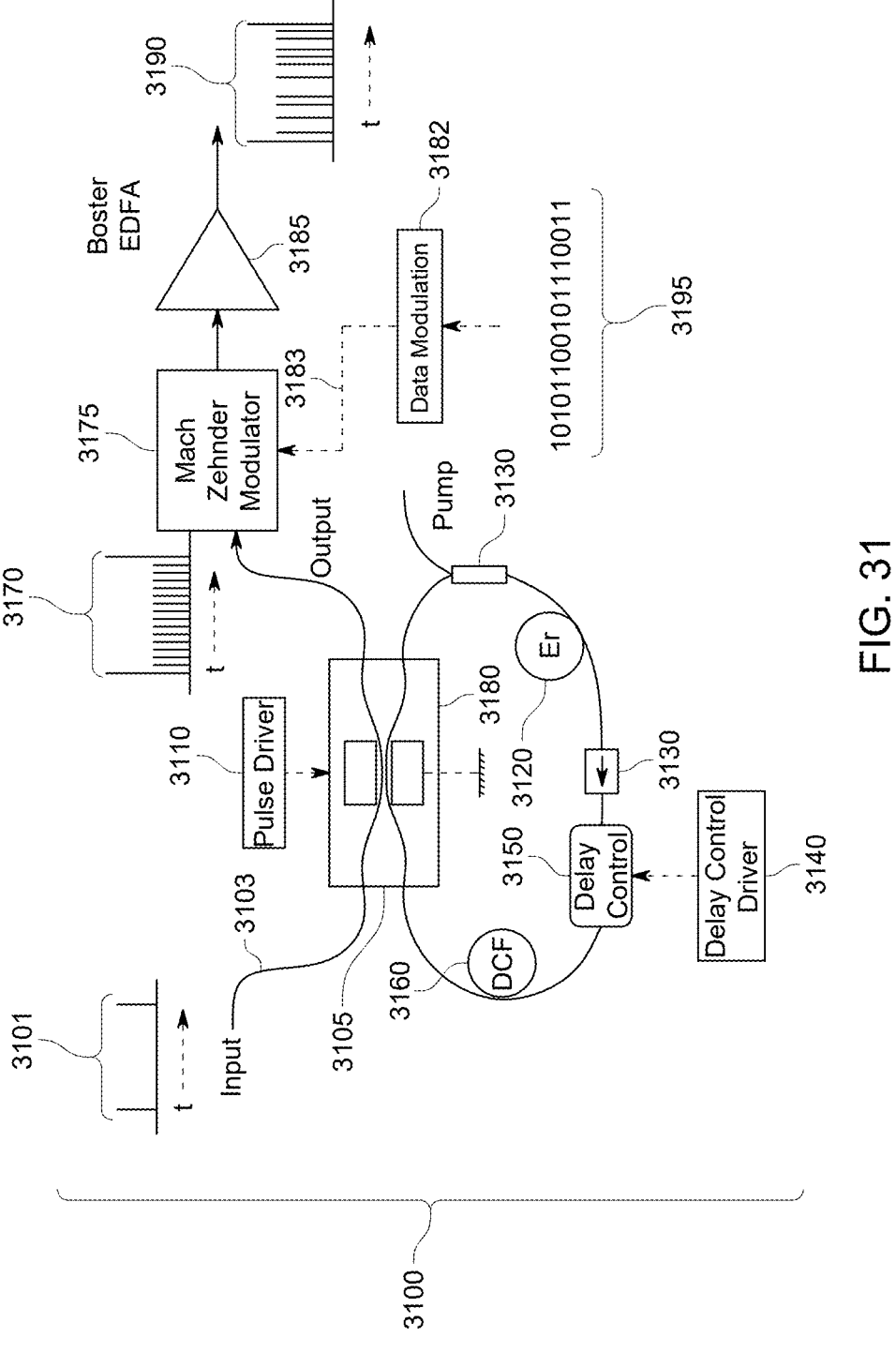
FIG. 31 depicts an example of a modified pulse interleaving scheme, by a pulse multiplication technique, in which the lower repetition rate pulse train of a well-characterized, well-mode locked laser can be coupled into an integrated-optical directional coupler, where a well-determined fraction of the pulse is tapped off and "re-circulated" in an optical loop with an optical delay equal to the desired inter-pulse spacing in the output pulse train, and re-coupled to the output of the directional coupler.

One approach to solving this problem involves use of a modified pulse interleaving scheme, by a technique which we call pulse multiplication. FIG. 31 illustrates this concept. The lower repetition rate pulse train of a well-characterized, well-mode locked laser 3101 is coupled into an integrated-optical directional coupler 3180, where a well-determined fraction of the pulse is tapped off and "re-circulated" in an optical loop with an optical delay 3150 equal to the desired inter-pulse spacing in the output pulse train, and re-coupled to the output of the directional coupler. For instance, to generate a 1 GHz pulse train from a 10 MHz pulse train, an optical delay of Ins is required, and to enable the 100th pulse in the train to coincide with the input pulse from the 10 MHz source, the optical delay might have to be precisely controlled. The optical delay loop includes optical gain 3120 to compensate for signal attenuation, dispersion compensation 3160 to restore pulse-width and active optical delay control 3150. Once the pulse multiplication has occurred, the output pulse train is OOK-modulated 3175 with a data stream 3182 to generated RZ signal 3190, and amplified in an erbium-doped fiber amplifier 3185 to bring the pulse energy up to the same level as that of the input pulse train (or up to the desired output pulse energy level).

One or more of the features described herein, whether taken alone or in combination, can be included in various aspects or implementations of the current subject matter. For example, in some aspects, an optical wireless communication system can include at least one USPL laser source, which can optionally include one or more of pico-second, nano-second, femto-second and atto-second type laser sources. An optical wireless communication system can include USPL sources that can be fiber-coupled or free-space coupled to an optical transport system, can be modulated using one or more modulation techniques for point-to-multi-point communications system architectures, and/or can utilize optical transport terminals or telescopes manufactured through one or more of hyperbolic mirror fabrication techniques, conventional Newtonian mirror fabrication techniques, or other techniques that are functionally equivalent or similar. Aspheric optical designs can also or alternatively be used to minimize, reduce, etc. obscuration of a received optical signal.

Free-space optical transport systems consistent with implementations of the current subject matter can utilize USPL laser designs that focus a received signal at one ideal point. In some implementations one telescope or other optical element for focusing and delivering light can be considered as a transmitting element and a second telescope or other optical element for focusing and receiving light positioned remotely from the first telescope or other optical element can function as a receiving element to create an optical data-link. Both optical communication platforms can optionally include components necessary to provide both transmit and receive functions, and can be referred to as USPL optical transceivers. Either or both of the telescopes or other optical elements for focusing and delivering light can be coupled to a transmitting USPL source through either via optical fiber or by a free-space coupling to the transmitting element. Either or both of the telescopes or other optical elements for focusing and receiving light can be coupled to a receive endpoint through either optical fiber or a free-space coupling to the optical receiver. A free-space optical (FSO) wireless communication system including one or more USPL sources can be used: within the framework of an optical communications network, in conjunction with the fiber-optic backhaul network (and can be used transparently within optical communications networks within an optical communications network (and can be modulated using On-Off keying (OOK) Non-Return-to-Zero (NRZ), and Returnto-Zero (RZ) modulation techniques, within the 1550 nm optical communications band), within an optical communications network (and can be modulated using Differential-Phase-Shift Keying (DPSK) modulation techniques), within an optical communications network (and can be modulated using commonly used modulation techniques for point-to-point communications system architectures using commonly used free-space optical transceiver terminals), within an optical communications network utilizing D-TEK detection techniques, within a communications network for use in conjunction with Erbium-Doped Fiber Amplifiers (EDFA) as well as high power Erbium-Ytterbium Doped Fiber Amplifiers (Er/Yb-DFA), within an optical communications network (and can be modulated using commonly used modulation techniques for point-to-multi-point communications system architectures), etc.

USPL technology can, in some aspects, be utilized as a beacon source to providing optical tracking and beam steering for use in auto-tracking capabilities and for maintaining terminal co-alignment during operation. The recovered clock and data extracted at the receive terminal can be used for multi-hop spans for use in extending network reach. The optical network can be provided with similar benefits in WDM configurations, thereby increasing the magnitude of effective optical bandwidth of the carrier data link. USP laser sources can also or alternatively be polarization multiplexed onto the transmitted optical signal to provide polarization multiplex USP-FSO (PM-USP-FSO) functionality. The recovered clock and data extracted at the receive terminal can be used for multi-hop spans for use in extending network reach, and can include a generic, large bandwidth range of operation for providing data-rate invariant operation. An optical pre-amplifier or semi-conductor optical amplifier (SOA) can be used prior to the optical receiver element and, alternatively or in combination with the recovered clock and data extracted at the receive terminal, can be used for multi-hop spans for use in extending network reach, having a generic, large bandwidth range of operation for providing data-rate invariant operation. Terminal co-alignment can be maintained during operation, such that significant improvement in performance and terminal co-alignment can be realized through the use of USPL technology, through the use of USPL data source as well as providing a improved approach to maintaining transceiver alignment through the use of USPL laser beacons.

USPL-FSO transceivers can be utilized in some aspects for performing remote-sensing and detection for signatures of airborne elements using ionization or non-ionization detection techniques, utilizing optical transport terminals manufactured through either the Hyperbolic Mirror Fabrication Techniques or conventional Newtonian designs that focus a received signal at one ideal point. USPL-FSO transceivers consistent with implementations of the current subject matter can be utilized in non-line of sight lasercom applications. USPL-FSO transceivers consistent with implementations of the current subject matter can allow adjustment of the distance at which the scattering effect (enabling NLOS technique) takes place, reception techniques to improve detection sensitivity using DTech detection schemes, and improved bandwidth via broadband detectors including frequency combs. USPL-FSO transceivers consistent with implementations of the current subject matter can be utilized in conjunction with Adaptive Optic (AO) Techniques for performing incoming optical wave-front correction (AO-USPL-FSO). USPL-FSO transceivers consistent with implementations of the current subject matter can be utilized and operate across the infrared wavelength range.

USPL-FSO transceivers consistent with implementations of the current subject matter can be utilized in conjunction with optical add-drop and optical multiplexing techniques, in both single-mode as well as multi-mode fiber configurations. A USPL-FSO transceiver consistent with implementations of the current subject matter can be utilized and operated across the infrared wavelength range as a range-finder and spotting apparatus for the purposes of target identification and interrogation applications.

In other aspects of the current subject matter, a series of switched network connections, such as for example 10 GigE, 100 GigE, or the like connections can be connected from one point to another, either over fiber or free-space optics, for example via Time Division Multiplexing (TDM).

A mode-locked USPL source consistent with implementations of the current subject matter can be used to generate both clock and data streams. Mode-locked lasers can represent a choice of a high performance, high finesse source for clocks in digital communication systems. In this respect, mode-locked fiber lasers—in either linear or ring configuration—can make an attractive candidate of choice, as they can achieve pulse widths of the USPL sources region and repetition rate as high as GHz.

High harmonic generation can be achieved using carbon nano-tubes saturable absorbers. Passive mode-locked fiber lasers using carbon nano-tubes saturable absorbers (CNT-SA) make an option for high rep rate sources due to their ability to readily generate high harmonics of the fundamental rep rate.

FSO can be used in terrestrial, space, and undersea applications.

Conditional path lengths control from splitter to aperture can be an important parameter. TDM multiplexes can be employed consistent with implementations of the current subject matter to control the relative temporal time delay between aperture-to-source paths. Each pulse train can be controlled using parallel time delay channels. This technique can be used to control conventional multiple-transmit FSO aperture systems employing WDM as well as TDM systems. USPL laser pulse-to-pulse spacing can be maintained and controlled to precise temporal requirements for both TDM and WDM systems. The techniques described can be used in TDM and WDM fiber based system. The use of TDM multiplexers as described herein can be used implement unique encryption means onto the transmitted optical signal. A complementary TDM multiplexer can be utilized to invert the incoming received signal, and thereby recover the unique signature of the pulse signals. A TDM multiplexer described herein can be utilized to control WDM pulse character for the purpose of WDM encryption. A TDM multiplexer can be used in conventional FSO systems wherein multiple apertures connected to a common source signal are capable of having the temporal delay between pulses controlled to maintain constant path lengths. A TDM multiplexer can be used for TDM fiber based and FSO based systems. A TDM multiplexer can be an enabling technology to control optical pulse train relationship for USPL sources. A TDM multiplexer can be used as an atmospheric link characterization utility across an optical link through measurement of neural correction factor to get same pulse relational ship.

Any combination of PZ discs can be used in a transmitter and can have an infinite number of encryption combinations for USPL based systems, both fiber and FSO based. The timing can run from 10 GigE switches or the equivalent and to build up the USPL to a Terabit/second (or faster) rate with a Multiplier Photonic chip, and this Terabit/second signal can be modulated directly from the 10 GigE switch. While operating in a WDM configuration, an interface either to a fiber based system or to a FSO network element can be included.

A system can accept an ultrafast optical pulse train and can generate a train of optical pulses with pulse-width, spectral content, chirp characteristics identical to that of the input optical pulse, and with a pulse repetition rate being an integral multiple of that of the input pulse. This can be accomplished by tapping a fraction of the input pulse power in a 2×2 optical coupler with an actively controllable optical coupling coefficient, re-circulating this tapped pulse over one round trip in an optical delay line provided with optical amplification, optical isolation, optical delay (path length) control, optical phase and amplitude modulation, and compensation of temporal and spectral evolution experienced by the optical pulse in the optical delay line for the purpose of minimizing temporal pulse width at the output of the device, and recombining this power with the 2×2 optical coupler.

Passive or active optical delay control can be used, as can optical gain utilizing rare-earth-doped optical fiber and/or rare-earth-doped integrated optical device and/or electrically- or optically-pumped semiconductor optical amplification. Dispersion compensation can be provided using fiber-Bragg gratings and/or volume Bragg gratings. Wavelength division multiplexing data modulation of the pulse traversing the delay line can be sued as can pulse code data modulation of the pulse traversing the delay line.

The tailoring of conventional USPL sources through synthesis of USPL square wave pulses can be accomplished utilizing micro-lithographic amplitude and phase mask technologies, for FSO applications. The ability to adjust pulse widths using technology and similar approaches to control and actively control pulse with this technology can improve propagation efficiency through FSO transmission links, thereby improving system availability and received optical power levels.

Active programmable pulse shapers can be used to actively control USPL pulse-width can include matching real-time atmospheric conditions to maximize propagation through changing environments. One or more of the following techniques can be used in FSO applications to adapt the optical temporal spectrum using techniques: Fourier Transform Pulse shaping, Liquid Crystal Modular (LCM) Arrays, Liquid Crystal on Silicon (LCOS) Technology, Programmable Pulse Shaping using Acousto-optic modulators (AOM), Acousto-optic Programmable Dispersive Filter (AOPDF), and Polarization Pulse Shaping.

FIG. 32 shows a process flow chart 3200 illustrating features of a method, one or more of which can appear in implementations of the current subject matter. At 3202, a beam of light pulses each having a duration of approximately 1 nanosecond or shorter is generated. At 3204, a modulation signal is applied to the beam to generate a modulated optical signal. The modulation signal carrying data for transmission to a remote receiving apparatus. The modulated optical signal is received at an optical transceiver within an optical communication platform at 3206, and at 3210 the modulated optical signal is transmitted using the optical transceiver for receipt by the second optical communication apparatus.

FIG. 33 shows another process flow chart 3300 illustrating features of a method, one or more of which can appear in implementations of the current subject matter. At 3302, a beam of light pulses each having a duration of approximately 1 nanosecond or shorter is generated, for example using a USPL source. The beam of light pulses is transmitted at 3304 toward a target atmospheric region via an optical transceiver. At 3306, optical information received at the optical transceiver as a result of optical backscattering of the beam of light pulses from one or more objects in the target atmospheric region is analyzed.

FIG. 34 shows another process flow chart 3400 illustrating features of a method, one or more of which can appear in implementations of the current subject matter. At 3402, first and second beams comprising light pulses are generated, for example by a USPL source. At 3404, a first modulation signal is applied to the first beam to generate a first modulated optical signal and a second modulation signal is applied to the second beam to generate a second modulated optical signal. A first polarization state of the first modulated optical signal is adjusted at 3406. Optionally, a second polarization states of the second modulated optical signal can also be adjusted. At 3410, the first modulated optical signal having the adjusted first polarization state is multiplexed with the second modulated signal. At 3412, the multiplexed first modulated optical signal having the adjusted first polarization state with the second modulated signal is transmitted by an optical transceiver for receipt by a second optical communication apparatus.

2. SHORT COHERENCE LENGTH IN FREE SPACE OPTICAL SYSTEMS

Figure 35A:
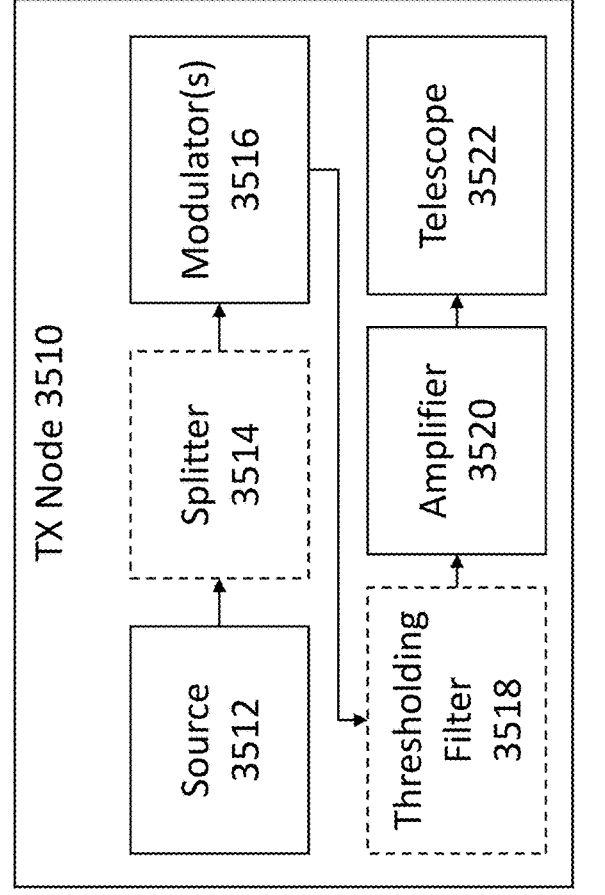
FIGS. 35A and 35B show exemplary nodes that can be used for transmitting and/or receiving information.
Figure 35B:
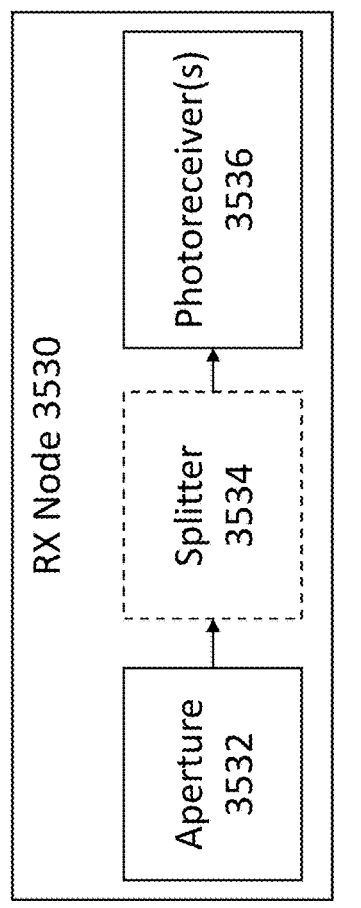

FIGS. 35A and 35B show exemplary nodes that can be used for transmitting and/or receiving information. Transmit node 3510 and receiving node 3530 may be communications platforms as described above, including with reference to FIGS. 1-9. Additionally, while transmit node 3510 is shown with components for generating and transmitting a data-bearing optical signal, and while receiving node 3530 is shown with components for receiving and extracting data from an optical signal, these components may be combined in a single node configured to both transmit and receive optical signals. In some embodiments, for example, a telescope 3522 may act as both an aperture for transmitting and receiving optical signals.

FIG. 35A shows an exemplary transmit node 3510. In some embodiments, transmit node 3510 may include a source 3512. In some embodiments, the source 3512 may be an USPL source, superluminescent diode, or other source. In other embodiments, the source 3512 may be a continuous wave source. Preferably, the source 3512 may be configured to generate a beam of light pulses, in which each pulse has a coherence length of less than 400 microns. The coherence length of the source is determined as:

$$L = C\frac{\lambda^2}{\Delta\lambda},$$

where C is a shaping constant equal to ½, $\lambda$ is the central wavelength of the pulse, and $\Delta\lambda$ is the full width at half maximum (FWHM) spectral width of the pulse. In some embodiments, the coherence length may be less than 1 mm, less than 600 microns, less than 400 microns, less than 200 microns, less than 100 microns, less than 50 microns, or less than 10 microns. In embodiments where a continuous wave source is used, these values may refer to the coherence length of the continuous wave beam, rather than that of the pulses.

In some embodiments, the source 3512 may have a central wavelength in the infrared range. For example, the central wavelength of the source 3512 may be between 1400 nm and 1700 nm. In some embodiments, the source 3512 may be configured to output pulses at a repetition rate of at least 50 MHz, 100 MHz, 200 MHz, 500 MHz, 800 MHz, 1 GHz, 1.25 GHz, 1.5 GHz, 2 GHz, 5 GHz, or 10 GHz. The source 3512 may include (internally or externally) a pulse multiplier, as generally described above, including with reference to FIGS. 15 and 18-20. In some embodiments, the pulse width may be less than 10 ns, less than 1 ns, less than 500 ps, less than 300 ps, less than 100 ps, less than 50 ps, less than 10 ps, less than 1 ps, less than 700 fs, less than 500 fs, less than 300 fs, less than 200 fs, or less than 100 fs.

Transmit node 3510 may optionally include a splitter 3514. Splitter 3514 may be configured to split pulses from source 3512 into a plurality of separated pulses having different wavelength bands. For example, a pulse having an original spectral width of 1500-1600 nm could be split into twenty-five pulses, each having a respective spectral width of 4 nm from 1500 nm to 1600 nm (e.g., 1500-1504 nm, 1504-1508 nm, 1508-1512 nm, and so on). Splitter 3514 may use any known beam-splitting mechanism. Each of the plurality of separated pulses may have coherence lengths of less than 1 mm, less than 600 microns, less than 400 microns, less than 200 microns, less than 100 microns, less than 50 microns, or less than 1 micron.

Transmit node 3510 may include one or more modulators 3516. In some embodiments, each of the modulators 3516 may be a Mach-Zehnder Modulator (MZM). The modulators 3516 may receive a data signal indicating data to be transmitted in an optical beam, and based on that data signal, may encode the data into the pulses of the beam using on-off keying or other modulation techniques. In some embodiments, the modulators 3516 may allow pulses to pass to indicate a '1' and may block or reduce the amplitude of a pulse to indicate a '0' in a bit stream. In embodiments where the beam is split, each of a plurality of separated pulses may be directed to a respective modulator 3516 of a plurality of modulators. In other embodiments, each of the plurality of separated pulses may be modulated by a single modulator 3516. For example, the separated pulses may be delayed and staggered in time relative to one another, and the modulator 3516 may encode data into each pulse at a higher repetition rate than the pulse-generating repetition rate of the source. In a case where the source 3512 generates pulses at a rate of at least 1 GHz, for example, the splitter may split each pulse into twenty-five or more separated pulses, which can be modulated by one or more modulators 3516 to encode data at a rate of at least 25 Gbps. In some embodiments, the source may generate pulses at a rate of at least 1 GHz, and the splitter may split each pulse into at least ten, at least twenty, at thirty, at least forty, or at least fifty separated pulses, to produce data rates of at least 10 Gbps, at least 20 Gbps, at least 30 Gpbs, at least 40 Gpbs, or at least 50 Gbps. In some embodiments, the FWHM bandwidth of the source may be at least 100 nm, at least 150 nm, or at least 200 nm, which may allow pulses to be split into more separated pulses without reducing the coherence length of those pulses below the values described below with respect to FIGS. 40 and 41.

After being modulated, the pulses (optionally, the separated pulses in the case where a splitter is used) may be passed to an optional thresholding filter 3518. In some embodiments, the thresholding filter may be a saturable absorber (or a different nonlinear device) that attenuates weak pulses and transmits strong pulses. The thresholding filter 3518 may be configured to eliminate or substantially diminish pulses below a defined threshold, while allowing pulses above that threshold to pass. In some embodiments, modulator 3516 may significantly diminish pulses where a "0" is intended to be transmitted, but it may be imperfect and some amount of optical energy may pass through, which, when amplified by amplifier 3520, could produce signals strong enough to generate bit errors. By using a thresholding filter 3518, pulses that are intended to be eliminated may be more fully eliminated, thereby improving the system's data transmission accuracy.

The modulated pulses may be passed to an amplifier 3520, which may increase the magnitude of the pulses for transmission by telescope 3522 (which may be, for example, an aperture and/or lens). In cases where a splitter is used, the separated pulses may be recombined using a recombiner (not shown) before or after being passed to amplifier 3520.

FIG. 35B shows an exemplary embodiment of a receiving node 3530, which may be configured to receive and extract data from an optical beam transmitted by, e.g., a transmit node 3510. Receiving node 3530 may include an aperture 3532, an optional splitter 3534, and one or more photoreceivers 3536, which may have specific characteristics in relation to the source, as described in detail below. The photoreceivers 3536 may include a photodiode and processing circuitry. In some embodiments, the photoreceivers 3536 may be, for example, an avalanche photodiode. In some embodiments, the processing circuitry of a photoreceiver may determine whether received light in a detection window exceeds a detection threshold and output bit data (e.g., a '0' or '1') for that window based on the result of that determination. Receiving node 3530 may be an optical communications platform as described above. In some embodiments, the components of transmit node 3510 and receiving node 3530 may be included in a single transceiver node.

Aperture 3532 may be configured to receive an optical signal, such as an optical beam transmitted by a transmit node 3510 as described in FIG. 35A. In some embodiments, the light received at aperture 3532 may pass through a filter that screens wavelengths of light that are not near the center wavelength of the source. For example, the source in the transmit node may have a center wavelength between 1500 nm and 1700 nm, and the filter at the receiving node 3530 may block or reduce light outside of the source band. For example, the filter may reduce a magnitude of light below 1500 nm. Optionally, the filter may additionally block longer wavelengths of light, or the threshold may be set at lower wavelengths, such as at 1480 nm or 1460 nm. Optionally, receive node 3530 may include a splitter 3534, which may split pulses in a received beam into a plurality of separated pulses of different wavelength bands. In a case where the pulses are split and separately modulated at the transmit node 3510, the pulses may be split into the same wavelength bands by the splitter 3534 in the receive node. The pulses (combined pulses or separated pulses, in the case where a splitter is used) may then be processed by one or more photoreceivers 3536. In embodiments where a pulse is split into a plurality of separated pulses, each pulse may be directed to a respective photoreceiver, which may be configured to determine whether an "on" or "off" signal was transmitted in a given detection window. In some embodiments, encoding modalities other than on-off keying may be used, such as frequency modulation. Additional detail regarding photoreceivers 3536 is provided below with respect to FIG. 41.

Figure 36:
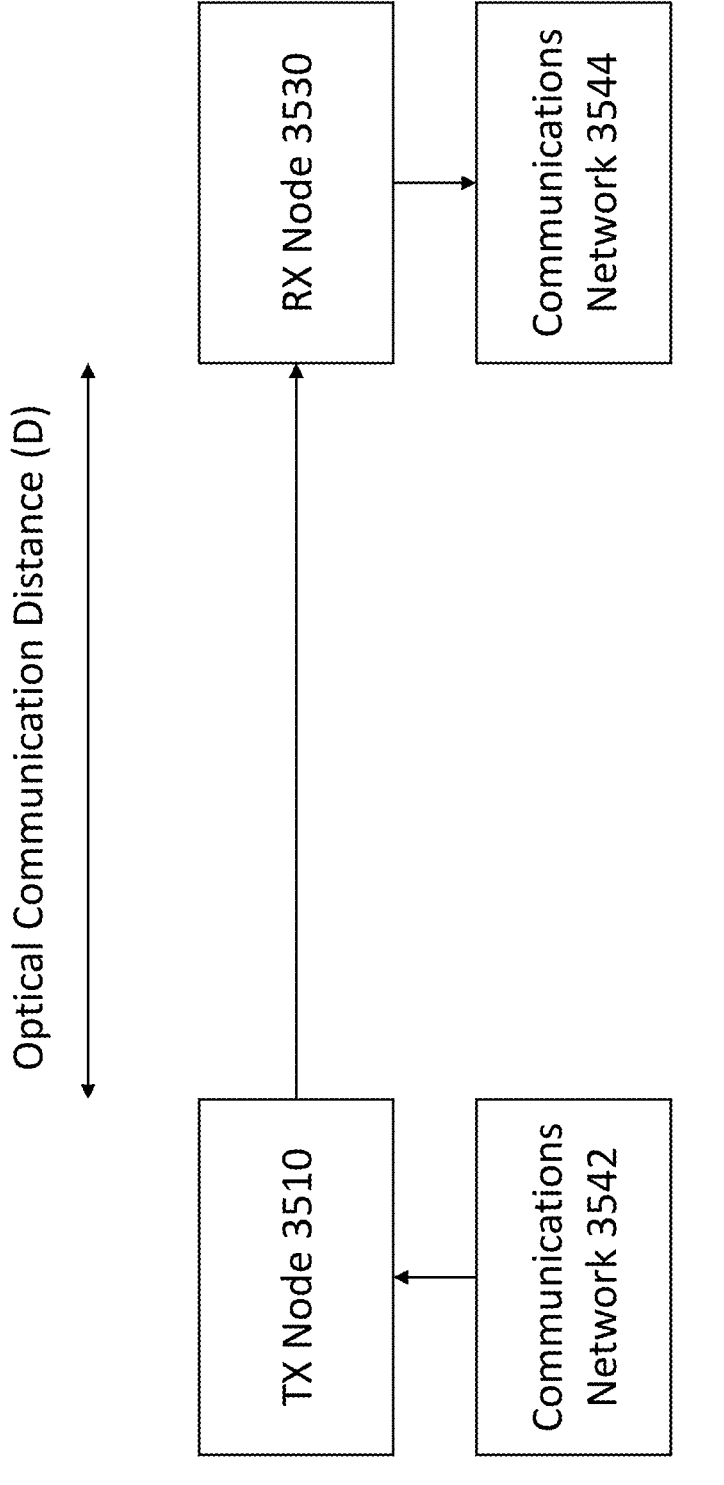
FIG. 36 shows an exemplary arrangement in which data is transmitted from a first communications network to a second communications network over an optical communication distance D using a transmit node and a receiving node.

FIG. 36 shows an exemplary arrangement in which data is transmitted from a first communications network 3542 to a second communications network 3544 over an optical communication distance D using a transmit node 3510 and a receiving node 3530, such as those described above with respect to FIGS. 35A-35B. Data may be received from optical communications network 3542 encoded into an optical beam and transmitted across optical communications distance D using transmit node 3510. Receiving node 3530 may receive the optical beam, extract the transmitted data, and pass the data to communications network 3544. In some embodiments, data from communications 3544 may also be transmitted from node 3530 back to node 3510, which may pass that data to communications network 3542 to enable two-way communication. In some embodiments, optical communication distance may be at least 0.5 miles, at least 1 mile, at least 2 miles, at least 3 miles, at least 5 miles, at least 7 miles, at least 10 miles, or at least 20 miles.

Figure 37:
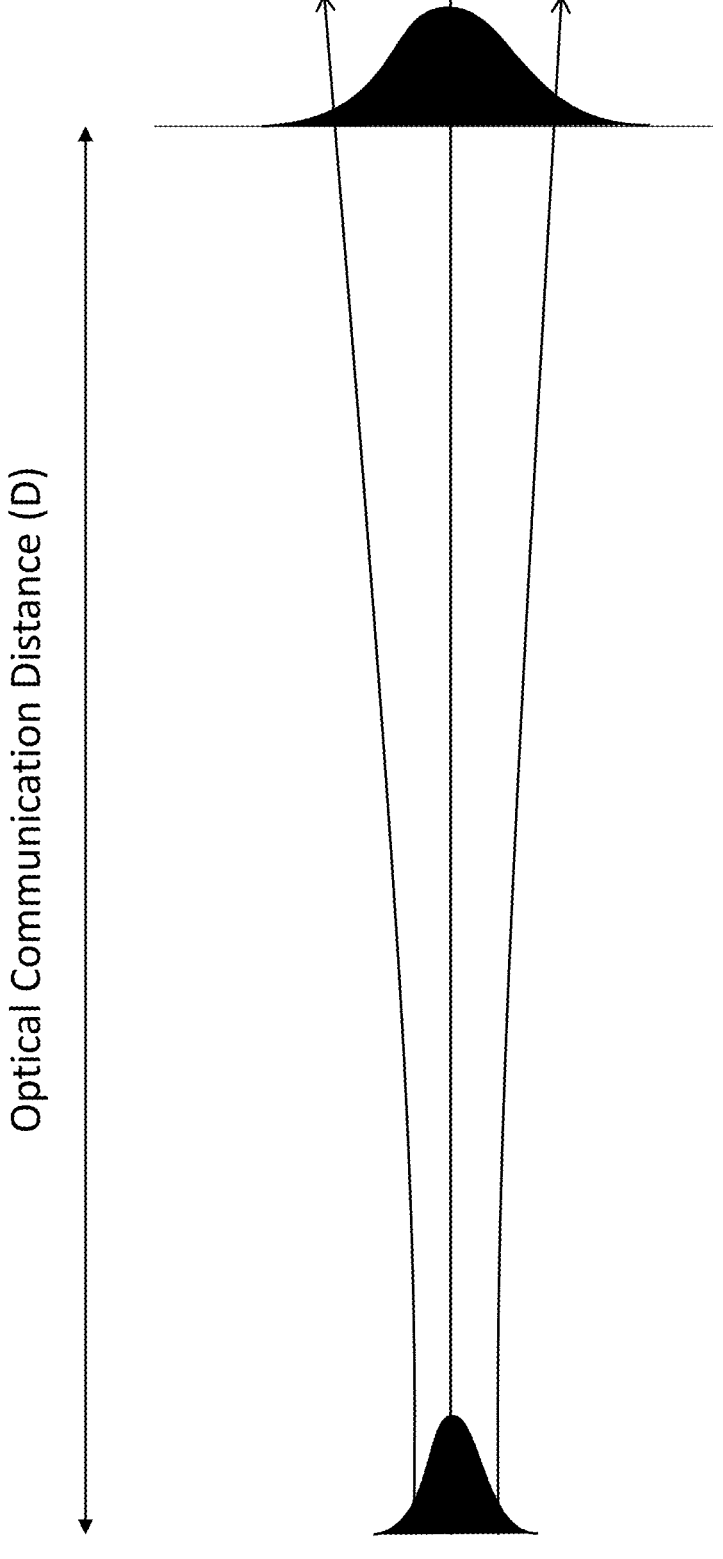
FIG. 37 shows an exemplary beam traveling over an optical communication distance D, such as 1 mile, through a constant refractive medium.

FIG. 37 shows an exemplary beam traveling over an optical communication distance D, such as 1 mile, through a perfectly uniform refractive index medium. Even in a medium of perfectly constant index of refraction, the beam will spread naturally due to diffraction, however the beam remains the same shape and simply expands by an amount that is proportional to the propagation distance, and there are no beam scintillation effects in a uniform index of refraction medium.

Figure 38:
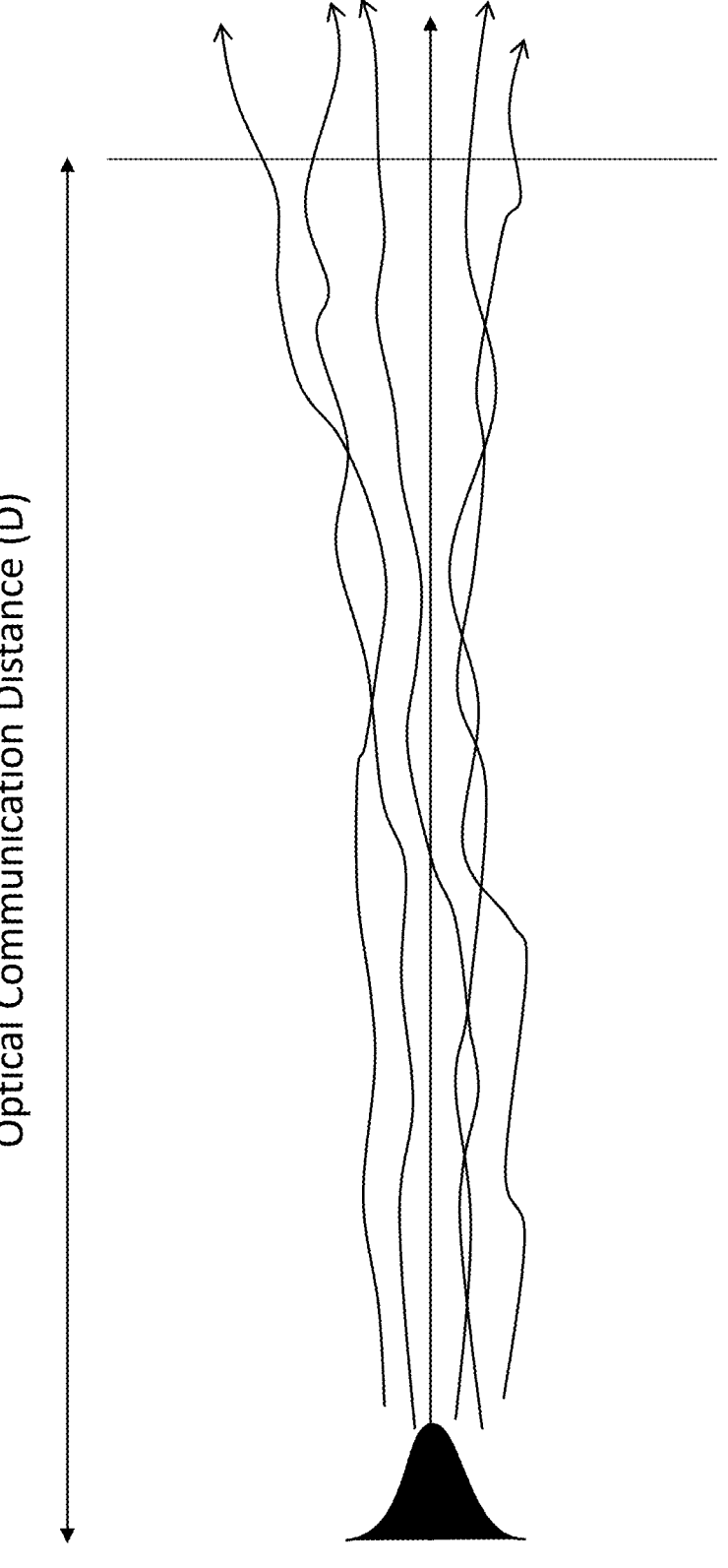
FIG. 38 provides a diagrammatic representation of photons in a beam traveling through a variably refractive medium.

FIG. 38 provides a diagrammatic representation of photons in a beam traveling through a variably refractive medium. The atmosphere has fluctuations in temperature, density, pressure, humidity, aerosols, wind, convection, and other parameters, which causes a refractive index of the atmosphere to vary. As an optical beam travels through the atmosphere or other variably refractive medium such as water, photons within the beam may be refracted slightly differently than other photons. As shown in FIG. 38, different ray paths within the beam may be refracted differently due to variations in the refractive index in the variably refractive medium. As a result, in a system such as that shown in FIG. 35 where a free space optical beam is transmitted over a sufficiently large optical communication distance D and received at a receiving node, different photons within a single pulse may take paths of different lengths to reach the receiving node and may arrive at different times. These differences in path length, and the time required for a photon to travel these distances, can produce coherent interference, and diminish signal quality in a free space optical communications system if the time delays are less than the coherence length of the source. Solutions for this problem are described herein, including with reference to FIGS. 40 and 41 and as applied within a system such as those shown in FIGS. 35A, 35B, and 36.

In addition to variance in path length, photons in a pulse may travel at variable speeds to due to variations in atmospheric conditions, including humidity, temperature, and density. Because different photons in a pulse travel though slightly different atmospheric conditions, the photons may travel at different speeds and arrive at different times. Additionally, different wavelengths of light within a pulse may travel at different speeds, which can further broaden a pulse as it travels through a variably refractive medium.

Figure 39:
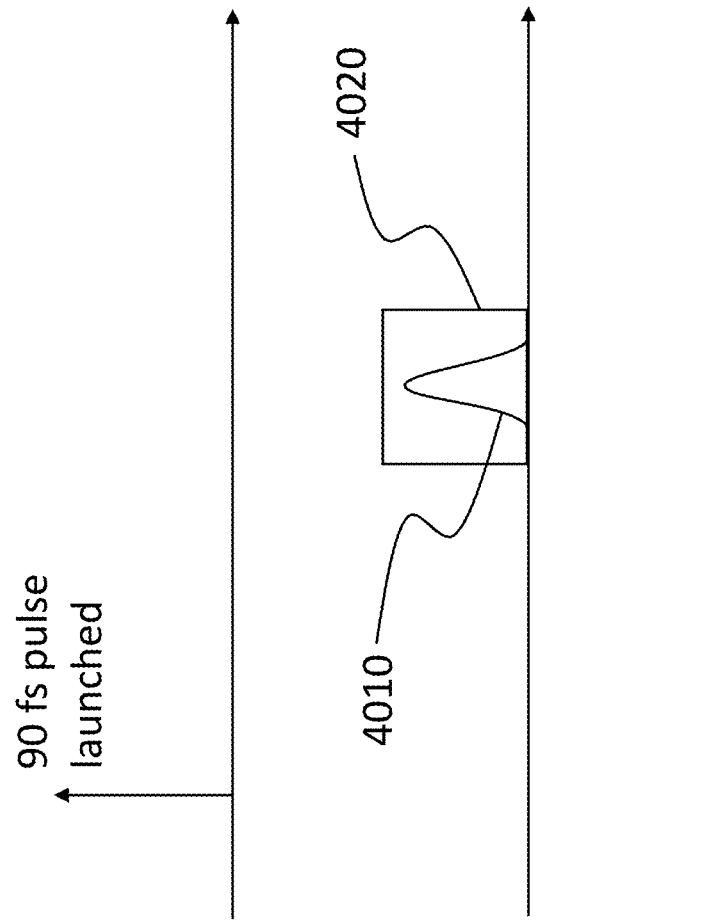
FIG. 39 shows a diagrammatic representation of a pulse broadening as it travels over an optical communication distance.

FIG. 39 shows a diagrammatic representation of a pulse as launched by a transmitter and as received by a photoreceiver. As shown in FIG. 39, the pulse may have a 90 femtosecond pulse width when it is transmitted by a transmit node. The pulse may then travel over an optical transmission distance where it may be received by a photoreceptor having a detection window 4020 of a defined duration, such as 500 picoseconds. When the pulse is received by the photoreceiver, its received pulsewidth may be broadened by passing through the variably refractive medium, as described above with respect to FIGS. 37-38. Due to variance in path lengths traveled by the beams and variance in atmospheric conditions through which the beams travel, different photons may arrive at the detector at different times according to a distribution curve, which may have a temporal duration that is longer than the pulse duration at launch. The amount of broadening can vary depending on the length of the optical communication distance and atmospheric conditions, including humidity, temperature, density, and the presence of aerosols such as fog. This broadening can be the order of picoseconds or more in some conditions.

The pulse may have a temporal distribution curve as shown. While a normal temporal distribution curve is shown, other pulse shapes are possible. By making the width of the curve 4010 longer (e.g., 3× longer) than the coherence length of pulses that are launched, coherent beam interference and coherent beam scintillation may be reduced.

Figure 40:
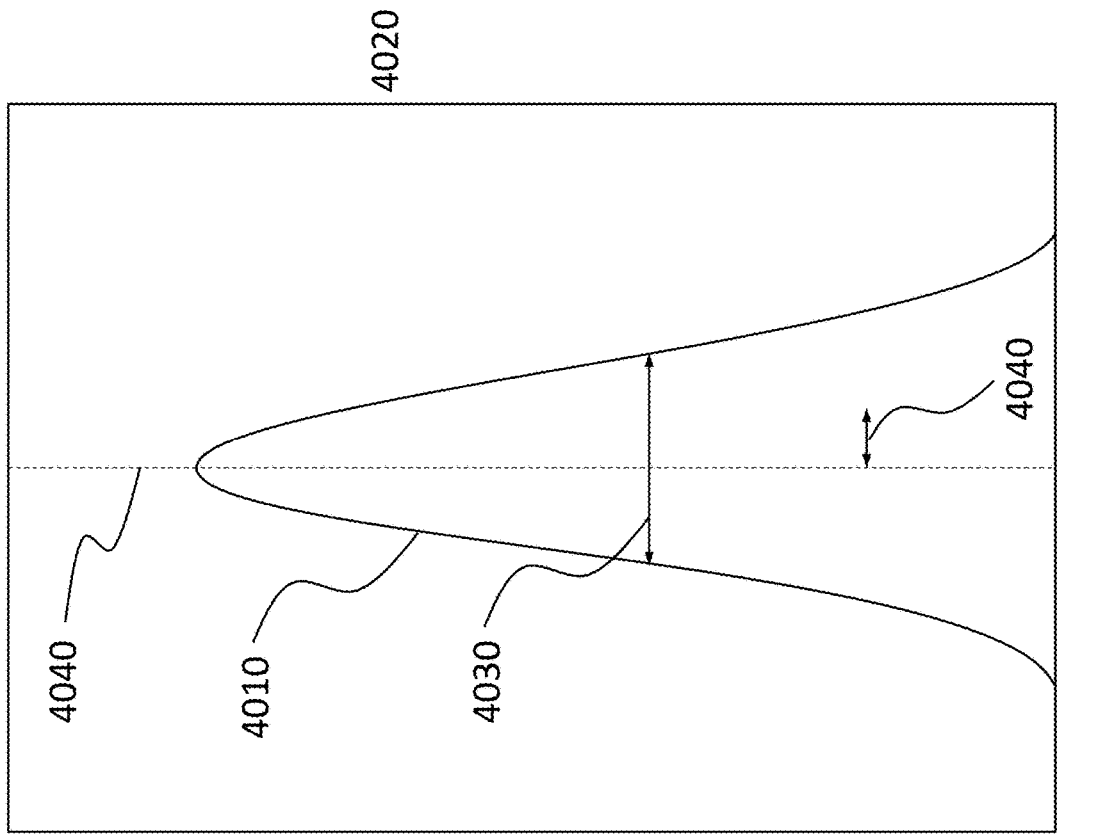
FIG. 40 shows an exemplary temporal distribution curve of a short-duration pulse that traveled a substantial distance through a variably refractive medium and has been temporally broadened.

FIG. 40 shows an exemplary temporal distribution curve of a short-duration (e.g., approximately 100 femtosecond) pulse 4010 that traveled a substantial distance (e.g., one mile) through a variably refractive medium and been temporally broadened. The pulse, as it arrives at the photoreceiver, may have a FWHM duration 4030 and a coherence time 4040, which may be equal to a coherence length of the pulse divided by the speed of light through the variably refractive medium. In some embodiments, the FWHM duration 4030 may be greater than the coherence time 4040 of the pulse. Preferably, the FWHM duration 4030 may be at least 2×, at least 3×, at least 4×, at least 5×, at least 6×, at least 8×, at least 10×, or at least 12× the coherence time 4040 of the pulse. By ensuring that the FWHM duration 4030 of the pulse as received at the photoreceiver is relatively large as compared to the coherence time 4040 of the pulse 4010, interference between the different ray paths of the pulse as they arrive at the photoreceivers at different times may be reduced, and a signal with reduced noise and higher quality may arrive at the photoreceiver.

The photoreceiver may have a detection window 4020 of a specified duration. A shorter detection window generally allows higher data throughput. For example, in a system that uses on-off keying for data modulation, a photoreceiver having a detection window of 1 nanosecond can extract up to 1 Gbps while a photoreceiver having a detection window of 100 picoseconds can extract up to 10 Gbps. The photoreceiver may have repeating detection windows of less than 100 ns, less than 10 ns, less than 1 ns, less than 100 ps, or less than 10 ps.

Pulse length and temporal broadening can, however, cause photons from a pulse intended to be received in one detection window to fall into an adjacent detection window. In the case where the adjacent detection window should not receive transmitted photons (e.g., because a '0' is transmitted in that bit position), this phenomenon can produce bit errors. Accordingly, to maximize data transmission accuracy, it is important that the FWHM duration 4030 of the pulse as received at the photoreceiver be greater (and preferably at least three times as large) than the coherence length 4040 of the pulse, while at the same time, the FWHM duration 4030 of the pulse as received at the photoreceiver should also be substantially less than the detection window 4020 of the photoreceiver.

For example, the detection window 4020 may be at least 2×, at least 5×, at least 6×, at least 7×, at least 8×, at least 10×, or at least 20× as large as the FWHM duration 4030 of the pulse as received at the photoreceiver. Preferably, at least 95%, at least 99%, or at least 99.99% of the photons in a pulse that arrive at the photoreceiver may arrive at a respective arrival time that is spaced from a center 4040 of the temporal distribution curve of the pulse by a respective time difference that is less than half of the detection window duration of the photoreceiver. Note that although the center 4040 of the temporal distribution curve of the pulse is shown at the center of the detection window 4020, this need not be the case, and pulses may arrive earlier or later than the midpoint of a detection window. It may be preferable that the center 4040 of the temporal distribution curve be at or near the center of the detection window 4020 to reduce the potential for photons in a pulse to spill over into an adjacent detection window. In some embodiments, the center 4040 of the temporal distribution curve may be less than 100 picoseconds, 50 picoseconds, 20 picoseconds, 10 picoseconds, 5 picoseconds, 1 picosecond, 800 femtoseconds, or 500 femtoseconds from the center of the detection window 4020.

By specifying relationships between the coherence time 4040 of the pulse, the FWHM duration 4030 of the pulse as it arrives at the photoreceiver, and the detection window 4020 of the photoreceiver in the manner described herein, data transmission accuracy and effective transmission range can be greatly improved (see below discussion with respect to FIG. 42 for test results). The FWHM duration 4030 of the pulse as it arrives at the photoreceiver may vary depending on the pulse length as transmitted from the source, the medium through which the pulse travels (e.g., atmospheric pressure, temperature, sunlight intensity, aerosols), and the distance over which the pulse travels to reach the photoreceiver. Accordingly, the coherence time 4040 of the pulse may need to be decreased and/or the detection window 4020 of one or more photoreceivers may need to be increased depending on conditions for the optical communication system. Decreasing coherence time 4040 and increasing detection window 4020 may thus improve data transmission quality while negatively impacting data throughput. In some embodiments, the system may be configured to determine a data transmission quality of the system (e.g., a bit error rate or a measurement of signal values above or below a detection threshold), and in response to the determined data transmission quality, modify either or both of the coherence time 4040 of the pulse or the detection window duration 4020 of the photoreceiver.

Similarly, when using a source that can continuously emit light, such as a continuous wave source or a superluminescent diode, the emitted light can be gated into pulses (or otherwise converted into pulses using data modulation or other known techniques) that occupy only a relatively small fraction of the duration of the detection window, and those pulses may be timed to arrive at or near the centers of the detection windows of the photoreceiver. Gating and timing the pulses in this manner can reduce the risk that photons in an "on" window (where light is intended to be transmitted) may spill over into an "off" window (where light is not intended to be transmitted) and produce bit errors. The pulse durations and positions relative to the detection windows described above may thus also apply to pulses generated using sources that can continuously emit light. In such cases, although the sources can continuously emit light, the effective output may be "off" for a majority of the time even during "on" transmission windows where light is intended to be transmitted, so that sufficient space may be left between the center of the pulse and the ends of the detection window to avoid spillover. For example, during an "on" bit window where light is intended to be transmitted, the effective output from the continuous emission source may be "on" less than 75%, 50%, less than 30%, less than 20%, or less than 10% of the respective transmission bit window.

Figure 41:
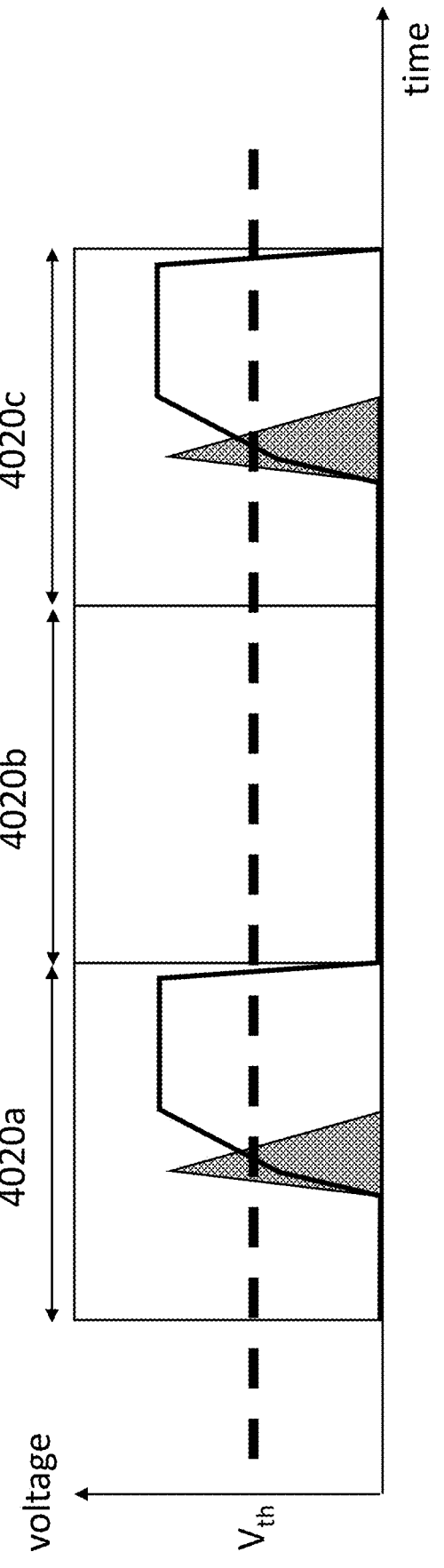
FIG. 41 shows a diagrammatic representation of light pulses arriving in detection windows of a photoreceiver.

FIG. 41 shows a diagrammatic representation of light pulses arriving in detection windows 4020a, 4020b, 4020c of a photoreceiver. The light pulses may be of any shape and generally may be broadened to some extent by traveling over an optical communication distance through a variably refractive medium. In a first detection window 4020a, a light pulse may arrive at or near the center of the window and may cause the total received light in that window to exceed a detection threshold $V_{th}$, which may be processed by circuitry of the photoreceiver to indicate that a pulse was received in that window. In some embodiments, this may cause the photoreceiver to output a '1' for this detection window. At the end of detection window 4020a and before detection window 4020b, the photoreceiver circuit may be reset and return to zero. In detection window 4020b, no pulse is transmitted (e.g., because a '0' is intended to be transmitted and a modulator at the transmit node blocked the pulse), and the total light received in window 4020b may be below the detection threshold $V_{th}$. This may cause the photoreceiver to output a '0' for this detection window. The photoreceiver circuit may again be reset and return to zero, and the cycle may repeat with a third window 4020c, and so on.

The detection threshold $V_{th}$ may be configured so that it is sufficiently high that environmental light will not trigger a false positive but sufficiently low that true pulses will reliably exceed the detection threshold $V_{th}$. It is important that pulses sufficiently exceed a noise floor so that there is sufficient signal difference between "on" and "off" bit windows so that the detection threshold $V_{th}$ may be both high enough to ignore environmental noise but low enough to capture every transmitted pulse. This is particularly challenging over longer distances (e.g., a mile or more) and in suboptimal environmental conditions (e.g., partly sunny, significant aerosols). The relationships between pulse length at the photoreceiver, coherence time, and detection window described herein with respect to FIGS. 39-41 greatly improve signal quality transmission and allow effective detection thresholds $V_{th}$ even for free space optical systems transmitting data over optical transmission distances in excess of 1 mile, 2 miles, 3 miles, 5 miles, or 7 miles.

In a case with a beam splitter and multiple photoreceivers, each of the multiple photoreceivers may generate a bit stream based on the separated pulses that are directed to that photoreceiver, and the bit streams from the respective photoreceivers may be interleaved to produce a combined bit stream having a higher data rate. The combined bit stream may be outputted to a communication network as described above, including with respect to FIG. 36.

Figure 42:
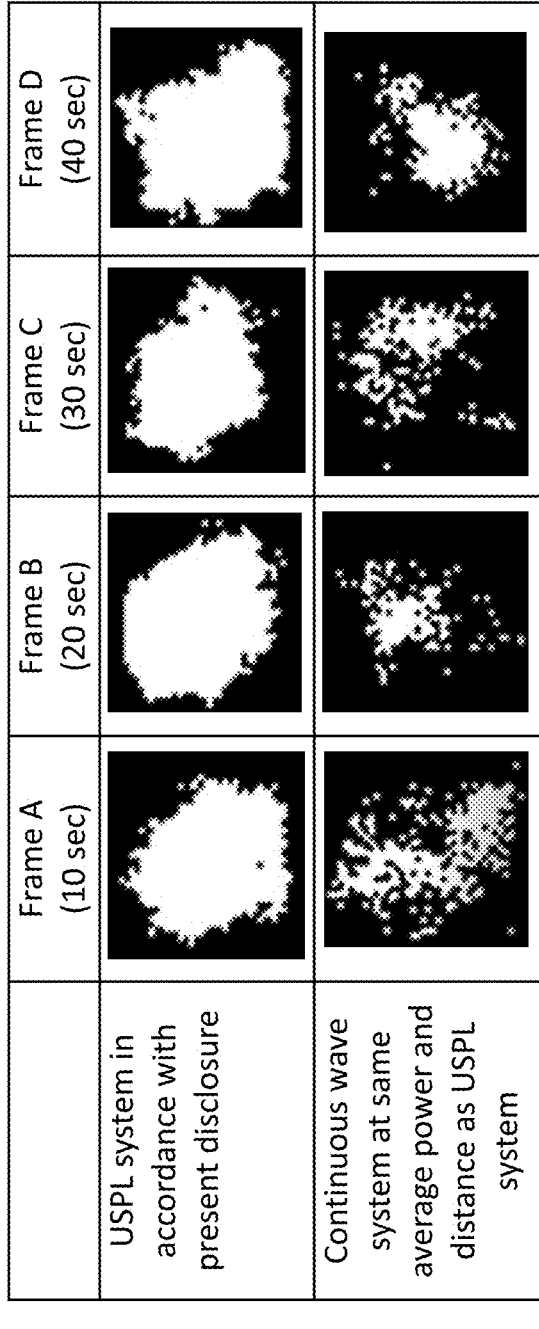
FIG. 42 shows an example of test data received over a one-mile optical communication distance.

FIG. 42 shows an example of test data received over a one-mile optical communication distance. The test data compares optical signals generated using a transmit node as described above with respect to FIG. 35A against optical signals generated using a continuous wave source having the same average power as the USPL source. Specifically, to generate the data shown in the top row of the chart shown in FIG. 42, a USPL source incorporated in a transmit node as described above with respect to FIG. 35A was used to transmit data over an optical communication distance of one mile. The received signal was directed at a piece of white paper, and an infrared camera was placed behind the paper to record the light that passed through the paper. To generate the data shown in the bottom row of the chart shown in FIG. 42, the same experimental setup was used with a continuous wave source having the same average power and same optical communication distance as the USPL source. The light from both the USPL source and the CW source was directed at the same sheet of white paper, and the two signal spots were captured in the same frame using the infrared camera. The spot sizes were approximately 12 inches in diameter. Background environmental light was subtracted from each pixel, and a each pixel was subjected to a thresholding logic such that pixels in which the received optical signal was above the threshold were set to "white" and pixels in which the received optical signal was below the threshold were set to "black." The four images shown for each source were taken from the same frames in the video feed, and those frames were equally spaced at intervals of 10 seconds. Frame A shows the received signals from the USPL and CW sources at 10 seconds, Frame B shows the shows the received signals from the USPL and CW sources at 20 seconds, Frame C shows the shows the received signals from the USPL and CW sources at 30 seconds, and Frame D shows the shows the received signals from the USPL and CW sources at 40 seconds.

This data shows that the transmit node as described herein produces ultrashort pulses that are substantially more clustered and, within the detection field, much more reliably exceed the detection threshold. As applied to a communication system using a photoreceiver having the characteristics described above, including with reference to FIGS. 35B to 41, this produces vastly improved data transmission accuracy. Applicant's testing of systems in accordance with this description has demonstrated free space optical communication distances in excess of 1 mile, 2 miles, 3 miles, 5 miles, and up to as much as 7.4 miles with zero bit error rate as measured over time intervals of at least 10 seconds, at least 30 seconds, at least 60 seconds, at least 10 minutes, at least 30 minutes, and at least 1 hour. In some embodiments, systems described herein may transmit data over an optical communication distance of at least one mile and have a measured bit error rate of less than one in one million, less than one in one billion, less than one in one trillion, or less than one in one quadrillion over a measurement period of at least sixty seconds. To Applicant's knowledge, no other free space optical system has achieved similarly low over optical communication distances of even one half of one mile.

Thus, the systems described herein allow for substantially improved data transmission accuracy, communication link distance, and they also allow free space optical communication to be used in inclement environmental conditions (e.g., rain, fog, atmospheric scintillation) that, in prior systems, rendered free space optical communication ineffective. In some embodiments, the improved data transmission quality and range may also allow for free space optical communication to be applied to systems that would have previously been impossible to use effectively. For example, a transmit node and/or receiving node in accordance with the present disclosure may be provided in an Earth-orbiting satellite to provide for ground-to-space and/or space-to-ground free space optical communication. Due to the amount of atmosphere that a beam must travel between Earth's ground level and space, effective optical data transmission has not been demonstrated using technologies prior to the present disclosure, but the technology described herein can achieve effective optical communication over this distance.

Figure 43:
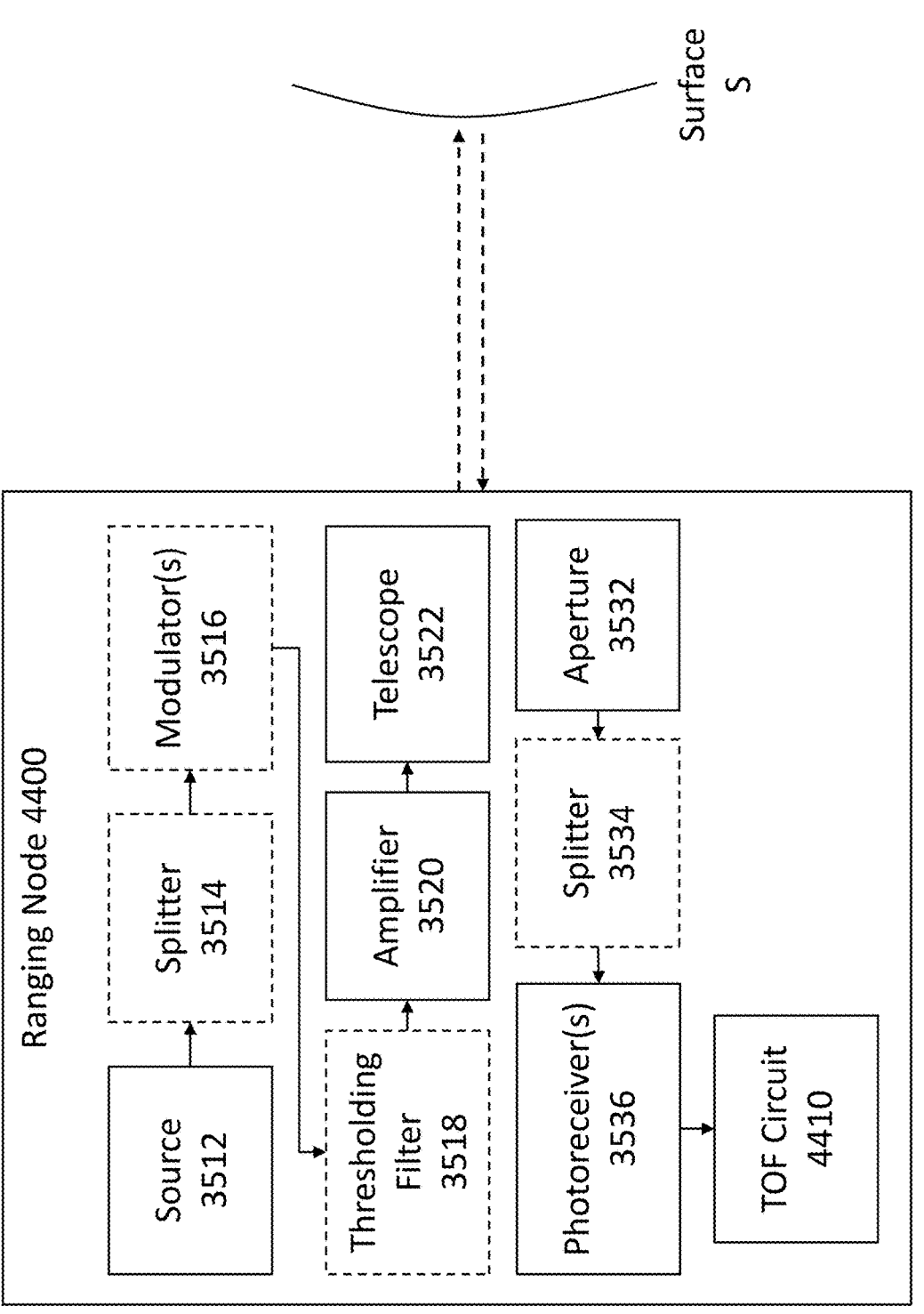
FIG. 43 shows an exemplary ranging node that can be used to detect objects or surfaces and determine positions of those objects relative to the node.

FIG. 43 shows an exemplary ranging node 4400 that can be used to detect objects or surfaces and determine positions of those objects relative to the node. The ranging node 4400 may generally include the components of the transmit and receiving nodes 3510, 3530 described above with respect to FIGS. 35A and 35B. For example, the ranging node 4400 may include a source 3512, a splitter, one or more modulators, an amplifier, and a telescope. These elements may collectively be configured to emit optical pulses that travel through a variably refractive medium toward a surface S. In the case of a laser ranging node, data modulation is optional but may be included to encode information relating to the pulses, nodes, or other information. Photons from the optical pulses may be reflected by surface S and return to the node 4400. The total travel distance of the optical pulses from transmission by the ranging node to receipt of the reflected pulse may be twice the distance of the node to the surface S. Upon return to the node, the pulses may be received by an aperture 3532, optionally split by a splitter 3534, and analyzed using one or more photoreceivers 3536. Each of these components may have the same properties and parameters as the corresponding components described above with respect to FIGS. 35A to 41. Ranging node 4400 may additionally include a time-of-flight (TOF) circuit 4410, which may be configured to determine the time of flight of a pulse to reach surface S and return to node 4400, and thereby determine a distance of that surface S from the ranging node 4400.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

3. AMPLIFIED SPONTANEOUS EMISSION (ASE) IN FREE SPACE OPTICAL SYSTEMS

Figure 44:
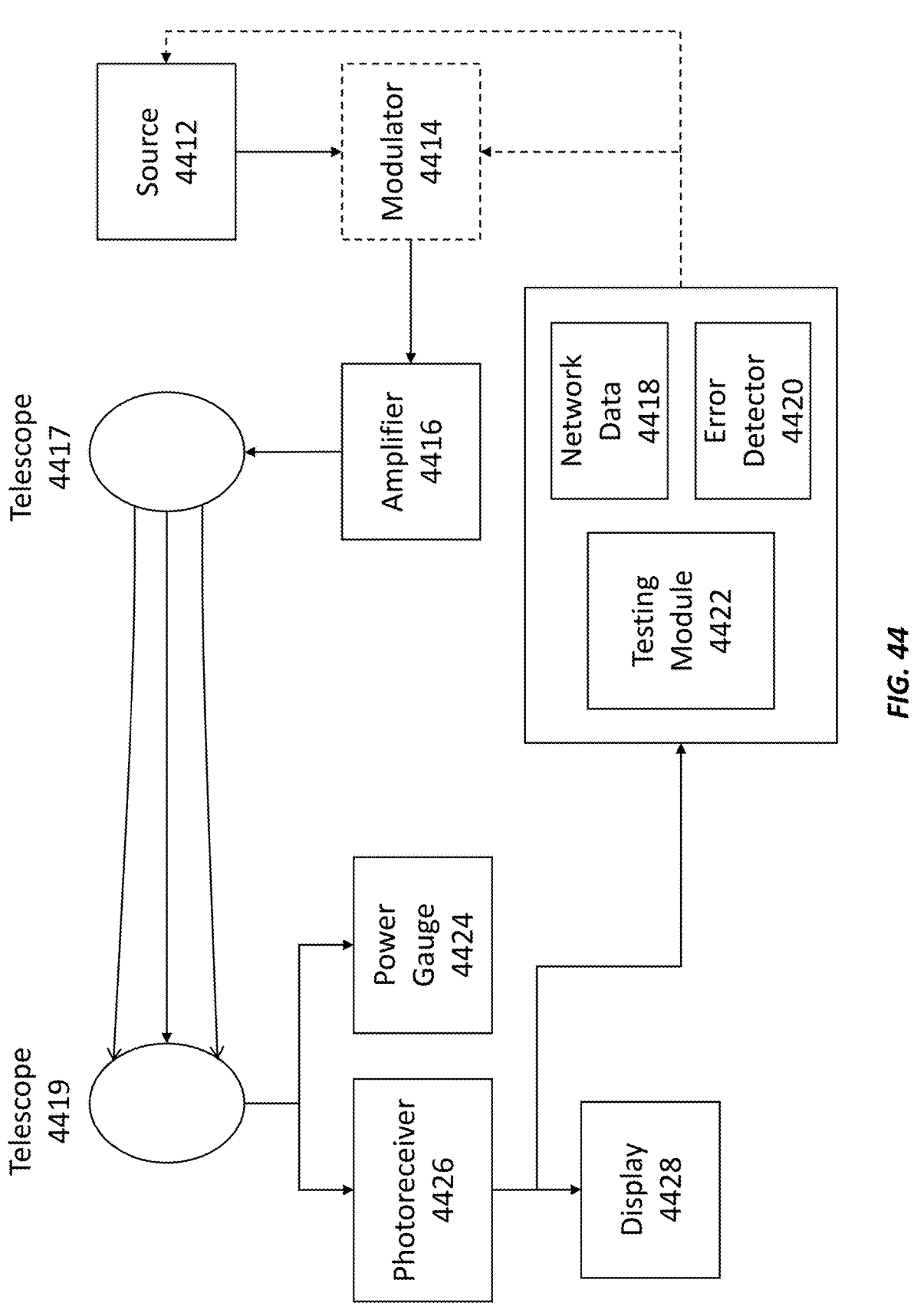
FIG. 44 shows an exemplary optical communication system for transmitting data through a medium.

FIG. 44 shows an exemplary optical communication system for transmitting data through a medium. As shown in FIG. 44, the system may include one or more of the following: an optical source 4412, a modulator 4414, an amplifier 4416, one or more telescopes 4417, 4419, a testing module 4422, a network data input 4418, an error detector 4420, a photoreceiver 4426, a power gauge 4424, and a display 4428.

The optical source 4412 may include a structure capable of generating a beam of light with a short coherence length. Preferably, the coherence length of the emitted beam may be less than 1 mm, less than 600 microns, less than 400 microns, less than 200 microns, less than 100 microns, less than 50 microns, or less than 10 microns. In some embodiments, the beam, when emitted through a variably refractive medium over a transmission distance, may have the parameters and properties described above with respect to FIGS. 38-42.

In some embodiments, the source 4412 may include a photon-emitting surface and a waveguide for amplifying the emitted light, as described below with respect to FIG. 45. In some embodiments, the source may be or include one or more superluminscent diodes (SLEDs). In other embodiments, the source 4412 may include a laser diode configured to pump light into an amplifier fiber doped with a transition metal ion compound, such as erbium, as described below with respect to FIG. 46.

The source 4412 may have an optical bandwidth at least as large as an optical gain bandwidth of amplifier 4416. By matching the optical bandwidth of source 4412 to the optical gain bandwidth of amplifier 4416, energy applied to source 4412 and amplifier 4416 may be more efficiently used to generate a beam of light, and the resulting light may have a minimal coherence length. The source may be capable of creating high peak power pulses, such as at least 5 W, at least 20 W, at least 50 W, at least 100 W, at least 500 W, at least 1 kW, at least 5 kW, at least 10 kW, at least 50 kW, at least 100 kW, at least 500 kW, or at least 1 MW.

In some embodiments, source 4412 may generate substantial noise in the form of randomly fluctuating power in the beam of light. The noise may be high-frequency noise such as "white" noise or "pink" noise.

The source 4412 may emit a beam of light. The beam of light may be sent to a modulator 4414. The modulator 4414 may encode transmission data into a plurality of time slots associated with the beam. In some embodiments, the modulator may be a Mach-Zehnder Modulator (MZM). In some embodiments, the modulator 4414 may be configured to encode data using on-off keying. For example, the transmission data may be a bit (a 0 or 1). The modulator 4414 may determine that at a first-time interval associated with the beam, the bit should be encoded 1, which may indicate "on." The modulator 4414 may determine that at a second-time interval associated with the beam, the bit should be encoded 0, which may indicate "off." The modulator 4414 may encode the bit by either blocking or allowing the beam of light to pass through the modulator 4414 at a given time slot. For example, if the bit encoded should be 0, the modulator 4414 may block the beam of light from passing through. If the bit encoded should be 1, the modulator 4414 may allow the beam of light to pass through.

In some embodiments, the data to be encoded in the beam of light may be received from a network data input 4418. Network data may be encoded in the beam of light by modulator 4414 or may be encoded by directly modulating source 4412. In cases where source 4412 is directly modulated, modulator 4414 may be omitted.

As described above, light emitted by source 4412 may be gated into pulses (or otherwise converted into pulses using data modulation or other known techniques) that occupy only a relatively small fraction of the duration of a detection window of a photoreceiver 4426. In some embodiments, those pulses may be timed to arrive at or near the centers of the detection windows of the photoreceiver. In such cases, although source 4412 may continuously emit light, the effective output may be "off" for a majority of the time even during "on" transmission windows where light is intended to be transmitted. For example, during an "on" bit window where light is intended to be transmitted, the effective output from the continuous emission source may be "on" less than 75%, 50%, less than 30%, less than 20%, or less than 10% of the respective transmission bit window.

The source 4412 may thus be time-sliced. In some embodiments, this may be accomplished using a Mach-Zehnder interferometer (MZI) or an electroabsorption modulator. In some embodiments, the source 4412 may be directly modulated to achieve a time-sliced behavior. For example, an MZI or electroabsorption modulator could be used in conjunction with an electrical "comb" generate that is synchronized to the data modulation circuit to provide the pulse slicing.

The output of the modulator 4414 may be a modulated beam of light. The modulated beam of light may have a relatively low signal-to-noise ratio (SNR), as described below with respect to FIGS. 49A-49F. For example, the modulated beam of light output by the modulator 4414 may have a SNR less than 5, less than 4, less than 3, less than 2, less than 1, or less than 0.5.

In some embodiments, a modulator 4414 may be omitted from the optical communication system. In some embodiments, data may alternatively or additionally be encoded into the beam of light by directly modulating the source 4412. For example, a bit stream may be converted to a series of instructions to turn off or turn on the source 4412 in respective timeslots, such that data is encoded into the beam of light using on-off keying without a modulator 4414.

The modulated beam of light may be sent to the amplifier 4416. In some embodiments, amplifier 4416 may be a fiber amplifier as described below with respect to FIG. 47. Amplifier 4416 may amplify and filter the modulated beam signal. Due to the filtering by amplifier 4416, the amplified signal output from amplifier 4416 may have a substantially improved signal to noise ratio as compared to the input, as described in greater detail below with respect to FIGS. 49A-F. The fiber amplifier 4416 may thus amplify the beam of light (e.g., ASE signal) while reducing high-frequency noise associated with the beam of light.

The filtered beam of light may be transmitted from the fiber amplifier 4416 to a detector which may include a photoreceiver 4426 and a power gauge 4424. The filtered beam of light may be transmitted through a medium with a variable (e.g., randomly variable) refractive index. The photoreceiver 4426 may extract the transmission data from the filtered beam of light. The power gauge 4424 may include an optical power meter to measure the power in the received signal. The beam of light received by the photoreceiver 4426 may have one or more characteristics described with respect to FIGS. 39 through 41.

The system may optionally include one or more of a testing module 4422, a network data input 4418, and an error detector 4420. The testing module 4422 may be configured to measure a bit error rate of the communication system. Testing module 4422 may also be used to test other parameter of the communication system or the signal received at telescope 4419. Network data input 4418 may generate a test pattern to be used by the system. Error detector 4420 may determine a number of bit errors produced by the communication system. A clock signal generator may be used to synchronize the network data input 4418 and the error detector 4420. The display 4428 may output the received signal and may include analysis of the signal as related to the network data input 4418. The testing module 4422 may include electrical-optical converters configured to test optical communication signals.

Figure 45:
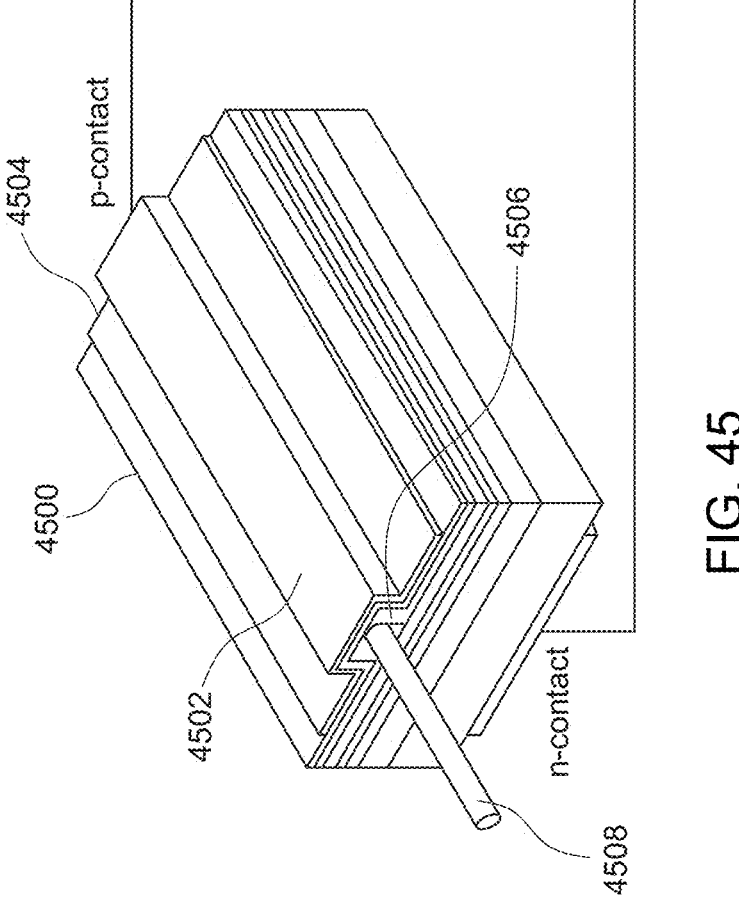
FIG. 45 shows an exemplary optical source configured to generate an amplified spontaneous emission (ASE) output.

FIG. 45 shows an exemplary optical source configured to generate an amplified spontaneous emission (ASE) output. The optical source 4500 may contain semiconductor layers such that, when a current is applied, a surface of the source emits photons. The emitting surface may be disposed along an interior of a waveguide 4502, such that emitted photons travel within the waveguide. In some embodiments, the waveguide core may be fluorescent. The waveguide 4502 may confine the fluorescence produced as current is applied within the body of the structure. The waveguide 4502 may include an open end and a closed end. As current is applied, at least a portion of the fluorescence may propagate towards the closed end and may be reflected by a reflector 4504. A beam of light 4508 may be emitted from the open end of the waveguide 4502. The use of waveguide 4502 and reflector 4504 may amplify the emitted light with a gain proportional to the length of the waveguide 4502.

In some embodiments, the beam of light 4508 may be in the visible or infrared spectrums. In some embodiments, other spectra may be used. In some embodiments, the beam of light may have a relatively short coherence length and/or broad spectral bandwidth, as described above, including with respect to FIGS. 35-43. In some embodiments, the light 4508 may include a FWHM spectral bandwidth of at least 10 nanometers, at least 20 nanometers, at least 25 nanometers, at least 30 nanometers, at least 40 nanometers, at least 50 nanometers, at least 70 nanometers, at least 100 nanometers, or at least 200 nanometers.

Figure 46:
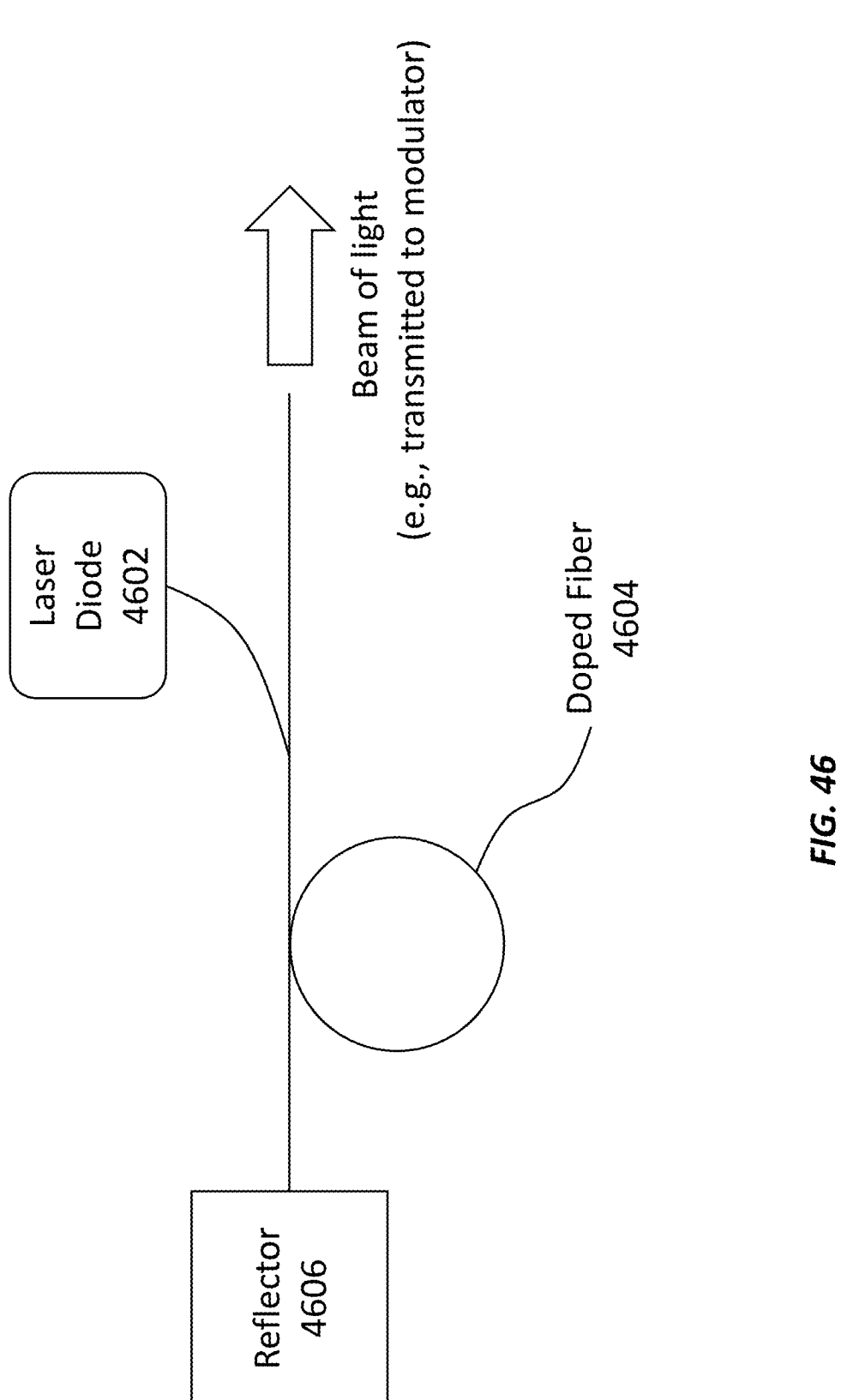
FIG. 46 shows an exemplary optical source configured to generate an output for use in a communication system.

FIG. 46 shows another exemplary source configured to be used in a communication system such as that shown in FIG. 44. An amplifier including doped fiber 4604 (e.g., similar, or equivalent to the amplifier described with respect to FIG. 47) may be used as a preamplifier to generate the beam of light. The preamplifier 4500 may be modified to enable it to generate the beam of light with the properties described with respect to FIG. 44. For example, the preamplifier 4500 may be able to double pass an input laser diode 4602, which may reflect off a back wall reflector 4606 of the preamplifier. An anti-reflection coating may be applied to the reflector 4606. The preamplifier may be pumped by a laser diode 4602 and may emit an ASE signal that matches the gain spectrum of the amplifier doped fiber 4604.

Figure 47:
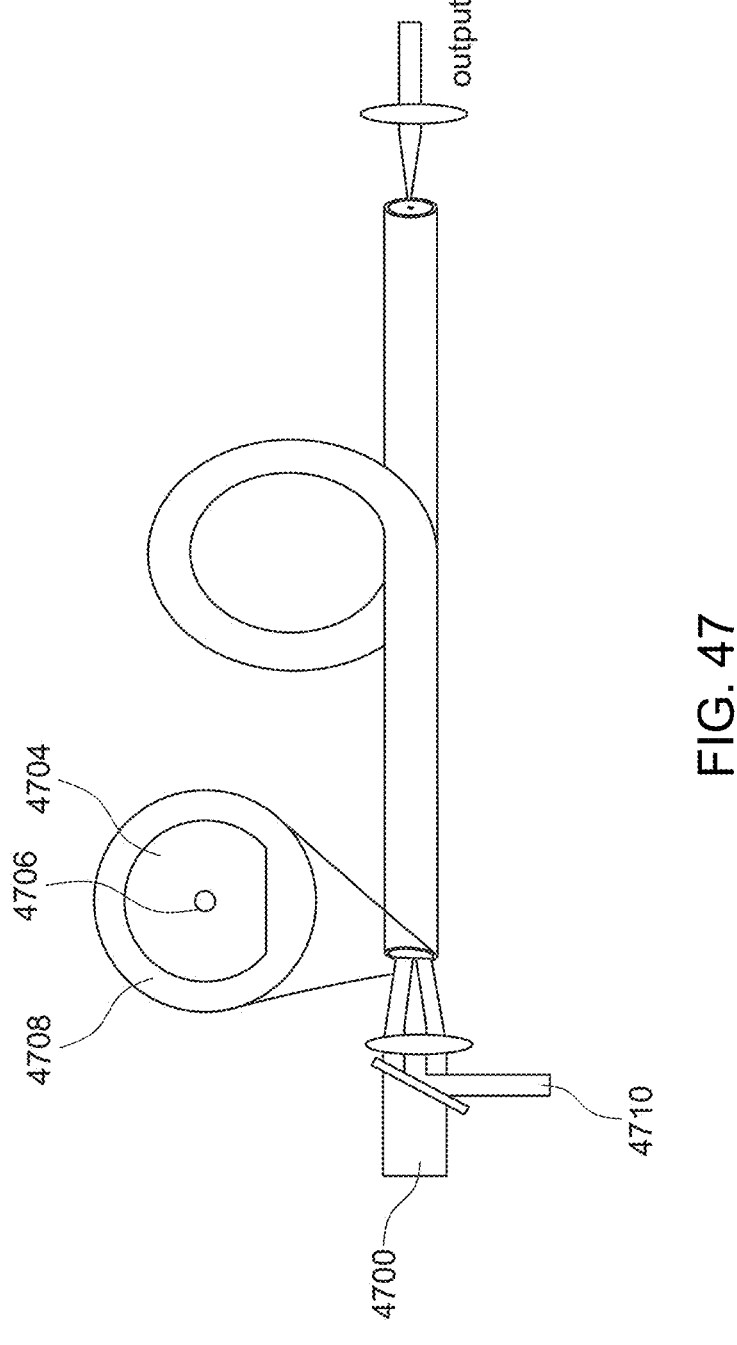
FIG. 47 shows an exemplary fiber amplifier configured to amplify and filter a beam of light.

FIG. 47 shows an exemplary fiber amplifier configured to amplify and filter a beam of light. As shown in FIG. 47, the amplifier may include one or more layers of cladding 4704, one or more cores 4706 configured to receive and transmit a data-encoded optical signal, pump light 4700, a fiber adjacent to the cladding, and a polymer coating 4708. The fiber amplifier may be a nonlinear filter and may be suited for amplifying an input signal 4710 while reducing high-frequency noise associated with the input signal 4710. The nonlinear filter may be an optical device that produces an output signal that is not a simple linear mathematical constant times the input signal.

The core 4706 may be surrounded by one or more layers of cladding 4704. The core 4706 may be doped with one or more transition metal ions such as Erbium, Ytterbium, Neodymium, Terbium, and/or the like. In some embodiments, the fiber amplifier may be an erbium doped fiber amplifier.

In some embodiments, the pump light may have a wavelength of approximately 980 nanometers. In some embodiments, the pump light may have a wavelength of approximately 1480 nanometers. In some embodiments, the pump light may have a wavelength of approximately 980 nanometers. The pump light may excite the transition metal ions in the core. When the excited ions are stimulated by photons in the optical signal traveling through the core, the ions may emit photons, thereby amplifying the optical signal. In some embodiments, a portion of the ions may remain in an excited state for at least a nanosecond, a microsecond, or a millisecond before emitting photons. In some embodiments, the light emitted by the transition metal ions may have wavelengths that are equal to or within 10 nanometers of the light emitted by the source. For example, the emitted light may be between 1500-1600 nanometers in wavelength.

The beam of light may be amplified and filtered due to its interaction with the excited ions. The excited ions may cause a gain on the beam of light, resulting in an increase in power associated with the beam of light. The gain of the fiber amplifier may multiply the power of the optical signal by a factor of at least 5, 10, 20, 30, 40, 50, 100, 200, 500, 1,000, 5,000, 10,000, or 30,000. The filtering effect of the amplifier is described in greater detail below with respect to FIGS. 49A-F.

FIGS. 48A-F show measurements (and representations thereof) of an exemplary continuous wave output. FIGS. 49A-F show measurements (and representations thereof) of an exemplary ASE output.

FIG. 48A shows a measurement of an optical signal emitted by a conventional laser (configured to emit a narrow-band, long coherence length signal), and FIG. 48D shows an illustration of qualitatively similar data. FIG. 49A, by contrast, shows a measurement of an optical signal emitted by a high-noise, short coherence length source such as described above with respect to FIGS. 44-46. FIG. 49D shows an illustration of data that is qualitatively similar to that in FIG. 49A. Comparing FIGS. 48A and 48D to FIGS. 49A and 49D, it can be observed that the high-noise, short coherence length source can emit an average power similar to that of the conventional laser, but with substantially greater noise in the form of high-frequency fluctuations in the power of the emitted beam.

FIG. 48B shows a measurement of the optical signal produced by the conventional laser after that signal has been modulated using an MZM. FIG. 48B shows several measurement traces, which represent repeated measurements of the modulated signal. FIG. 48E shows an illustration of a single trace representing data that is qualitatively similar to that shown in FIG. 48B over a three bit period. In FIG. 48E, bit window 4820*a* represents an "on" bit, 4820*b* represents an "off" bit, and 4820*c* represents an "on" bit. As shown in this diagram, the modulated signal is relatively steady in each window near an "on" power level $P_{on}$ for "on" bits and near an "off" power level $P_{off}$ in "off" bits. Although the conventional laser produces a small amount of noise, this noise is small as compared to the difference between $P_{on}$ and $P_{off}$, resulting in a relatively high signal-to-noise ratio (SNR).

Figure 49B:
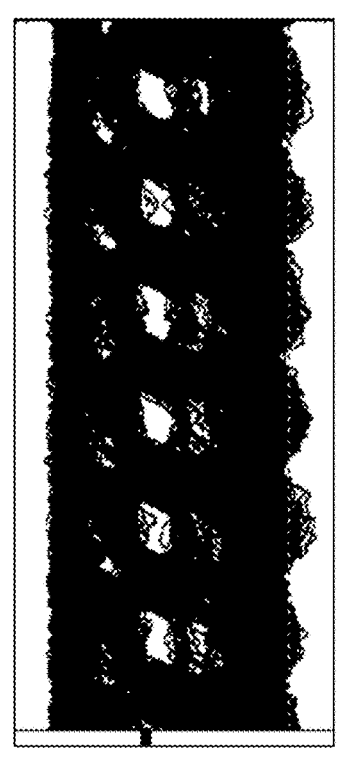
FIGS. 49A-C show measurements of an exemplary ASE output.

FIG. 49B shows a measurement of the optical signal produced by the high-noise, short coherence length source after that signal has been modulated using an MZM. FIG. 48B shows several measurement traces, which represent repeated measurements of the modulated signal. Due to the significant noise in the signal, the measurement traces are highly variable. FIG. 48E shows an illustration of a single trace representing data that is qualitatively similar to that shown in FIG. 48B over a three bit period. In FIG. 49E, bit window 4920*a* represents an "on" bit, 4920*b* represents an "off" bit, and 4920*c* represents an "on" bit. As shown in this diagram, the modulated signal centers at or near the "on" power level $P_{on}$ for "on" bits and at or near the "off" power level $P_{off}$ in "off" bits, but the significant noise in the signal results in significant variance above and below the desired power levels. This signal noise obscures the difference between the "on" state and the "off" state and, if not corrected, would render the transmission beam unreliable, particularly if transmitted through atmosphere over significant distances, which tends to weaken and introduce additional noise in the beam before it is received by a photoreceiver. With reference to FIG. 49E, the SNR of the modulated beam may be defined as half of the difference between $P_{on}$ and $P_{off}$ divided by the standard deviation of the measured power over a given bit window. Applying this definition, the SNR of the modulated beam may be less than 5, less than 3, less than 2, less than 1.5, less than 1, less than 0.5, less than 0.2 or less than 0.1.

FIG. 48C shows a measurement of the optical signal produced by the conventional laser after that signal has been modulated using an MZM and then amplified using a fiber amplifier such as that described above with respect to FIG. 47. FIG. 48F shows an illustration of a single trace representing data that is qualitatively similar to that shown in FIG. 48C over a three bit period. Comparing FIG. 48B to FIG. 48C and FIG. 48E to FIG. 48F, it is observed that the SNR remains similar in the conventional laser system both before and after the modulated signal is passed through the amplifier.

Figure 49C:
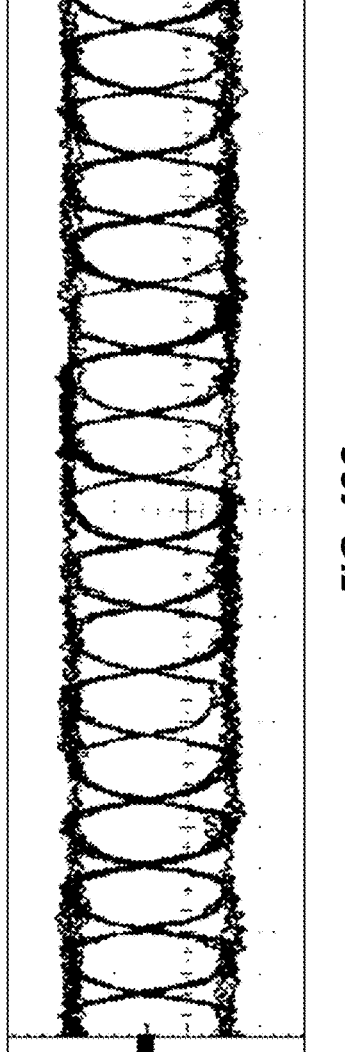
Figure 49A:
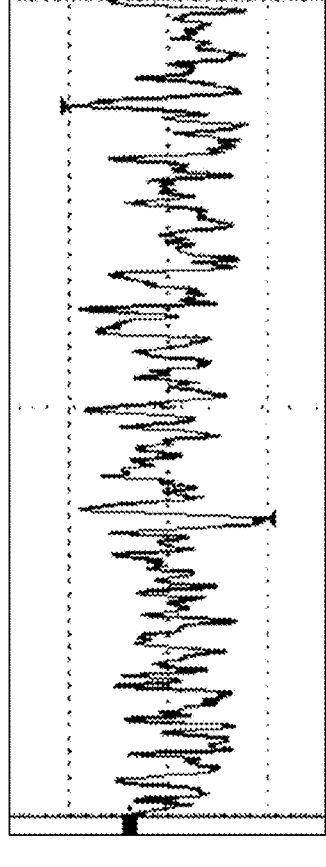
Figures 49D, 49E, 49F:
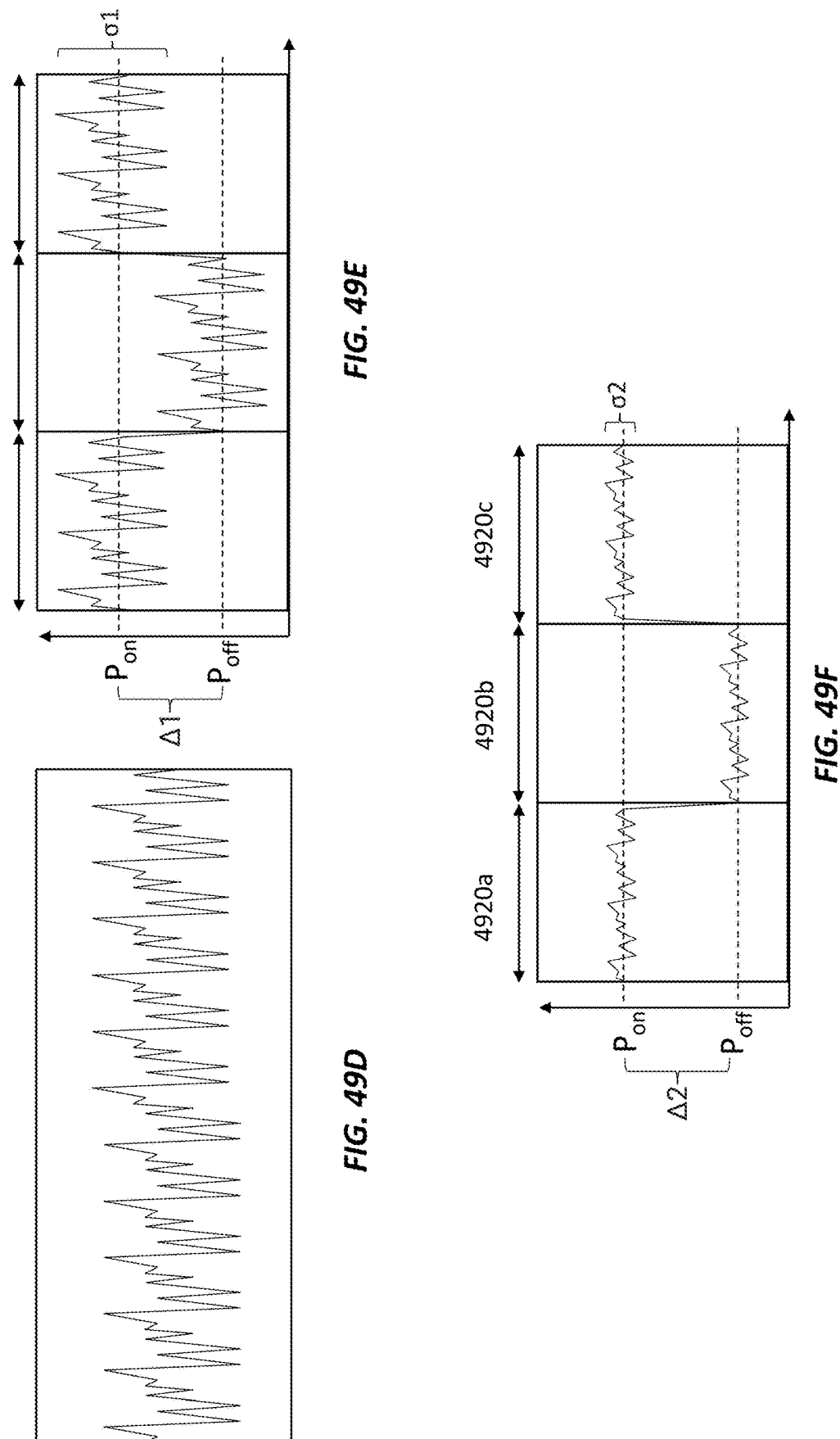
FIGS. 49D-F show illustrative representations of the measurements shown in FIGS. 49A-C.

FIG. 49C shows a measurement of the optical signal produced by the high-noise, short coherence length source after that signal has been modulated using an MZM and then amplified using a fiber amplifier such as that described above with respect to FIG. 47. FIG. 49F shows an illustration of a single trace representing data that is qualitatively similar to that shown in FIG. 49C over a three bit period. Comparing FIG. 49B to FIG. 49C and FIG. 49E to FIG. 49F, it is observed that the SNR in the system using the high-noise, short coherence length source is substantially after the optical signal has been passed through the fiber amplifier. The SNR of the amplified, filtered signal may be at least 1, 2, 3, 5, 7, 10, 15 or 20. In some embodiments, the SNR of the post-fiber amplifier filtered signal may be at least 2x, 3x, 4x, 5x, 7x, 10x, or 20x higher than the SNR of the signal post-modulation but pre-amplification.

Figure 50:
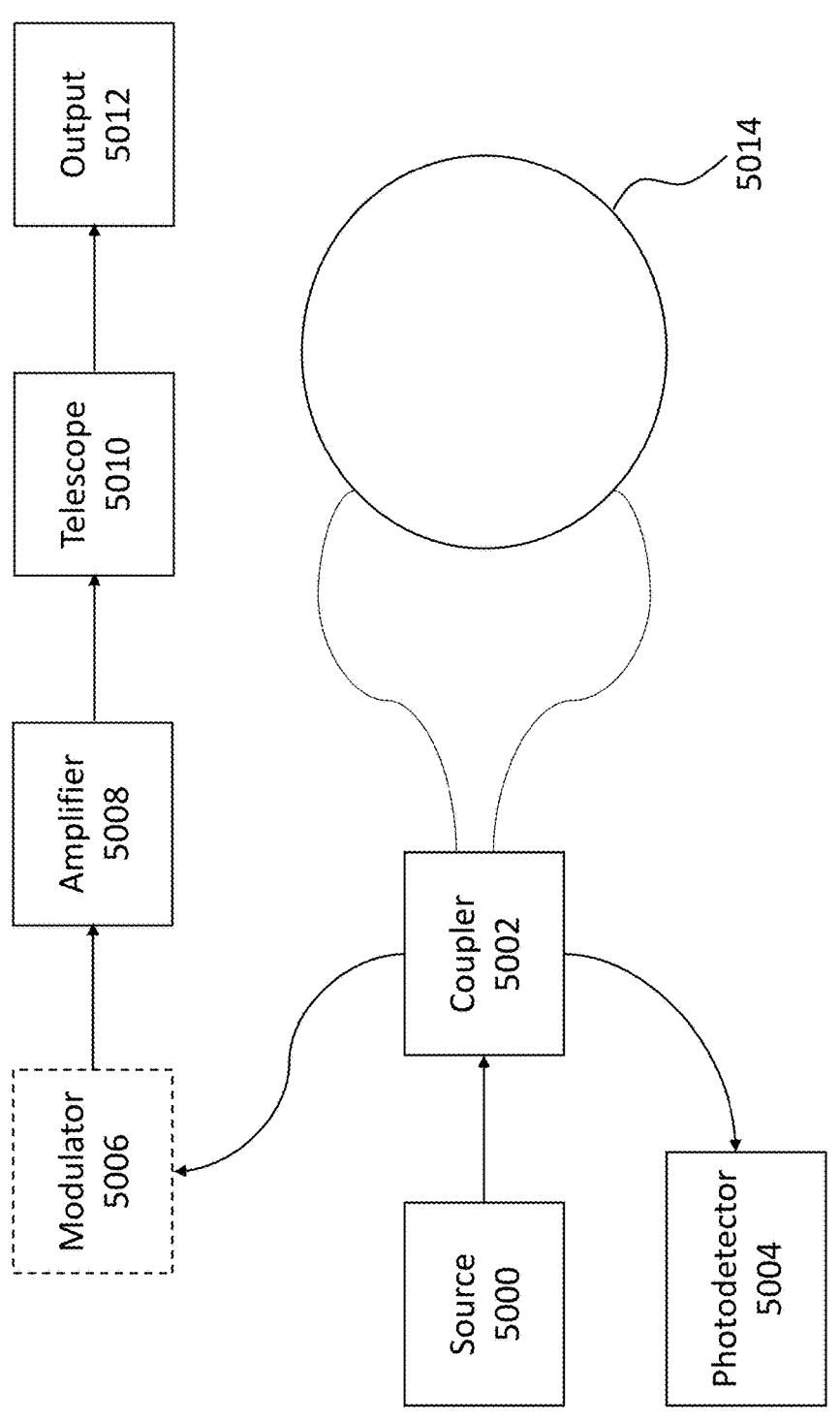
FIG. 50 shows an exemplary optical communication system coupled to a fiber optic gyroscope (FOG).

FIG. 50 shows an exemplary optical communication system coupled to a fiber optic gyroscope (FOG). As shown in FIG. 50, the optical communication system may include an optical source 5000, a coupler 5002, a photodetector 5004, a modulator 5006, an amplifier 5008, a telescope 5010, output 5012 from the telescope, and fiber coils 5014. The FOG may be analog or digital.

The optical source may be the optical source described with respect to FIGS. 44 through 46 and may include one or more SLEDs to emit a beam of light.

The beam of light may be sent to a coupler 5002 which may split the beam into two beams, e.g., a first beam and a second beam. The first beam may travel clockwise along the coils 5014 while the second beam travels counterclockwise. Using the phase shift between the two coils 5014, the orientation of the gyroscope may be sensed (e.g., clockwise, or counterclockwise). The FOG may be used on a free space optical system as a tool to calculate the absolute position of anything it is linked to.

The beam of light may be modulated and amplified using techniques described with respect to FIGS. 44 through 49. In some embodiments, the filtered light may be used as input to the coupler 5002 and may be used by the FOG to sense orientation.

FIG. 51 shows an exemplary flow chart of the optical communication system configured to transmit data.

In some embodiments, a system for transmitting information optically may include an optical source, a modulator, and a photoreceiver.

At step 5100, the optical source may be configured to generate a beam. The beam may include a series of light pulses each having a duration of less than 100 picoseconds. The optical source may include a waveguide that amplifies light emitted by one or more diodes. The beam of light emitted by the optical source may have a coherence length less than 400 microns. The beam of light may include high frequency noise in the form of amplitude fluctuations. In some embodiments, the system may include a plurality of optical sources configured to generate respective beams of light. Each of the plurality of optical sources may include a respective waveguide. The respective beams of light may be coupled to a multiport coupler such that a combined output from one or more of the plurality of optical sources is transmitted to the modulator. The combined output may be used for system redundancy, course wavelength division multiplexing (WDM), hot swapping, and/or the like.

At step 5102, the beam of light may be modulated. A modulator may be configured to modulate the series of light pulses in response to a data transmission signal, thereby encoding transmission data into the series of light pulses. The modulator may be configured to encode a bit in a given time slot by blocking or allowing the beam of light to pass through the modulator in that time slot. The modulator may output a modulated beam of light having a first SNR.

At step 5104, the modulated beam of light may be received and both amplified and filtered. A fiber amplifier, which may include at least a core and a cladding surrounding the core, may be configured to receive the modulated beam of light from the modulator and both amplify and filter the modulated beam of light to produce a filtered beam of light. The cladding may include a transition metal ion compound. Photons with a wavelength between 1500 nm and 1600 nm may be emitted from the transition metal ion compound and amplify the modulated beam of light by a gain of at least 10x. In some embodiments, the transition metal ion may be at least one of Erbium, Ytterbium, Neodymium, or Terbium. The filtered beam of light may have a second SNR. The second signal-to-noise ratio may be at least three times as large as the first signal-to-noise ratio. In some embodiments, the fiber amplifier may a first fiber amplifier. The system may include a second fiber amplifier. The first fiber amplifier may transmit the filtered beam of light to the second fiber amplifier.

At step 5106, the filtered beam of light may be transmitted. The filtered beam of light may be transmitted to a detector having a photoreceiver. The photoreceiver may be configured to extract the transmission data from the filtered beam of light. In some embodiments, the optical source and the detector having the photoreceiver may be spaced by a free space optical communication distance of at least one mile. The optical communication system may have a measured bit error rate of less than one in one million over the free space optical communication distance of at least one mile for a measurement period of at least sixty seconds. In some embodiments, the optical source may be located on a ground station and the photoreceiver is disposed on an earth-orbiting satellite. The optical communication system may have a measured bit error rate of less than one in one billion over a free space optical communication distance between the ground station and the earth-orbiting satellite for a measurement period of at least sixty seconds. The optical source may a SLED and the fiber amplifier may a nonlinear filter that amplifies the modulated beam of light and reduces the high frequency noise.

The optical source may be configured to generate a beam comprising a series of light pulses each having a duration of less than 100 picoseconds. The modulator may be configured to modulate the series of light pulses in response to a data transmission signal, thereby encoding transmission data into the series of light pulses. The photoreceiver may have a detection window duration of less than 1 nanosecond and a detection threshold. The photoreceiver may be configured to indicate whether a received optical energy during a given detection window is greater than the detection threshold. The series of light pulses may include a first light pulse having a coherence length of less than 400 microns. When the first pulse travels through the variably refractive medium, photons in the first pulse may be refracted to travel along different ray paths having different lengths to the photoreceiver, and the photons of the first pulse may arrive at the photoreceiver according to a temporal distribution curve that depends, at least in part, on the duration of the first pulse and the lengths of the different ray paths taken by the photons in the first pulse to the photoreceiver. A full width at half maximum (FWHM) value of the temporal distribution curve may be at least three times as large as a coherence time value equal to the coherence length of the first pulse divided by the speed of light through the variably refractive medium, and the detection window of the photoreceiver may be at least six times as large as the FWHM value of the temporal distribution curve.

In some embodiments, a laser ranging system may include an optical source and a photoreceiver. The optical source may be configured to generate a beam comprising a series of light pulses each having a duration of less than 100 picoseconds. The photoreceiver may have a detection window duration of less than 1 nanosecond and a detection threshold. The photoreceiver may be configured to indicate whether a received optical energy during a given detection window is greater than the detection threshold. The series of light pulses may include a first light pulse having a coherence length of less than 400 microns. When the first pulse travels through the variably refractive medium, photons in the first pulse may be refracted to travel along different ray paths having different lengths to the photoreceiver. The photons of the first pulse may arrive at the photoreceiver according to a temporal distribution curve that depends, at least in part, on the duration of the first pulse and the lengths of the different ray paths taken by the photons in the first pulse to the photoreceiver. A full width at half maximum (FWHM) value of the temporal distribution curve may at least three times as large as a coherence time value equal to the coherence length of the first pulse divided by the speed of light through the variably refractive medium, and the detection window of the photoreceiver may be at least six times as large as the FWHM value of the temporal distribution curve. The laser ranging system may be configured to transmit the series of light pulses toward a surface, receive at least a portion of the series of light pulses that have been reflected by the surface, and, based on a time of flight of the received portion of the series of light pulses, determine a distance of at least a portion of the surface from the laser ranging system.

4. SPECTRALLY-EQUALIZING AMPLIFIER IN FREE SPACE OPTICAL SYSTEMS

Figure 52:
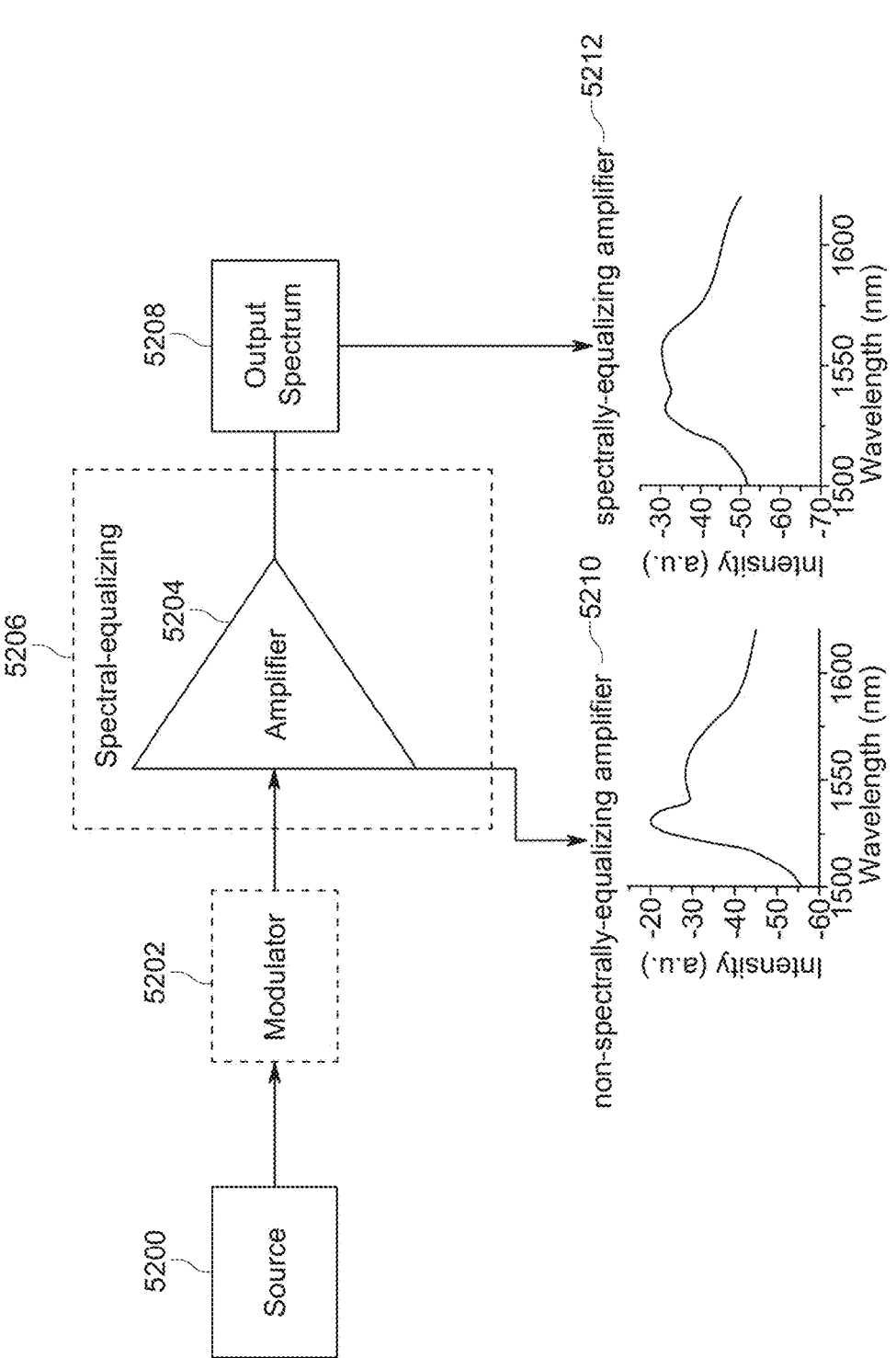
FIG. 52 shows an exemplary system incorporating a spectrally-equalizing amplifier configured to equalize a gain of a beam of light and respective distribution curves of wavelengths.

FIGS. 52 and 53 depict features for optically transmitting data through a variably refractive medium using a spectrally-equalizing amplifier. The features of FIGS. 52 and 53 may apply or use any feature of FIGS. 35A-51, 54-57, and 58A-59.

FIG. 52 shows an exemplary system incorporating a spectrally-equalizing amplifier configured to equalize a gain of a beam of light and respective distribution curves of wavelengths. The system may include a source 5200, a modulator 5202, an amplifier 5204 which may be configured to perform spectrally-equalizing as shown as step 5206, and an output. The output may produce a beam of light with an output spectrum 5208. The output spectrum 5208 may follow a spectrally-equalizing spectrum with respect to wavelength and intensity. The output spectrum 5208 may be different than a non-spectrally-equalizing amplifier spectrum (e.g., of an EDFA). The spectrally-equalizing amplifier may provide certain significant benefits for the optical communication systems, such as a larger range of wavelengths to transmit data over. As an example, a gain-flattened spectrum graph 5212 may be compared to a non-spectrally-equalizing amplifier graph 5210 to demonstrate the different properties of the spectrums. Furthermore, the broadband light has a short optical coherence length, which is advantageous for free-space optical communications. The coherence length of the source is determined as: $L=C \ \lambda^2/\Delta\lambda$, where C is a shaping constant equal to ½, $\lambda$ is the central wavelength of the pulse, and $\Delta\lambda$ is the full width at half maximum (FWHM) spectral width of the pulse. In some embodiments, the coherence length may be less than 1 mm, less than 600 microns, less than 400 microns, less than 200 microns, less than 100 microns, less than 50 microns, or less than 10 microns. In embodiments where a continuous wave source is used, these values may refer to the coherence length of the continuous wave beam, rather than that of the pulses.

A source 5200 may be an optical source configured to generate a beam of light. The source 5200 may include a waveguide that amplifies emitted light. In some embodiments, the source 5200 may be a SLED, fiber ASE source (described above), a mode-locked laser, and/or the like. In some embodiments, the source 5200 may be a SLED described with respect to FIGS. 42 and 45. In some embodiments, the source 5200 may be a USPL and may generate ultra-short pulses described with respect to FIGS. 40-42. In some embodiments, the beam of light emitted by the optical source may have a coherence length less than a threshold, for example, 400 microns. In some embodiments, the beam of light may be associated with high frequency noise in the form of amplitude fluctuations.

A modulator 5202 may be configured to modulate the beam of light to encode data on the beam of light. The data may include transmitted data which may include encoding data and/or tracking data. The optical system may be operated as a LIDAR instrument, using USPL laser sources operating over a spectral range of interest. In some embodiments, the modulator 5202 may encode the transmitted data into a plurality of time slots. For example, encoding a bit in a given time slot may involve blocking or allowing the beam of light to pass through the modulator 5202 in that time slot. The modulator 5202 may be the modulator 4414 described with respect to FIG. 44. Similarly to what was described with respect to FIGS. 44, in some embodiments, the modulator 5202 may not be included in the system.

The amplifier 5204 may receive the beam of light from the source 5200 or, in some embodiments, the modulator 5202. In some embodiments, the amplifier 5204 may be and have the components of the amplifier 5204 described with respect to FIGS. 35A, 35B, 44 and 47. For example, the amplifier 5204 may be an EDFA. In some embodiments, the amplifier 5204 may be a Raman amplifier.

In the case of the Raman amplifier, gain-equalizing may be performed by implementing and coupling multiple pump wavelengths during the amplification process. For instance, by coupling multiple pump sources (with same or different wavelengths), and pumping light from the pump sources into the Raman amplifier (along with the signal from the modulator 5202), the Raman amplifier may gain-equalize the spectrum of the signal (e.g., the encoded beam of light or plurality of pulses). For instance, using FIG. 47 as an example, the pump light 4700 may include two or more pump sources to thereby provide same or different spectrums of pump energy using same or different wavelengths of light.

In some embodiments, the amplifier 5204 may be considered a spectrally-equalizing optical gain amplifier and may equalize the gain. The gain may be equalized to account for an atmospheric condition, for example, a sunlight, humidity, and the like. In such a case, the gain equalization performed by the amplifier 5204 may equalize the gain across a spectral domain without completely flattening it. In some embodiments, the gain may be equalized by flattening it across a spectral domain.

In some cases, the amplifier 5204 may include additional components and/or features in order to equalize the gain of the received beam of light/plurality of pulses. Examples of the components and/or features may include, but are not limited to, one or combinations of: long-period fiber, thin-film interference coating, one or more MEMs arrays for creating continuous spectrally-dependent reflectivity, acousto-optic equalizer, multiple filtering, and/or the like.

In the case of long-period fiber grating, the long-period fiber grating may apply one or more techniques related to graphic equalizing such as rejecting light near the peak of the spectrum while allowing other wavelengths to pass through. For instance, the amplifier 5204 may include long-period grating in a core of the amplifier 5204, or a separate long-period fiber grating may be connected before or after the amplifier 5204 (as the case may be, e.g., if the amplifier 5204 has multiple stages).

In the case of thin-film interference coating, the thin-film interference coating may include at least two layers (e.g., a plurality of layers) of different materials with different indexes of refraction. Based on the materials and sequence of layers, the thin-film interference coating may (in transmission or reflection) filter the spectrum of the amplifier 5204. The thin-film interference coating may be integrated into the amplifier 5204 (e.g., in between stages), or applied to an input and/or out end of the amplifier 5204.

In the case of one or more MEMs arrays for mirroring, the MEMs arrays may include optical filtering structures (optionally with electro-mechanical adjustments) and/or semiconductor filtering structures (e.g., with voltages applied to electrodes on a semiconductor substrate stack) to filter the spectrum, of the spectrum of the amplifier 5204. The MEMs arrays may be fixed or dynamically controlled (e.g., to adjust a filter of the MEMs array). The MEMs arrays may be integrated into the amplifier 5204 (e.g., in between stages), or applied to an input and/or out end of the amplifier 5204.

In the case of an acousto-optic equalizer, the acousto-optic equalizer may include at least one piezoelectric transducer attached to material(s) (e.g., glass), and (optionally) an acoustic absorber. The acousto-optic equalizer may control the at least one piezoelectric transducer to vibrate to cause sound waves in the material(s), thereby causing a filter of spectrum passing through the material(s). The acousto-optic equalizer may be static (e.g., constant vibration) or dynamically controlled (e.g., to adjust a filter of the acousto-optic equalizer). The acousto-optic equalizer may be integrated into the amplifier 5204 (e.g., in between stages), or applied to an input and/or out end of the amplifier 5204.

In the case of multiple filtering, the multiple filtering may apply successive and/or parallel stages of the above techniques to amplify and filter the spectrum to obtain the output spectrum 5208.

In some embodiments, the gain-flattening components and features may be positioned and performed in before, after, or in between different gain stages of the amplifier 5204. In some cases, the wavelength of the beam of light emitted by the source 5200 matches and/or corresponds to the wavelength applied by the amplifier 5204. In some embodiments, gain-flattening may be an external process that is independent of the amplifier 5204 and that may occur before or after the beam of the light is processed by the amplifier 5204. In some embodiments, an optical gain of at least one of 10, 100, 1000, 2000, 5000, and/or the like may be applied to the received beam of light. The optical gain may be used to increase its power from a mW range to a Watt range (or more). In some embodiments, the amplifier 5204 may include a linear and/or a nonlinear filter. For example, a non-linear filter described with respect to FIG. 44. The non-linear filter may amplify the beam of light and reduce high frequency and/or low intensity noise while saturating the high intensity noise based on using techniques described with respect to FIGS. 48A-F and 49A-F. In some embodiments, pump power may be coupled to the filter and controlled and/or adjusted to tune the filtering, for example, the saturation level applied by the filter.

At 5206, spectrally-equalizing techniques may be applied to the beam of light, which may result in an outputted beam of light with an increased, or in other words larger, bandwidth. An example of spectral-equalization may be gain-flattening. The gain-flattening may occur over the spectral domain of the beam of light. Gain-flattening the beam of light may involve making the bandwidth of the amplifier 5204 larger. Techniques may include equalizing the gain applied by the amplifier 5204 to the beam of light, thereby making the bandwidth of the amplifier 5204 flat across the whole (or a substantial portion of the) bandwidth. Because the full bandwidth of the amplifier 5204 may be available, a beam of light may be received by the source 5200 (e.g., the SLED described with respect to FIGS. 43 and 44), or in some embodiments the modulator 5202, and amplified such that the beam of light maintains the shape it had when outputted by the source. In some embodiments, a distribution curve of wavelength of EM radiation may be modified (e.g., flattened) across a defined range. For example, the defined range may be a range above a power threshold. In this manner, a usable range of an optical source and amplifier for data transmission may be increased from 10 or 15 nm to 50 nm of more, thereby increasing data bandwidth over the optical communication distance.

An output with a corresponding output spectrum 5208 may be outputted and transmitted to a detector. Transmission data may be extracted from the beam of light, for example, via a photoreceiver coupled to the detector, which may be described with respect to FIG. 44. In some embodiments, the source 5200 and the detector having the photoreceiver are spaced by a distance of one or more of the following ranges: 1 cm to 1 m, 1 m to 100 m, 100 m to 500 m, 500 m to 1 km, at least 1 km, and the like. The system may have a measured bit error rate of less than one in one million, one in one billion, one in one trillion, and the like for a measurement period of at least sixty seconds, for a measurement period of minutes, or for a measurement period of hours.

As shown by comparing non-spectrally-equalizing amplifier graph 5210 with the spectrally-equalizing amplifier graph 5212, increasing the bandwidth may in turn shorten the coherence length of the beam of light. In turn, shortening the coherence length of the beam of light may enhance one or more properties related to signal quality of the beam of light such as lowering BER, improving the link quality, increasing the signal's resistance to atmospheric distortions and/or the like. In some embodiments, the coherence length may be shortened to a range of approximately 10-15 microns. The benefits of shortening the coherence length may be described further with respect to FIGS. 37-41 and 42-49. In some cases, the non-spectrally-equalizing amplifier graph 5210 depicts the spectrum of a beam of light that has been amplified using an amplifier 5204 without gain-flattening capabilities, while the gain-flattened spectrum graph 5212 depicts the spectrum of a beam of light amplified by a gain-flattened amplifier. With respect to the non-spectrally-equalizing amplifier graph 5210, a spike (e.g., a peak in gain) in intensity may occur on the spectrum at a wavelength of around 1531 nm and then the intensity may drop at higher wavelengths (e.g., a shoulder of gain), before the intensity trails off to the right. With respect to the gain-flattened spectrum graph 5212, intensity is maintained at the higher wavelengths. In some cases, the maintained intensity may lead to the beam of light having a shorter coherence length. In some embodiments, the gain may be flattened such that the output power density is within a plus or minus 0.5 dB, 1 dB, 2 dB, 3 dB, 4 dB, etc. across a specified spectral range, for example, a 20, 30, 40, 50 nm bandwidth, or more. In other words, the wavelengths of the filtered beam of light may be made to have equal spectral power density, which may be understood as power per channel or nm band (with at least a define threshold amount of power per channel).

In some cases, based on spectrally equalizing the gain applied to encoded beam of light/encoded beam of light, amplified output wavelengths within a defined range (e.g., ±50 nm of a center wavelength) are made to have substantively equal spectral power density. In some cases, the gain applied to the encoded beam of light is flattened to produce a distribution curve of wavelengths associated with the filtered beam. For instance, the distribution curve may have a variance less than ±0.05 dB, 1 dB, or 2 dB, and the like, over the defined range of wavelengths.

As mentioned above, the optical source may be a super-luminescent diode (SLED). In some cases, the spectrally-equalizing amplifier is a nonlinear filter that amplifies the encoded beam of light and reduces high frequency noise (e.g., a EDFA with additional features) or a Raman amplifier.

In some cases, the filtered beam of light comprises a plurality of pulses including at least a first pulse that is transmitted over an optical communication distance to the photoreceiver. As the first pulse traverses over the optical communication distance, photons, of the first pulse, may travel along a plurality of ray paths having different lengths to the photoreceiver. The photons of the first pulse of light may arrive at the photoreceiver according to a temporal distribution curve that depends, at least in part, on a duration of the first pulse and the different lengths of the plurality of ray paths taken by the photons in the first pulse to the photoreceiver. In this case, a full width at half maximum (FWHM) value (see, e.g., FIGS. 35A-51) of the temporal distribution curve is at least three times as large as a coherence time value equal to a coherence length of the first pulse divided by a speed of light through the variably refractive medium.

FIG. 53 shows an exemplary method of spectrally equalizing a gain of a beam of light using a spectrally-equalizing amplifier. The method may start at step 5300, the system may, by an optical source, generate a beam of light. For instance, the optical source may be a SLED, as discussed herein.

In step 5302, the system may encode, by a modulator, data on the beam of light to produce an encoded beam of light. For instance, the modulator may receive a data signal and on-off key (e.g., return to zero) the beam of light in accordance with the digital signal and time slots, as discussed herein.

In step 5304, the system may amplify and filter, by a spectrally-equalizing amplifier, the encoded beam of light to produce a filtered beam of light. The spectrally-equalizing amplifier may spectrally equalize a gain applied to the encoded beam of light. For instance, the spectrally-equalizing amplifier may apply a gain to the beam of light that ensures the output spectrum has at no more than ±1 dB of variance over a target range of wavelengths, as discussed herein.

In step 5306, the system may transmit the filtered beam of light through a variably refractive medium to a detector having a photoreceiver. For instance, the system may route the filtered beam of light to a telescope that transmits the filtered beam of light, e.g., to a detector, as discussed herein.

5. TEMPERATURE CONTROLLER IN FREE SPACE OPTICAL SYSTEMS

FIGS. 54, 55, 56A, 56B, and 57 depict features for optically transmitting data through a variably refractive medium using a temperature controller of an optical source. The features of FIGS. 54, 55, 56A, 56B, and 57 may apply or use any feature of FIGS. 35A-51, 52-53, and 58A-59.

Figure 54:
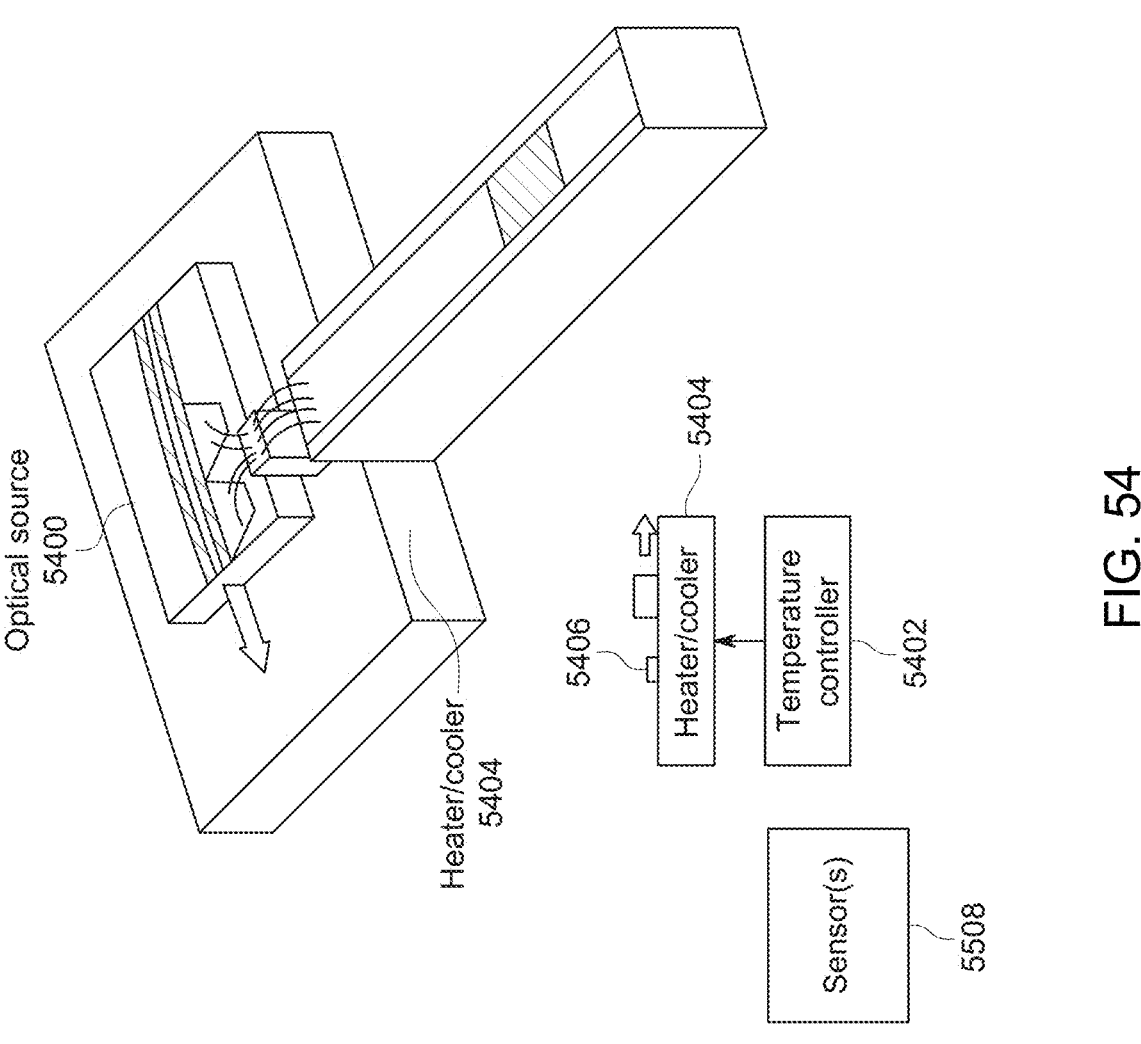
FIG. 54 shows an exemplary system for tuning a temperature of an optical source to optically transmit data through a refractive medium.

FIG. 54 shows an exemplary system for tuning a temperature of an optical source to optically transmit data through a refractive medium. As shown, the system may include an optical source 5400, a temperature controller 5402, a heater/cooler 5404, and a thermometer 5406. In some embodiments, the system may include additional features such as an RF connector (SMA connector), a DC drive bias, and/or the like.

An optical source 5400 may be configured to generate a beam of light. The beam of light may have a spectrum of wavelengths. In some embodiments, the optical source 5400 may be a semiconductor. In some embodiments, the optical source 5400 may be a SLED, for example, the SLED described with respect to FIGS. 44 and 45. As described with respect to FIG. 55, multiple sources, for example, multiple SLEDs, may be used in combination. In some embodiments, the optical source 5400 may be a fiber ASE source (described above), a mode-locked laser, and/or the like.

A temperature controller 5402 may be coupled to the optical source 5400 in such a way that it can adjust the temperature of the optical source 5400 and, in doing so, drive the beam it generates to have a certain range of wavelengths. In some embodiments, the temperature controller 5402 may be thermal electric cooler (TEC) coupled to and/or including a heater/cooler 5404. In some embodiments, devices other than a TEC may be used to control the temperature such as "heat-only" devices and "cool-only" devices. At a first temperature, an optical source 5400 may generate a beam of light with a spectrum (in other words with a distribution curve of wavelengths). In some cases, the distribution curve of the wavelengths may not be aligned with the spectrum of the output of the spectrally-equalizing amplifier. In this case, the output amplified bandwidth may not reach its maximum capacity and thus the coherence length not being set to its optimally shortest length. In some cases, the maximum output bandwidth of the amplifier may be desirable. In some cases, by changing the temperature of the optical source 5400 such that the spectrum generated by the optical source aligns with the spectrum of the output of the spectrally-equalizing amplifier, both the maximum capacity of the output amplified bandwidth and the shortest possible coherence length can be reached, which may improve signal quality. In some embodiments, the coherence length may be shortened to a range of approximately 10-15 microns. Aligning the wavelengths by adjusting the temperature may be described further with respect to FIGS. 56A and B. Additionally, aligning the wavelengths may improve the amplifier's ability to perform spectral equalization on the beam of light received from the optical source 5400 and/or the modulator. In some embodiments, the amplifier may be an EDFA. In some embodiments, the amplifier may be a Raman amplifier, similarly to what was described with respect to FIG. 52.

In some embodiments, a feedback mechanism may be implemented to provide information to the system as to what the current temperature of the optical source 5400 is set at (e.g., based on a sensor tracking temperature readings such as the thermometer 5406) as well as information (e.g., from sensors 5508) related to a performance of the system. For instance, sensors 5508 may report data regarding how effective was the most recent set of transmissions (which may use testing techniques described with respect to FIG. 44), what are the current conditions (e.g., weather, visibility, etc.), any drift, and the like. In this manner, the system may adjust the temperature adjustment to compensation for changes, or adjust other system parameters (e.g., encoding technique, gain equalizer (if actively controlled), and the like). Additionally, the system may call an operation that defines an expected curve on how to drive a wavelength of a beam generated by the optical source 5400 given a current temperature reading of the source 5400.

In some embodiments, the temperature controller 5402 may include a PID controller may be implemented to determine how to adjust the temperature. In doing so, the PID controller may use one or more of the following: signals proportional to the temperature difference, integral of the temperature difference over time, the derivative of the temperature over time, and/or the like.

In some cases, the feedback information indicative of a performance of the system may be sent and considered by the system when determining how to adjust the temperature. The system may make such adjustments in real-time (in other words, satisfying pre-configured real-time requirements). The performance may be related to signal quality and/or other performance metrics related to signal quality. For example, the feedback information may convey the BER at a current temperature reading. The system may determine that driving the wavelength of the source in a certain direction (increasing it or decreasing it) by either heating or cooling may lower the BER and may send an instruction to the temperature controller 5202 according to such determination. Evaluating the signal quality and/or other performance metrics may take place on a sideband linked to the system. For example, the system may transmit a signal at a higher than needed bit rate and slice out the extra-bits in real-time in order to perform an evaluation such as a health exchange on the extra-bits via a sideband. In some examples, the system may perform dithering (pointing and centering) to determine how to adjust the temperature to improve signal quality. For example, dithering may involve the system making sequential small adjustments to the temperature in both directions to perform a "perturb-and-observe" test on whether the BER improved or worsened. If it worsened, the system may determine to change the temperature in the direction opposite of what was tested. If it improved, the system may determine to change the temperature in the same direction as to what was tested. In other words, the system may detect the control point at which the BER (or another performance metric) is minimal/improved and set the temperature accordingly.

In some embodiments, feedback information indicative of an atmospheric condition may be sent to and considered by the system when determining how to adjust the temperature. The feedback information may be generated using a sensor linked to the system. In some examples, the feedback information may indicate the presence of higher than usual atmospheric turbulence (clear air scintillation). Based on such information, the system may determine that the output spectrum of the amplifier should be set to the maximum limit in terms of having the shortest coherence length possible and the system may adjust the temperature accordingly.

In some cases, a temperature controller 5402 on a first end (a transmit end) and a temperature controller 5402 on a second end (a receive end) of a bi-directional communication link may drive distribution curves to different ranges of wavelengths to thereby provide co-transmission along a same region of space. The systems on each end may communicate to divide respective wavelength portions and the temperature controllers 5402 may drive respective temperatures of their respective optical sources to output spectrum in the respective wavelength potions.

Figure 55:
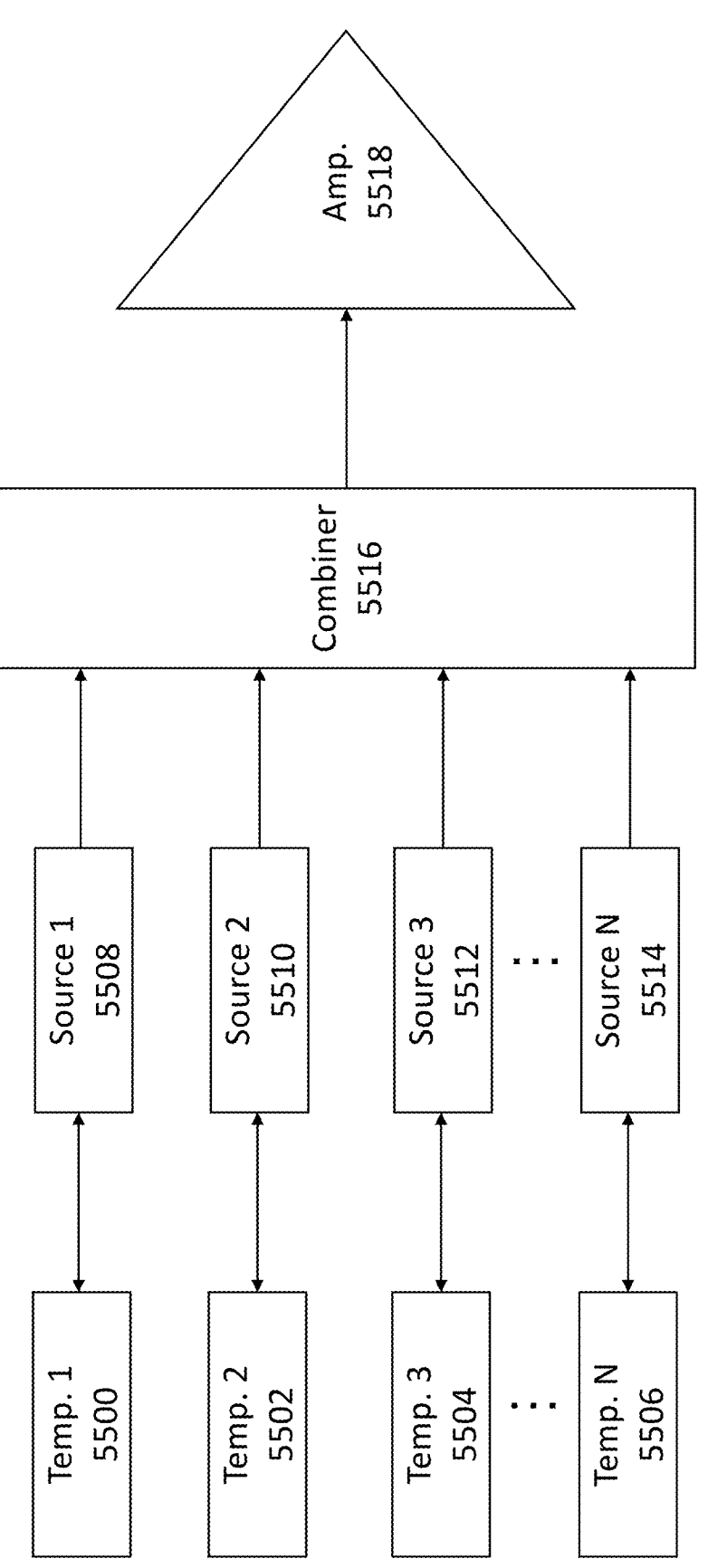
FIG. 55 shows an exemplary system with multiple sources used in combination to optically transmit data through a refractive medium.

FIG. 55 shows an exemplary system with multiple sources used in combination to optically transmit data through a refractive medium. The system may include multiple optical sources (first source 5508, second source 5510, and third source 5512 up to and including an Nth source 5514) independently linked to respective temperature controllers (first temperature controller 5500, second temperature controller 5502, and third temperature controller 5504 up to and including nth temperature controller N 5506), a combiner 5516, and/or an amplifier 5518. The system may include additional components and/or features described with respect to FIG. 54.

The sources may be independent of one another and may be set to generate beams with different wavelengths and different data modulation rates that can be optically combined to generate an output from the amplifier 5518 with a broadened bandwidth and shorter coherence length. For example, as shown and described in FIG. 56A, the bottom graph may add a hump or in other words a potential distribution of wavelengths for each additional independent source. Having more potential distributions to choose from may lead to finding a combination of sources set to different wavelengths (via independent temperature tuning) that results in a broader (or broadest) output from the amplifier 5518.

In some embodiments, each source may be linked to a respective temperature controller, which may be used to configure the sources to generate beams with different wavelengths. In some embodiments, the sources and/or temperature controllers may be in communication with one another such that adjusting the wavelengths is based at least partially on the current wavelengths and/or temperature readings associated with the other sources.

The combiner 5516 may receive the individual beam generated and sent from respective optical sources. In some embodiments, the combiner 5516 may be a passive combiner. For example, if the number of sources is 4, the combiner may be a 1×4 power splitter.

The combiner 5516 may feed the multiple beams of light into the amplifier 5518. The amplifier 5518 may be a spectrally-equalizing amplifier. The amplifier may include one or more components and/or features described with respect to FIGS. 52 and 54.

FIG. 56A shows exemplary diagrams 5600 demonstrating how to align the wavelengths of the output of the source and the output of the amplifier to achieve a maximally broad output bandwidth.

The top diagram may depict an output spectrum (distribution curve of wavelengths) of an amplified output that has not been equalized (similar to the graph on the left shown in FIG. 52). The middle diagram may depict an output spectrum (distribution curve of wavelengths) of an amplified output that has been equalized using a spectrally-equalizing amplifier (similar to the graph on the right shown in FIG. 52). In each graph, the dashed line may represent 50% of the bandwidth, respectively (for example, 50% of 3 dB). The bottom diagram may depict the output spectrum (power density relative to wavelengths) of the source at 3 different temperature settings. It should be noted that since the current applied by the system remains constant for the varying temperature settings, the shapes of the output spectrums at different temperatures (distributions of wavelengths) may remain more or less identical. This may allow the system to determine a temperature setting by choosing the setting that results in the center wavelength of the spectrum of the output beam being aligned with the center wavelength of the amplified output spectrum (described above). Considering the three different output spectrum options depicted in the bottom graph, the system may determine to set the temperature to the setting that produces the middle output spectrum as it would lead to the broadest amplified output since the spectrum of the optical source would produce power for the greatest range of wavelengths that align with the bandwidth. As described with respect to FIG. 55, adding multiple sources and/or multiple temperature controllers may allow for more distribution curves to be considered; thereby, the system may configure the optical sources to generate a beam with an output spectrum that results in a maximum amplified output bandwidth, or maximum amplified output power.

Figure 56B:
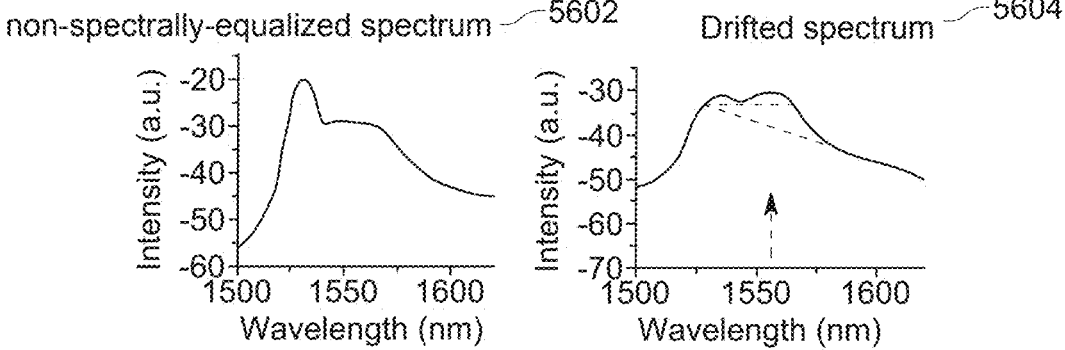
FIG. 56B shows exemplary diagrams demonstrating a system configured to tune a temperature of an optical source to account for a changed state of the amplifier.

FIG. 56B shows exemplary diagrams (graph on left 5602 and graph on right 5604) demonstrating a system configured to tune a temperature of an optical source to account for a changed state of the amplifier.

In some embodiments, a feedback mechanism may send information indicative of a condition of the amplifier. For example, the information may convey that the amplifier is performing spectral equalization on the received beam of light differently than in the past, which is resulting in an amplified output spectrum that is not flat enough to produce a signal with a sufficiently short coherence length. The graph on the right 5604 may show an output spectrum that over time has drifted and is beginning to resemble the output spectrum of the output from an amplifier that does not perform gain-equalizing (graph on the left 5602). The decline in performance may be due to deterioration such as short-term, medium-term, or long-term drift. In such a case, the temperature of the source may be adjusted to account for the deteriorated state of the amplifier such that the amplifier is able to output a spectrum that is sufficiently equalized, for example, sufficiently flattened. Using these system optimization techniques may extend the service-life of the system.

FIG. 57 shows an exemplary method for tuning a temperature of an optical source to optically transmit data through a refractive medium. The method may start at step 5700, where the system may sense, using a thermometer, a temperature of an optical source. For instance, the thermometer may report a current temperature of the optical source (or, indirectly, a heat sink attached or adjacent the optical source).

At step 5702, the system may determine, using a temperature controller, a temperature adjustment based on the temperature or other data (e.g., from sensors). In some cases, the temperature adjustment may be configured to modify a distribution curve of wavelengths of the beam of light output by the optical source, as discussed herein.

At step 5704, the system may adjust, using a heater/cooler, the temperature based on the temperature adjustment. For instance, the temperature controller may transmit an instruction to the heater/cooler to raise or lower the temperature of the optical source, as discussed herein, in accordance with the determined temperature adjustment.

At step 5706, the system may, by an optical source, generate a beam of light, and transmit, detect, and determine system parameters. For instance, the optical source may be a SLED, as discussed herein. The system may also collect data from sensors (e.g., weather, alignment or power drift, and the like) and determine a new temperature adjustment or other system parameters. Other system parameters may include encoding technique, adjustments to gain equalizer (if actively controlled), and the like, as discussed herein. The system may then return to step 5700 to repeat the method.

6. IMPULSIVE DETECTION IN FREE SPACE OPTICAL SYSTEMS

FIGS. 58A, 58B, and 59 depict features for optically transmitting data through a variably refractive medium using pulses short enough where data may be extracted using impulsive detection. The features of FIGS. 58A, 58B, and 59 may apply or use any feature of FIGS. 35A-51 and 52-57.

FIG. 58A shows an exemplary system for optically transmitting data through a variably refractive medium using pulses short enough where data may be extracted from a pulse at a rate less than a detection response time. The system may include an optical source 5800, a time slicing modulator 5802, a pre-amplifier 5804, a data modulator 5806, and/or an amplifier 5808. It should be noted that either or both modulators may be altered to include additional or alternative features. In some embodiments, the modulator(s) may not be included in the system.

An optical source 5800 may be configured to generate a beam of light. The optical source 5800 may be similar to and/or may have characteristics of the optical sources described with respect to FIGS. 52 and 54. In some embodiments, the optical source 5800 may be configured to send a beam at a duty factor (for example, 50%) high enough that when the beam is chopped into return-to-zero (RZ) pulses (described further herein), the pulses have enough average power to not be disturbed (materially disturbed) by noise (ASE noise) produced by the amplifier 5808. In such a case, a pre-amplifier 5804 may not be needed in the system as the average power of the pulses would already be sufficient.

A time slicing modulator 5802 may slice the beam received from the optical source 5800 into one or more pulses. Slicing the beam may involve narrow-time slicing techniques. For example, the time slicing modulator 5802 may be a short pulse generator such as an electrical comb drive. The pulses may be sliced short enough such that transmitted data (similar to the transmitted data described with respect to FIG. 52) may be extracted from a pulse at a rate less than a detection response time threshold. The threshold may be set to be at least a factor of 1.25, 1.5, 2, 2.5, and the like below the detector response time. To illustrate using an example, a detector with a 3 dB bandwidth may have a response time of 400 picoseconds. In such a case, the threshold may be set to at least 200 picoseconds and the rate at which data must be extracted from a pulse in order to be considered in an RZ state must be below 200 picoseconds. Another way to think about the slicing mechanism is that the pulses may be sliced to achieve an RZ state (when data cannot be extracted from the pulses at a rate less than the detection response time threshold, it may be referred to as being in a non-return-to-zero (NRZ) state). While in an RZ state, one or more impulsive coding benefits may be realized by the system such as increased detection efficiency, increased link margin, detector hits with increased power, and/or the like.

A pre-amplifier 5804 may be included in the system to receive one or more pulses. Due to the time-slicing performed by the time slicing modulator 5802, the average power of the pulses may be significantly less than the average power of the original beam generated by the optical source 5800. For example, the average power of the pulses may be less than one of 2.5%, 5%, 10%, 20%, 30%, 40%, 50%, etc. of what the average power of the beam was. Power distribution curves for the original beam of light as well as the chopped pulses may be depicted and described with respect to FIG. 58B. The pre-amplifier 5804 may be configured to add power to the one or more pulses such that noise (ASE noise) generated from the amplifier 5808 will not dominate the noise (ASE noise) of the amplified output pulses. In some embodiments, the pre-amplifier 5804 may increase the average power of the pulses to the average power of the original beam was, for example, which may be in the range of a few hundred mW. In some embodiments, the preamplifier 5804 may include CW gating light source (s), while in others it may not include CW gating light source(s). In some embodiments, the preamplifier 5804 may be configured to perform gain-flattening techniques described with respect to FIGS. 52-57. In some embodiments, the pre-amplifier 5804 may perform gain-flattening on the pulses in order for the pre-amplified output spectrum to be spectrally broad and follow a distribution curve similar to the amplified output spectrum. Otherwise in some cases, a pre-amplifier 5804 without gain-flattening may output a spectrum that is so narrow that the amplifier 5808 may be unable to amplify a meaningful portion of the pre-amplified spectrum. In some embodiments, the pre-amplifier 5804 may be associated with a broad bandwidth.

A data modulator 5806 may receive the pulses from the pre-amplifier 5804 and encode data on the pulses. The data modulator 5806 may be similar to and/or may perform similar keying operations and/or other encoding techniques as the modulators described with respect to FIGS. 44, 52, and 54.

The amplifier 5808 may receive the plurality of pulses and amplify and filter the pulses. In some embodiments, the amplifier 5808 may be a spectrally-equalizing amplifier and may perform spectral equalization, for example, gain-flattening, on a gain applied to the pulses (which is described further with respect to FIGS. 52-56). As mentioned above, the amplifier 5808 may produce its own noise (ASE noise) independent of the received pulses. In cases where the pulses are not processed by a pre-amplifier 5804, this noise may disturb the quality of the pulses due to the average power of the pulses being too low (caused by slicing the beam). As described above, a pre-amplifier 5804 or any other device that can amplify, or increase the power of the pulses may be used to prevent such disturbances. The amplifier 5808 may additionally add more power to the pulses, for examples, may increase the pulses from a range of around a few hundred mW to a range of around 2 Watts, in order to traverse the optical communication distance.

FIG. 58B shows exemplary diagrams of power distributions of the beam generated by the optical source and of the chopped pulses.

The top graph 5810 may show the power density over time of the beam outputted by the optical source which, for example, may be CW. The bottom graph 5812 may show power density over time of the original beam sliced into sliced pulses. In some embodiments, slicing the beam may involve removing at least 90% (e.g., 90%, 95%, or 97.5%, and the like) of a bit duration from the original beam for a given time window. When comparing the two graphs, bits encoded on the beam (top graph 5810) may have a longer bit duration (demonstrated by the longer time intervals at which a bit is present for a given time window, which is shown via the positive intensity reading) than bits encoded on the pulses (bottom graph 5812). This may lead to the conclusion that chopping the beam results in a decreased average power associated with the pulses. For example, using the example of removing 90% of the bit duration mentioned above, a scenario may exist where the top graph 5810 may depict 800 picosecond long bits while the bottom graph 5812 may depict 80 picosecond long bits. Using pulses with such a short duration should provide the impulsive coding benefits described with respect to FIG. 58A. Additionally, in such a case, the average power of the pulses may be a factor of 10 less than the average power of the original beam (which would naturally follow since by removing 90% of the bit duration, 10% would remain). In some embodiments, this factor, for example, in the above scenario a factor of 10, may be the gain applied to the pulses by the pre-amplifier in order to restore the average power (in other words, the gain may be the ratio of the average power of the original beam over the average power the chopped pulses). For example, for a factor of 20, the bit duration of the chopped pulses may be 40 picoseconds; for a factor of 40, it may be 20 picoseconds. The factors may range from less than 10, between 10 and 40, or more than 40.

FIG. 59 shows an exemplary method for optically transmitting data through a variably refractive medium using pulses short enough where data can be extracted from a pulse at a rate less than a detection response time. The method may start at step 5900, where the system may generate, by an optical source, a beam of light. In some cases, the optical source may include a waveguide that amplifies emitted light. For instance, the optical source may be a SLED, a mode-locked laser, and the like, as discussed herein.

At step 5902, the system may slice, by a first modulator, the beam of light into a plurality of pulses. In some cases, the first modulator may remove at least 90% of the beam of light (i.e., block it or otherwise absorb it), as discussed herein.

At step 5904, the system may amplify, by a pre-amplifier, the plurality of pulses to produce pre-amplified plurality of pulses. For instance, the pre-amplified plurality of pulses may have an average power that corresponds to an average power of the beam of light. In some cases, the pre-amplifier is a spectrally-equalizing amplifier (e.g., a gain flattened amplifier), as discussed herein. The pre-amplifier may apply a gain factor of at least 10, but the gain factor may be anywhere between 10 and several thousand. In some cases, the pre-amplifier may also spectrally-equalize the power amplification.

At step 5906, the system may encode, by a second modulator, data on the pre-amplified plurality of pulses to produce an encoded plurality of pulses. For instance, the modulator may receive a data signal and on-off key (e.g., return to zero) the pre-amplified plurality of pulses in accordance with the digital signal and time slots, as discussed herein.

At step 5908, the system may amplify and filter, by a spectrally-equalizing amplifier, the encoded plurality of pulses to produce a filtered plurality of pulses. The spectrally-equalizing amplifier may spectrally equalize a gain applied to the encoded plurality of pulses, as discussed herein.

At step 5910, the system may transmit the filtered plurality of pulses through a variably refractive medium to a detector having a photoreceiver. For instance, the system may route the filtered plurality of pulses to a telescope that transmits the filtered plurality of pulses, e.g., to a detector, as discussed herein.

7. MULTI-DETECTORS IN FREE SPACE OPTICAL SYSTEMS

FIG. 60 depicts a block diagram 6000 of a multi-detector system 6002 of a free-space optical system for free-space communications. The features of FIG. 60 may apply or use any feature of FIGS. 35A-59 and 60-76. The multi-detector system 6002 may have a telescope 6004, an optical/fiber routing 6006, a multi-detector 6010, a controller 6008, and an ADC 6012.

In some cases, the telescope 6004 may be a lens, off-axis parabolic mirror, and the like. The telescope 6004 may collect/direct a beam of light 6001 (from other end of optical communication link) to optical/fiber routing 6006.

In some cases, the optical/fiber routing 6006 may have optical components and/or fiber components. The optical components may include one or combinations of mirrors, lens, and the like. The fiber components may include single-mode fiber(s), multi-mode fiber(s), switches, attenuators, and the like. The optical/fiber routing 6006 may pass the beam of light 6001 to one or more detectors of multi-detector 6010. In some cases, the optical/fiber routing 6006 may be active (e.g., by the controller 6008 to actively change configuration or routing) or be passive.

The multi-detector 6010 may have a plurality of detectors (e.g., at least two, at least four, and so on). For instance, the plurality of detectors may have a first detector 6010A, second detector 6010B, and so on until nth detector 6010N. The plurality of detectors may include more than one detector of a same type of detector (e.g., for redundancy) or sets of different types of detectors (e.g., for different sensitivity or data rate). In some cases, the plurality of detectors may include only avalanche diodes detectors, only PIN diode detectors, only optically amplified detectors, or various combinations of the foregoing. In some cases, the plurality of detectors may include only detectors at a first data rate, only detectors at a second data rate, and so on. In some cases, the plurality of detectors may include detectors at a first data rate, at a second data rate, and so on. Examples of optically amplified detectors include at least semiconductor waveguide amplifiers, and optically pumped doped fiber amplifiers coupled to a PIN diode or avalanche diode detector.

One or more of the detectors of the multi-detector 6010, based on received portions of the beam of light 6001, may output analog signals to analog digital converter 6012. In some cases, the multi-detector 6010 may be active (e.g., by the controller 6008 to actively change configuration or detector) or be passive. For instance, in the case of the multi-detector 6010 including avalanche diode detectors, PIN diode detectors, and/or optically amplified detectors, the controller 6008 may select PIN diode detectors to receive the beam of light (or portions thereof) for lowest sensitivity circumstances (e.g., high power into detector, such as power above a first threshold that corresponds to an acceptable power level of avalanche diodes detectors); select avalanche diodes detectors for moderate sensitivity circumstances (e.g., power into detector below the first threshold); and select optically amplified detectors for high sensitivity circumstances (e.g., power into detectors below a second threshold that corresponds to floor power level of avalanche diodes detectors or ceiling of the optically amplified detectors).

The analog digital converter 6012 may receive and convert the analog signals into data 6014. The analog signals may be passed to other systems of the free-space optical system. In some cases, the analog digital converter 6012 may have separate convertors for each detector, or multiple detectors for a plurality of detectors.

The controller 6008 may determine whether a re-configuration condition (e.g., of a plurality of re-configuration conditions) is satisfied and, if so, causes the optical/fiber routing 6006 and/or the multi-detector 6010 to change states from a first state 6016 (e.g., an active state) to a second state 6018 (e.g., inactive state from among a plurality of such states). For instance, the controller 6008 may obtain control parameters 6015 to determine whether the re-configuration condition is satisfied. For instance, the control parameters 6015 may be one or combinations of data rate parameters, system state parameters, and/or user/system instructions. The data rate parameters may include data indicating environment state, user preference, and/or software unlock. The environment state may indicate weather, air temperature, air pressure, wind, fog conditions, precipitation, and the like. The user preference (e.g., for thresholds to switch) may indicate data rate preference, detector sensitivity, and the like. The software unlock may indicate whether a customer has access to software and/or hardware functionality of the system that is software locked. The system state parameters may include heat of detectors, power reading of detectors, signal strength of detectors, and the like. The user/system instructions may indicate a desired configuration to change to now (e.g., if safe or as an override). In some cases, the controller 6008 may determine, based on a re-configuration condition, to change states (1) if a heat of an active detector (or detectors) is above a threshold; (2) if a signal of the active detector (or detectors) is above a threshold; (3) if a RSSI of the active detector (or detectors) is above a threshold; (4) if the environment conditions indicate a more sensitive or less sensitive detector; (5) if a user or system instruction indicates a change in detector, and the like.

In some cases, the plurality of states may be discrete states or analog states. A discrete state may re-configure the system to change an active detector from a first detector to a second detector, or to move a component from a first position to a second position (thereby changing an active detector, or an amount of the beam on a detector). An analog state may be physical or optical change in the system to change a where a portion of a beam of light is routed or focused with respect to a detector.

FIG. 61 depicts a schematic 6100 of a multi-detector system 6102 for free-space communications. The features of FIG. 61 may apply or use any feature of FIGS. 35A-59 and 60-76. The multi-detector system 6102 may have a telescope 6106, and a first daughter card 6110.

The telescope 6106 may be a lens, off-axis parabolic mirror, or the like. The telescope 6106 may collect/direct a beam of light 6104 (from other end of optical communication link) to a focal plane 6108.

The first daughter card 6110 may be positioned in the focal plane 6108. The first daughter card 6110 may have an array of detectors 6112. The array of detectors 6112 may include at least a first detector 6112A, a second detector 6112B, a third detector 6112C, and a fourth detector 6112D. The array of detectors 6112 may include one or more detectors arranged in defined configurations, such as linear, matrix, circular, and the like. In the case depicted in FIG. 61, the array may be configured as a matrix array with four quadrants.

The controller 6008 may cause (1) the telescope 6106 to move the beam of light 6104 on the focal plane 6108 and/or (2) the first daughter card 6110 to move within focal plane 6108. In this manner, the controller 6008 may change which detector receives of the beam of light or to change a relative amount (e.g., from 0 to 100%) of the beam of light 6104 that that respective detectors receive. In some cases, the detectors are signal detectors (e.g., with integration time fast enough for 2.5 GHz/Gbps signal), whereas normal a quad detector may have a set of slower integration time detectors used to detect a signal spot location. Moreover, using multiple detectors may also help distribute the signal power of the beam of light, which might otherwise overload a single signal detector. In some cases, a fifth detector (not depicted) may be centered behind the other detectors to capture the optical signal that might slip between the other detectors.

In this manner, for a given amount of signal power in the beam of light 6104, the controller 6008 may (1) protect certain detectors, (2) increase dynamic range of the system, and (3) make use of the entire (or as much as possible) of the available signal power. For instance, the telescope may route incoming beam of light; multi-detector system may be in first state; the system begins operations in the first state; the controller constantly checks if a signal intensity of the first daughter card 6110 may be equal in each quadrant (or other condition, such as heat or signal to noise protection); if equal (or protection condition is satisfied), maintain the first state; and if not, move the beam of light or daughter card to a second state (e.g., beam of light centered on first daughter card 6110, protect detectors, increase/decrease sensitivity, increase/decrease data rate).

Figure 62:
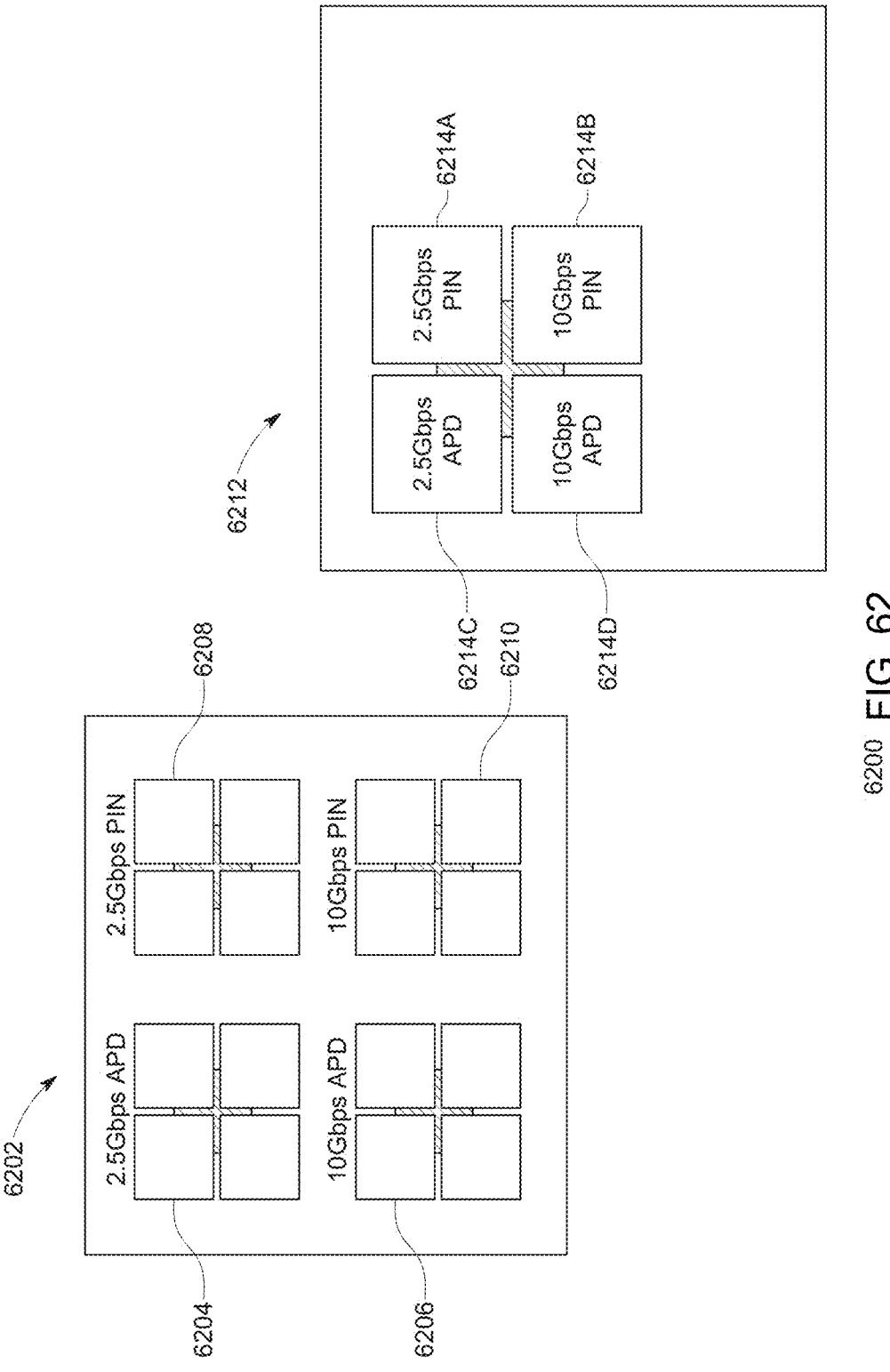
FIG. 62 depicts schematics of different configurations of a daughter card for a multi-detector system for free-space communications.

FIG. 62 depicts schematics 6200 of different configurations of a daughter card (such as second daughter card 6202 and third daughter card 6212) for a multi-detector system 6102 for free-space communications. The features of FIG. 62 may apply or use any feature of FIGS. 35A-59 and 60-76.

The second daughter card 6202 may have a plurality of arrays. The plurality of arrays may include at least two arrays. For instance, the plurality of arrays may include a first array 6204, a second array 6206, a third array 6208, and a fourth array 6210. In some cases, each of the arrays may have a certain type of detector. In some cases, some of the plurality of arrays may be a first type of detector (e.g., e.g., a first data rate and/or a first sensitivity), while others of the plurality of arrays may be a second type of detector (e.g., a second data rate and/or a second sensitivity). For instance, the first array 6204 may have 2.5 Gbps (or other data rate) avalanche photodiode (APD) detectors; the second array 6206 may have 10 Gbps (or other data rate) APD detectors; the third array 6208 may have 2.5 Gbps (or other data rate) PIN diode detectors; the fourth array 6210 may have 10 Gbps (or other data rate) PIN diode detectors. The plurality of arrays may be arranged in different configurations, such linear, matrix, circular, and the like. In the case depicted in FIG. 62, the plurality of arrays are configured as a matrix array with each of the plurality of arrays in a different quadrant. In this manner, the controller 6008 may change between different types of data rates and/or sensitives. Thus, in the case of second daughter card 6202, the array of arrays may have course configuration selection (e.g., which array to use) and fine configuration selection (how to distribute the input power onto the selected array for use).

The third daughter card 6212 may depict an array 6214 that has different types of the detectors in a same sub array. The array 6214 may be used in the first daughter card or second daughter card. The array 6214 may include a first detector 6214A (e.g., a 2.5 Gbps PIN diode detector); a second detector 6214B (e.g., a 10 Gbps PIN diode detector); a third detector 6214C (e.g., a 2.5 Gbps APD detector); and a fourth detector 6214D (e.g., a 10 Gbps APD detector). In this case, the controller 6008 may select a particular region of the array to transmit all (or a higher relative portion) of the signal power.

FIG. 63 depicts a schematic 6300 of a multi-detector system 6302 for free-space communications. The features of FIG. 63 may apply or use any feature of FIGS. 35A-59 and 60-76. The multi-detector system 6302 may have an optical splitter 6306, a first variable filter wheel 6308, a first detector 6310, a second variable filter wheel 6312, and a second detector 6314.

The optical splitter 6306 may receive and split a beam of light 6304 into a plurality of portions. The plurality of portions may include at least two portions. For instance, the plurality of portions may include a first portion 6304A and a second portion 6304B. In some cases, the beam of light 6304 may be split using power, frequency, wavelength, phase, and the like to form the plurality of portions.

The first variable filter wheel 6308 may control how much of the first portion 6304A passes to the first detector 6310, and the second variable filter wheel 6312 may control how much of the second portion 6304B passes to the second detector 6314. The controller 6008 may control the first variable filter wheel 6308 and the second variable filter wheel 6312 to protect respective detectors (e.g., before damage) or while detectors are changed for the first portion 6304A and the second portion 6304B.

In some cases, the optical splitter 6306 may control how much passes or gets reflected by the optical splitter 6306. In these cases, he variable filter wheels may be omitted or used in addition. In some cases, the optical splitter 6306 may be passive and split a defined ratio of light to each portion (e.g., 25/75, 50/50, and the like). The controller 6008 may control the optical splitter 6306 and/or the variable filter wheels.

The first detector 6310 and the second detector 6314 may be the same type or different types of detectors. For instance, the first detector 6310 may be a first one selected from 2.5 Gbps PIN diode detector, a 10 Gbps PIN diode detector; a 2.5 Gbps APD detector, and a 10 Gbps APD detector. The second detector 6314 may be a second one selected from a 2.5 Gbps PIN diode detector, a 10 Gbps PIN diode detector; a 2.5 Gbps APD detector, and a 10 Gbps APD detector. Based on design constraints or customer configurations, the first and second detectors may be provide redundancy, different data rates, or different sensitives.

Moreover, generally, the multi-detector system 6302 may split the beam of light 6304 into a plurality of portions, to be directed to a plurality of detectors. A trade off of too many splits may be a power reduction to each detector, while system dynamic range, redundancy, or sensitivity may be increased. In some case, amplifiers may overcome these issues, but eventually a noise floor may overcome such amplification and limit design options for such systems. A benefit of such systems may be that the system is largely passive, until the splitter(s)/variable filter wheel(s) require adjustment.

FIG. 64 depicts a schematic 6400 of a multi-detector system 6402 for free-space communications. The features of FIG. 64 may apply or use any feature of FIGS. 35A-59 and 60-76. The multi-detector system 6402 may have platform 6408 (e.g., a daughter card), a first detector 6310, and a second detector 6314.

The platform 6408 may have the first detector 6310 and the second detector 6314 fixedly or removably attached (e.g., mounted) to the platform 6408. The controller 6008 may move the platform 6408 up or down in the vertical direction 6406 (or back and forth) in a focal plane, to change which of the first detector 6310 or the second detector 6314 (or neither) receives signal power from an incoming beam of light 6404. As contrasted from FIG. 61 and FIG. 62, the multi-detector system 6402 may avoid two dimensional movement (thereby reducing mechanical complexity and reducing failure points) and may completely sequester the signal power on a detector (or off the detectors), instead of partially sharing signal power (thereby risking over heating/powering a more sensitive detector).

While two detectors are depicted in FIG. 64, a plurality of detectors may be axially aligned and movement of the axially aligned detectors may provide redundancy, different data rates, or different sensitives. Design considerations of where in the axial alignment of the different (if any) detectors may favor different features. For instance, PIN diodes may be grouped separate APD diodes, or 2.5 Gbps diodes may be grouped separate from 10 Gbps diodes, and the like.

Figure 65:
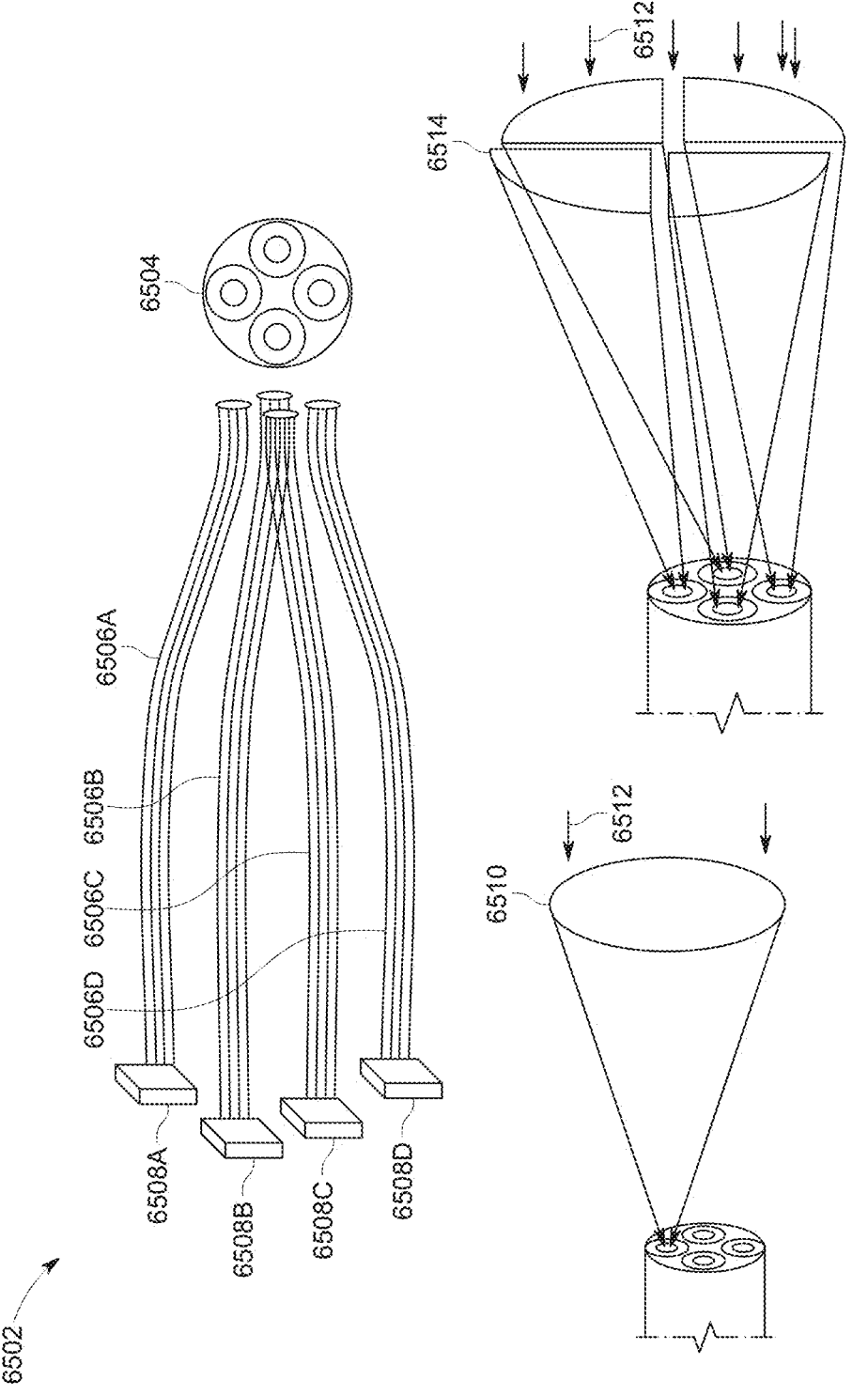
FIG. 65 depicts a schematic of a multi-detector system for free-space communications.

FIG. 65 depicts a schematic 6500 of a multi-detector system 6502 for free-space communications. The features of FIG. 65 may apply or use any feature of FIGS. 35A-59 and 60-76. The multi-detector system 6502 may have a plurality of fibers 6506A-6506B, a shared intake terminal 6504, a plurality of detectors 6508A-6508B, and a lens 6510/6514.

The shared intake terminal 6504 may group a first end of plurality of fibers 6506A-6506B, and a second end of the plurality of fibers 6506A-6506B may be butt-coupled to a respective one of the plurality of detectors 6508A-6508B. In this manner, an input beam of light 6512 may be directed to an individual detector (via an individual fiber) or split between two or more detectors (via two or more fibers).

In some case, the system may use a first lens 6510. In some cases, the first lens 6510 may be a single lens that may be controllable to steer the beam of light 6512 to a portion of shared intake terminal 6504 that corresponds to a particular fiber/detector or group of fiber/detectors. In some cases, a single lens (or a plurality of lens) may be fixed onto a particular fiber/detector and other lens may be fixed onto other particular fibers/detectors. In some cases, the first lens 6510 may direct the beam of light to a fixed location and the shared intake terminal 6504 may be moved relative to the fixed location.

In some case, the system may use a second lens 6515. The second lens 6515 may be divided into a plurality of parts (e.g., quadrants) and each one aligned onto one of the fibers/detectors. In some cases, the quadrants may be moveable to direct to their portion of the beam of light to a selected detector/fiber.

In this manner, multiple photodetectors can be a mixed/matched of 1 GbE or 10 GbE, or PINs or APDs as decided by design constraint or customer configuration. The fibers may be multi-mode fiber (MMF) such as graded-index (GRIN) MMF. For instance, the GRIN MMF may have a core diameter of 62.5 microns. Generally, the GRIN MMF may have a core diameter of at least 20 microns, 30 microns, 40 microns, 60 microns, 80 microns, and the like. Moreover, the GRIN MMFs can be arranged with a split into 2 or more (e.g., 4) branches, where each fiber routes all or a portion of incoming beam of light to a respective detector (or array).

There may be various benefits of this arrangement. For instance, the (1) detectors can be individual GRIN-butt coupled units; (2) it may be easier to swap out on in case of detector failure or to upgrade; and (3) if four signals are used together, it could be used to provide directional feedback for a pointing/tracking system.

In the case of a remote optical head, there may be additional tradeoffs/considerations. For instance, with a passive configuration remote optical head, then this configuration may require a plurality (e.g., four) identical GRIN MMFs to run from the remote optical head back to a data interface/detector system. From a logistics/financial consideration, the cost of using four GRIN MMFs should be compared to other options. One option may be to use a fiber switch (e.g., 1×4 MMF), and then only a single GRIN MMF may be needed to run from the remote optical head to the data interface/detector system. In some cases, this may also simplify the optics at the remote optical head, because only one MMF has to be aligned to the collecting optic.

Figure 66:
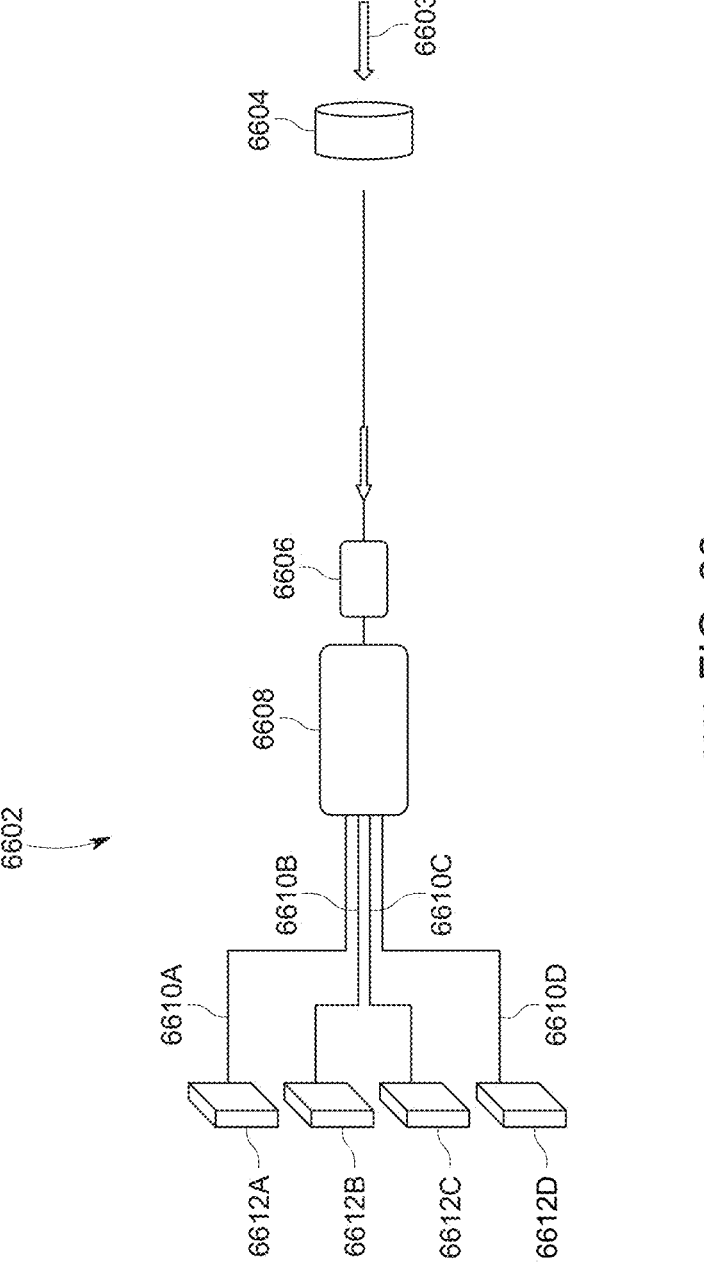
FIG. 66 depicts a schematic of a multi-detector system for free-space communications.

FIG. 66 depicts a schematic 6600 of a multi-detector system 6602 for free-space communications. The features of FIG. 66 may apply or use any feature of FIGS. 35A-59 and 60-76. The multi-detector system 6602 may have a collecting optics 6604, (optionally) a variable fiber attenuator 6606, a fiber switch 6608, a plurality of routing fibers 6610A-6610D, and a plurality of detectors 6612A-6612D.

The collecting optics 6604 may route received beam of light 6603 into a fiber (e.g., GRIN MMF 62.5 microns core) to form an input beam of the fiber. The collecting optics 6604 may be in a telescope or remote optical head. The collecting optics 6604 may be a Fresnel lens, an off-axis parabolic mirror and the like.

The fiber may transmit the input beam to the variable fiber attenuator 6606. The fiber attenuator 6606 may generate an attenuated beam. For instance, the controller 6008 may control the fiber attenuator 6606 to protect downstream detectors based on, e.g., heat or power signals, or to switch detectors.

The fiber, or variable fiber attenuator 6606, may be connected to the fiber switch 6608. The fiber switch 6608 may receive the input beam from the fiber or the attenuated beam. The fiber switch 6608 may be a MEMS MMF switch, such as a 1×4 switch. The fiber switch 6608 may be software controlled to select which output of a plurality of routing fibers 6610A-6610D. In some case, the fiber switch 6608 may be static between state changes (e.g., does not require maintenance charge or power). In some cases, the fiber switch 6608 may have a default state (e.g., a biases to route to a certain detector). The fiber switch 6608 may route the input beam or attenuated beam to the selected routing fiber.

Each of the routing fibers 6610A-6610D may be terminated to a different detector of the detectors 6612A-6612D. In this manner, multiple photodetectors can be mixed/matched of 1 GbE or 10 GbE, or PINs or APDs as designed or customer configuration. The routing fibers 6610A-6610D may be butt-coupled to a respective detector (e.g., to replace if failure or upgrade).

There may be various benefits of a fiber switch. For instance, using a fiber switch, the system may: (1) easily switch between the detectors; (2) for switching rapidly from APD to PIN, the switch may be fast enough to "save" the APD if the photocurrent is getting too high due to high received optical power; (3) for switching or "hot swapping" when there is a detector failure, the switch may be configured to switch over to a different or same detector, then after the new detector is installed switch back or stay with a backup; (4) perform data rate switches (e.g., between different data rates); and/or (5) for switching when upgrading detectors from 1 to 10 GbE, switch between different detectors with different data rates.

For testing, a testing arrangement of an optical signal generator (e.g., SLED optical source, MZM modulator, EDFA amplifier, via a fiber-coupled telescope) transmitted a beam of light to a collecting optics 6604 (e.g., a Fresnel lens or an off-axis parabolic mirror). The collecting optics 6604 focused the beam of light to the core of a multi-mode fiber tip, which routed the beam of light (via butt-coupling) to a detector. As compared to direct detection from the collecting optics 6604 to the detector, the testing arrangement generated an additional 3-6 dB of dynamic range before bit error started to appear.

FIG. 67 depicts a flowchart 6700 of a multi-detector system for free-space communications. The features of FIG. 67 may apply or use any feature of FIGS. 35A-59 and 60-76. The flowchart 6700 may start at block 6702, to receive, by a telescope, a beam of light.

At block 6704, a controller may obtain control parameters.

At block 6706, the controller may determine whether a re-configuration condition is satisfied. The re-configuration condition may indicate a change in state from a first state to a second state.

In response to determining no change in state (Block: 6706: change of state is not determined), the controller may maintain the beam of light on a active detector (or set of detectors) and return to block 6702.

In response to determining a change in state (Block: 6706: change of state is determined), the controller may, at block 6710, determine a system re-configuration from the first state to the second state. At block 6712, the controller may perform a system re-configuration from the first state to the second state and return to block 6702.

In some cases, for an optical communication system for optically transmitting data through a variably refractive medium, the optical communication system may include: an optical signal generator, a telescope, and a detector system.

The optical signal generator may include: an optical source, a modulator, and an amplifier. The optical source may be configured to generate a beam of light. The optical source may include a waveguide that amplifies emitted light. The modulator may be configured to encode data on the beam of light to form an encoded beam of light. The amplifier configured to receive the encoded beam of light from the modulator and both amplify and filter the encoded beam of light to produce an amplified beam of light.

The telescope may be configured to transmit the amplified beam of light through a variably refractive medium. The telescope may be configured to receive an inbound beam of light.

The detector system may include: a plurality of detectors, a routing system, and a controller. The routing system may include optical components and/or fiber components. The routing system may transmit the inbound beam of light to a first set of detectors of the plurality of detectors.

The controller may be configured to: obtain one or more control parameters; determine whether a re-configuration condition is satisfied based on the one or more control parameters; in response to determining the re-configuration condition is satisfied, determine a system re-configuration from a first state to a second state. The first state may be an active state of the optical communication system for causing the inbound beam of light to be directed to the first set of detectors. The second state may be a new state of the optical communication system for causing the inbound beam of light to be directed to a second set of detectors. The controller may be configured to perform the system re-configuration to the second state.

In some case, the plurality of detectors may be arranged on a daughter card in a focal plane of the telescope. In some case, the plurality of detectors may be arrayed in a matrix such that the inbound beam of light overlaps at least two detectors. In this case, the second state may move the daughter card in the focal plane in case the inbound beam of light moves from a defined location of the matrix.

In some case, the daughter card may include a plurality of arrays. Each of the plurality of arrays may include at least two detectors. The second state may move the daughter card in the focal plane to change a targeted array of the inbound beam of light from a first array to a second array. In some case, the first array includes at least one avalanche diode detector and at least one PIN diode detector. In some case, the first array includes at least one detector with a first data rate and at least one detector with a second data rate. The first data rate may be different from the second data rate.

In some case, the plurality of detectors includes an avalanche diode detector and a PIN diode detector. The first state may target the inbound beam of light at a first one of the avalanche diode detector and the PIN diode detector, and the second state may target the inbound beam of light at a second one of the avalanche diode detector and the PIN diode detector.

In some case, the plurality of detectors may include a first detector with a first data rate and a second detector with a second data rate. The first data rate may be different from the second data rate. The first state may target the inbound beam of light at a first one of the first detector and the second detector, and the second state may target the inbound beam of light at a second one of the first detector and the second detector.

In some case, the routing system includes at least one optical splitter and at least two variable filter wheels. The at least one optical splitter may split the inbound beam of light into at least two portions. The at least two portions may each, respectively, target a different detector of the plurality of detectors. The controller may control the at least two variable filter wheels to set how much of the at least two portions are let through to the different detectors.

In some case, the plurality of detectors are mounted on a platform and axially spaced apart along a first axis. The controller may control the platform to move along the first axis to change which detector of the plurality of detectors is targeted by the inbound beam of light.

In some case, the routing system may include a lens and at least two fibers. The at least two fibers may have a shared intake terminal to receive the inbound beam of light from the lens. Each of the at least two fibers may be butt-terminated to a different detector of the plurality of detectors. In some case, the lens may target the shared intake terminal to input the inbound beam of light into one or multiple of the at least two fibers.

In some case, the routing system may include a first fiber, a fiber switch, and at least two routing fibers. The first fiber may receive the inbound beam of light and input the inbound beam of light into the fiber switch. The controller may control the fiber switch to select a first one of the at least two routing fibers. The fiber switch may input the inbound beam of light to first one of the at least two routing fibers. In some case, the at least two routing fibers are each respectively butt-coupled to a different detector.

In some case, the routing system may further include a fiber attenuator. The controller may control the fiber attenuator to block or not block the inbound beam of light. In some case, the fiber attenuator may be (1) between the first fiber and the fiber switch or (2) between the fiber switch and a detector in series with a routing fiber.

In some case, the system may include a first fiber and a second fiber. The first fiber may be configured to transmit the inbound beam of light from the telescope to the plurality of detectors, and the second fiber may be configured to transmit the amplified beam of light from the amplifier to the telescope. In some case, the first fiber may be multi-mode fiber and the second fiber may be single-mode fiber.

In some case, the routing system may include a splitter. The splitter may be configured to split the inbound beam of light into at least two channels. Each of the at least two channels may be routed, via routing fibers, to different detectors. In some case, the splitter may be a multi-mode fiber splitter.

8. REMOTE OPTICAL HEAD IN FREE SPACE OPTICAL SYSTEMS

FIG. 68 depicts a schematic 6800 for a remote optical head configuration of a free-space communications system 6802. The features of FIG. 68 may apply or use any feature of FIGS. 35A-59 and 60-76. The free-space communications system 6802 may have a first free space optical transceiver system 6804 and a second free space optical transceiver system 6806. The first free space optical transceiver system 6804 and the second free space optical transceiver system 6806 may each transmit and receive free-space optical beams of lights (e.g., inbound beam of light 6808A and outbound beam of light 6808B) to each other.

The first free space optical transceiver system 6804 may include a first data interface 6804C, a first connection 6804B, and a first remote optical head 6804A. The second free space optical transceiver system 6806 may include a second data interface 6806C, a second connection 6806B, and a second remote optical head 6806A. The free-space communications system 6802 may provide a combination of convenience and performance advantages by using optical fiber-coupled remote heads. However, chromatic dispersion may cause limitations in data rate unless compensated or eliminated, or cause limitations on a length of the first connection 6804B and/or the second connection 6806B.

The first connection 6804B may connect, optically and/or electrically (e.g., digital, or analog), the first data interface 6804C and the first remote optical head 6804A. The second connection 6806B may connect the second data interface 6806C and the second remote optical head 6806A. While each transceiver may be depicted with a remote optical head, one of the transceivers may be consolidated into a single unit (e.g., without a remote optical head), such as when deployed on a cell tower or where a separation between components is not desired or possible.

The connections 6804B/6806B may include at least an outbound fiber (e.g., single mode fiber) to transmit optical signals. In such cases, the connections 6804B/6806B may include an electrical/ethernet cable to transmit data from the remote optical head, where the detector system 6908 is located. In these cases, signal protection of, e.g., a SMA cable between detector system 6908 and a network interface card may be required because the SMA cable may have significant loss for high frequency electrical signals. Furthermore, in the case of ethernet, power over ethernet may have separate issues (e.g., current draw at detector system 6908). Thus, a remote optical head that relays (e.g. transmits and receives in both directions) optical signals may have design tradeoffs from an electrical or ethernet arrangement. In the case of an optical receive configuration, this may avoid signal losses, dB losses, or power losses transitioning from free space communication, through telescope, to fiber, to a remote detector. However, increased cost or customer configuration may not desire active optical detection at the remote optical head, or a power loss into a fiber may be small (as compared to other system benefits).

In some cases, the connections 6804B/6806B may also include an inbound fiber (e.g., a multi-mode fiber) to receive incoming optical signals. In such cases, the detector system 6908 may be located in the data interface 6804C/6806C instead of the remote optical head. In some cases, the connections 6804B/6806B may include electrical/ethernet cables to power/provide data/control a pointing and tracking system of the remote optical head. As discussed herein, the connection length between the data interface and the remote optical head may be a design constraint as optical sources transmitting and receiving using, e.g., SLEDs and EDFAs may be limited by dispersion in the optical fibers. Moreover, the outbound and inbound fibers may be the same or different to account for differences in the quality of the optical signal (e.g., inbound beams of light may be degraded because of free-space optical communications) and how long the optical fibers run from data interface to remote optical head. Details of the data interface are further discussed herein, such as in FIG. 69, while details of the remote optical head are further discussed herein, such as in FIG. 70.

Figure 69:
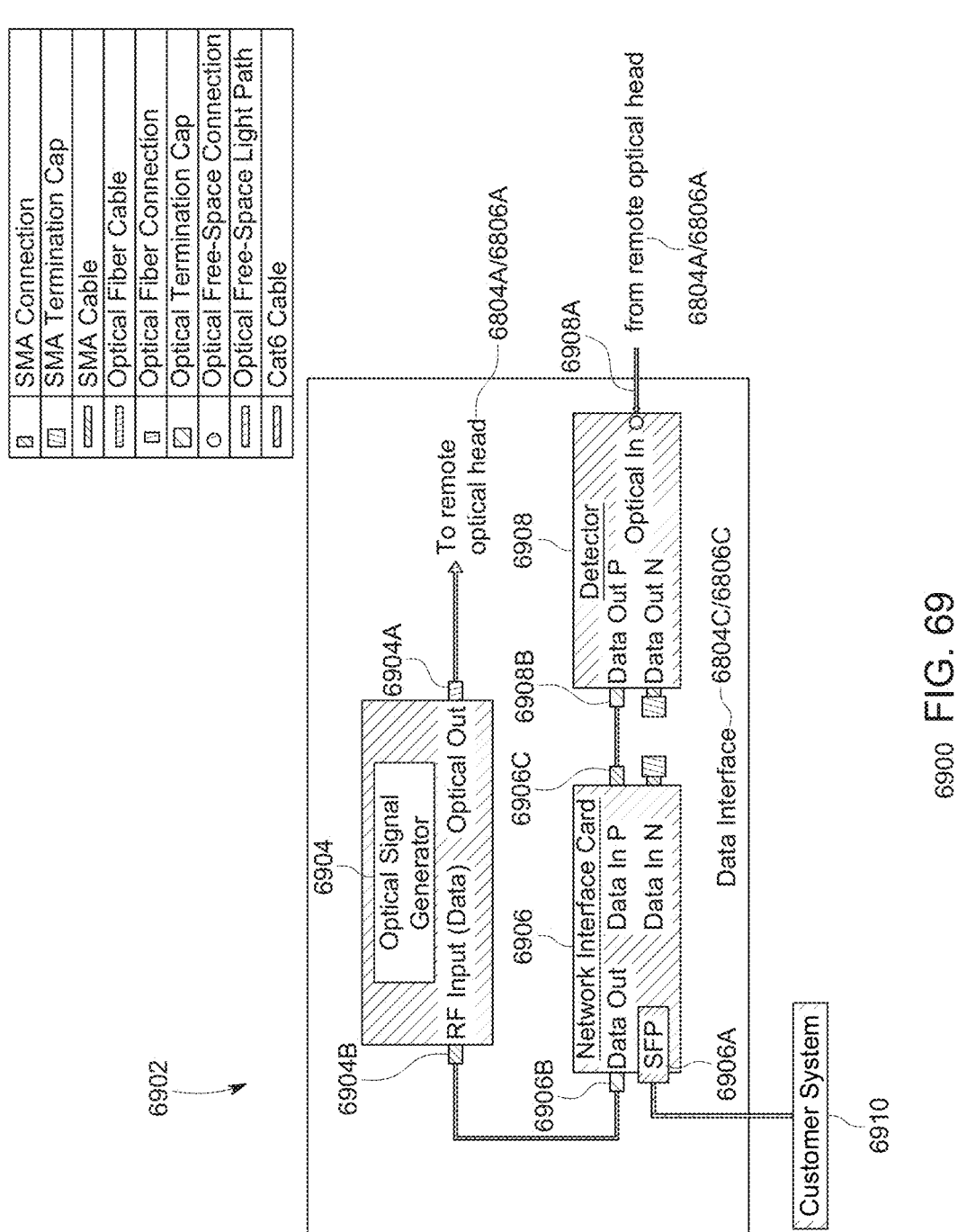
FIG. 69 depicts a schematic of a data interface for a free-space communications system.

FIG. 69 depicts a schematic 6900 of a data interface 6804C/6806C for a free-space communications system 6802. The features of FIG. 69 may apply or use any feature of FIGS. 35A-59 and 60-76. For ease of reference, the data interface 6804C/6806C will be referred to as the data interface 6804C, while the same features may apply to data interface 6806C. The data interface 6804C may include an optical signal generator 6904, a detector system 6908, and a network interface card 6906.

The optical signal generator 6904 may have an optical source (e.g., a SLED), a modulator (e.g., a Mach-Zehnder interferometer (MZI)), and an amplifier (e.g., an erbium-doped fiber amplifier (EDFA)). In some cases, the optical source may be modulated directly (or output a modulated pulse) and the modulator may be omitted. The modulator (or optical source if modulator is omitted) may generate a modulated beam of light (e.g., on-off key, OOK, to encode a bit stream), as discussed herein.

The optical signal generator 6904 may have (1) a data input 6904B that receives data from a data output 6906B of the network interface card 6906, and (2) an optical output 6904A connected to a fiber connected to the remote optical head 6804A. Thus, the optical signal generator 6904 may generate an output signal beam, in accordance with data from network interface card 6906, and transmit, via the outbound fiber, the output signal beam to the remote optical head 6804A. The remote optical head 6804A may receive the output signal beam and transmits the output signal beam to an optically coupled (e.g., via pointing and tracking) optical transceiver.

The remote optical head 6804A may receive an incoming beam of light and transmit, via (in some cases) fiber, the incoming beam of light to the detector system 6908, at optical input 6908A of the detector system 6908. The detector system 6908 may convert the incoming beam of light into a data signal using one or more detectors, as discussed herein. The detector system 6908 may output, at a data output 6908B, the data signal to a data input 6906C of the network interface card 6906.

Customer system 6910 (e.g., a network or server) may provide and receive customer data as input/output as a data signal over ethernet (e.g., cat6 or other means) to a customer data port 6906A (e.g., small form-factor pluggable, SFP, mini-gbic (gigabit interface converter)). The network interface card 6906 may manage data in/out to the customer data port 6906A to the customer system 6910, data out to data output 6906B to the optical signal generator 6904, and data in from the detector system 6908.

Figure 70:
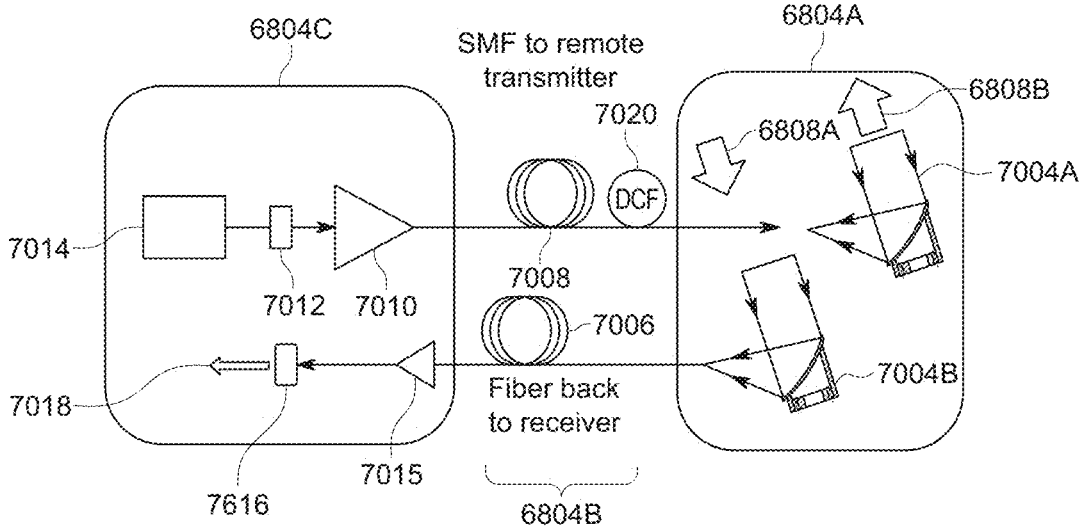
FIG. 70 depicts a schematic of a free space optical transceiver system for a free-space communications system.

FIG. 70 depicts a schematic 7000 of a free space optical transceiver system 6804 for a free-space communications system 6804. The features of FIG. 70 may apply or use any feature of FIGS. 35A-59 and 60-76. The free space optical transceiver system 6804 may include an outbound fiber 7008 (to the remote optical head 6804A) and an inbound fiber 7006 (from the remote optical head 6804A) of the first connection 6804B.

The remote optical head 6804A may include a first OAP mirror 7004A (off-axis parabolic mirror) and a second OAP mirror 7004B (or lens, or other telescope optical components). The first OAP mirror 7004A may receive the outbound beam of light from the outbound fiber and transmit the outbound beam of light 6808B to a distant transceiver over a free-space optical link, and the second OAP mirror 7004B may receive an incoming beam of light 6808A from the distant transceiver over the free-space optical link, and transmit the incoming beam of light to the inbound fiber.

The first data interface 6804C may generate the outbound beam of light. The optical signal generator 6904 of the first data interface 6804C may have an optical source 7014 (e.g., a SLED), a modulator 7012 (e.g., an MZI), and an amplifier 7010 (e.g., an EDFA).

The detector system 6908, of the first data interface 6804C, may receive the inbound beam of light, via the inbound fiber. The detector system 6908 may convert, by one or more detectors (such as the multi-detector system 6002), the inbound beam of light into data 7018.

In some cases, an amplifier 7015 may be inserted before the detector system 7016 (e.g., between the detector system 7016 and the inbound fiber 7006). The amplifier 7015 may be a pre-amplifier to amplify (relatively) low power incoming beams of light to power levels usable by the detector system 6908. In some cases, the amplifier 7015 may be positioned before certain detectors and only used to amplify incoming beams of light when higher sensitivity is needed.

Figure 71:
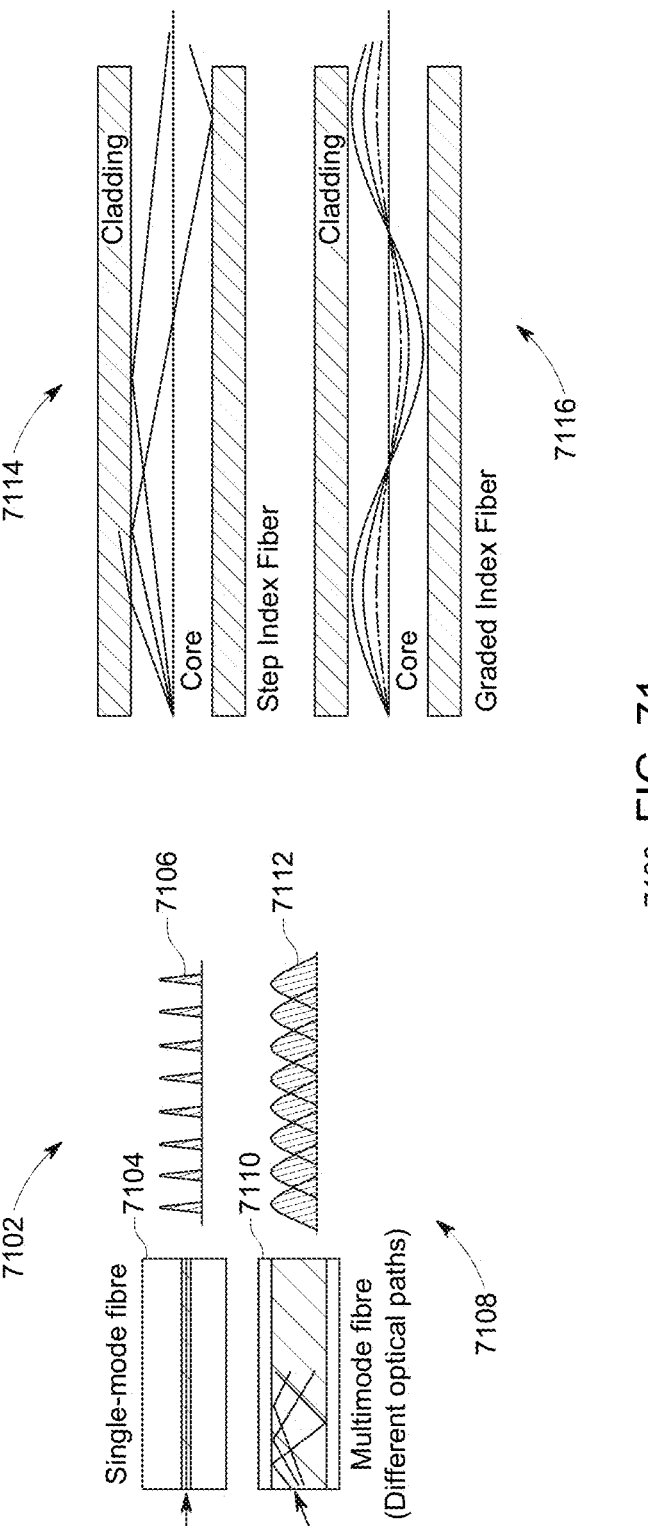
FIG. 71 depicts a schematic of a different fiber types for a free space optical transceiver system for a free-space communications system.

FIG. 71 depicts a schematic 7100 of a different fiber types for a free space optical transceiver system 6804 for a free-space communications system 6802. FIG. 72 depicts a graph 7200 of relationship between the length of a fiber in kilometers and dispersion in picoseconds. The features of FIGS. 71 and 72 may apply or use any feature of FIGS. 35A-59 and 60-76.

In some cases, single mode fiber 7102 may be used for outbound fiber, but up to a certain limit of distance. For instance, with an ASE-type optical source (e.g., a SLED) with data modulation, fiber loss may not be a problem, but dispersion and potential nonlinearity in the fiber may limit a usable distance the fiber can run to/from the remote optical head. For dispersion, a typical value may be D=+17 ps/nm-km for single mode fiber. To calculate the pulse broadening due to dispersion, the following equation may be used.

$$DT(L)=D \cdot BW \cdot L \qquad \text{Equation:}$$

In the above equation, D is a dispersion coefficient of fiber (in picoseconds per nanometer-kilometer), BW is a spectral bandwidth at full width at half maximum, L is a length of the fiber. For an amplified SLED, BW may be 20 nm. See FIG.

72 for a function 7204 graphing DT (L) for the above parameters. The function 7204 (of FIG. 72) indicates an amount of dispersion (in ps) for a given length of SM fiber for an ASC-type optical source. The function 7204, however, does not indicate how much dispersion the system should be able to handle. For a 1 GbE system, the system may provide data bits with a data period around 800 ps long. Generally, the dispersive time broadening should be less than 10% (or 5%, 20%, 30%, and the like) of a data period in order to avoid distorting the waveform too much. Thus, the time broadening for a 1 GbE system should be less than 80 ps (see, e.g., the dispersion limit line 7206 of FIG. 72). In this case, outbound fiber of the system could be single mode fiber up to ~238 meters long (see length limit line 7208 of FIG. 72), before dispersion distorts the transmitted waveform too much. For a 1 GbE system, 238 meters is reasonable dispersive limit. However, for a 10 GbE system, the limit would be 23.8 meters, assuming all other factors being the same. Moreover, for a NRZ modulated system, a peak power may not be higher than a CW system so there should not be any nonlinear limits. However, for a femtosecond laser system, a femtosecond laser system may not be transmitted through any single mode fiber because the high peak power would overdrive the soliton fission process, and the signals would be degraded, so this scheme may only work for the ASE source system. Thus, for the outbound beam of light, a single mode fiber may be a suitable option. Moreover, it may be desirable to use single mode fiber for the outbound fiber. For instance, in order to be able to launch a nearly diffraction-limited beam at the transmitter optic, a single mode fiber (as compared to a multi-mode fiber) may be required.

Furthermore, in the case of an ASE-type source with OOK NRZ modulation at 1.25 to 12.5 GHz modulation speeds corresponding to 1 GbE and 10 GbE, respectively, there would be no modal dispersion from the SMF, however dispersion is typically +17 ps/nm-km. Compared to a normal fiber optic communications link with 12.5 GHz modulation bandwidth, this system may be limited in fiber length from much higher dispersive effects because the system uses a full 20 nm bandwidth of the amplifier gain spectrum in order to ensure a relatively short coherence length to avoid coherent beam interference and coherent beam scintillation may be reduced.

In some cases, this dispersion may be eliminated by the use of hollow-core (air-core), holey fiber or photonic crystal fiber with hollow core. However, it must be single-mode air core fiber or else there will be modal dispersion, which is not desirable on the outbound signal. Such fibers are currently available but may be cost-prohibitive for now. In some cases, this dispersion may also be compensated by including a DCF 7020 (dispersion compensation fiber) in between the outbound fiber and the remote optical head. Because the system may be linear, the DCF 7020 can be used to compensate the chromatic dispersion in just the transmitter, or it can also be used to compensate the chromatic dispersion of the inbound fiber (e.g., multi-mode fiber). DCF 7020 are available with dispersion that is opposite to that of ordinary SMF. For example, a system with fifty meters of SMF and fifty meters of MMF return fiber (one hundred meters total length) may have dispersion broadening of 1700 ps that could be cancelled by including four hundred and seventy five meters (1700/4) of DCF 7020 in series with the SMF. In such cases, the DCF 7020 may compensate for dispersion for the transmit side, and, in some cases, pre-compensate for dispersion on the receiver side. However, DCF 7020 may be a design constraint due to cost. Thus, limits on lengths, DCF 7020, or other compensation schemes, require tradeoffs. In some cases, higher dispersion fibers may be used to allow for shorter dispersion compensating segments.

In some case for the inbound fiber, the system may have the same dispersion issue as in the outbound fiber. To maintain a 10% dispersion ratio (or other ratio such as less than 20%, 30%, and the like), the system would have to cut the length limit in two. For instance for: (1) a 1 GbE system, 119 meters for SMF; and (2) for 10 GbE system, 11.9 meters for SMF.

However, there may be large losses inputting incoming beams of light into a single mode fiber. For instance, due to atmospheric distortions, the incoming beam of light will not all enter the core of a single mode fiber, thus being lost to fiber cladding modes and not delivered to the detector. Instead, a solution may be multi-mode fiber 7108. In this manner, multi-mode fiber for the inbound path may maximize the received signal (via fiber). However, multi-mode fiber has modal dispersion. In particular, the problem is that in multi-mode fiber, although it is a lot easier to put light into the core, the core supports propagation of many modes (compare SMF tracing 7104 to MMF tracing 7110) that travel at different speeds, taking different paths through the optical fiber. Thus, generating pulse spreading 7112 due to modal dispersion, as compared to single mode fiber with zero modal dispersion 7106.

While multi-mode fiber may be used for the inbound fiber, it is desirable to minimize the modal the dispersion (e.g., to maintain dispersion limit or power loss). For instance, step-index fiber 7114 or graded-index fiber 7116 (both multi-mode fibers) may be used to compensate for the modal dispersion. Graded-index fiber 7116 may be preferred to step-index fiber 7114, subject to design constraints. For instance, graded-index fibers have an upside-down parabolically graded index core that limits the possible ray paths inside the fiber core, reducing the modal dispersion significantly compared to step-index fiber.

For instance, the bandwidth of a MMF is typically specified as MHz-km units. For a 1 GbE system at 1550 nm (e.g., of optical source+amplifier), the system may support a returning signal with about 10% pulse broadening due to modal dispersion at one hundred meters of length. However, there are types of MMF available with much higher data rates with up to 4700 MHz-km modal dispersion. The design constraints (length, cost, and the like) may inform selection of a MMF that is sufficient (e.g., dispersion is acceptable and length reached) in view of cost per length of MMF. For instance, GRIN MMFs are available at up to 28,000 MHz-km modal dispersion profile, with 50 micron core size. However, this may not make sense unless the length or data rate is a design requirement.

FIG. 72 depicts a graph 7200 which illustrates the relationship between the length of a fiber (e.g., SMF) in kilometers (L km) 7206 and the dispersion in picoseconds (ps) 7202. The graph 7200 presents a function 7204 that maps the increase in dispersion as the length of the single-mode fiber extends. A dispersion limit line 7208 is also shown, indicating a threshold value at a specific fiber length, marked by a data point 7208. This threshold value represents the point where the dispersion broadening of the signal in the fiber optic system becomes less than 80 ps for a 1 GbE system to avoid distorting the waveform of the signal. The function 7204 in the graph 7200 demonstrates the challenge of managing chromatic dispersion within acceptable limits over increasing fiber lengths for optical communication systems.

In some operational variations of the optical communication system 6802, the system may provide a combination of convenience and performance advantages by using optical fiber-coupled remote heads. This configuration allows for the efficient transmission and reception of optical signals over long distances while minimizing the impact of chromatic dispersion. However, as the length of the single-mode fiber increases, the dispersion of the optical signal also increases, which can lead to signal distortion and degradation. Therefore, managing chromatic dispersion within acceptable limits is a challenge that the optical communication system 6802 is designed to address.

FIG. 73 depicts a flowchart 7300 of a free space optical transceiver system 6804 for free-space communications. The features of FIG. 73 may apply or use any feature of FIGS. 35A-59 and 60-76. The flowchart 7300 may be start at block 7302, by transmitting, from a customer system, outbound customer data to a network interface card.

At block 7304, the network interface card may manage/route data between the optical signal generator, the detector, and the customer system using inbound/outbound fibers to remote optical head. In this case, the network interface card may route the outbound customer data to the optical signal generator.

At block 7306, the optical signal generator may generate an outbound beam of light based on the outbound customer data. The optical signal generator may transmit the outbound beam of light to the outbound fiber.

At block 7308, the outbound fiber may transmit the outbound beam of light to remote optical head. The remote optical head may receive the outbound beam of light.

At block 7310, the remote optical head transmit the outbound beam of light, e.g., to a distant transceiver.

Separately or in parallel to block 7302 to block 7310, at block 7312, the remote optical head may receive an inbound beam of light e.g., from the distant transceiver. The remote optical head may transmit the inbound beam of light to the inbound fiber.

At block 7314, the inbound fiber may transmit the inbound beam of light to a detector. The detector may receive the inbound beam of light.

At block 7316, the detector may convert the inbound beam of light to inbound customer data. The detector may transmit the inbound customer data to the network interface.

At block 7318, the network interface card may manage/route data between the optical signal generator, the detector, and the customer system using inbound/outbound fibers to remote optical head. In this case, the network interface card may route the inbound customer data to the customer system.

At block 7320, the network interface card may transmit, to the customer system, the inbound customer data.

In some case, an optical communication system for optically transmitting data through a variably refractive medium may include: a data interface, a remote optical head, and a detector system.

In some case, the data interface may include at least an optical signal generator. The optical signal generator may include: an optical source, a modulator, and amplifier. The optical source may be configured to generate a beam of light. The optical source may include a waveguide that amplifies emitted light. a modulator. The modulator may be configured to encode data on the beam of light to form an encoded beam of light. The amplifier may be configured to receive the encoded beam of light from the modulator and both amplify and filter the encoded beam of light to produce an amplified beam of light.

The remote optical head may be configured to transmit the amplified beam of light through a variably refractive medium. The remote optical head may be configured to receive an inbound beam of light.

The detector system may include: one or more detectors, a routing system, and a connection between the remote optical head and the data interface. The routing system may include optical components and/or fiber components. The routing system may be configured to transmit the inbound beam of light to a first set of detectors of the one or more detectors.

The connection may include a first fiber connecting the remote optical head and the optical signal generator. In some cases, the detector system may be a part of the remote optical head. In such cases, the connection may include an electrical/data connection between the data interface and the detector system in the remote optical head.

In some cases, the detector system may be a part of the data interface. In such cases, the connection may include a second fiber between the detector system in the data interface and the remote optical head. In such cases, the remote optical head may be a passive optical system. In some cases, the connection may include an electrical/data connection to control or provide data to a pointing and tracking system that controls an orientation of the remote optical head.

In some cases, the first fiber may be a first type of fiber and the second fiber may be a second type of fiber. In some cases, the first type of fiber may be a single mode fiber. In some cases, the second type of fiber may be a multi-mode fiber. In some cases, the multi-mode fiber may be a step-index fiber or a graded-index fiber. In some cases, the first fiber and/or the second fiber may include, in series between the remote optical head and the data interface, a dispersion compensation fiber.

In some cases, the first fiber and/or the second fiber are no longer than a threshold distance from the data interface to the remote optical head. The threshold distance may be based on a dispersion limit for a configuration of the optical communication system. In some cases, the dispersion limit, in a 1 GbE system, may be around 80 picoseconds and the threshold distance may be around 100 meters. In some cases, the dispersion limit, in a 10 GbE system, is around 8 picoseconds and the threshold distance may be around 10 meters. Generally, as the data rate increases, the dispersion limit may decrease. In some cases, the dispersion limit and the threshold distance are based on a dispersion coefficient and a spectral bandwidth. In some cases, the dispersion coefficient may be based on a type of fiber for the first fiber and the second fiber, respectively. In some cases, the spectral bandwidth may be at least 10 nanometers, at least 20 nanometers, at least 30 nanometers, at least 40 nanometers, or any range between 10 nanometers and 40 nanometers. In some cases, the spectral bandwidth may be designed to have a coherence length to avoid coherent beam interference and coherent beam scintillation.

In some cases, the routing system may include a fiber switch and/or a fiber splitter. The fiber switch and/or a fiber splitter may be connected in series between the one or more detectors and the second fiber. The fiber switch may receive the inbound beam of light from the second fiber and may be controllable to select different detectors via one or more routing fibers butt-connected to the different detectors. The fiber splitter may receive the inbound beam of light and split the inbound beam of light into at least two channels (e.g., to respect routing fibers).

9. UPGRADE PATHS IN FREE SPACE OPTICAL SYSTEMS

FIG. 74 depicts a schematic 7400 of channel formation 7402 and a WDM transmitter 7412 (wave division multiplexing) for a free space optical transceiver system 6804 for a free-space communications system 6802. The features of FIG. 74 may apply or use any feature of FIGS. 35A-59 and 60-76.

Upgrade paths for ASE-source free-space optical systems may be required to provide increasing data bandwidths, as data transmission bandwidth demand increases. In some cases, time division multiplexing (TDM) may be feasible for the system, as TDM may require replacing existing hardware instead of system re-design. However, the faster electronics to implement TDM may be more costly. Furthermore, dispersive limitations may become severe in the case of a longer remote fiber and a high data rate. Thus, very high speed TDM scaling will be more costly if long remote fibers are required. Correspondingly, long remote fibers do not appear to be problematic for 1 GbE and slower systems.

In contrast, WDM upgrades for ASE-source free-space optical systems may be feasible and provide greater flexibility in system design/configuration. For instance, if lower WDM channel rates (e.g., 10 GbE or less) are used, then the dispersive limits of fiber to an optical head may apply to the individual channels. However, the spectral slicing of the ASE-source, to generate respective channels, will increase the coherence length of each individual channel. If channels are sliced too thinly, the coherence length of the channels may not be able to avoid coherent beam interference and coherent beam scintillation. Therefore, for a given output wavelength band of the ASE-source, there may an effective upper limit to how many channels may be used while maintaining a relatively short coherence length of the channels to avoid coherent beam interference and coherent beam scintillation. After spectral splitting into individual wavelength channels, each channel must have enough spectral bandwidth to support coherence lengths that are at least ten times shorter than the path length spreads in the beam due to atmospheric propagation.

For instance, based on a 50 nm output wavelength band of the ASE-source, the system could support 2, 3, 4, or 5 channels. To scale data bandwidth, each of the channels may be separately modulated at the same or different data rates. For instance, the data rates may be at least 1 Gbps, at least 2 Gbps, at least 3 Gbps, at least 4 Gbps, at least 5 Gbps, at least 6 Gbps, 7 Gbps, at least 8 Gbps, at least 9 Gbps, at least 10 Gbps, 12.5 Gbps, and so on (subject to fiber length/dispersion limits). The system data bandwidth may be a summation of such data rates. Thus, for instance, a system that has 4 channels, each at 3 Gbps, may support a 10 GbE data connection, while also providing relatively longer fiber lengths than higher data rates (for a given dispersion upper limit).

The channel formation 7402 may include a splitter 7406 that receives an input beam 7404 (e.g., from ASE-source on transmitter side, or a telescope on receiver side) and splits the input beam 7404 into at least two channels. In this case, two channels—a first channel 7408 and a second channel 7410. The splitter 7406 may generate the first channel 7408 by applying a first filter 7409 to the input beam 7404, and generate the second channel 7410 by applying a second filter 7407 to the input beam 7404. For instance, the splitter 7406 may be a c-band single mode fiber splitter, where the first filter 7409 may be a first type of thin film coated bulk element and the second filter 7407 may be a second type of thin film coated bulk element.

The WDM transmitter 7412 may include an optical source 7414, a splitter 7416, at least two modulators (e.g., a first modulator 7418 and a second modulator 7422), a combiner 7424, an amplifier 7426, (optionally) a fiber 7428, and a telescope 7430 that transmits an outbound beam of light 7434.

The optical source 7414 (e.g. an ASE-source, such as a SLED) may output a beam of light to the splitter 7416. The splitter 7416 (e.g., a C-band SMF splitter) may split the beam of light into at least two channels. The at least two channels may include a first channel 7418A and second channel 7422A. The splitter 7416 may transmit, via routing fibers or optics, the at least two channels to the at least two modulators. The at least two modulators may, respectively, receive the at least two channels. For instance, the first modulator 7418 may receive the first channel 7418A and the second modulator 7422 may receive the second channel 7422A. Each of the at least two modulators may modulate their respective channel at an assigned data rate (e.g., 1.25 Gbps and 12.5 Gbps) in accordance with respective data signals (e.g., from a network interface card). Each of the at least two modulators may output a modulated channel. The output a modulated channels may include a first modulated channel 7418B and a second modulated channel 7422B. Each of the at least two modulators may output a modulated channel to the combiner 7424.

The combiner 7424 may receive modulated channels from the at least two modulators. For instance, the combiner 7424 may receive the first modulated channel 7418B and the second modulated channel 7422B, combine them into a combined beam of light, and transmit the combined beam of light to the amplifier 7426. The combiner 7424 may be a WDM combiner such as a fused biconical taper (FBT) combiner, planar light wave circuit combiner, or a fiber coupler.

The amplifier 7426 (e.g., EDFA) may receive the combined beam of light and filter/amplify the combined beam of light to generate an amplified beam of light. The amplifier 7426 may transmit the amplified beam of light to the telescope 7430 (either directly via optics or via fiber 7428 to a telescope of a remote optical head). The telescope 7430 may transmit the amplified beam of light to a distant receiver.

FIG. 75 depicts a schematic 7500 of a WDM receiver 7502 for a free space optical transceiver system 6804 for a free-space communications system 6802. The features of FIG. 75 may apply or use any feature of FIGS. 35A-59 and 60-76. The WDM receiver 7502 may include a telescope 7506, (optionally) a fiber 7508, a splitter 7510, and at least two detectors.

The telescope 7506 (e.g., of remote optical head) may collect an inbound beam of light 7504 and transmit the inbound beam of light to the splitter 7510. The telescope 7506 may transmit the inbound beam of light 7504 directly via optics or indirectly via the fiber 7508. The fiber 7508 may be multi-mode fiber, such as graded-index fiber. The fiber 7508 may be relatively short (e.g., for beam collection and routing) or relatively long (e.g., from remote head).

The splitter 7510 may receive the inbound beam of light from the telescope 7506 or the fiber 7508. The splitter 7510 may split the inbound beam of light into at least two channels. The at least two channels may include a first channel 7512 and a second channel 7514. The splitter 7510 may transmit (via routing fibers or optics) the at least two channels to respective detectors of the at least two detectors (e.g., a first detector 7516 and a second detector 7518). In some cases, the splitter 7510 may be different than the splitter 7416, as the splitter 7510 may be a multi-mode fiber C-band splitter instead of a single mode fiber splitter. In some cases, an optical amplifier 7509 may be inserted before the splitter 7510.

The at least two detectors may, respectively, receive the at least two channels, and convert the at least two channels into data signals. For instance, a first detector 7516 may convert the first channel 7512 into a first data signal 7520, and a second detector 7518 may convert the second channel 7514 into second data signal 7522. Each of the at least two detectors may be the same or different, signal detectors, or multi-detector systems, such as the multi-detector system 6002.

In some cases, a switch (e.g., the fiber switch 6608) and/or an attenuator (e.g., the variable fiber attenuator 6606) may be inserted between the splitter 7510 and each of the at least two detectors, such that each routing fiber may be attenuated (e.g., to protect an active detector in case of overheating/ power) and/or to switch signal detectors, in the case of multi-detector configurations.

In some cases, the two channels may have different data rates, such as 1 GbE and 10 GbE. The at least two detectors may be selected (during design) or dynamically switched (in a multi-detector design) to match a corresponding data rate.

FIG. 76 depicts a flowchart 7600 of a free space optical transceiver system 6804 for free-space communications using WDM. The features of FIG. 76 may apply or use any feature of FIGS. FIGS. 35A-59 and 60-76. The flowchart 7600 may be start at block 7602, by transmitting, from a customer system, outbound customer data to a network interface card.

At block 7604, the network interface card may manage/ route data between the optical signal generator, the detector, and the customer system. In this case, the network interface card may route the outbound customer data to the optical signal generator (e.g., a plurality of modulators).

At block 7606, an optical source may generate an outbound beam of light. The optical source may transmit the outbound beam of light to an outbound splitter.

At block 7608, the outbound splitter may split the outbound beam of light into a plurality of outbound beams. The outbound splitter may transmit the plurality of outbound beams to respective modulators of the plurality of modulators.

At block 7610, the plurality of modulators may modulate the plurality of outbound beams thereby generating modulated outbound beams of light based on outbound customer data. The plurality of modulators may transmit, respectively, the modulated outbound beams of light to a combiner.

At block 7612, the combiner may combine the modulated outbound beams of light into combined beam of light. The combiner may transmit the combined beam of light to a telescope, such as via optical pathways or fiber. At block 7614, the telescope may transmit the combined beam of light.

Separately or in parallel to block 7602 to block 7614, at block 7616, the telescope may receive an inbound beam of light. The telescope may transmit the inbound beam of light to an inbound splitter, such as via optical pathways or fiber.

At block 7618, the inbound splitter may split the inbound beam of light into a plurality of beams. The inbound splitter may transmit, respectively, the plurality of beams to a plurality of detectors.

At block 7620, the plurality of detectors may convert the plurality of inbound beams to analog signals/data. The plurality of detectors may transmit the analog signals/data to the network interface card.

At block 7622, the network interface card may manage/route data between the optical signal generator, the detector, and the customer system. In this case, the network interface card may route the inbound customer data (based on the analog signals/data) to the customer system. At block 7624, the network interface card may transmit the inbound customer data to the customer system.

In some cases, an optical communication system for optically transmitting data through a variably refractive medium may include: an optical signal generator, a telescope, and a detector system.

The optical signal generator may include: an optical source, a splitter, at least two modulators, a combiner, and an amplifier. The optical source may be configured to generate a beam of light. The optical source may include a waveguide that amplifies emitted light. The splitter may be configured to receive the beam of light and generate at least two channels. The at least two modulators may be configured to receive the at least two channels and encode data on the at least two channels to form at least two modulated channels. The combiner may be configured to combine the at least two modulated channels to form a combined beam of light. The amplifier may be configured to receive the combined beam of light from the combiner and both amplify and filter the combined beam of light to produce an amplified beam of light The telescope may be configured to transmit the amplified beam of light through a variably refractive medium. The telescope may be configured to receive an inbound beam of light.

The detector system may include: a plurality of detectors; and a routing system. The routing system may include optical components and/or fiber components. The routing system may transmit the inbound beam of light to a first set of detectors of the plurality of detectors.

In some cases, each of the at least two channels may have a spectral bandwidth may be at least 10 nanometers, at least 20 nanometers, at least 30 nanometers, at least 40 nanometers, or any range between 10 nanometers and 40 nanometers. In some cases, the spectral bandwidth is designed to have a coherence length to avoid coherent beam interference and coherent beam scintillation.

In some cases, the at least two modulators include a first modulator and a second modulator. The at least two channels may include a first channel and a second channel. The first modulator may be configured to encode the data on the first channel, and the second modulator may be configured to encode the data on the second channel. In some cases, the first modulator and the second modulator have a same data rate. In some cases, the first modulator and the second modulator have different data rates.

In some cases, the splitter may be a c-band single mode fiber splitter.

In some cases, the telescope may be located in a remote optical head. In some cases, the system may further include a first fiber connecting the amplifier and the telescope.

In some cases, the splitter of the optical signal generator may be a first splitter, the at least two channels are a first set of at least two channels, and the routing system includes at least a second splitter. The second splitter may be configured to receive the inbound beam of light and generate a second set of at least two channels.

In some cases, the routing system may include at least two routing fibers between the second splitter and the plurality of detectors. The second set of at least two channels are respectively routed to different detectors using the at least two routing fibers. In some cases, the routing system may include, for a first channel of the second set of at least two channels, a fiber switch between the second splitter and at least two detectors. The fiber switch may select and route the first channel to a first detector or a second detector of the at least two detectors. In some cases, the routing system may include a fiber attenuator before the fiber switch. The fiber attenuator may be controllable to block or not block the first channel to the first detector or the second detector. In some cases, the second splitter may be a c-band multi-mode fiber splitter.

In some cases, the telescope may be located in a remote optical head. The optical signal generator and the detector system may be located in a data interface, and the optical communication system includes a first fiber connecting the amplifier and the telescope and a second fiber connecting the telescope and the detector system.

In some cases, the first fiber may be single-mode fiber and the second fiber may be multi-mode fiber.

In some cases, the data interface may be located at a first location inside a customer building. The remote optical head may be located at a second location outside the customer building.

In some cases, the data interface may connect to a customer system at the first location. The data interface may connect to the customer system to (1) relay outbound customer data via the optical signal generator, the first fiber, and the telescope, and (2) relay inbound customer data via the telescope, the second fiber, and the detector system.

In some cases, the data interface may include a network interface card. The network interface card may be configured to (1) route the inbound customer data from the detector system to the customer system, and (2) route the outbound customer data from the customer system to the optical signal generator.

In some cases, the first location may be less than a threshold distance from the second location. For instance, the first fiber and the second fiber may be no longer than the threshold distance. The threshold distance may be based on a dispersion limit of the optical communication system. The dispersion limit may be based on a dispersion coefficient and a spectral bandwidth.

10. RADIO SIGNAL TRANSMISSION IN FREE SPACE OPTICAL SYSTEMS

The transmission of bit-encoded analog/radio signals over free space optical (FSO) links offers several significant advantages over traditional radio frequency (RF) communication methods. FSO systems may provide higher bandwidth capacity, allowing for increased data transmission rates compared to conventional RF systems. The use of optical frequencies may also offer improved spectral efficiency, potentially enabling more information to be transmitted within a given bandwidth.

In some aspects, FSO systems may provide enhanced security due to the highly directional nature of laser beams, making interception more challenging compared to omnidirectional RF transmissions. FSO links may also be less susceptible to electromagnetic interference and may not require frequency licensing, potentially simplifying regulatory compliance in some jurisdictions.

The integration of bit-encoded analog/radio signals with FSO technology may allow for the advantages of both optical and RF communication to be leveraged. By encoding analog or radio signals into digital bits for optical transmission, the system may benefit from the robustness of digital communication while maintaining the flexibility and compatibility of analog/radio systems at the endpoints.

In some implementations, this hybrid approach may enable long-distance transmission of RF signals using optical means, potentially overcoming limitations of traditional RF propagation such as signal attenuation over distance. The ability to regenerate the RF signal at the receiving end may allow for the creation of RF relays or extenders using FSO as an intermediate step, potentially expanding the reach and coverage of existing RF networks.

Furthermore, the use of bit-encoding techniques in combination with FSO may provide additional opportunities for signal processing, error correction, and adaptive modulation schemes. This may enhance the overall reliability and performance of the communication system, particularly in challenging atmospheric conditions that can affect both optical and RF transmissions.

FIGS. 77-88 depict various embodiments for transmitting radio signals using various free space optical (FSO) systems. In some cases, the FSO systems may use any, combinations of, or parts of the technology disclosed with respect to FIGS. 1-76 (e.g., USPL sources, short coherence length systems, SLED+EDFA systems, gain-flattened amplifier systems, temperature control source systems, impulsive coding systems, multi-detector systems, fiber-routed systems, and/or WDM systems, as discussed herein). In some cases, continuous wave sources or mode-locked lasers may be used as part of the FSO system, if an arrangement with appropriate environmental, cost, or design constraints would allow acceptable signal quality over the FSO link. In some cases, the transmitted FSO beam/pulses of light may or may not have a short coherence length, so as to avoid coherent interference, if an arrangement with appropriate environmental, cost, or design constraints would allow acceptable signal quality over the FSO link.

In certain cases, the systems and methods of the present disclosure may connect different nodes of a radio frequency communication system (e.g., radio frequency signal captured on one end, converted to bits for transmission, transmitted using FSO system, received, corrected, and re-transmitted as a radio frequency signal). In some cases, the FSO system may receive data (e.g., from a local network (e.g., an enterprise network) or from a wide-area network (e.g., fiber-optical backbone)), and transmit the data to a radio frequency network using FSO systems (e.g., as a node of the radio frequency network for transmitting radio frequency signals). In some cases, the FSO system may receive radio frequency signals from the radio frequency network, perform operations as discussed herein, and transmit resulting data to the local or wide-area network as digital data (e.g., over ethernet or fiber optics). Thus, the systems and methods disclosed herein may be used as an ingress/egress point between ethernet/fiber networks and radio frequency networks, or as a connection between different nodes of radio frequency networks.

Figure 77:
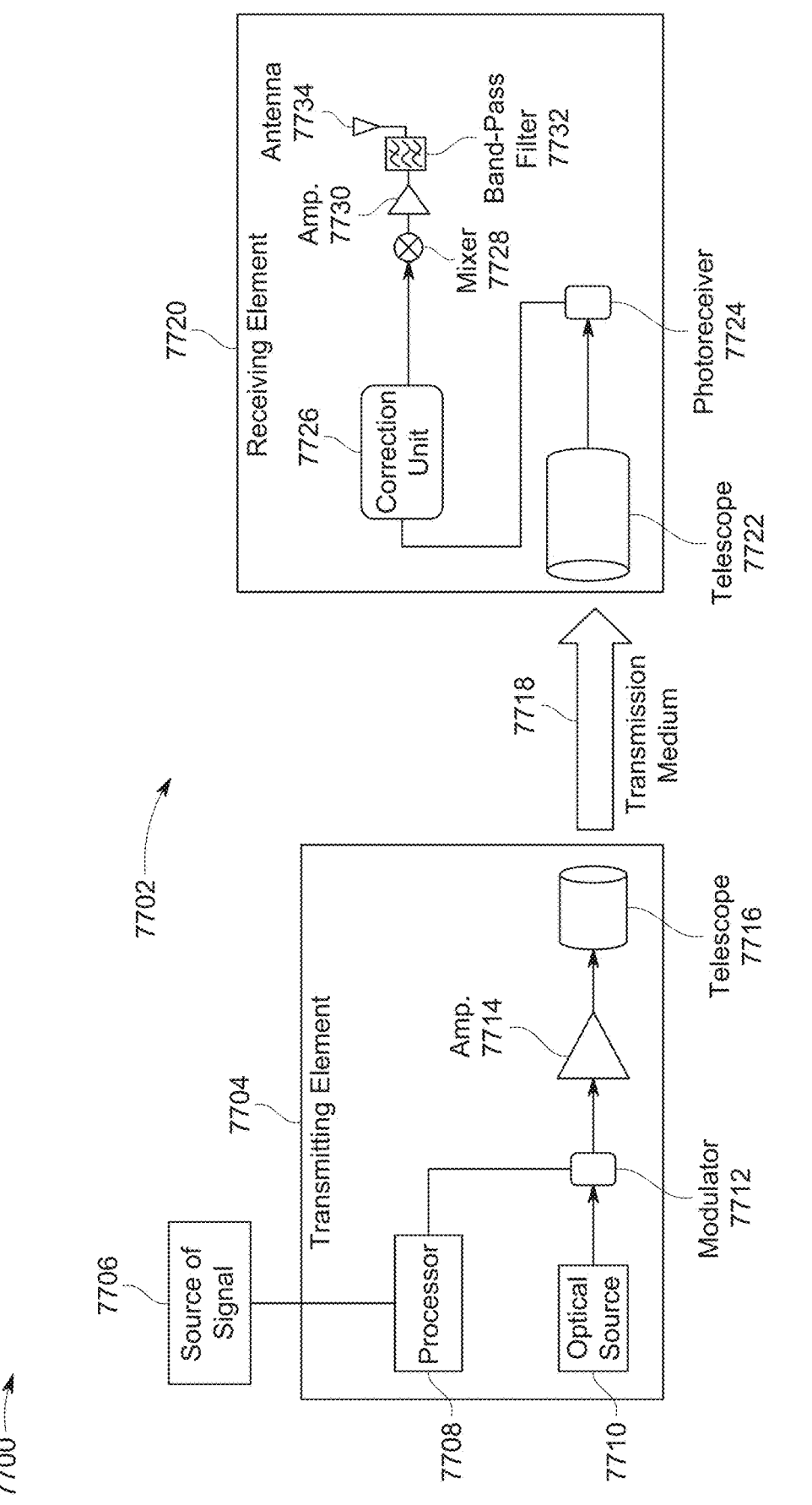
FIG. 77 depicts a block diagram of a free-space optical communication system for radio frequency signal transmission.

10.a. Time Multiplexing Bit Encoding Radio Signals for Free Space Optical Systems FIG. 77 illustrates a schematic 7700 of a free space optical communication system 7702. The system may comprise a transmitting element 7704 and a receiving element 7720 connected via a transmission medium 7718.

The transmitting element 7704 may include a processor 7708 that receives a signal from a signal source 7706. In some aspects, the signal source 7706 may provide or generate an analog radio signal or a baseband signal. In some aspects, the processor 7708 may be configured to separate the input signal into an in-phase component and a quadrature component, generate at least two signals based on these components, quadrature-modulate the signals, and combine them in a time-division manner. In some aspects, the time-division combined signal is a bit.

The processor 7708 may be connected to an optical source 7710, which may be configured to generate a beam of light. In some implementations, the optical source 7710 may be a superluminescent diode (SLED) that emits light with a coherence length less than 400 microns.

The output from the processor 7708 and the optical source 7710 may feed into a modulator 7712. The modulator 7712 may be configured to receive the time-division combined signal from the processor 7708 and the beam of light from the optical source 7710, and modulate the beam of light based on the time-division combined signal to form a modulated beam of light. In some aspects, the modulator 7712 may be a Mach-Zehnder modulator and may be configured to encode the transmission data into a series of light pulses using on-off keying.

The output of the modulator 7712 may be amplified by an amplifier 7714 before being directed to a telescope 7716 for transmission. The amplifier 7714 may be a fiber amplifier comprising at least a core and cladding surrounding the core. In some implementations, the cladding may comprise a transition metal ion compound, such as Erbium, Ytterbium, Neodymium, or Terbium. The core of the fiber amplifier may be configured to receive the modulated beam of light from the modulator 7712 and both amplify and filter the modulated beam of light to produce an amplified beam of light.

The transmission medium 7718 may carry the amplified beam of light from the transmitting element 7704 to the receiving element 7720. The transmission medium 7718 may be a variably refractive medium, such as the atmosphere, through which the optical signal propagates.

On the receiving end, a telescope 7722 may capture the transmitted signal and direct it to a photoreceiver 7724. The photoreceiver 7724 may be configured to extract a time-division combined signal from the amplified beam of light after it has been transmitted through the transmission medium 7718.

The output of the photoreceiver 7724 may be processed by a correction unit 7726. The correction unit 7726 may be configured to correct distortion in the time-division combined signal created during transmission of the amplified beam of light through the variably refractive medium. In some aspects, the correction unit 7726 may use threshold detection to correct the distortion. Additionally, or alternatively, the correction unit 7726 may perform re-timing and jitter reduction to produce a corrected signal.

The receiving element 7720 may also include a signal processing chain including, but not limited to, a mixer 7728, an amplifier 7730, and a band-pass filter 7732. The mixer 7728 may be configured to receive the corrected signal from the correction unit 7726 and multiply it by a signal having a predetermined frequency to produce a multiplied signal. The amplifier 7730 may then amplify the multiplied signal to produce an amplified multiplied signal.

The band-pass filter 7732 may be configured to generate a radio signal by removing a frequency component contained in a predetermined frequency band from the amplified multiplied signal. The processed signal may then be sent to an antenna 7734 for further transmission or use. For example, the antenna 7734 may be configured to re-transmit the regenerated RF analog signal.

In some embodiments, optical communication distance may be at least 0.5 miles, at least 1 mile, at least 2 miles, at least 3 miles, at least 5 miles, at least 7 miles, at least 10 miles, or at least 20 miles. In some embodiments, systems described herein may transmit data over an optical communication distance of at least one mile and have a measured bit error rate of less than one in one million, less than one in one billion, less than one in one trillion, or less than one in one quadrillion over a measurement period of at least sixty seconds.

In some cases, the transmitting end and/or the receiving end may include pointing, acquisition, and tracking (PAT) systems. The PAT systems may monitor signal quality and/or alignment (e.g., by sampling, at least a portion of, incoming beams/light pulses for relative angle, movement, and the like), and modify a relative location/orientation of the transmitting end and/or the receiving end to ensure better signal quality between the transmitting end and/or the receiving end. In some cases, the transmitting end and/or the receiving end, as a part of the PAT systems, may include fast steering mirrors and the like.

The free space optical communication system 7702 may enable efficient and reliable transmission of data through variably refractive mediums, such as the atmosphere. The free space optical communication system 7702 may be particularly useful for transmitting radio frequency signals over free space. In some implementations, the signal input into the processor 7708 may be an RF analog signal. The processor 7708 may then process this RF analog signal. For example, in some aspects and as will be described in reference to FIGS. 78 and 79, the RF analog signal may be processed by separating it into in-phase and quadrature components, generating multiple signals based on these components, and combining them using time-division multiplexing techniques. This processed signal is then used to modulate the optical beam. On the receiving end, after the optical signal is captured and processed to extract the original information, the system may be capable of regenerating the RF analog signal. The antenna 7734 in the receiving element 7720 may be configured to re-transmit this regenerated RF analog signal. This capability may allow the system to function as a long-distance RF relay, using free-space optical transmission as an intermediate step. The system 7702 may thus effectively transmit RF signals over long distances using optical means, which can provide advantages in terms of bandwidth and interference resistance compared to traditional RF transmission methods. The ability to transmit RF signals over free space using optical means may be particularly advantageous in scenarios where traditional RF transmission is challenging due to interference, regulatory restrictions, or the need for high bandwidth.

Figure 78:
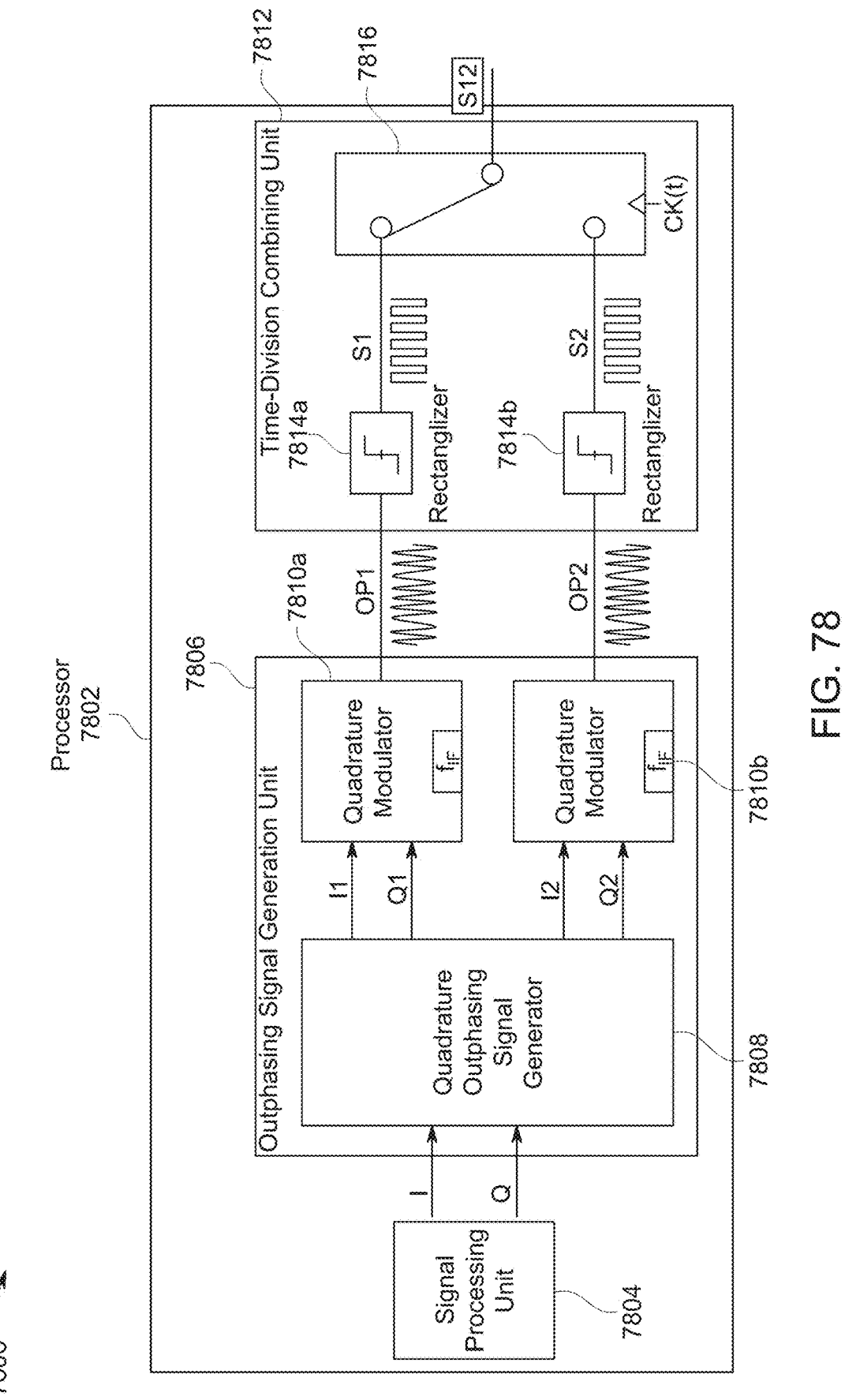
FIG. 78 depicts a block diagram of an exemplary processor for time-multiplexing in a free-space optical communication system for radio frequency signal transmission.

FIG. 78 illustrates a schematic 7800 of an exemplary processor 7802 that may be used in the free space optical communication system 7702 shown in FIG. 77 for processing the input signal received from signal source 7706. The processor 7802 may comprise a signal processing unit 7804, an outphasing signal generation unit 7806, and a time-division combining unit 7812.

The signal processing unit 7804 may receive the input signal from the signal source 7706. This unit may be configured to process the input signal and generate in-phase (I) and quadrature (Q) components of the original signal.

The outphasing signal generation unit 7806 may receive the I and Q signal components from the signal processing unit 7806. This unit 7806 may include a quadrature outphasing signal generator 7808, which may generate two pairs of signals: I1 and Q1, and I2 and Q2. These signal pairs may represent the in-phase and quadrature components of two separate outphasing signals. The I1 and Q1 signals may be fed into a first quadrature modulator 7810a, while the I2 and Q2 signals may be fed into a second quadrature modulator 7810b.

The quadrature modulators 7810a and 7810b may modulate their respective input signals to produce two outphasing signals, OP1 and OP2. The time-division combining unit 7812 may receive the amplified OP1 and OP2 signals from the quadrature modulators. This unit may contain two rectangularizers 7814a and 7814b, which may convert the sinusoidal OP1 and OP2 signals into rectangular waveform outphasing signals S1 and S2, respectively.

A switch circuit 7816, controlled by a clock signal CK(t), may determine the timing for combining the S1 and S2 signals. This switch circuit may alternate between the S1 and S2 signals at a predetermined rate, effectively time-division multiplexing the two signals. The output of this process may be the combined signal S12, which represents the time-division multiplexed version of the original input signal.

Figure 79:
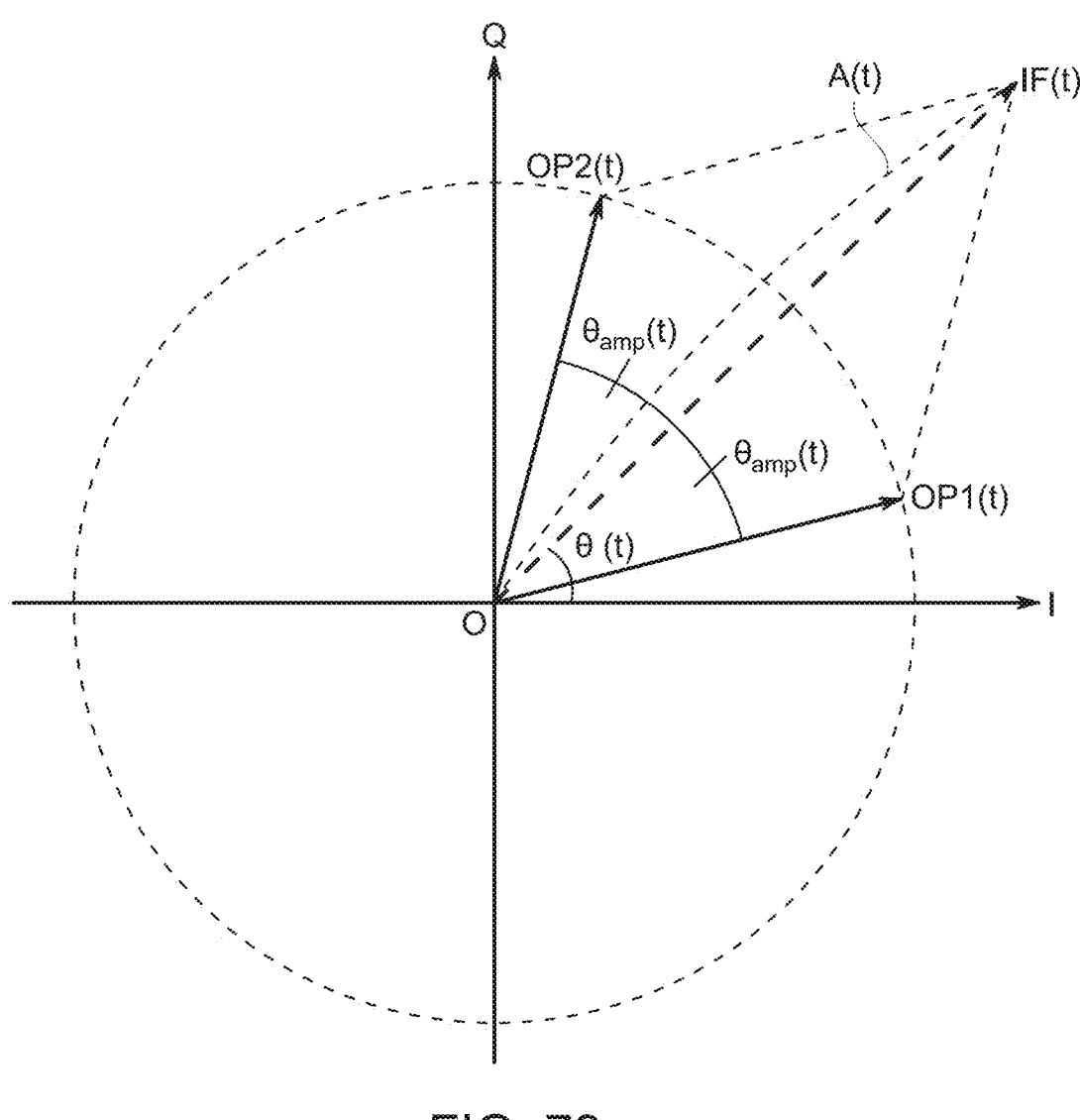
FIG. 79 depicts a vector diagram for time-multiplexing in a free-space optical communication system for analog or radio frequency signal transmission.

FIG. 79 illustrates a vector diagram representing the signal processing performed by the processor 7802 shown in FIG. 78. The diagram depicts a two-dimensional coordinate system with an I (In-phase) axis and a Q (Quadrature) axis intersecting at the origin O. This representation helps visualize the relationship between the various signals generated and processed within the system.

Figure 80:
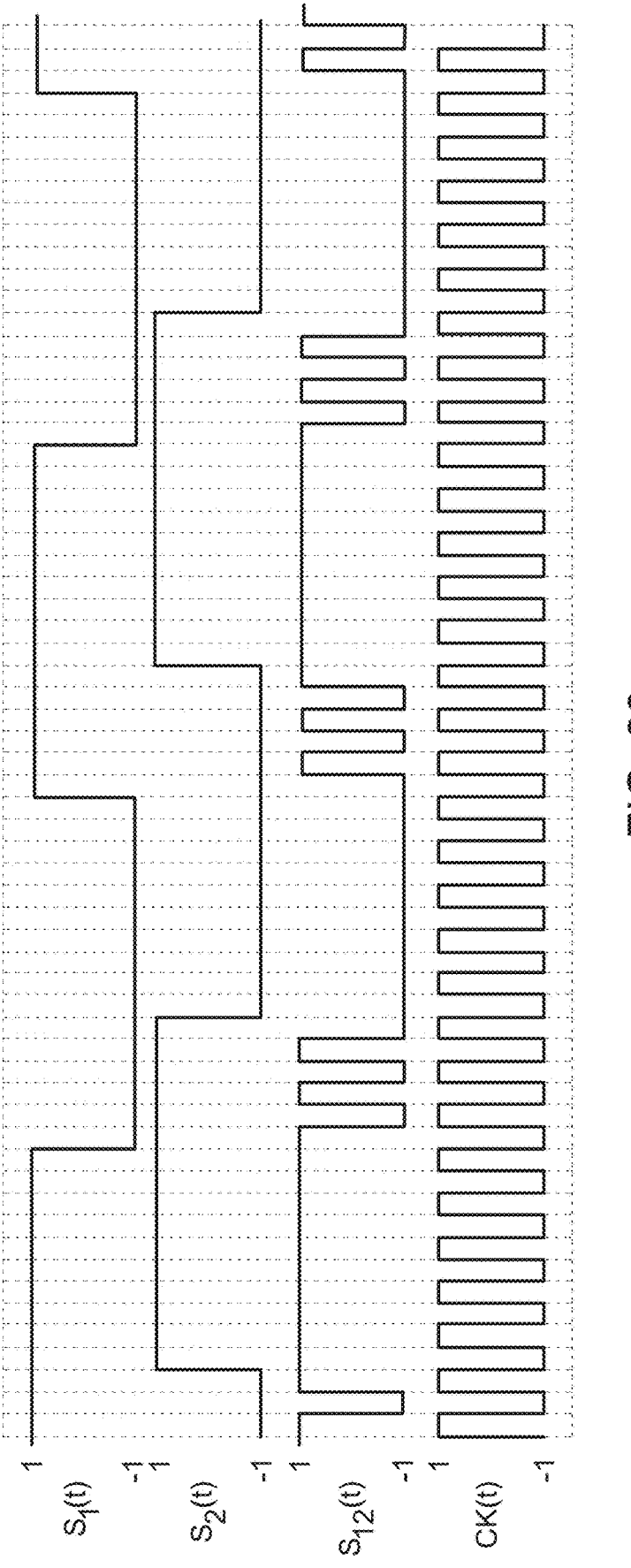
FIG. 80 shows waveforms of rectangular outphasing signals and a clock signal for time-multiplexing in a free-space optical communication system for analog or radio frequency signal transmission.

In the diagram, two output signals OP1($t$) and OP2($t$) are shown. OP1($t$) and OP2($t$) are represented as vectors and correspond to the outphasing signals generated by the quadrature modulators 7810a and 7810b in FIG. 78. A vector IF(t) represents the desired intermediate frequency signal, which is the resultant of OP1($t$) and OP2($t$). The relationship between these vectors illustrates how the outphasing technique produces a signal with both amplitude and phase modulation. The desired signal IF(t) can be expressed as a vector having a magnitude A(t) and a phase $\theta$(t). The outphasing signal OP1($t$) can be expressed as a unit vector having a phase $\theta(t)-\theta_{amp}(t)$. The outphasing signal OP2($t$) can be expressed as a unit vector having a phase $\theta(t)+\theta_{amp}(t)$. The first and second rectangularizers 7814a and 7814b acquire the outphasing signals OP1($t$) and OP2($t$), respectively, and output rectangular-waveform outphasing signals S1($t$) and S2($t$), respectively. More specifically, the rectangularizers 7814a and 7814b output signals having amplitude values of 1 when the amplitude values of the outphasing signals OP1($t$) and OP2($t$) are larger than zero, and output signals having amplitude values of −1 when the amplitude values are smaller than zero. By doing so, the rectangularizers 7814a and 7814b output rectangular-waveform outphasing signals S1($t$) and S2($t$). The rectangular-waveform signals S1($t$) and S2($t$) are digital signals having amplitude values of 1 or -1. As shown in FIGS. 78 and 80, the switch circuit 7816 outputs the rectangular-waveform outphasing signal S1($t$) when the amplitude value of the clock signal is 1, and outputs the waveform of the rectangular-waveform outphasing signal S2($t$) when the amplitude value of the clock signal is −1.

FIG. 80 illustrates the waveforms of the rectangular outphasing signals and the clock signal over time for the time-multiplexing embodiment. The graph shows four separate waveforms: S1($t$), S2($t$), S12($t$), and CK(t).

The S1($t$) and S2($t$) waveforms represent the rectangular outphasing signals that result from the rectangularizers 7814*a* and 7814*b* in FIG. 78. These signals alternate between +1 and −1 values with different timing patterns, corresponding to the phase-shifted outphasing signals OP1 and OP2.

The S12(*t*) waveform represents the combined signal derived from S1(*t*) and S2(*t*) after time-division multiplexing. This waveform shows a more complex pattern of transitions between +1 and −1 values, effectively encoding both the amplitude and phase information of the original input signal.

The CK(t) waveform represents the clock signal that controls the switch circuit 7816 in FIG. 78. This clock signal has regular transitions between +1 and −1 values at a higher frequency than the other signals, determining the rate at which the system alternates between S1(*t*) and S2(*t*) to produce S12(*t*).

The time-multiplexing technique illustrated in FIG. 80 allows the system to transmit complex modulated signals using simple binary (on-off) modulation of the optical carrier. This approach may help overcome limitations in optical modulator bandwidth and linearity, as well as non-linearity in the optical fiber amplifier, potentially enabling high-fidelity transmission of wideband RF signals over free-space optical links.

Figure 81:
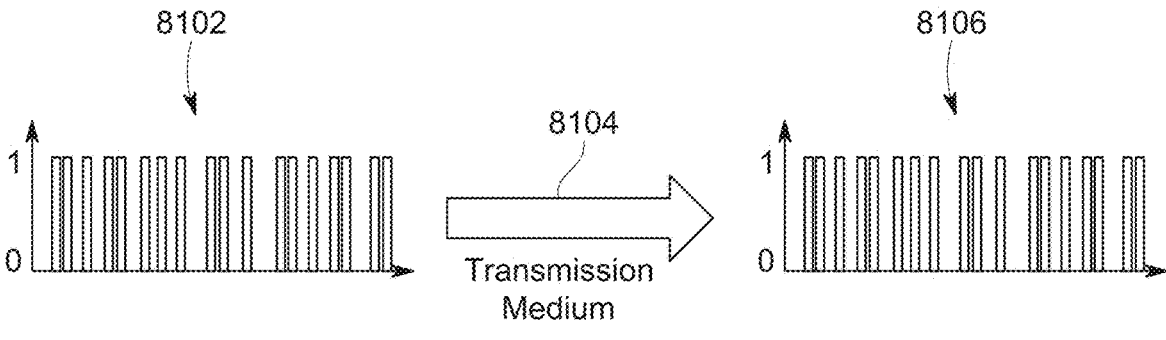
FIG. 81 illustrates signal transmission through a medium without distortions.
Figure 82:
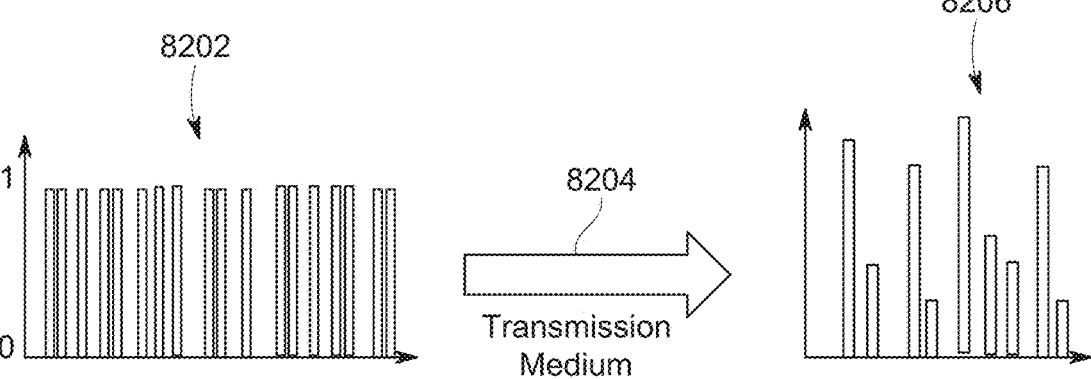
FIG. 82 illustrates signal transmission through a medium with distortions.

FIGS. 81-82 illustrate the effects of signal transmission through different mediums and the correction of distortions introduced during transmission.

FIG. 81 depicts a transmission system without distortions. The system comprises an input signal 8102, a transmission medium 8104, and an undistorted output signal 8106. The input signal 8102 may be represented by a series of vertical bars of uniform height, indicating a clean digital signal. This signal may pass through the transmission medium 8104, which could represent a fiber optic cable or another low-distortion medium. The undistorted output signal 8106 may appear identical to the input signal 8102, suggesting that the transmission medium 8104 introduces no significant distortions to the signal.

FIG. 82 shows a transmission system with distortions caused by atmospheric propagation. This system may include an input signal 8202, a transmission medium 8204, and a distorted output signal 8206. The input signal 8202 may be represented by vertical bars of uniform height, similar to the input signal in FIG. 81. However, after passing through the transmission medium 8204, which represents atmospheric conditions, the distorted output signal 8206 may show significant variations relative to the input signal 8202. This variation may indicate that the atmospheric propagation introduces distortions to the signal, affecting its amplitude and/or timing.

FIGS. 81 and 82 demonstrate the different effects that transmission mediums can have on signal integrity. While the medium in FIG. 81 may preserve the signal characteristics, the atmospheric propagation in FIG. 82 may introduce noticeable distortions that may require additional processing or correction at the receiving end.

Figure 83:
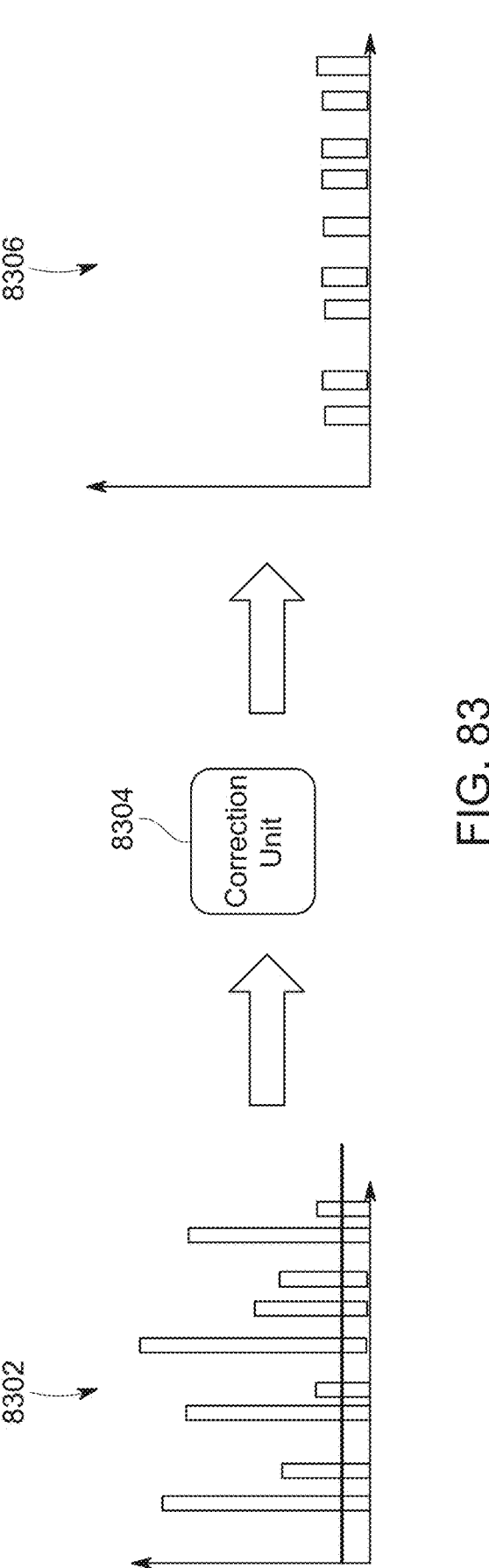
FIG. 83 depicts a system for correcting atmospheric propagation effects on a signal for analog or radio frequency signal transmission.

FIG. 83 illustrates a system for correcting atmospheric propagation effects on a signal. The system may comprise a distorted output signal 8302, a correction unit 8304, and a corrected output signal 8306. The correction unit 8304 may, for example, be used in system 7702 as correction unit 7726. The distorted output signal 8302 may represent the distribution of signal amplitudes before correction, as described in reference to FIG. 82. This input signal may then be processed by the correction unit 8304, which may be designed to mitigate distortions caused by atmospheric propagation.

In some aspects, the correction unit 8304 may employ techniques such as threshold detection to adjust the signal. After processing, the resulting signal may be represented by the corrected output signal 8306. The corrected output signal 8306 may show a more uniform distribution of signal amplitudes compared to the input, indicating the correction applied by the correction unit 8304. In some implementations, the threshold detection may involve comparing the received signal amplitude to one or more predetermined threshold levels. When the signal amplitude crosses these thresholds, the correction unit 8304 may make decisions about the original transmitted bit or symbol. This approach may be particularly effective in dealing with amplitude fluctuations introduced by atmospheric turbulence or other environmental factors. In some cases, the correction unit 8304 may dynamically adjust these threshold levels based on the observed signal characteristics, allowing for adaptive correction that can respond to changing atmospheric conditions. The threshold detection technique may also be combined with other signal processing methods to further enhance the overall performance of the correction unit 8304 in restoring the integrity of the transmitted signal.

Alternatively, or in addition to threshold detection, the correction unit 8304 may perform re-timing and jitter reduction to produce the corrected signal. Re-timing may help synchronize the received signal with the system clock, compensating for timing variations introduced during transmission. Jitter reduction techniques may be employed to minimize unwanted fluctuations in the signal's timing, potentially improving the overall signal quality and reducing errors in data recovery. These additional processing steps may further enhance the system's ability to mitigate distortions caused by atmospheric propagation and other factors affecting signal integrity.

10.B. WDM of Bit-Encoded Analog or Radio Signals for Free Space Optical Systems

Figure 84:
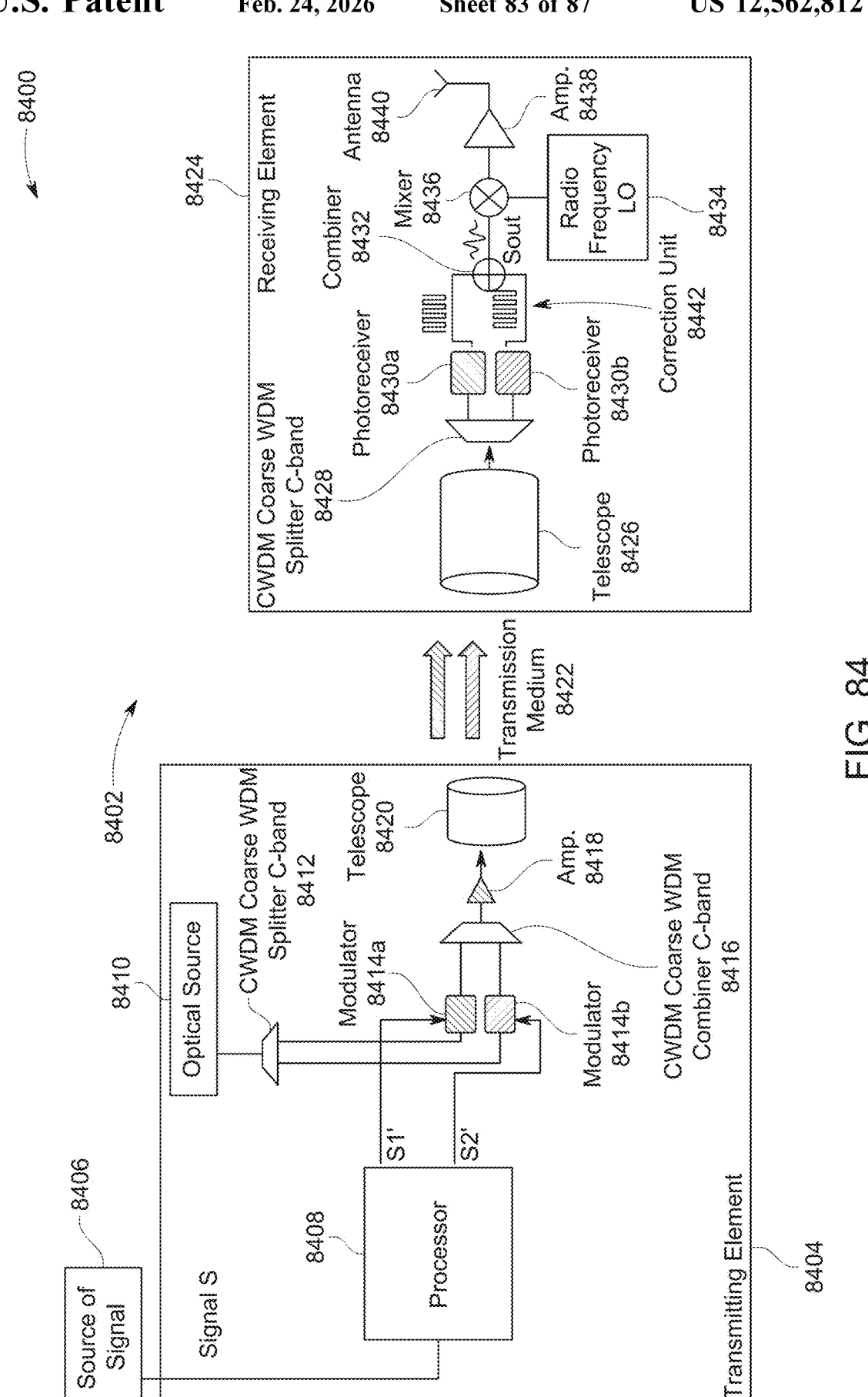
FIG. 84 depicts a block diagram of a multi-channel free-space optical communication system for analog or radio frequency signal transmission.

FIG. 84 illustrates a schematic 8400 of a free space optical communication system 8402. The free space optical communication system 8402 may comprise a transmitting element 8404 and a receiving element 8424 connected via a transmission medium 8422. The transmitting element 8404 may include a source of signal 8406 that provides input to a processor 8408. The processor 8408 may be configured to process the input signal and generate two separate signals for transmission.

An optical source 8410 may be connected to the processor 8408. The optical source 8410 may be configured to generate two distinct wavelengths of light. These two wavelengths may be separated using a coarse wavelength division multiplexing (CWDM) splitter C-band 8412. The separated wavelengths may then be directed to two separate modulators: a first modulator 8414*a* and a second modulator 8414*b*.

The modulators 8414*a* and 8414*b* may be configured to modulate their respective wavelengths based on the processed signals from the processor 8408. The modulated signals may then be combined using another CWDM splitter C-band 8416. The combined optical signal may be amplified by an amplifier 8418 before being directed to a telescope 8420 for transmission through the transmission medium 8422.

On the receiving end, the receiving element 8424 may include a telescope 8426 that captures the transmitted optical signal. The captured signal may then be separated into its two constituent wavelengths using a CWDM splitter C-band 8428. Each separated wavelength may be directed to a respective photoreceiver: a first photoreceiver 8430*a* and a second photoreceiver 8430*b*.

The outputs from the photoreceivers 8430*a* and 8430*b* may be processed by a series of components including a correction unit 8442 and a combiner 8432. The correction unit 8442 may perform correction including threshold detection, jitter reduction, and retiming as described with respect to the embodiments described in FIGS. 77 and 81-83, potentially enhancing the system's ability to mitigate distortions caused by atmospheric propagation and other factors affecting signal integrity in the two-wavelength free space optical communication system. The combiner 8432 may combine the received signals from the photoreceivers. The combined signal may then be processed by a mixer 8436, which may mix the combined signal with a signal from a radio frequency local oscillator 8434. The mixed signal may then be amplified by an amplifier 8438, and finally transmitted through an antenna 8440.

Figure 85:
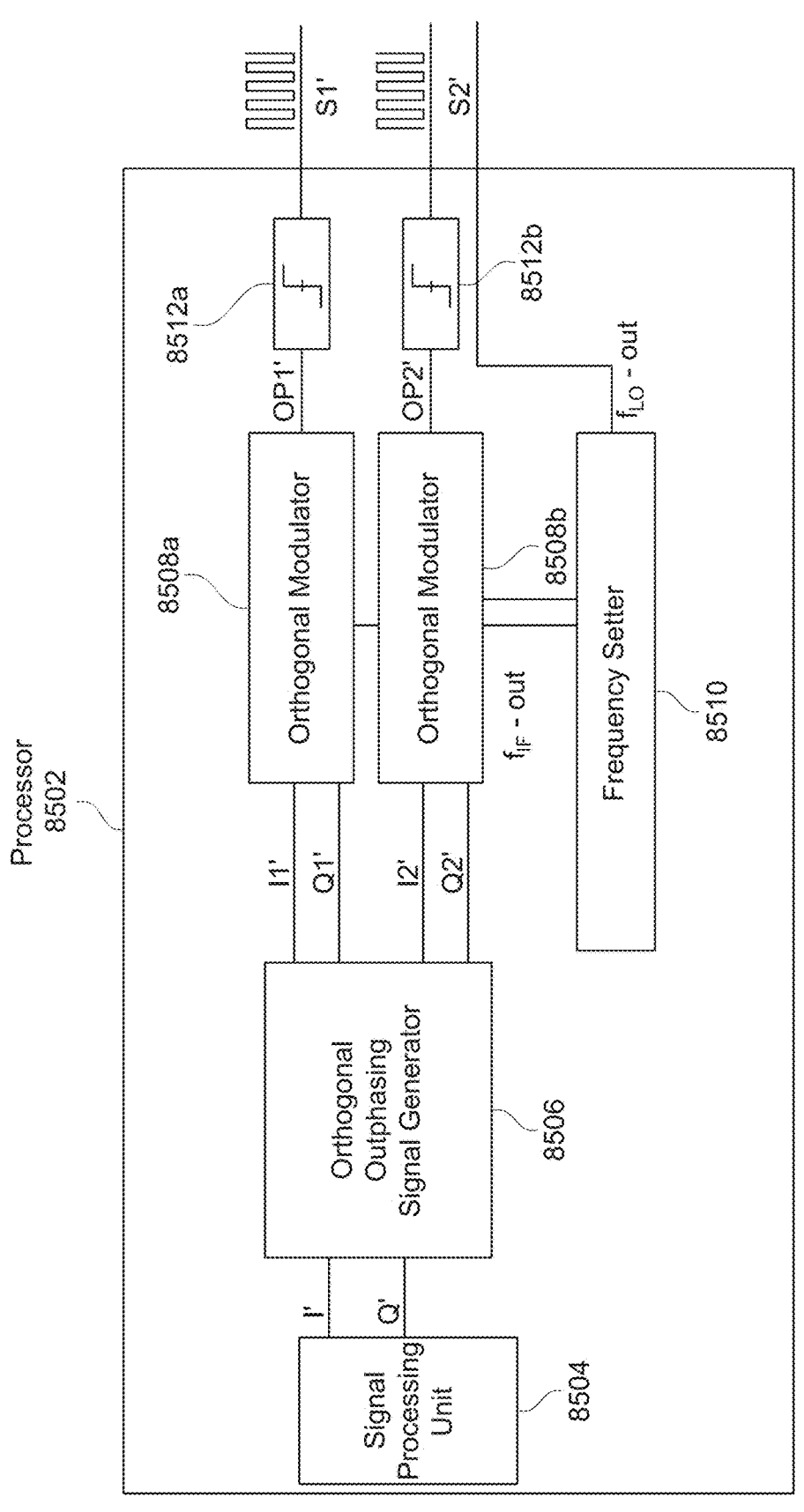
FIG. 85 depicts a block diagram of an exemplary processor for a multi-channel free-space optical communication system for analog or radio frequency signal transmission.

FIG. 85 illustrates a schematic 8500 of an exemplary processor 8502 that may be used in the free space optical communication system 8402 shown in FIG. 84 for processing the input signal received from signal source 8406. The processor 8502 may comprise a signal processing unit 8504, an orthogonal outphasing signal generator 8506, and two orthogonal modulators 8508*a* and 8508*b*.

The signal processing unit 8504 may process the input signal into two orthogonal components, I' and Q'. The orthogonal outphasing signal generator 8506 may receive the processed I' and Q' signals from the signal processing unit 8504. This unit 8506 may be configured to generate four separate signals: I1', Q1', I2', and Q2'. These signals may represent two pairs of orthogonal outphasing signals, with I1' and Q1' forming the first pair, and I2' and Q2' forming the second pair.

The four signals generated by the orthogonal outphasing signal generator 8506 may then be fed into two separate orthogonal modulators: a first orthogonal modulator 8508*a* and a second orthogonal modulator 8508*b*. The first orthogonal modulator 8508*a* may receive I1' and Q1', while the second orthogonal modulator 8508*b* may receive I2' and Q2'. These modulators may be designed to combine their respective input signals to produce two orthogonally modulated signals, OP1' and OP2'.

A frequency setter 8510 may be connected to both orthogonal modulators 8508*a* and 8508*b*. This component may provide frequency control signals (e.g., $f_{IF}$_set and $f_{LO}$_set) to the modulators and/or other components, allowing for precise control over the frequency characteristics of the output signals. The frequency setter 8510 of the processor 8502 sets the intermediate frequency $f_{IF}$ to be used in the orthogonal modulator 8508*a* and 8508*b* so that the signal-to-distortion characteristics have a specified value or greater. Then, concurrently with this setting, the frequency setter 8510 sets the frequency $f_{LO}$ of the external LO signal so that the frequency of the radio signal emitted from the antenna 8440 becomes the target value.

The outputs from the orthogonal modulators, OP1' and OP2', may then be processed by two rectangularizers: a first rectangulizer 8512*a* and a second rectangulizer 8512*b*. These components may convert the modulated signals into rectangular waveforms, S1' and S2'. The rectangular output signals S1' and S2' may represent the final processed signals that are ready for optical modulation and transmission. Each of these signals may correspond to one of the two wavelengths used in the free space optical communication system, allowing for the simultaneous transmission of two separate data streams.

Figure 86:
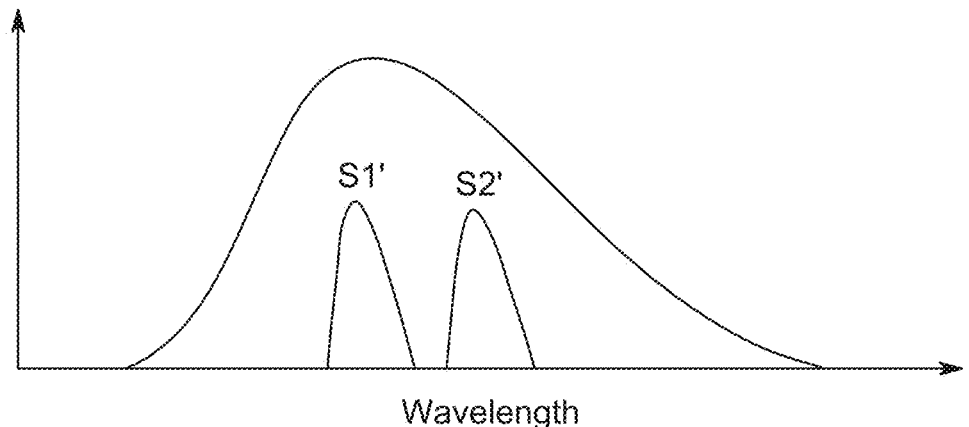
FIG. 86 depicts a graph illustrating wavelength characteristics for a multi-channel free-space optical communication system for analog or radio frequency signal transmission.

FIG. 86 depicts a graph depicting the wavelength characteristics for a two-wavelength free-space optical communinication system. Two distinct peaks, labeled S1' and S2', indicate the two specific wavelengths utilized in the free-space optical communication system. These peaks correspond to the two separate data streams generated by the processor 8502 and transmitted through the system, as described in reference to FIG. 85.

The x-axis of the graph represents the wavelength, while the y-axis indicates the intensity or amplitude of the wavelengths. In some aspects, the wavelengths corresponding to S1' and S2' may be chosen to coincide with atmospheric transmission windows, minimizing absorption and scattering losses during propagation through the atmosphere. This selection may enhance the overall efficiency and reliability of the free-space optical communication link.

This two-signal approach may offer several advantages in the context of free space optical communication. It may provide increased bandwidth, improved resistance to atmospheric turbulence, and enhanced reliability through redundancy. The system may be particularly useful in scenarios where high data rates and robust communication links are required over long distances or through challenging atmospheric conditions. The dual-wavelength approach may also provide flexibility in adapting to different transmission requirements or environmental conditions. Thus, the systems described herein improve signal quality by addressing variations introduced during transmission through the atmosphere. This correction process may be crucial for maintaining reliable communication in free-space optical systems, particularly over long distances or in challenging atmospheric conditions.

10.C. Flowcharts for Analog or Radio Signals for Free Space Optical Systems

FIG. 87 depicts a flowchart 8700 for time-multiplexing in a free-space optical communication system for analog or radio frequency signal transmission. The flowchart 8700 begins, at block 8702, with receiving a first signal. In some aspects, the first signal may be an analog radio signal or a baseband signal. The first signal may be received by a transmitting element, such as transmitting element 7704 in the free space optical communication system 7702 shown in FIG. 77. The first signal may be provided by a signal source, such as signal source 7706 in FIG. 77.

The flowchart 8700, at block 8704, proceeds to separate the first signal into an in-phase component and a quadrature component. This separation may be performed by a processor, such as processor 7708 in FIG. 77. The in-phase component may represent the real part of the first signal, while the quadrature component may represent the imaginary part of the first signal. The separation into in-phase and quadrature components may be performed using techniques such as quadrature demodulation or other suitable methods.

Based on the in-phase component and the quadrature component, the method proceeds, at block 8706, to generate at least two signals. This generation may be performed by the processor, such as processor 7708 in FIG. 77. In some aspects, the processor may generate the at least two signals by generating a first signal pair including an in-phase component I1 and a quadrature component Q1 and a second signal pair including an in-phase component I2 and a quadrature component Q2. The in-phase component I1 and the quadrature component Q1 in the first signal pair may have 90° different phase and the in-phase component I2 and the quadrature component Q2 in the second signal pair may have 90° different phase.

The flowchart 8700, at block 8708, then proceeds to quadrature-modulate the at least two signals to generate at least two outputs. This modulation may be performed by the processor, such as processor 7708 in FIG. 77. In some aspects, the processor may be configured to quadrature-modulate the at least two signals by quadrature-modulating the first signal pair for a first output OP1, in parallel with quadrature-modulating the second signal pair for a second output OP2.

The flowchart 8700, at block 8710, then proceeds to combine the at least two outputs in a time-division manner to generate a first time-division combined signal. This combination may be performed by the processor, such as processor 7708 in FIG. 77. In some aspects, the processor may be configured to combine the at least two outputs in a time-division manner by using a time-division combining unit, such as time-division combining unit 7812 in FIG. 78. The time-division combining unit may be configured to generate a time-division combined signal by combining the first and second outphasing signals in a time-division manner. In some aspects, the first time-division combined signal may be a bit, representing a binary digit of information.

The flowchart 8700, at block 8712, proceeds to generate a beam of light. This step may be performed by an optical source, such as optical source 7710 in FIG. 77. The optical source may be configured to generate a beam of light that is suitable for modulation and transmission. In some aspects, the optical source may be a superluminescent diode (SLED) that emits light with a coherence length less than 400 microns. The short coherence length of the light emitted by the SLED may be advantageous for free-space optical communication, as it may reduce the effects of atmospheric turbulence on the transmitted signal.

The flowchart 8700, at block 8714, proceeds to modulate the beam of light based on the first time-division combined signal to form a modulated beam of light. This modulation may be performed by a modulator, such as modulator 7712 in FIG. 77. The modulator may be configured to receive the first time-division combined signal from the processor and the beam of light from the optical source, and modulate the beam of light based on the time-division combined signal. In some aspects, the modulator may be a Mach-Zehnder modulator and may be configured to encode the transmission data into a series of light pulses using on-off keying.

The flowchart 8700, at block 8716, proceeds to amplify the modulated beam of light to produce an amplified beam of light. This amplification may be performed by an amplifier, such as amplifier 7714 in FIG. 77. The amplifier may be configured to receive the modulated beam of light from the modulator and amplify the modulated beam of light to produce an amplified beam of light. In some aspects, the amplifier may be a fiber amplifier comprising at least a core and cladding surrounding the core. In some implementations, the cladding may comprise a transition metal ion compound, such as Erbium, Ytterbium, Neodymium, or Terbium. The core of the fiber amplifier may be configured to receive the modulated beam of light from the modulator and both amplify and filter the modulated beam of light to produce the amplified beam of light.

The flowchart 8700, at block 8718, proceeds to transmit the amplified beam of light through the variably refractive medium. This transmission may be performed by a telescope, such as telescope 7716 in FIG. 77. The telescope may be configured to transmit the amplified beam of light through the variably refractive medium. In some aspects, the telescope may include optics for collimating the beam, reducing divergence and maximizing the power density at the receiver. The telescope may also include mechanisms for adjusting the beam direction, allowing for precise alignment with the receiving element.

The flowchart 8700, at block 8720, proceeds to receive the amplified beam of light after transmission through the variably refractive medium. This reception may be performed by a receiving element, such as receiving element 7720 in FIG. 77. The receiving element may include a telescope, such as telescope 7722 in FIG. 77, that captures the transmitted signal. The telescope may be configured to focus the incoming optical signal onto a photoreceiver, such as photoreceiver 7724 in FIG. 77. The photoreceiver may be configured to receive the amplified beam of light and extract a second time-division combined signal from the amplified beam of light after the amplified beam of light was transmitted through the variably refractive medium.

The flowchart 8700, at block 8722, proceeds to extract a second time-division combined signal from the received amplified beam of light. This extraction may be performed by a photoreceiver, such as photoreceiver 7724 in FIG. 77. The photoreceiver may be configured to receive the amplified beam of light and extract a second time-division combined signal from the amplified beam of light after the amplified beam of light was transmitted through the variably refractive medium. In some aspects, the second time-division combined signal may be a bit, representing a binary digit of information.

The flowchart 8700, at block 8724, proceeds to correct distortion in the second time-division combined signal created during transmission of the amplified beam of light through the variably refractive medium, thereby producing a corrected signal. This correction may be performed by a correction unit, such as correction unit 7726 in FIG. 77 or correction unit 8442 in FIG. 84. The correction unit may be configured to correct distortions in the second time-division combined signal that were introduced during transmission through the variably refractive medium. In some aspects, the correction unit may use threshold detection to correct the distortion. In other aspects, the correction unit may perform re-timing and jitter reduction to produce the corrected signal.

The flowchart 8700, at block 8726, proceeds to multiply the corrected signal by a signal having a predetermined frequency to produce a multiplied signal. This multiplication may be performed by a mixer, such as mixer 7728 in FIG. 77 or mixer 8436 in FIG. 84. The mixer may be configured to receive the corrected signal and a signal having a predetermined frequency, and multiply the corrected signal by the signal having the predetermined frequency. The multiplied signal may represent the combined information carried by the first and second beams of light, modulated onto a radio frequency carrier for further transmission or use.

The flowchart 8700, at block 8728, proceeds to amplify the multiplied signal to produce an amplified multiplied signal. This amplification may be performed by an amplifier, such as amplifier 7730 in FIG. 77 or amplifier 8438 in FIG. 84. The amplifier may be configured to amplify the multiplied signal to a level suitable for transmission or use.

The flowchart 8700, at block 8730, proceeds to generate a radio signal by removing a frequency component contained in a predetermined frequency band from the amplified multiplied signal. This generation may be performed by a band-pass filter, such as band-pass filter 7732 in FIG. 77. The band-pass filter may be configured to generate a radio signal by removing a frequency component contained in a predetermined frequency band from the amplified multiplied signal. The radio signal may represent the combined information carried by the first and second beams of light, modulated onto a radio frequency carrier and amplified for transmission.

The flowchart 8700, at block 8732, proceeds to emit the radio signal. This emission may be performed by an antenna, such as antenna 7734 in FIG. 77 or antenna 8440 in FIG. 84. The antenna may be configured to emit the radio signal into free space for reception by another device. The antenna may be designed to radiate the radio signal in a specific pattern or direction, depending on the requirements of the communication system. The antenna may be configured to re-transmit the regenerated RF analog signal. This capability may allow the system to function as a long-distance RF relay, using free-space optical transmission as an intermediate step. The system may thus effectively transmit RF signals over long distances using optical means, which can provide advantages in terms of bandwidth and interference resistance compared to traditional RF links for point-to-point communication.

In some aspects, the antenna may be configured to re-transmit the regenerated RF analog signal. This capability may allow the system to function as a long-distance RF relay, using free-space optical transmission as an intermediate step. The system may thus effectively transmit RF signals over long distances using optical means, which can provide advantages in terms of bandwidth and interference resistance compared to traditional RF links for point-to-point communication.

The emission of the radio signal represents the final step in the communication process, allowing the transmitted information to be received and utilized by another device. This step is crucial for the overall operation of the free space optical communication system, as it enables the system to deliver the transmitted information to its intended destination. The use of an antenna for emitting the radio signal may provide flexibility in directing the signal towards the receiver, potentially enhancing the reliability and efficiency of the communication link.

In some cases, the antenna may be part of a larger network of antennas, allowing for the distribution of the radio signal over a wide area. This may be particularly useful in scenarios where the information needs to be disseminated to multiple receivers, such as in a broadcast system. In other cases, the antenna may be part of a point-to-point link, directing the radio signal towards a specific receiver. This may be advantageous in scenarios where secure, dedicated communication links are required.

In some implementations, the antenna may be designed to operate over a wide range of frequencies, allowing for the transmission of a variety of radio signals. This may provide flexibility in adapting to different communication requirements or standards. In other implementations, the antenna may be designed to operate at a specific frequency or within a narrow frequency band, potentially improving the signal quality and reducing interference.

In some aspects, the antenna may be configured to adjust its radiation pattern based on the characteristics of the radio signal or the communication environment. This may involve adjusting the direction, shape, or intensity of the radiation pattern to optimize the signal coverage and reception. Such adjustments may be performed dynamically, allowing the system to adapt to changing conditions in real time.

Overall, the emission of the radio signal represents a critical step in the communication process, enabling the delivery of the transmitted information to its intended destination. The design and configuration of the antenna play a crucial role in this step, influencing the efficiency, reliability, and flexibility of the communication system.

FIG. 88 depicts a flowchart 8800 for multi-channel free-space optical communication system for analog or radio frequency signal transmission. The flowchart 8800, at block 8802, may start by receiving a first signal. This first signal may be an analog radio signal or a baseband signal. The first signal may be received by a transmitting element, such as transmitting element 8404 in the free space optical communication system 8402 shown in FIG. 84. The first signal may be provided by a signal source, such as signal source 8406 in FIG. 84.

The flowchart 8800, at block 8804, proceeds to process the first signal to generate a first processed signal and a second processed signal. This processing may be performed by a processor, such as processor 8408 in FIG. 84. The processor 8408 may be configured to process the input signal and generate a first processed signal and a second processed signal. The first processed signal and the second processed signal may represent two separate data streams that are to be transmitted simultaneously.

The flowchart 8800, at block 8806, proceeds to generate a first beam of light and a second beam of light. This generation may be performed by an optical source, such as optical source 8410 in FIG. 84. The optical source 8410 may be configured to generate a first beam of light and a second beam of light, each with a coherence length less than 400 microns. In some implementations, the optical source 8410 may be a superluminescent diode (SLED) that emits light with a coherence length less than 400 microns.

The flowchart 8800, at block 8808, proceeds to modulate the first beam of light based on the first processed signal to form a first modulated beam of light. This modulation may be performed by a first modulator, such as first modulator 8414*a* in FIG. 84. The first modulator 8414*a* may be configured to receive the first processed signal and the first beam of light, and modulate the first beam of light based on the first processed signal to form a first modulated beam of light.

Similarly, the flowchart 8800, at block 8810, proceeds to modulate the second beam of light based on the second processed signal to form a second modulated beam of light. This modulation may be performed by a second modulator, such as second modulator 8414*b* in FIG. 84. The second modulator 8414*b* may be configured to receive the second processed signal and the second beam of light, and modulate the second beam of light based on the second processed signal to form a second modulated beam of light.

In this way, the method may involve generating two separate modulated beams of light based on two separate processed signals. This may allow for the simultaneous transmission of two separate data streams, potentially doubling the data capacity of the system. The use of two separate beams of light may also provide redundancy, potentially enhancing the reliability of the communication system.

The flowchart 8800, at block 8812, proceeds to amplify the first modulated beam of light and the second modulated beam of light to produce a first amplified beam of light and a second amplified beam of light. This amplification may be performed by a first amplifier, such as amplifier 8418 in FIG. 84. The first amplifier 8418 may be configured to receive the first modulated beam of light and the second modulated beam of light from the first modulator 8414*a* and the second modulator 8414*b*, respectively, and amplify the first modulated beam of light and the second modulated beam of light to produce the first amplified beam of light and the second amplified beam of light.

The flowchart 8800, at block 8814, proceeds to transmit the first amplified beam of light and the second amplified beam of light through the variably refractive medium. This transmission may be performed by a telescope, such as telescope 8420 in FIG. 84. The telescope 8420 may be configured to transmit the first amplified beam of light and the second amplified beam of light through the variably refractive medium. In some aspects, the telescope 8420 may include optics for collimating the beam, reducing divergence and maximizing the power density at the receiver. The telescope 8420 may also include mechanisms for adjusting the beam direction, allowing for precise alignment with the receiving element.

The flowchart 8800, at block 8816, proceeds to receive the first amplified beam of light and the second amplified beam of light after transmission through the variably refractive medium. This reception may be performed by a receiving element, such as receiving element 8424 in FIG. 84. The receiving element 8424 may include a receiving telescope 8426 that captures the transmitted signal. The receiving telescope 8426 may be configured to focus the incoming optical signal onto a photoreceiver, such as first photoreceiver 8430*a* and second photoreceiver 8430*b* in FIG. 84.

The first photoreceiver 8430*a* and the second photoreceiver 8430*b* may be configured to receive the first amplified beam of light and the second amplified beam of light, respectively, and extract a first processed transmitted signal from the received first amplified beam of light and a second processed transmitted signal from the received second amplified beam of light. The first processed transmitted signal and the second processed transmitted signal may represent the information carried by the first and second beams of light, respectively. The photoreceivers 8430*a* and 8430*b* may convert the received optical signals into electrical signals that can be further processed.

The flowchart 8800, at block 8818, proceeds to extract a first processed transmitted signal from the received first amplified beam of light and a second processed transmitted signal from the received second amplified beam of light. This extraction may be performed by first photoreceiver 8430*a* and second photoreceiver 8430*b* in the receiving element 8424 of the free space optical communication system 8402 shown in FIG. 84. The first photoreceiver 8430*a* and the second photoreceiver 8430*b* may be configured to receive the first amplified beam of light and the second amplified beam of light, respectively, and extract a first processed transmitted signal from the received first amplified beam of light and a second processed transmitted signal from the received second amplified beam of light. The first processed transmitted signal and the second processed transmitted signal may represent the information carried by the first and second beams of light, respectively. The photoreceivers 8430*a* and 8430*b* may convert the received optical signals into electrical signals that can be further processed.

The flowchart 8800, at block 8820, proceeds to correct distortion in the first processed transmitted signal and the second processed transmitted signal created during transmission through the variably refractive medium, thereby producing a first corrected signal and a second corrected signal. This correction may be performed by a correction unit, such as correction unit 8442 in FIG. 84. The correction unit 8442 may be configured to correct distortions in the first and second processed transmitted signals that were introduced during transmission through the variably refractive medium 8422. In some aspects, the correction unit 8442 may use threshold detection to correct the distortion. In other aspects, the correction unit 8442 may perform re-timing and jitter reduction to produce the corrected signals. These techniques may help mitigate the effects of atmospheric distortions and improve the overall signal quality and reliability of the communication system.

The flowchart 8800, at block 8822, proceeds to combine the first corrected signal and the second corrected signal into a combined signal. This combination may be performed by a combiner, such as combiner 8432 in FIG. 84. The combiner 8432 may be configured to combine the first and second corrected signals in a manner that preserves the information carried by each signal. The combined signal may represent the combined information carried by the first and second beams of light.

The flowchart 8800, at block 8824, proceeds to multiply the combined signal by a radio frequency signal to produce a multiplied signal. This multiplication may be performed by a mixer, such as mixer 8436 in FIG. 84. The mixer 8436 may be configured to receive the combined signal and a signal from a radio frequency local oscillator 8434, and multiply the combined signal by the signal from the radio frequency local oscillator 8434 to produce a multiplied signal. The multiplied signal may represent the combined information carried by the first and second beams of light, modulated onto a radio frequency carrier for further transmission or use.

The flowchart 8800, at block 8826, proceeds to amplify the multiplied signal to produce an amplified multiplied signal. This amplification may be performed by an amplifier, such as amplifier 8438 in FIG. 84. The amplifier 8438 may be configured to amplify the multiplied signal to a level suitable for transmission or use. The amplified multiplied signal may represent the combined information carried by the first and second beams of light, modulated onto a radio frequency carrier and amplified for transmission.

The flowchart 8800, at block 8820, proceeds to emit the amplified multiplied signal. This emission may be performed by an antenna, such as antenna 8440 in FIG. 84. The antenna 8440 may be configured to emit the amplified multiplied signal into free space for reception by another device. The antenna 8440 may be designed to radiate the amplified multiplied signal in a specific pattern or direction, depending on the requirements of the communication system. The antenna 8440 may be configured to re-transmit the regenerated RF analog signal. This capability may allow the system to function as a long-distance RF relay, using free-space optical transmission as an intermediate step. The system 8402 may thus effectively transmit RF signals over long distances using optical means, which can provide advantages in terms of bandwidth and interference resistance compared to traditional RF links for point-to-point communication.

11. EXAMPLES

Exemplary embodiments of the systems and methods disclosed herein are described in the numbered paragraphs below.

A1. A free space optical communication system for optically transmitting data through a variably refractive medium, the system comprising: a transmitting element configured to receive a first signal, wherein the transmitting element includes: a processor configured to: separate the first signal into an in-phase component and a quadrature component; based on the in-phase component and the quadrature component, generate at least two signals; quadrature-modulate the at least two signals to generate at least two outputs; and combine the at least two outputs in a time-division manner to generate a first time-division combined signal; an optical source configured to generate a beam of light; a modulator configured to receive the first time-division combined signal and the beam of light, and modulate the beam of light based on the time-division combined signal to form a modulated beam of light; a first amplifier configured to receive the modulated beam of light from the modulator and amplify the modulated beam of light to produce an amplified beam of light; and a telescope configured to transmit the amplified beam of light through the variably refractive medium; a receiving element comprising: a photoreceiver configured to receive the amplified beam of light and extract a second time-division combined signal from the amplified beam of light after the amplified beam of light was transmitted through the variably refractive medium; a correction unit configured to correct distortion in the second time-division combined signal created during transmission of the amplified beam of light through the variably refractive medium, thereby producing a corrected signal; a mixer configured to receive the corrected signal, and multiply the corrected signal by a signal having a predetermined frequency to produce a multiplied signal; a second amplifier configured to amplify the multiplied signal to produce an amplified multiplied signal; a band-pass filter configured to generate a radio signal by removing a frequency component contained in a predetermined frequency band from the amplified multiplied signal; and an antenna configured to emit the radio signal.

A2. The free space optical communication system of A1, wherein the correction unit uses threshold detection to correct the distortion in the second time-division combined signal created during the transmission of the amplified beam of light through the variably refractive medium.

A3. The free space optical communication system of any of A1-A2, wherein the correction unit performs re-timing and jitter reduction to produce the corrected signal.

A4. The free space optical communication system of any of A1-A3, wherein the first signal is an analog radio signal.

A5. The free space optical communication system of any of A1-A4, wherein the first time-division combined signal is a bit.

A6. The free space optical communication system of any of A1-A5, wherein the second time-division combined signal is a bit.

A7. The free space optical communication system of any of A1-A6, wherein the modulator is a Mach-Zehnder modulator.

A8. The free space optical communication system of any of A1-A7, wherein the modulator is configured to encode the transmission data into the series of light pulses using on-off keying.

A9. The free space optical communication system of any of A1-A8, wherein the first signal is a baseband signal.

A10. The free space optical communication system of any of A1-A9, wherein the processor is configured to generate at least two signals by generating a first signal pair including an in-phase component I1 and a quadrature component Q1 and a second signal pair including an in-phase component I2 and a quadrature component Q2.

A11. The free space optical communication system of A10, wherein the in-phase component I1 and the quadrature component Q1 in the first signal pair have 900 different phase and the in-phase component I2 and the quadrature component Q2 in the second signal pair have 900 different phase.

A12. The free space optical communication system of A10, wherein the processor is configured to quadrature-modulate the at least two signals by quadrature-modulating the first signal pair for a first output OP1, in parallel with quadrature-modulating the second signal pair for a second output OP2.

A13. The free space optical communication system of A12, wherein the processor is further configured to convert waveforms of the first and second output OP1, OP2 into rectangular waveforms, wherein the processor combines the first and second rectangular-waveform output OP1, OP2 in a time-division manner.

A14. The free space optical communication system of any of A1-A13, wherein the beam of light emitted by the optical source has a coherence length less than 400 microns.

A15. The free space optical communication system of any of A1-A14, wherein the optical source is a superluminescent diode (SLED).

A16. The free space optical communication system of any of A1-A15, wherein the optical source and the photoreceiver are spaced by a free space optical communication distance of at least one mile, and the optical communication system has a measured bit error rate of less than one in one billion over the free space optical communication distance of at least one mile for a measurement period of at least sixty seconds.

A17. The free space optical communication system of any of A1-A16, wherein the amplifier is a fiber amplifier comprising at least a core and cladding surrounding the core, wherein the cladding comprises a transition metal ion compound and the core of the fiber amplifier is configured to receive the modulated beam of light from the modulator and both amplify and filter the modulated beam of light to produce the amplified beam of light.

A18. The free space optical communication system of A17, wherein the transition metal ion is at least one of Erbium, Ytterbium, Neodymium, or Terbium.

A19. A free space optical communication system for optically transmitting data through a variably refractive medium, the system comprising: a transmitting element configured to receive a first signal, wherein the transmitting element includes: a processor configured to: process the first signal and generate a first processed signal and a second processed signal; an optical source configured to generate a first beam of light and a second beam of light, wherein the first beam of light and the second beam of light emitted by the optical source each have a coherence length less than 400 microns; a first modulator, wherein the first modulator is configured to: receive a first one of the first processed signal and the second processed signal and a first one of the first beam of light and the second beam of light, and modulate the first one of the first beam of light and the second beam of light based on the first one of the first processed signal and the second processed signal to form a first modulated beam of light; a second modulator, wherein the second modulator is configured to: receive a second one of the first processed signal and the second processed signal and a second one of the first beam of light and the second beam of light, and modulate the second one of the first beam of light and the second beam of light based on the second one of the first processed signal and the second processed signal to form a second modulated beam of light; a first amplifier configured to receive the first modulated beam of light and the second modulated beam of light from the first modulator and the second modulator and amplify the first modulated beam of light and the second modulated beam of light to produce a first amplified beam of light and a second amplified beam of light; and a telescope configured to transmit the first amplified beam of light and the second amplified beam of light through the variably refractive medium; a receiving element comprising: a photoreceiver configured to receive the first amplified beam of light and the second amplified beam of light and configured to: extract a first processed transmitted signal from the first amplified beam of light after the first amplified beam of light was transmitted through the variably refractive medium; and extract a second processed transmitted signal from the second amplified beam of light after the second amplified beam of light was transmitted through the variably refractive medium; a correction unit configured to: correct distortion in the first processed transmitted signal created during transmission of the first amplified beam of light through the variably refractive medium, thereby producing a first corrected signal; and correct distortion in the second processed transmitted signal created during transmission of the second amplified beam of light through the variably refractive medium, thereby producing a second corrected signal; a combiner configured to combine the first corrected signal and the second corrected signal into a combined signal; a radio frequency local oscillator configured to generate a radio frequency signal; a mixer configured to receive the combined signal and the radio frequency signal, and multiply the combined signal by the radio frequency signal to produce a multiplied signal; a second amplifier configured to amplify the multiplied signal to produce an amplified multiplied signal; and an antenna configured to emit the amplified multiplied signal.

A20. A free space optical communication system for optically transmitting data through a variably refractive medium, the system comprising: a transmitting element configured to receive a first signal, wherein the transmitting element includes: a processor configured to: process the first signal and generate at least one processed signal; an optical source configured to generate at least one beam of light, the at least one beam of light emitted by the optical source having a coherence length less than 400 microns; at least one modulator configured to receive the at least one processed signal and the at least one beam of light, and modulate the at least one beam of light based on the at least one processed signal to form at least one modulated beam of light; a first amplifier configured to receive the at least one modulated beam of light from the at least one modulator and amplify the at least one modulated beam of light to produce at least one amplified beam of light; and a telescope configured to transmit the at least one amplified beam of light through the variably refractive medium; a receiving element comprising: a photoreceiver configured to receive the at least one amplified beam of light and extract at least one processed transmitted signal from the amplified beam of light after the amplified beam of light was transmitted through the variably refractive medium; a correction unit configured to correct distortion in the at least one processed transmitted signal created during transmission of the amplified beam of light through the variably refractive medium, thereby producing at least one corrected signal; a mixer configured to receive the at least one corrected signal, and multiply the at least one corrected signal by a signal having a predetermined frequency to produce a multiplied signal; a second amplifier configured to amplify the multiplied signal to produce an amplified multiplied signal; and an antenna configured to emit the amplified multiplied signal.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A transmitting system of a free space optical communication system for optically transmitting data through a variably refractive medium, the transmitting system comprising:

a processor configured to:
 receive a first signal; and
 process the first signal and generate a first processed signal and a second processed signal;

an optical source configured to generate a first beam of light and a second beam of light, wherein the first beam of light and the second beam of light emitted by the optical source each have a coherence length less than 400 microns;

a first modulator, wherein the first modulator is configured to:
 receive a first one of the first processed signal and the second processed signal and a first one of the first beam of light and the second beam of light, and
 modulate the first one of the first beam of light and the second beam of light based on the first one of the first processed signal and the second processed signal to form a first modulated beam of light;

a second modulator, wherein the second modulator is configured to:
 receive a second one of the first processed signal and the second processed signal and a second one of the first beam of light and the second beam of light, and
 modulate the second one of the first beam of light and the second beam of light based on the second one of the first processed signal and the second processed signal to form a second modulated beam of light;

a first amplifier configured to receive the first modulated beam of light and the second modulated beam of light from the first modulator and the second modulator and amplify the first modulated beam of light and the second modulated beam of light to produce a first amplified beam of light and a second amplified beam of light; and a telescope configured to transmit the first amplified beam of light and the second amplified beam of light through the variably refractive medium, wherein the first amplified beam of light comprises a series of pulses, the series of pulses comprises a first pulse having a coherence length of less than 400 microns, when the first pulse travels through the variably refractive medium, photons in the first pulse are refracted to travel along different ray paths having different lengths to a photoreceiver, the photons of the first pulse arrive at the photoreceiver according to a temporal distribution curve that depends, at least in part, on a duration of the first pulse and lengths of the different ray paths taken by the photons in the first pulse to the photoreceiver, a full width at half maximum value (FWHM value) of the temporal distribution curve is at least as large as a coherence time value equal to the coherence length of the first pulse divided by a speed of light through the variably refractive medium, and

a detection window of the photoreceiver is at least as large as the FWHM value of the temporal distribution curve.

2. A transmitting system of a free space optical communication system for optically transmitting data through a variably refractive medium, the transmitting system comprising:

a processor configured to:
receive a first signal; and
process the first signal and generate at least one processed signal;

an optical source configured to generate at least one beam of light, the at least one beam of light emitted by the optical source having a coherence length less than 400 microns;

at least one modulator configured to receive the at least one processed signal and the at least one beam of light, and modulate the at least one beam of light based on the at least one processed signal to form at least one modulated beam of light;

a first amplifier configured to receive the at least one modulated beam of light from the at least one modulator and amplify the at least one modulated beam of light to produce at least one amplified beam of light; and a telescope configured to transmit the at least one amplified beam of light through the variably refractive medium, wherein the at least one amplified beam of light comprises a series of pulses, the series of pulses comprises a first pulse having a coherence length of less than 400 microns, when the first pulse travels through the variably refractive medium, photons in the first pulse are refracted to travel along different ray paths having different lengths to a photoreceiver, the photons of the first pulse arrive at the photoreceiver according to a temporal distribution curve that depends, at least in part, on a duration of the first pulse and lengths of the different ray paths taken by the photons in the first pulse to the photoreceiver, a full width at half maximum value (FWHM value) of the temporal distribution curve is at least as large as a coherence time value equal to the coherence length of the first pulse divided by a speed of light through the variably refractive medium, and a detection window of the photoreceiver is at least as large as the FWHM value of the temporal distribution curve.

3. A transmitting system of a free space optical communication system for optically transmitting data through a variably refractive medium, the transmitting system comprising:

a processor configured to:
receive a first signal;
separate the first signal into an in-phase component and a quadrature component;
based on the in-phase component and the quadrature component, generate at least two signals;
quadrature-modulate the at least two signals to generate at least two outputs; and
combine the at least two outputs in a time-division manner to generate a first time-division combined signal;

an optical source configured to generate a beam of light;
a modulator configured to receive the first time-division combined signal and the beam of light, and modulate the beam of light based on the first time-division combined signal to form a modulated beam of light;

96 a first amplifier configured to receive the modulated beam of light from the modulator and amplify the modulated beam of light to produce an amplified beam of light; and a telescope configured to transmit the amplified beam of light through the variably refractive medium, wherein the amplified beam of light comprises a series of pulses, the series of pulses comprises a first pulse having a coherence length of less than 400 microns, when the first pulse travels through the variably refractive medium, photons in the first pulse are refracted to travel along different ray paths having different lengths to a photoreceiver, the photons of the first pulse arrive at the photoreceiver according to a temporal distribution curve that depends, at least in part, on a duration of the first pulse and lengths of the different ray paths taken by the photons in the first pulse to the photoreceiver, a full width at half maximum value (FWHM value) of the temporal distribution curve is at least as large as a coherence time value equal to the coherence length of the first pulse divided by a speed of light through the variably refractive medium, and a detection window of the photoreceiver is at least as large as the FWHM value of the temporal distribution curve.

4. The transmitting system of claim 3, wherein the first signal is an analog radio signal.

5. The transmitting system of claim 3, wherein the first time-division combined signal is a bit.

6. The transmitting system of claim 3, wherein the modulator is a Mach-Zehnder modulator.

7. The transmitting system of claim 3, wherein the modulator is configured to encode transmission data, corresponding to the first signal, into the beam of light using on-off keying.

8. The transmitting system of claim 3, wherein the first signal is a baseband signal.

9. The transmitting system of claim 3, wherein the processor is configured to generate the at least two signals by generating a first signal pair including a first in-phase component I1 and a first quadrature component Q1 and a second signal pair including a second in-phase component I2 and a second quadrature component Q2.

10. The transmitting system of claim 9, wherein the first in-phase component I1 and the first quadrature component Q1 in the first signal pair have 90° different phase, and the second in-phase component I2 and the second quadrature component Q2 in the second signal pair have 90° different phase.

11. The transmitting system of claim 9, wherein the processor is configured to quadrature-modulate the at least two signals by quadrature-modulating the first signal pair for a first output OP1, in parallel with quadrature-modulating the second signal pair for a second output OP2.

12. The transmitting system of claim 11, wherein the processor is further configured to convert waveforms of the first output OP1 and the second output OP2 into rectangular waveforms, wherein the processor combines the rectangular waveforms in a time-division manner.

13. The transmitting system of claim 3, wherein the beam of light emitted by the optical source has a coherence length less than 400 microns.

14. The transmitting system of claim 3, wherein the optical source is a superluminescent diode (SLED).

15. The transmitting system of claim 3, wherein the optical source and a photoreceiver configured to receive the amplified beam of light are spaced by a free space optical communication distance of at least one mile, and the transmitting system has a measured bit error rate of less than one in one billion over the free space optical communication distance for a measurement period of at least sixty seconds.

16. The transmitting system of claim 3, wherein the first amplifier is a fiber amplifier comprising at least a core and cladding, the cladding surrounds the core, the cladding comprises a transition metal ion compound, and the fiber amplifier is configured to receive the modulated beam of light from the modulator and both amplify and filter the modulated beam of light to produce the amplified beam of light.

17. The transmitting system of claim 16, wherein a transition metal ion of the transition metal ion compound is at least one of Erbium, Ytterbium, Neodymium, or Terbium.

18. The transmitting system of claim 3, wherein the FWHM value of the temporal distribution curve is at least three times as large as a coherence time value.

19. The transmitting system of claim 3, wherein the detection window of the photoreceiver is at least six times as large as the FWHM value of the temporal distribution curve.

\*    \*    \*    \*    \*